US012711459B1

(12) United States Patent
Chadwick et al.

(10) Patent No.: US 12,711,459 B1
(45) Date of Patent: Aug. 18, 2026

(54) AUTOMATED STORY MODEL COLLABORATION SYSTEM

(71) Applicant: Live Circle Inc., Ridgewood, NJ (US)

(72) Inventors: Charles Chadwick, Ridgewood, NJ (US); Darin Ragozzine, Huber City, UT (US); Blake Wilkey, Soddy Daisy, TN (US); Samuel Brotherton, Park City, UT (US)

(73) Assignee: Live Circle Inc., Ridgewood, NJ (US)

( * ) Notice: Subject to any disclaimer, the term of this patent is extended or adjusted under 35 U.S.C. 154(b) by 526 days.

(21) Appl. No.: 18/082,544

(22) Filed: Dec. 15, 2022

Related U.S. Application Data

(63) Continuation-in-part of application No. 17/074,617, filed on Oct. 19, 2020, and a continuation-in-part of application No. 17/074,270, filed on Oct. 19, 2020.

(60) Provisional application No. 63/289,745, filed on Dec. 15, 2021, provisional application No. 62/916,793, filed on Oct. 17, 2019.

(51) Int. Cl.
*G06Q 10/101* (2023.01)
*G06F 16/2455* (2019.01)

(52) U.S. Cl.
CPC ..... *G06Q 10/101* (2013.01); *G06F 16/24568* (2019.01)

(58) Field of Classification Search
CPC ........................ G06Q 10/101; G06F 16/24568
See application file for complete search history.

(56) References Cited

U.S. PATENT DOCUMENTS 7,742,911 B2 6/2010 Chotimongkol
9,367,608 B1 6/2016 Zhang
11,526,541 B1 12/2022 Chadwick
2005/0124474 A1* 6/2005 Van Der Hoeven ......................... A63B 23/0211 482/121
2011/0093564 A1* 4/2011 Li ........................... H04L 67/51 709/217
2014/0046696 A1* 2/2014 Higgins ................. G16H 50/20 705/3
2017/0004260 A1* 1/2017 Moturu .................. G16H 10/60

(Continued)

OTHER PUBLICATIONS

Demiris, George et al, "Spoken words as biomarkers: using machine learning to gain insight into communication as a predictor of anxiety", Journal of the American Medical Informatics Association, 27(6), May 6, 2020, 929-933.

*Primary Examiner* — Daniel C Washburn
*Assistant Examiner* — Paul J. Mueller
(74) *Attorney, Agent, or Firm* — POLSINELLI PC

(57) ABSTRACT

In the various example embodiments disclosed herein, a best next action is recommended by a user's model by establishing from user inputs a personally relevant narrative context; establishing a narrative context using a Story Object Hierarchy; constructing values for user attributes and goals based on the Story Object Hierarchy; determining from the goals a user's envisioned story; optimizing actions to advance the user towards the user's envisioned story; optimizing communication of the optimized actions to reflect the constituents of the Story Object Hierarchy most likely to advance the user towards user's envisioned story; receiving new user input after communicating the optimized actions to the user; evaluating user progress towards the user's envisioned story; and recommending for the user a best next action for their personally relevant narrative context.

22 Claims, 115 Drawing Sheets

(56) References Cited

U.S. PATENT DOCUMENTS

| | | | | |
|---|---|---|---|---|
| 2017/0337180 | A1 | 11/2017 | Wang | |
| 2019/0139642 | A1* | 5/2019 | Roberge | G06N 3/08 |
| 2019/0155907 | A1 | 5/2019 | Park | |
| 2019/0205787 | A1* | 7/2019 | Duriseti | G06F 16/901 |
| 2019/0311003 | A1 | 10/2019 | Tonkin | |

* cited by examiner

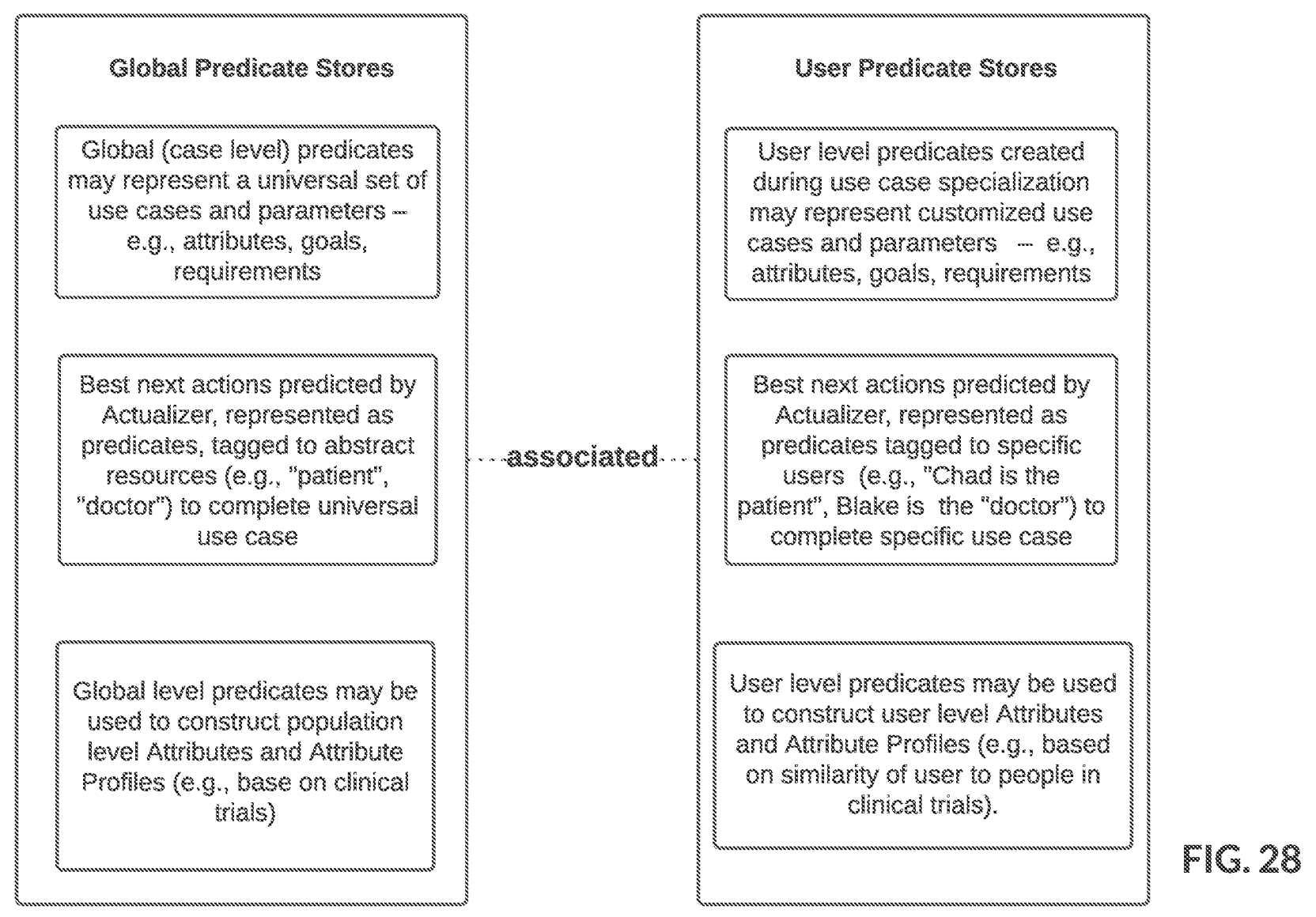

Global Predicate Stores

Global (case level) predicates may represent a universal set of use cases and parameters -- e.g., attributes, goals, requirements Best next actions predicted by Actualizer, represented as predicates, tagged to abstract resources (e.g., "patient", "doctor") to complete universal use case Global level predicates may be used to construct population level Attributes and Attribute Profiles (e.g., base on clinical trials)

associated

User Predicate Stores

User level predicates created during use case specialization may represent customized use cases and parameters -- e.g., attributes, goals, requirements Best next actions predicted by Actualizer, represented as predicates tagged to specific users (e.g., "Chad is the patient", Blake is the "doctor") to complete specific use case User level predicates may be used to construct user level Attributes and Attribute Profiles (e.g., based on similarity of user to people in clinical trials).

FIG. 28

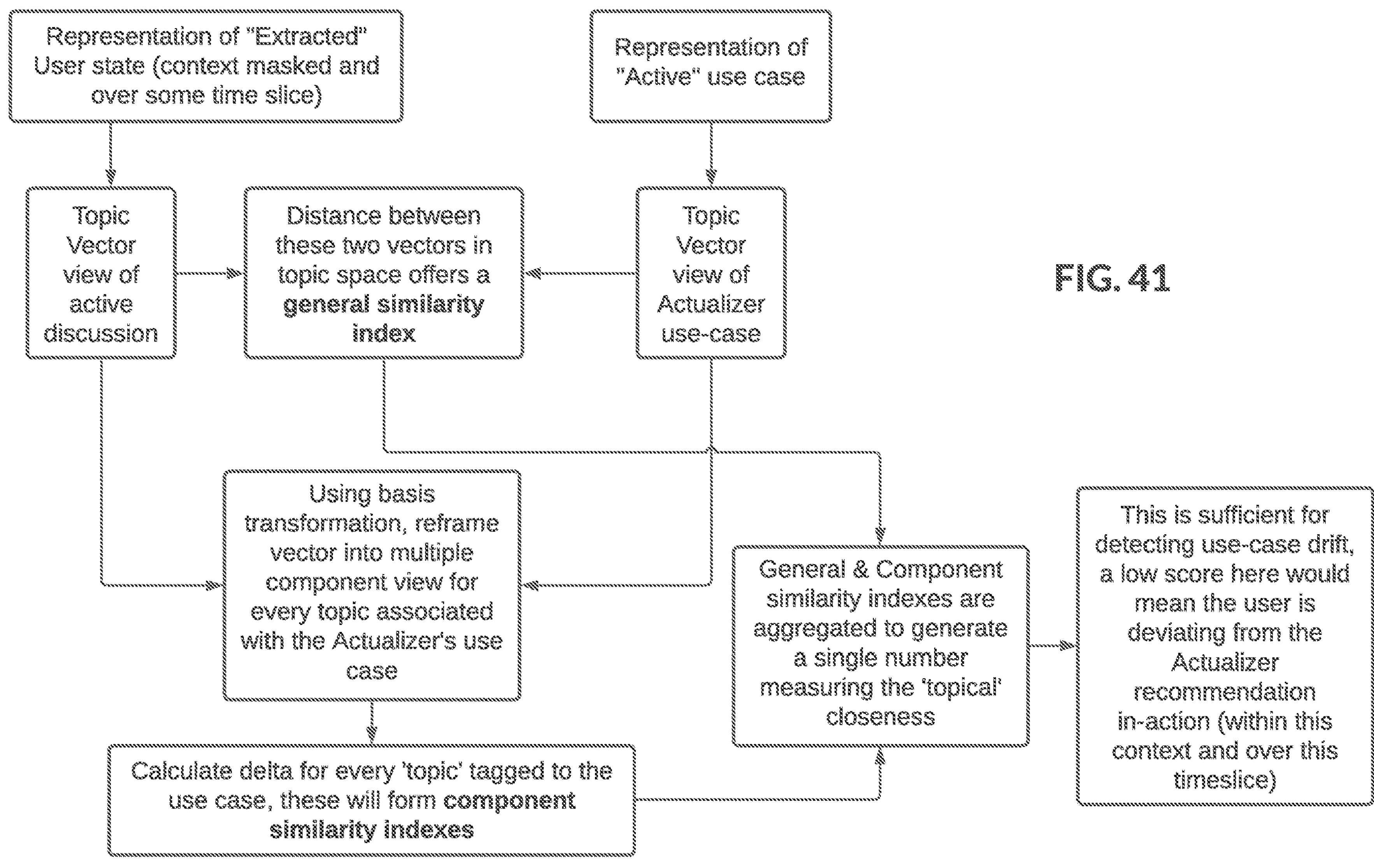

Representation of "Extracted" User state (context masked and over some time slice)
Representation of "Active" use case
Topic Vector view of active discussion
Distance between these two vectors in topic space offers a general similarity index
Topic Vector view of Actualizer use-case
FIG. 41
Using basis transformation, reframe vector into multiple component view for every topic associated with the Actualizer's use case
General & Component similarity indexes are aggregated to generate a single number measuring the 'topical' closeness
This is sufficient for detecting use-case drift, a low score here would mean the user is deviating from the Actualizer recommendation in-action (within this context and over this timeslice)
Calculate delta for every 'topic' tagged to the use case, these will form component similarity indexes

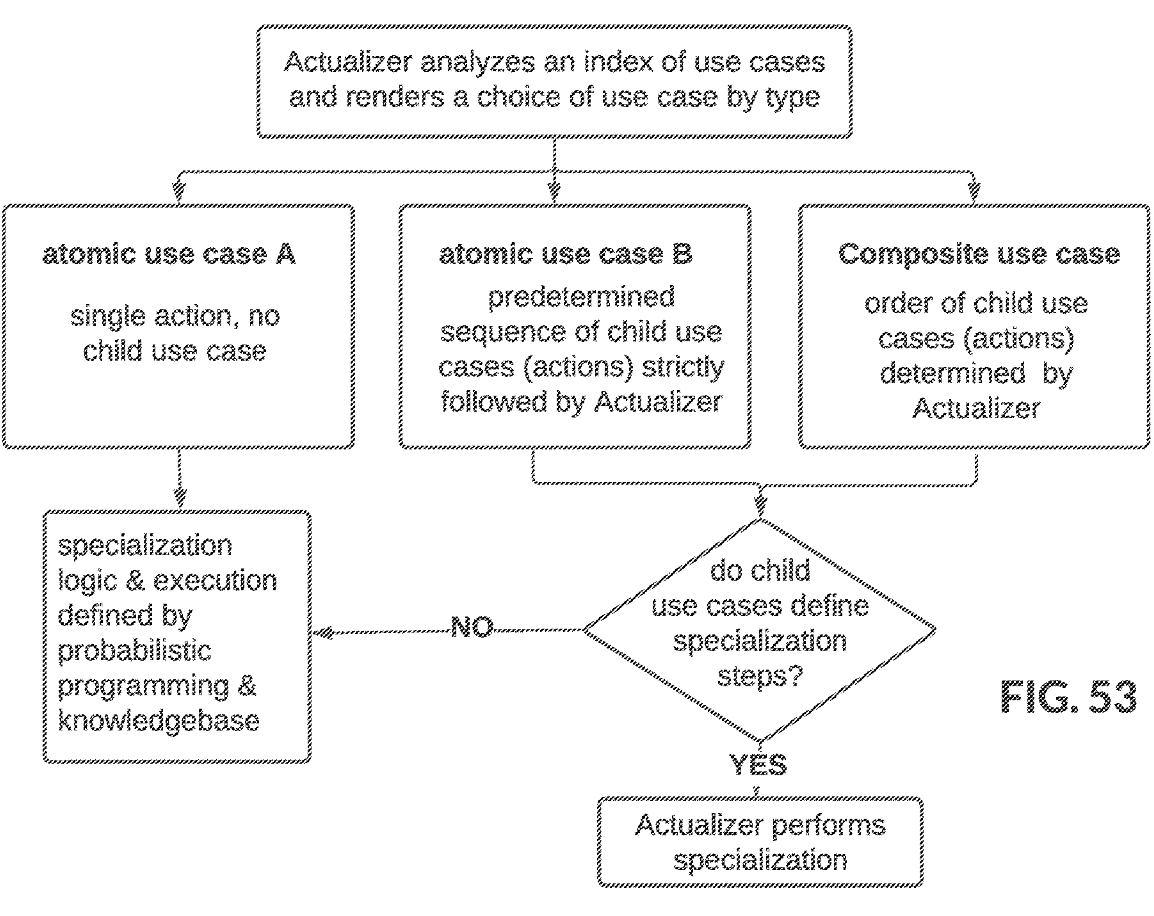
FIG. 53
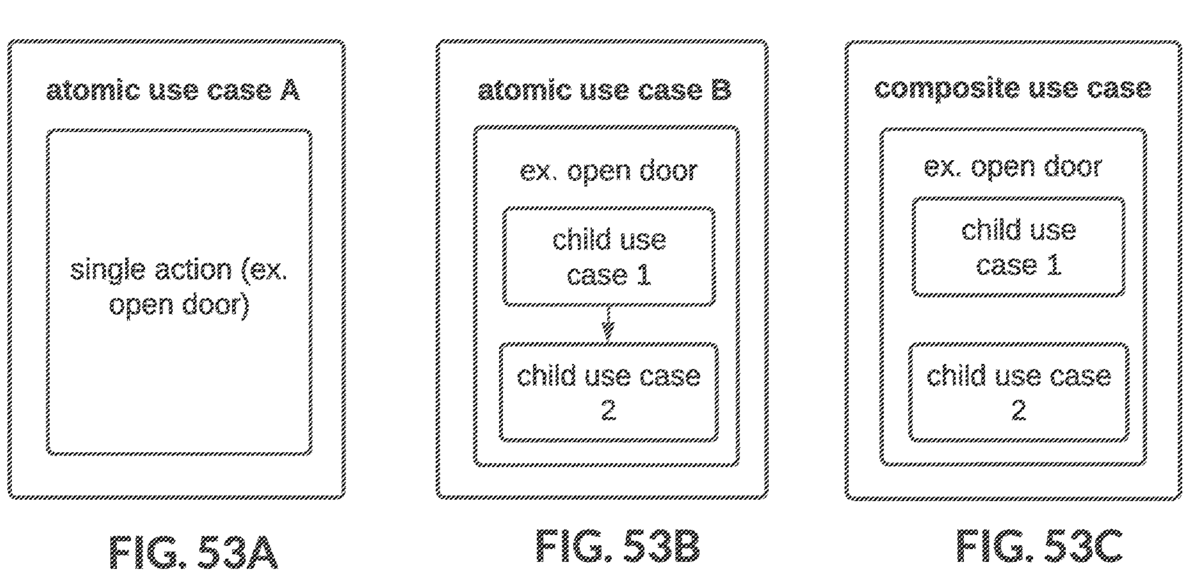
FIG. 53A
FIG. 53B
FIG. 53C

FIG. 54

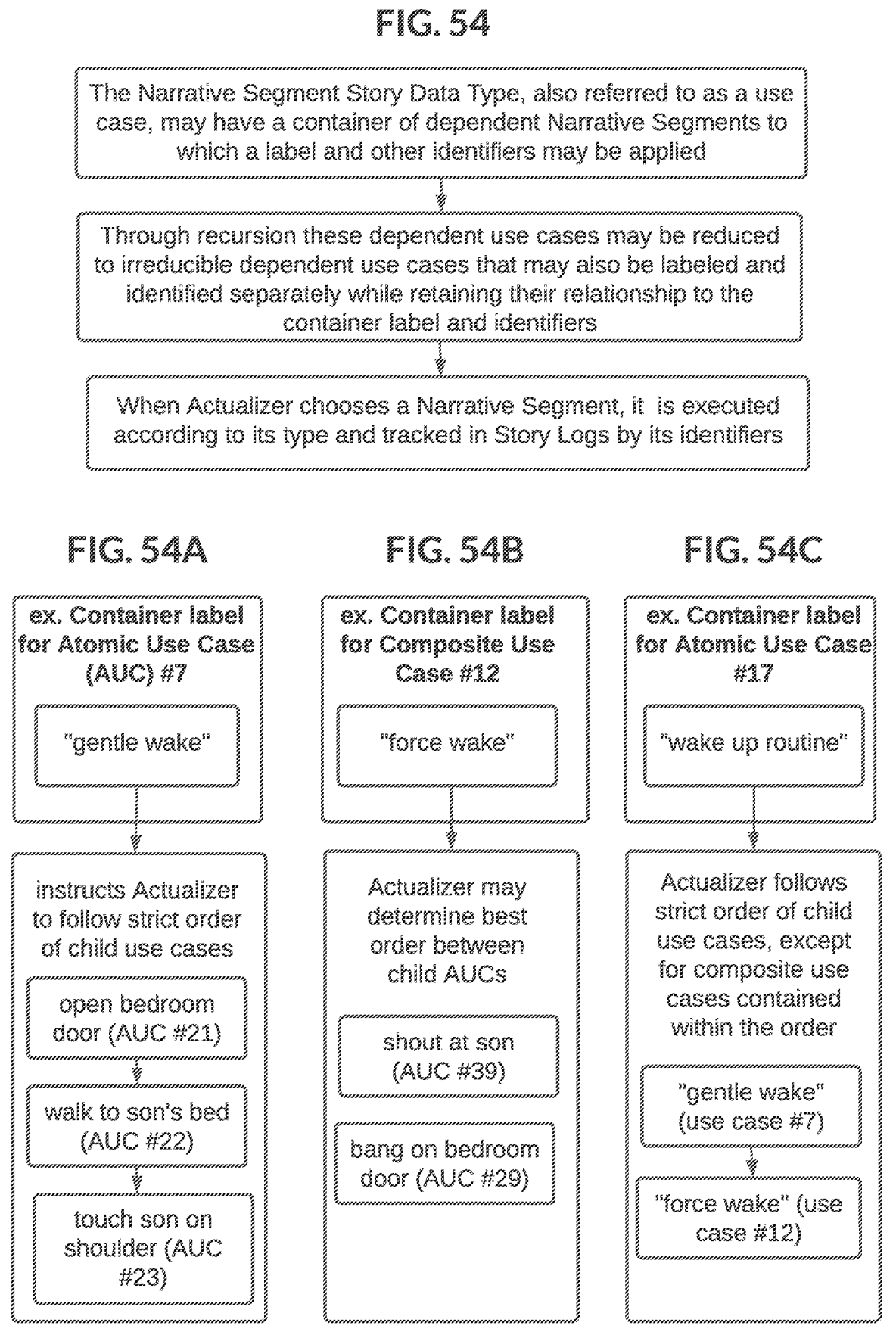

The Narrative Segment Story Data Type, also referred to as a use case, may have a container of dependent Narrative Segments to which a label and other identifiers may be applied Through recursion these dependent use cases may be reduced to irreducible dependent use cases that may also be labeled and identified separately while retaining their relationship to the container label and identifiers When Actualizer chooses a Narrative Segment, it is executed according to its type and tracked in Story Logs by its identifiers

FIG. 54A ex. Container label for Atomic Use Case (AUC) #7

"gentle wake"

instructs Actualizer to follow strict order of child use cases open bedroom door (AUC #21)

walk to son's bed (AUC #22)

touch son on shoulder (AUC #23)

FIG. 54B ex. Container label for Composite Use Case #12

"force wake"

Actualizer may determine best order between child AUCs shout at son (AUC #39)

bang on bedroom door (AUC #29)

FIG. 54C ex. Container label for Atomic Use Case #17

"wake up routine"

Actualizer follows strict order of child use cases, except for composite use cases contained within the order "gentle wake" (use case #7)

"force wake" (use case #12)

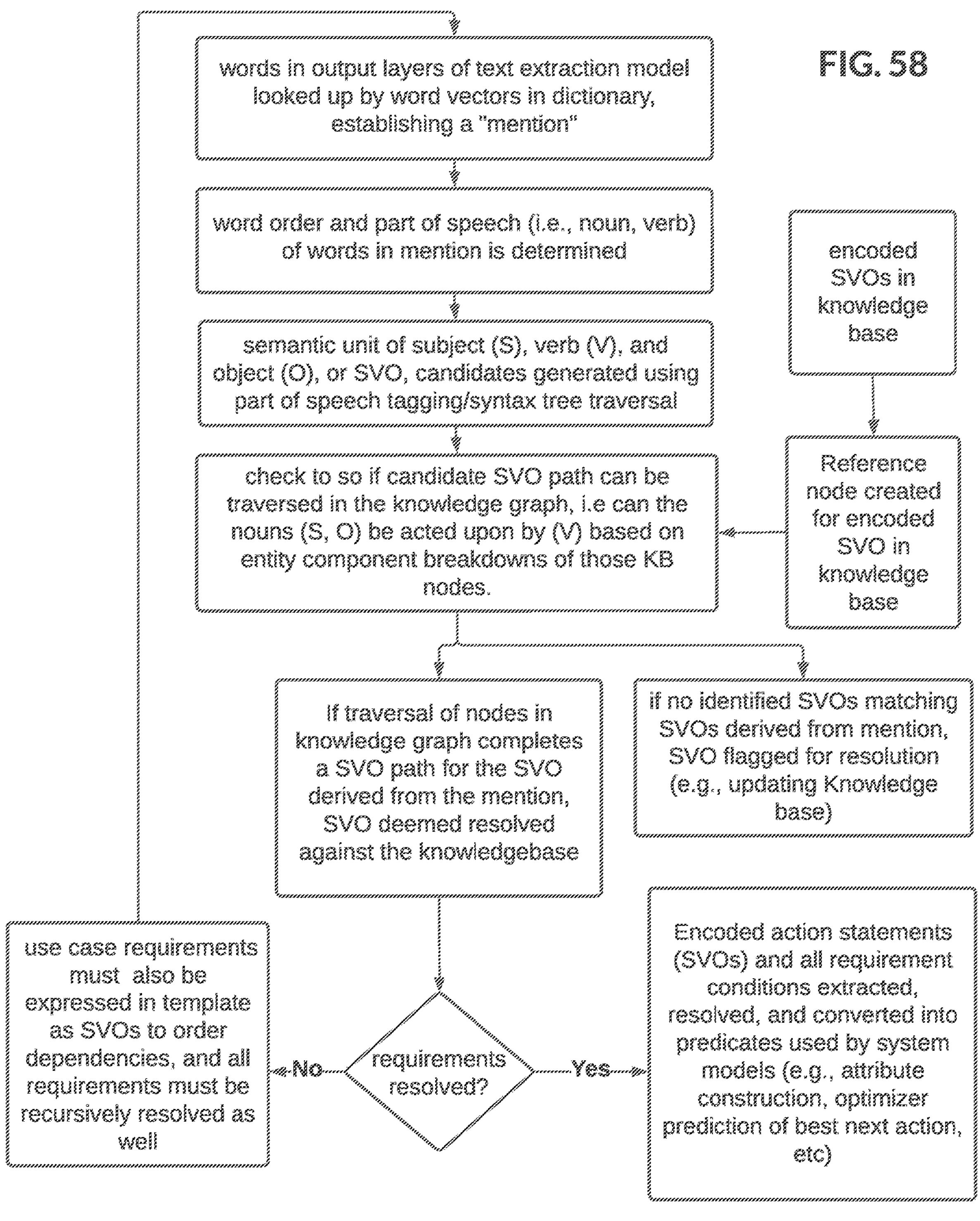
FIG. 58
words in output layers of text extraction model looked up by word vectors in dictionary, establishing a "mention"
word order and part of speech (i.e., noun, verb) of words in mention is determined
semantic unit of subject (S), verb (V), and object (O), or SVO, candidates generated using part of speech tagging/syntax tree traversal
encoded SVOs in knowledge base
Reference node created for encoded SVO in knowledge base
check to so if candidate SVO path can be traversed in the knowledge graph, i.e can the nouns (S, O) be acted upon by (V) based on entity component breakdowns of those KB nodes.
If traversal of nodes in knowledge graph completes a SVO path for the SVO derived from the mention, SVO deemed resolved against the knowledgebase
if no identified SVOs matching SVOs derived from mention, SVO flagged for resolution (e.g., updating Knowledge base)
requirements resolved?
No
Yes
use case requirements must also be expressed in template as SVOs to order dependencies, and all requirements must be recursively resolved as well
Encoded action statements (SVOs) and all requirement conditions extracted, resolved, and converted into predicates used by system models (e.g., attribute construction, optimizer prediction of best next action, etc)

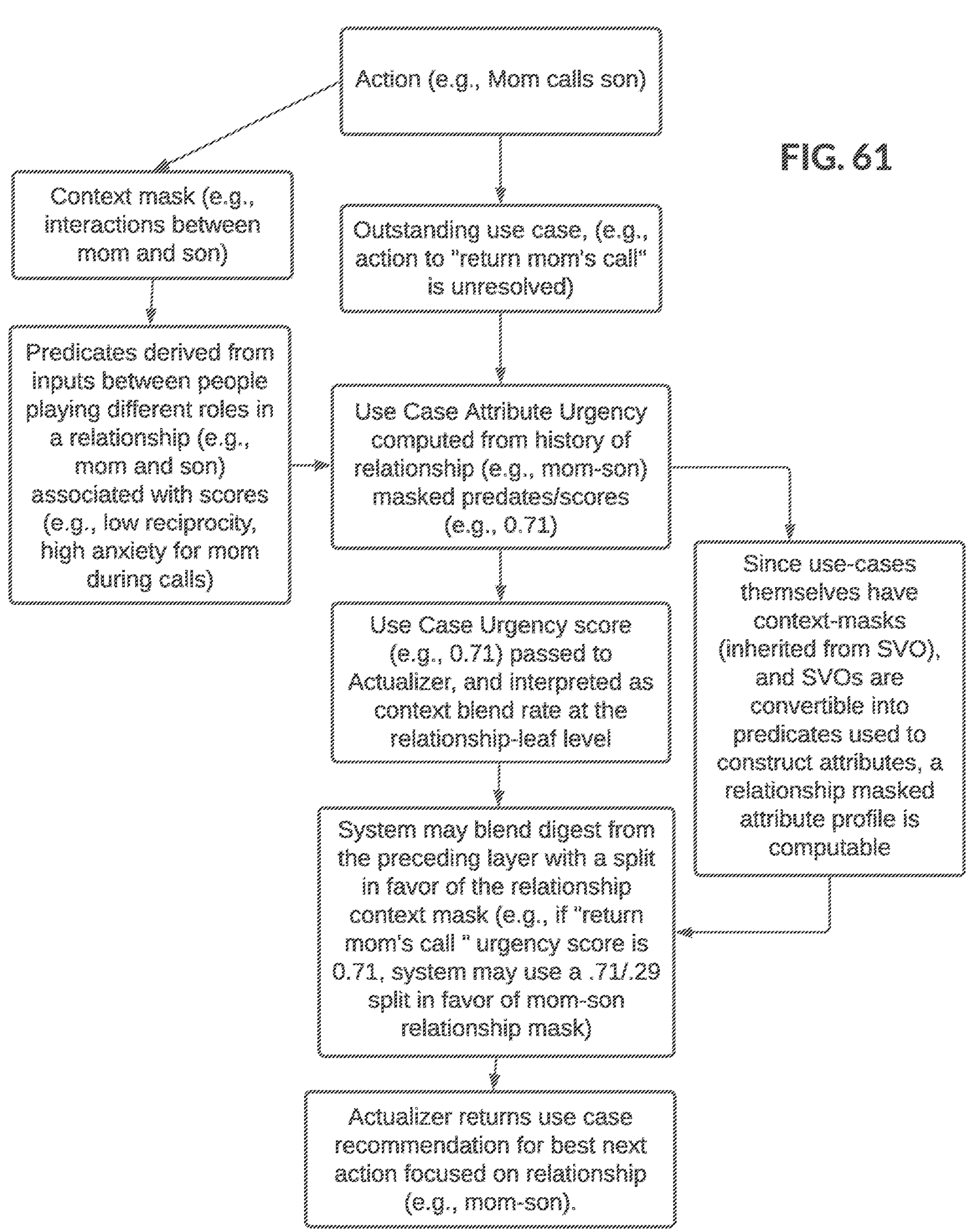
Action (e.g., Mom calls son)
FIG. 61
Context mask (e.g., interactions between mom and son)
Outstanding use case, (e.g., action to "return mom's call" is unresolved)
Predicates derived from inputs between people playing different roles in a relationship (e.g., mom and son) associated with scores (e.g., low reciprocity, high anxiety for mom during calls)
Use Case Attribute Urgency computed from history of relationship (e.g., mom-son) masked predates/scores (e.g., 0.71)
Since use-cases themselves have context-masks (inherited from SVO), and SVOs are convertible into predicates used to construct attributes, a relationship masked attribute profile is computable
Use Case Urgency score (e.g., 0.71) passed to Actualizer, and interpreted as context blend rate at the relationship-leaf level
System may blend digest from the preceding layer with a split in favor of the relationship context mask (e.g., if "return mom's call " urgency score is 0.71, system may use a .71/.29 split in favor of mom-son relationship mask)
Actualizer returns use case recommendation for best next action focused on relationship (e.g., mom-son).

FIG. 63

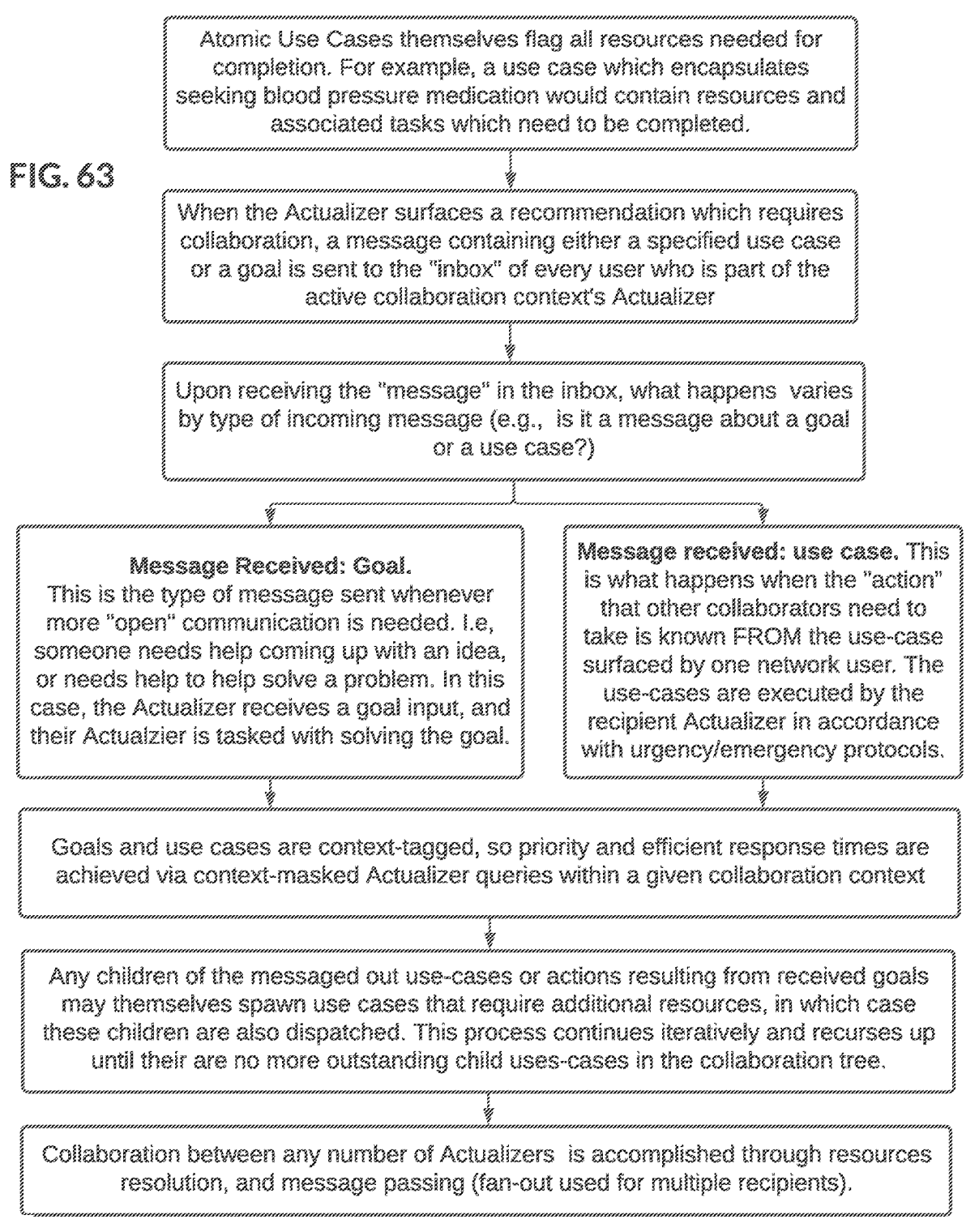

Atomic Use Cases themselves flag all resources needed for completion. For example, a use case which encapsulates seeking blood pressure medication would contain resources and associated tasks which need to be completed.

When the Actualizer surfaces a recommendation which requires collaboration, a message containing either a specified use case or a goal is sent to the "inbox" of every user who is part of the active collaboration context's Actualizer Upon receiving the "message" in the inbox, what happens varies by type of incoming message (e.g., is it a message about a goal or a use case?)

Message Received: Goal. This is the type of message sent whenever more "open" communication is needed. I.e, someone needs help coming up with an idea, or needs help to help solve a problem. In this case, the Actualizer receives a goal input, and their Actualzier is tasked with solving the goal.

Message received: use case. This is what happens when the "action" that other collaborators need to take is known FROM the use-case surfaced by one network user. The use-cases are executed by the recipient Actualizer in accordance with urgency/emergency protocols.

Goals and use cases are context-tagged, so priority and efficient response times are achieved via context-masked Actualizer queries within a given collaboration context Any children of the messaged out use-cases or actions resulting from received goals may themselves spawn use cases that require additional resources, in which case these children are also dispatched. This process continues iteratively and recurses up until their are no more outstanding child uses-cases in the collaboration tree.

Collaboration between any number of Actualizers is accomplished through resources resolution, and message passing (fan-out used for multiple recipients).

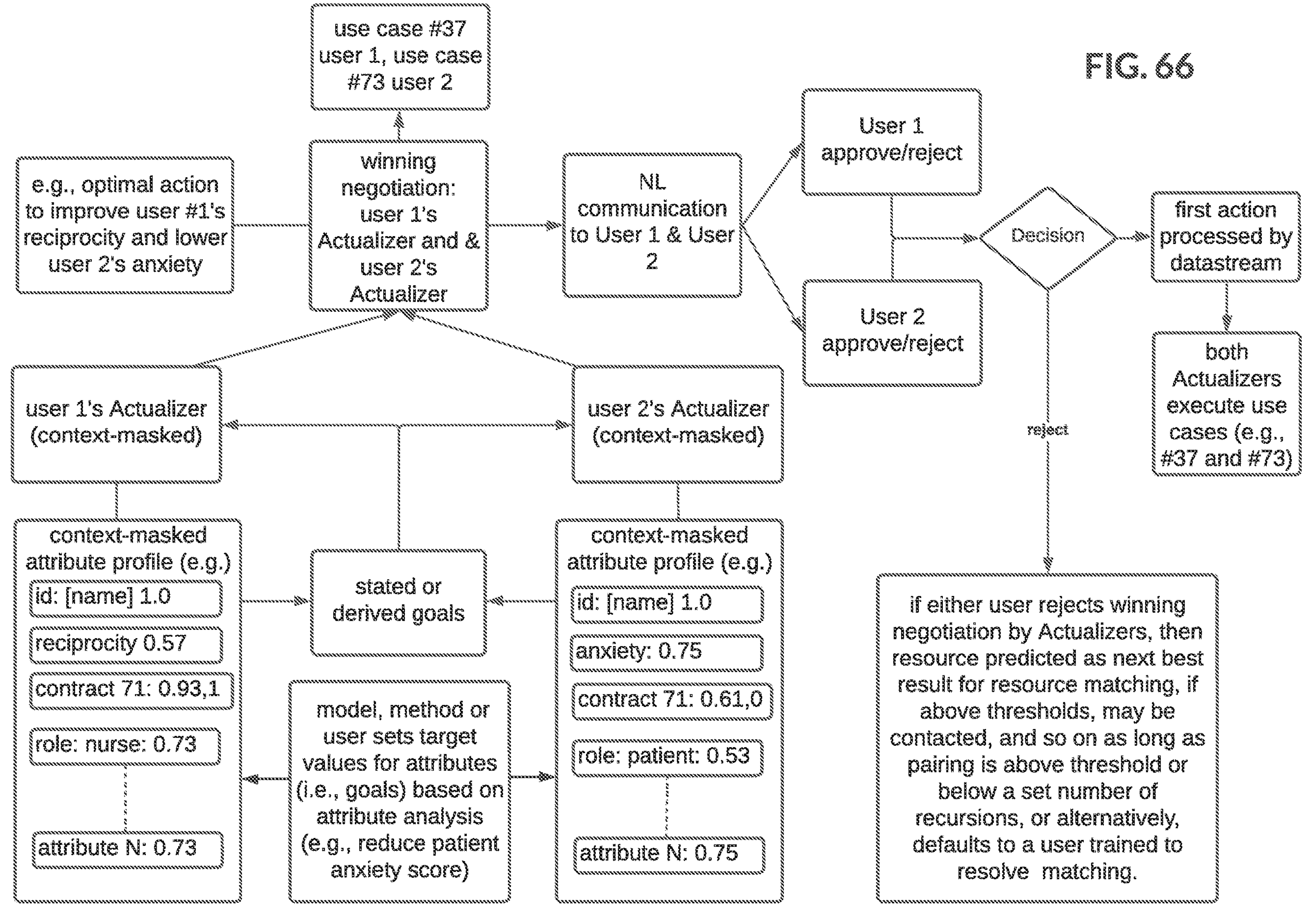
FIG. 66
e.g., optimal action to improve user #1's reciprocity and lower user 2's anxiety
use case #37 user 1, use case #73 user 2
winning negotiation: user 1's Actualizer and & user 2's Actualizer
NL communication to User 1 & User 2
User 1 approve/reject
User 2 approve/reject
Decision
reject
first action processed by datastream
both Actualizers execute use cases (e.g., #37 and #73)
if either user rejects winning negotiation by Actualizers, then resource predicted as next best result for resource matching, if above thresholds, may be contacted, and so on as long as pairing is above threshold or below a set number of recursions, or alternatively, defaults to a user trained to resolve matching.
user 1's Actualizer (context-masked)
user 2's Actualizer (context-masked)
stated or derived goals
context-masked attribute profile (e.g.)
id: [name] 1.0
reciprocity 0.57
contract 71: 0.93,1
role: nurse: 0.73
attribute N: 0.73
context-masked attribute profile (e.g.)
id: [name] 1.0
anxiety: 0.75
contract 71: 0.61,0
role: patient: 0.53
attribute N: 0.75
model, method or user sets target values for attributes (i.e., goals) based on attribute analysis (e.g., reduce patient anxiety score)

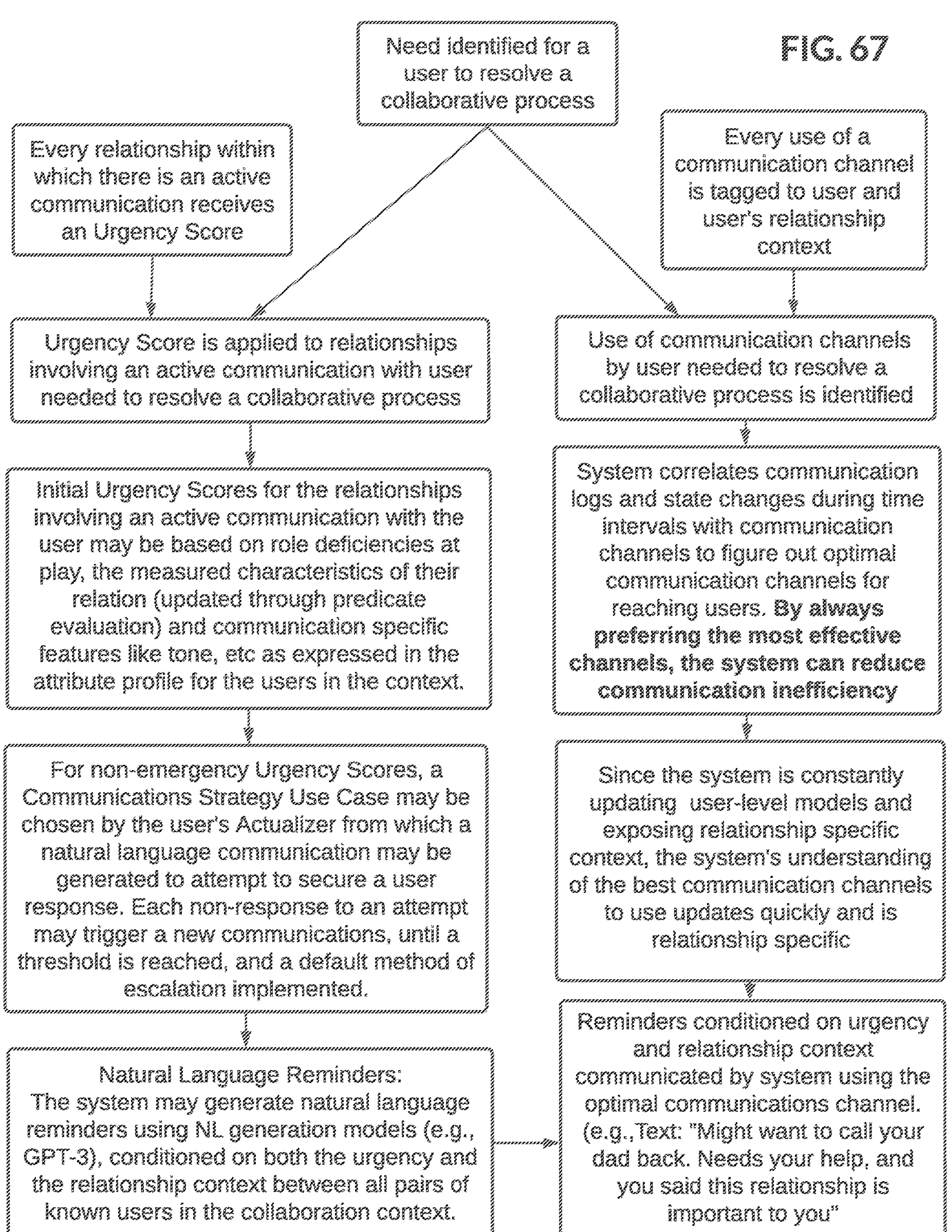
FIG. 67
Need identified for a user to resolve a collaborative process
Every relationship within which there is an active communication receives an Urgency Score
Every use of a communication channel is tagged to user and user's relationship context
Urgency Score is applied to relationships involving an active communication with user needed to resolve a collaborative process
Use of communication channels by user needed to resolve a collaborative process is identified
Initial Urgency Scores for the relationships involving an active communication with the user may be based on role deficiencies at play, the measured characteristics of their relation (updated through predicate evaluation) and communication specific features like tone, etc as expressed in the attribute profile for the users in the context.
System correlates communication logs and state changes during time intervals with communication channels to figure out optimal communication channels for reaching users. By always preferring the most effective channels, the system can reduce communication inefficiency
For non-emergency Urgency Scores, a Communications Strategy Use Case may be chosen by the user's Actualizer from which a natural language communication may be generated to attempt to secure a user response. Each non-response to an attempt may trigger a new communications, until a threshold is reached, and a default method of escalation implemented.
Since the system is constantly updating user-level models and exposing relationship specific context, the system's understanding of the best communication channels to use updates quickly and is relationship specific
Natural Language Reminders: The system may generate natural language reminders using NL generation models (e.g., GPT-3), conditioned on both the urgency and the relationship context between all pairs of known users in the collaboration context.
Reminders conditioned on urgency and relationship context communicated by system using the optimal communications channel. (e.g.,Text: "Might want to call your dad back. Needs your help, and you said this relationship is important to you"

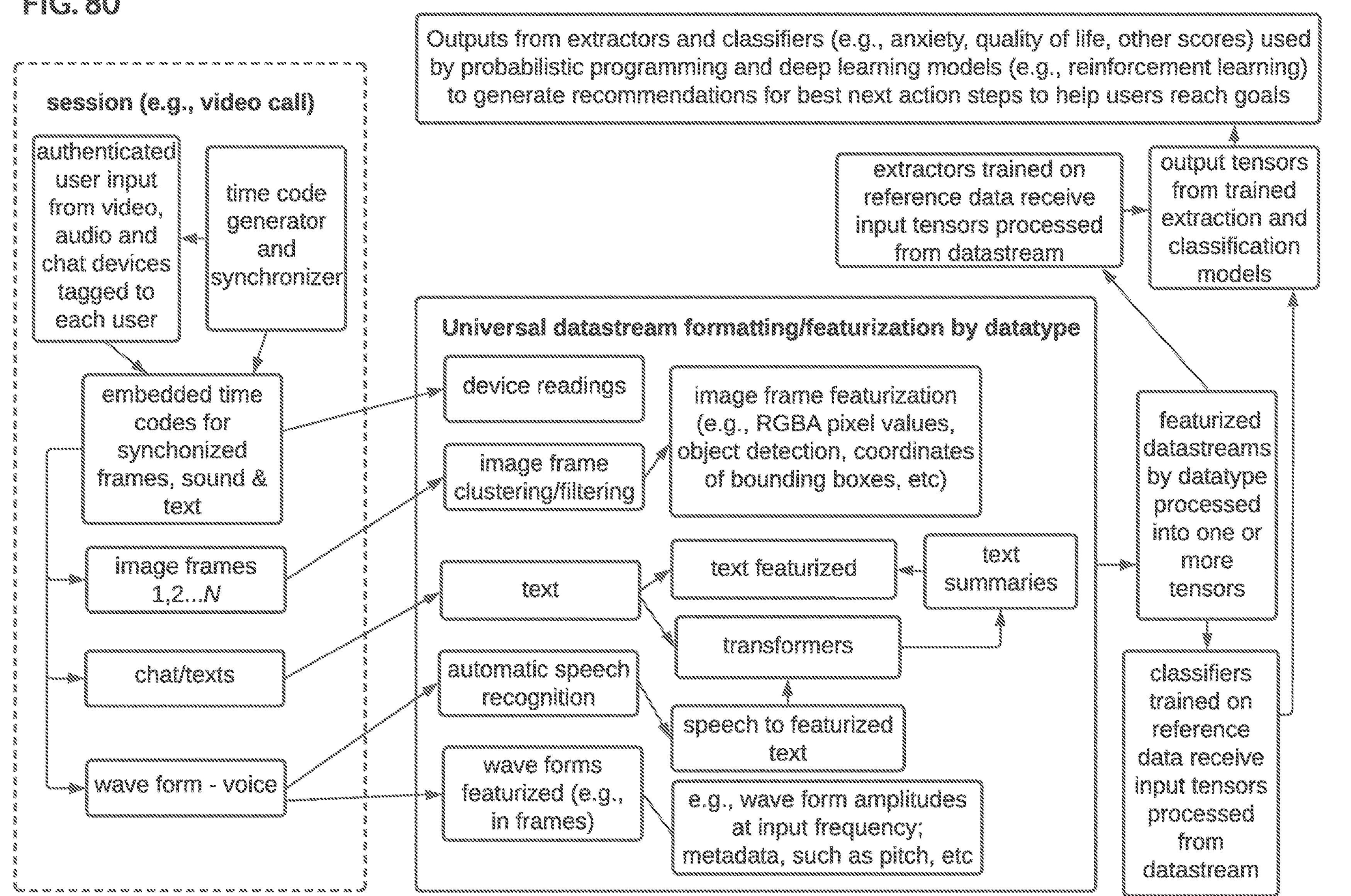
FIG. 80
session (e.g., video call)
authenticated user input from video, audio and chat devices tagged to each user
time code generator and synchronizer
embedded time codes for synchonized frames, sound & text
image frames 1,2...N
chat/texts
wave form - voice
Universal datastream formatting/featurization by datatype
device readings
image frame clustering/filtering
image frame featurization (e.g., RGBA pixel values, object detection, coordinates of bounding boxes, etc)
text
text featurized
text summaries
transformers
automatic speech recognition
speech to featurized text
wave forms featurized (e.g., in frames)
e.g., wave form amplitudes at input frequency; metadata, such as pitch, etc
featurized datastreams by datatype processed into one or more tensors
classifiers trained on reference data receive input tensors processed from datastream
extractors trained on reference data receive input tensors processed from datastream
output tensors from trained extraction and classification models
Outputs from extractors and classifiers (e.g., anxiety, quality of life, other scores) used by probabilistic programming and deep learning models (e.g., reinforcement learning) to generate recommendations for best next action steps to help users reach goals

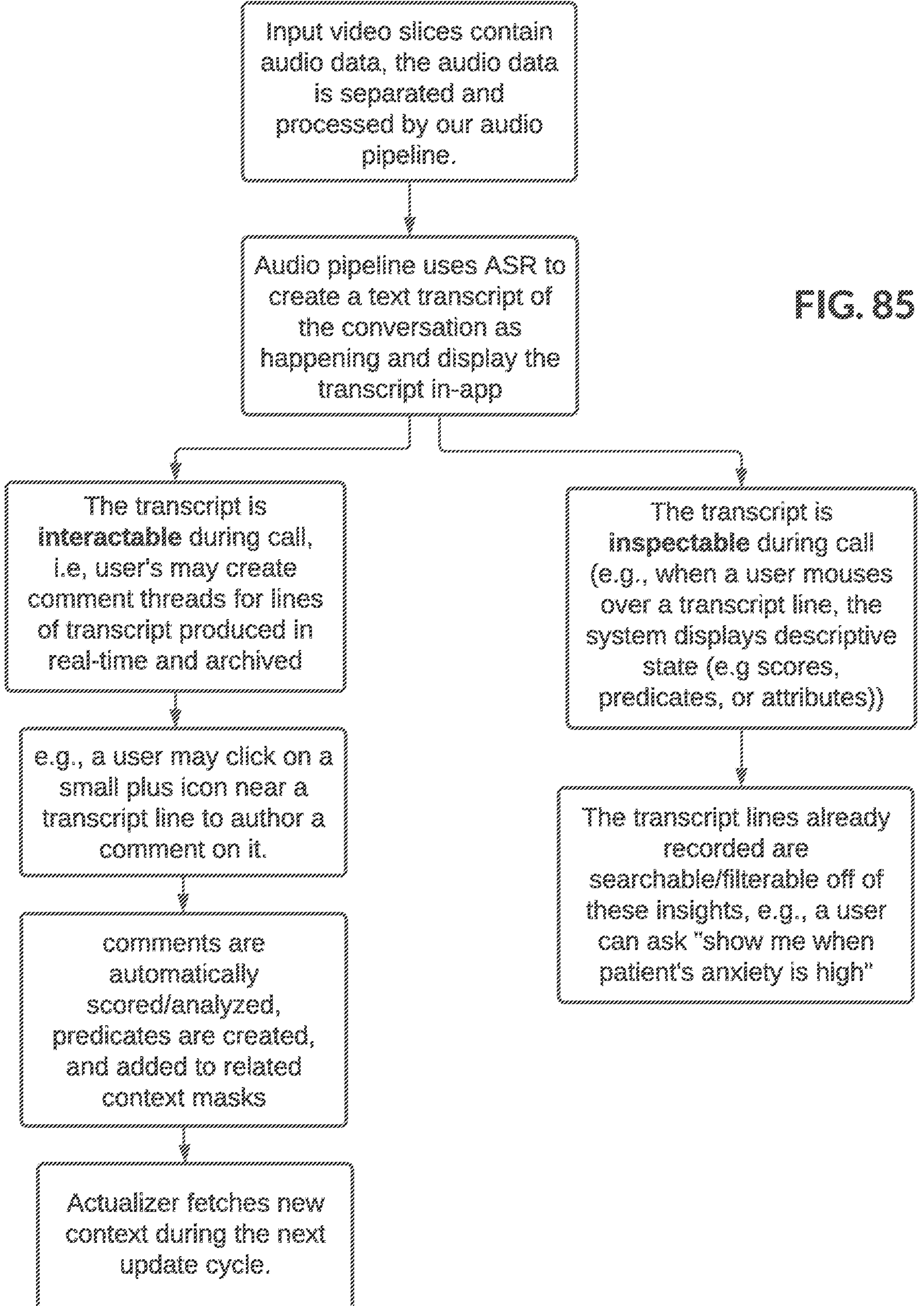
Input video slices contain audio data, the audio data is separated and processed by our audio pipeline.
Audio pipeline uses ASR to create a text transcript of the conversation as happening and display the transcript in-app
FIG. 85
The transcript is interactable during call, i.e, user's may create comment threads for lines of transcript produced in real-time and archived
e.g., a user may click on a small plus icon near a transcript line to author a comment on it.
comments are automatically scored/analyzed, predicates are created, and added to related context masks
Actualizer fetches new context during the next update cycle.
The transcript is inspectable during call (e.g., when a user mouses over a transcript line, the system displays descriptive state (e.g scores, predicates, or attributes))
The transcript lines already recorded are searchable/filterable off of these insights, e.g., a user can ask "show me when patient's anxiety is high"

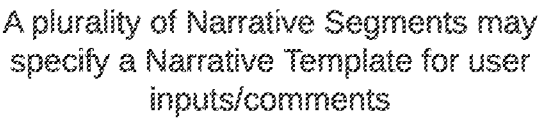

Narrative Template generated and made available to user as per Narrative Segment requirements

Example Narrative Template user may define an areas of transcript displayed by Narrative Template on which to make comments or add notes (e.g., placing cursor over text and clicking the mouse to mark the start and end of portion of transcript user wishes to comment on)

user defined area is highlighted as it is defined (e.g., via a graphical box expandable by human or machine cursor bounding area, with or without also displaying a translucent color through which transcript may be seen )

user chooses from a combination of ways to input a comment or note as well as to label it, which are associated with the highlighted area the user has defined, and then user provides input.

user input processed as Story Model Inputs, filtered, topic modeled, and summarized for user review in Narrative Template again

FIG. 88

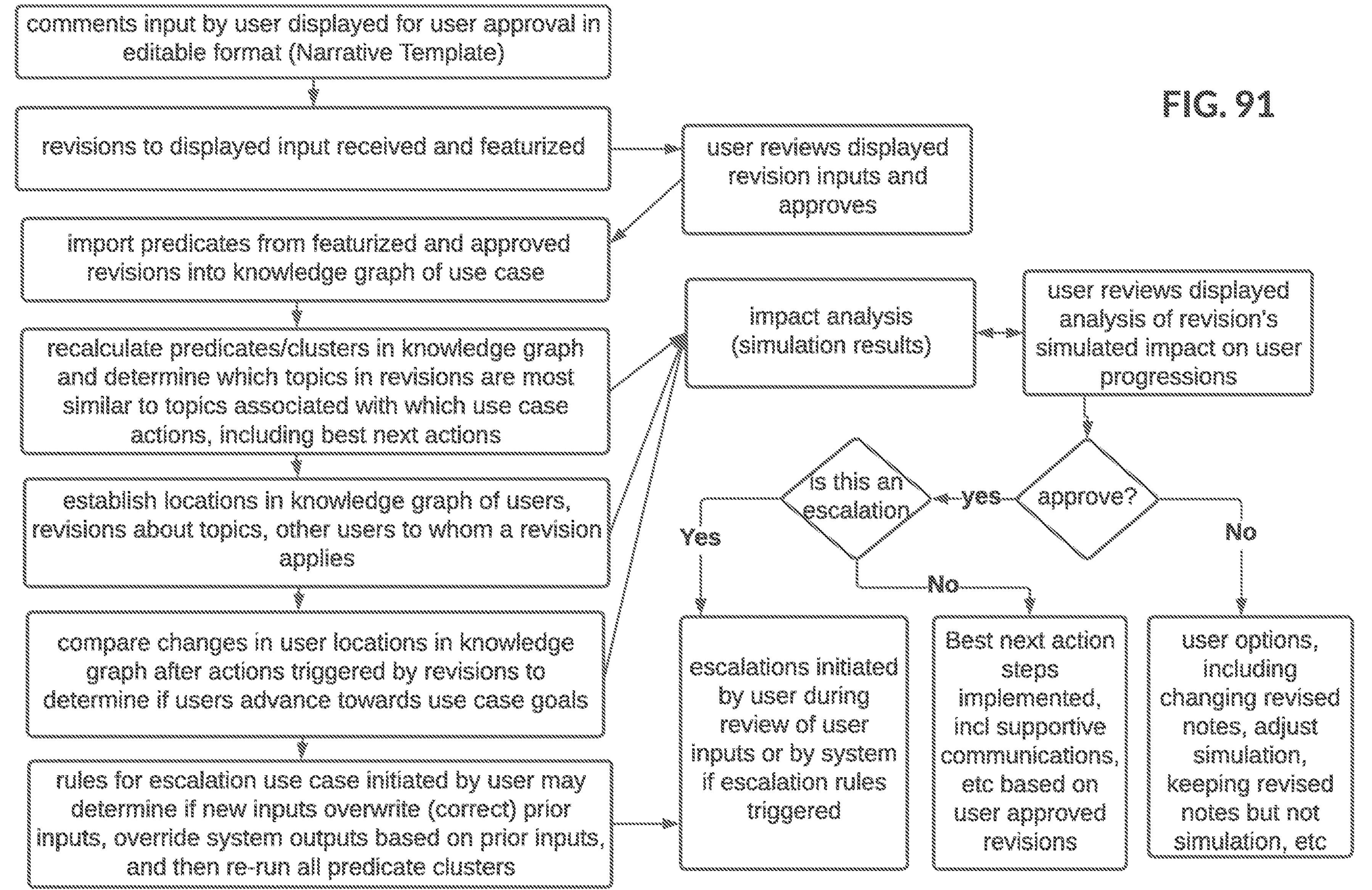
FIG. 91
comments input by user displayed for user approval in editable format (Narrative Template)
revisions to displayed input received and featurized
user reviews displayed revision inputs and approves
import predicates from featurized and approved revisions into knowledge graph of use case
recalculate predicates/clusters in knowledge graph and determine which topics in revisions are most similar to topics associated with which use case actions, including best next actions
establish locations in knowledge graph of users, revisions about topics, other users to whom a revision applies
compare changes in user locations in knowledge graph after actions triggered by revisions to determine if users advance towards use case goals
rules for escalation use case initiated by user may determine if new inputs overwrite (correct) prior inputs, override system outputs based on prior inputs, and then re-run all predicate clusters
impact analysis (simulation results)
user reviews displayed analysis of revision's simulated impact on user progressions
approve?
yes
No
Is this an escalation
Yes
No
escalations initiated by user during review of user inputs or by system if escalation rules triggered
Best next action steps implemented, incl supportive communications, etc based on user approved revisions
user options, including changing revised notes, adjust simulation, keeping revised notes but not simulation, etc

FIG. 94

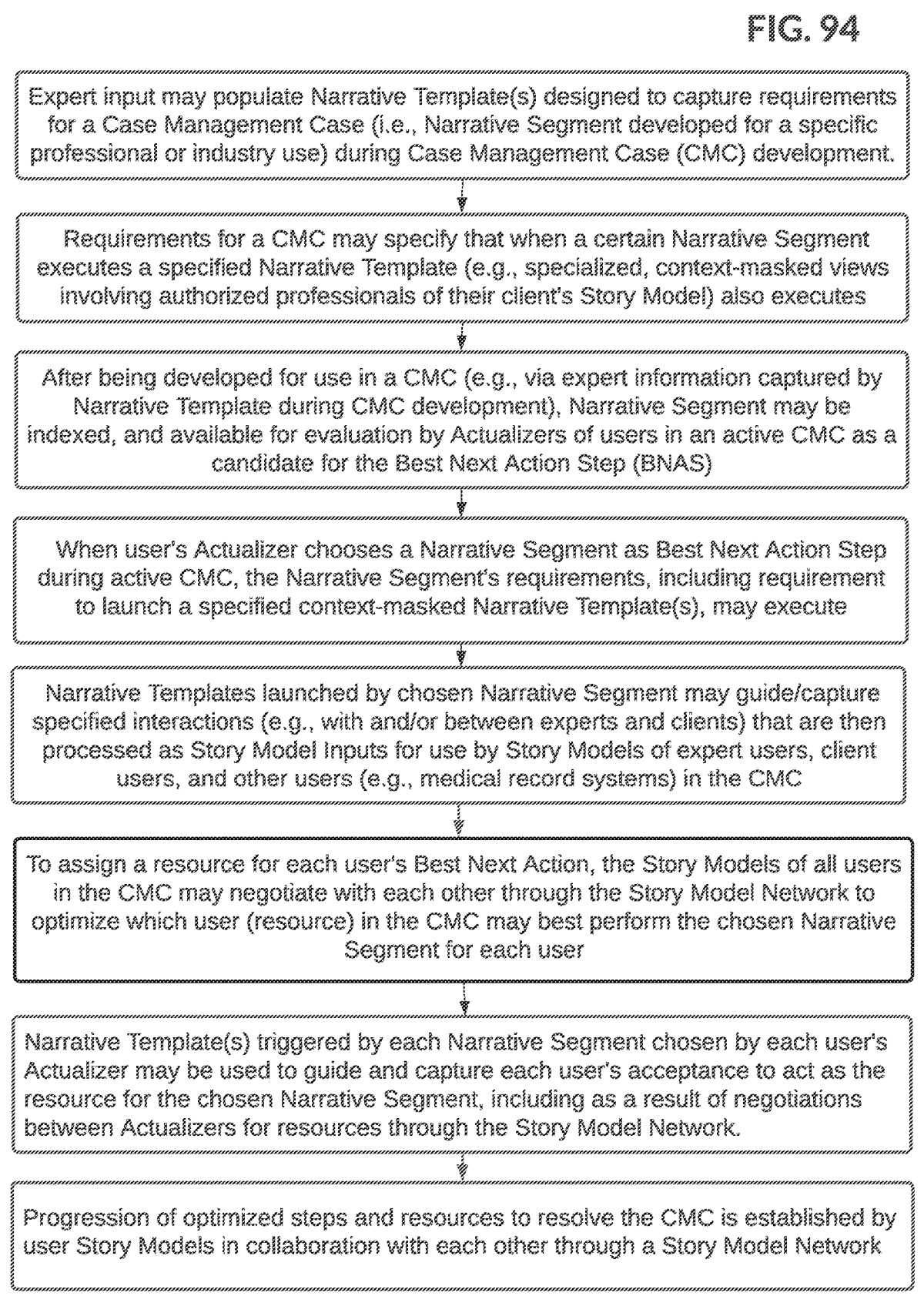

Expert input may populate Narrative Template(s) designed to capture requirements for a Case Management Case (i.e., Narrative Segment developed for a specific professional or industry use) during Case Management Case (CMC) development.

Requirements for a CMC may specify that when a certain Narrative Segment executes a specified Narrative Template (e.g., specialized, context-masked views involving authorized professionals of their client's Story Model) also executes After being developed for use in a CMC (e.g., via expert information captured by Narrative Template during CMC development), Narrative Segment may be indexed, and available for evaluation by Actualizers of users in an active CMC as a candidate for the Best Next Action Step (BNAS)

When user's Actualizer chooses a Narrative Segment as Best Next Action Step during active CMC, the Narrative Segment's requirements, including requirement to launch a specified context-masked Narrative Template(s), may execute Narrative Templates launched by chosen Narrative Segment may guide/capture specified interactions (e.g., with and/or between experts and clients) that are then processed as Story Model Inputs for use by Story Models of expert users, client users, and other users (e.g., medical record systems) in the CMC To assign a resource for each user's Best Next Action, the Story Models of all users in the CMC may negotiate with each other through the Story Model Network to optimize which user (resource) in the CMC may best perform the chosen Narrative Segment for each user Narrative Template(s) triggered by each Narrative Segment chosen by each user's Actualizer may be used to guide and capture each user's acceptance to act as the resource for the chosen Narrative Segment, including as a result of negotiations between Actualizers for resources through the Story Model Network.

Progression of optimized steps and resources to resolve the CMC is established by user Story Models in collaboration with each other through a Story Model Network

FIG. 96

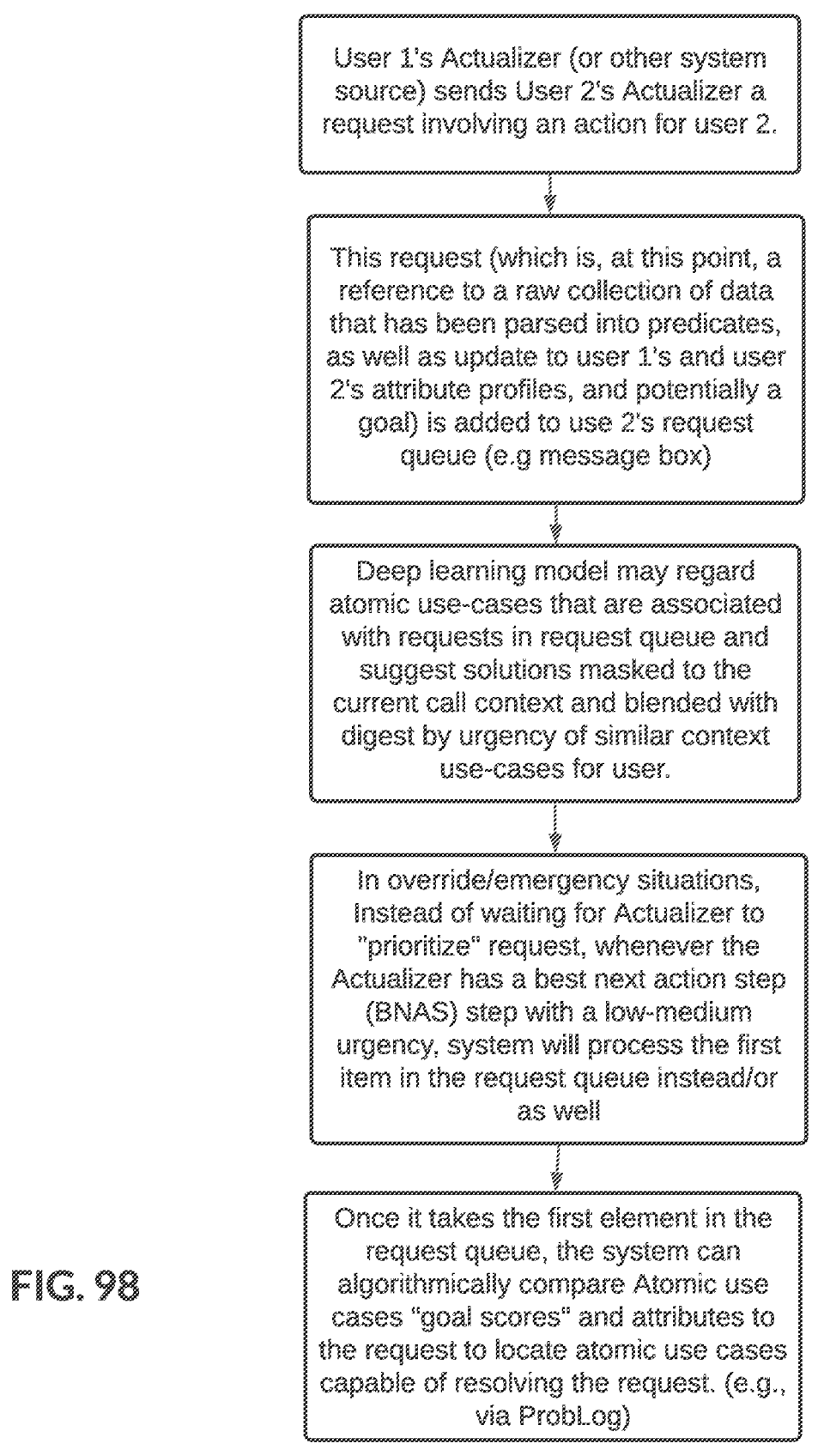

User 1's Actualizer (or other system source) sends User 2's Actualizer a request involving an action for user 2.

This request (which is, at this point, a reference to a raw collection of data that has been parsed into predicates, as well as update to user 1's and user 2's attribute profiles, and potentially a goal) is added to use 2's request queue (e.g message box)

Deep learning model may regard atomic use-cases that are associated with requests in request queue and suggest solutions masked to the current call context and blended with digest by urgency of similar context use-cases for user.

In override/emergency situations, Instead of waiting for Actualizer to "prioritize" request, whenever the Actualizer has a best next action step (BNAS) step with a low-medium urgency, system will process the first item in the request queue instead/or as well Once it takes the first element in the request queue, the system can algorithmically compare Atomic use cases "goal scores" and attributes to the request to locate atomic use cases capable of resolving the request. (e.g., via ProbLog)

FIG. 98

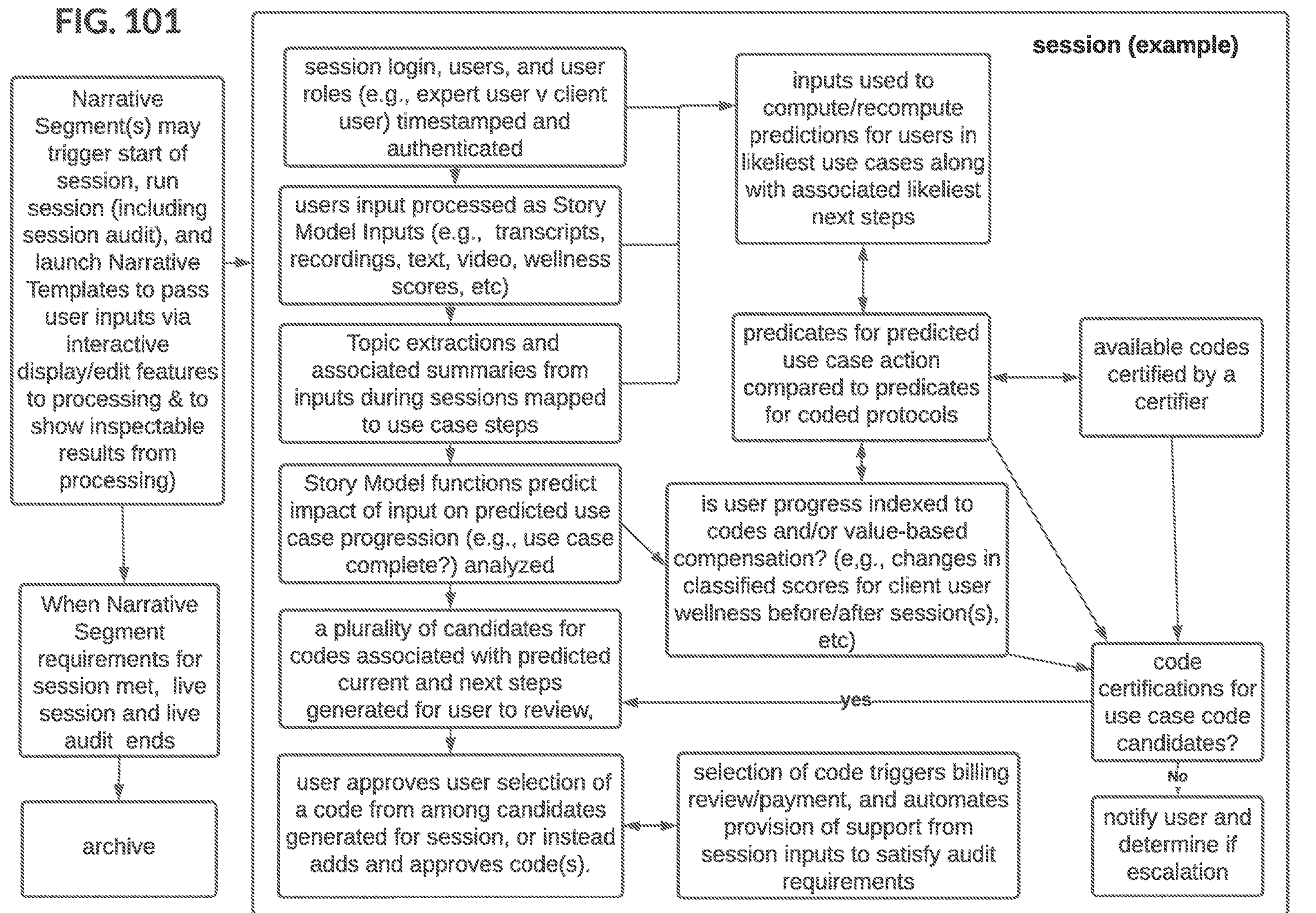
FIG. 101
Narrative Segment(s) may trigger start of session, run session (including session audit), and launch Narrative Templates to pass user inputs via interactive display/edit features to processing & to show inspectable results from processing)
When Narrative Segment requirements for session met, live session and live session audit ends
archive
session (example)
session login, users, and user roles (e.g., expert user v client user) timestamped and authenticated
users input processed as Story Model Inputs (e.g., transcripts, recordings, text, video, wellness scores, etc)
Topic extractions and associated summaries from inputs during sessions mapped to use case steps
Story Model functions predict impact of input on predicted use case progression (e.g., use case complete?) analyzed
a plurality of candidates for codes associated with predicted current and next steps generated for user to review,
user approves user selection of a code from among candidates generated for session, or instead adds and approves code(s).
inputs used to compute/recompute predictions for users in likeliest use cases along with associated likeliest next steps
predicates for predicted use case action compared to predicates for coded protocols
available codes certified by a certifier
is user progress indexed to codes and/or value-based compensation? (e,g., changes in classified scores for client user wellness before/after session(s), etc)
code certifications for use case code candidates?
yes
No
notify user and determine if escalation
selection of code triggers billing review/payment, and automates provision of support from session inputs to satisfy audit requirements

AUTOMATED STORY MODEL COLLABORATION SYSTEM

CROSS-REFERENCE TO PRIORITY APPLICATIONS

This non-provisional utility patent application claims priority to and the benefit of co-pending U.S. patent application Ser. No. 17/074,617, by Charles Chadwick and Samuel Brotherton titled Automated Predictive Care System filed on Oct. 19, 2020; which claims priority to and the benefit of U.S. provisional application Ser. No. 62/916,793 filed on Oct. 17, 2019 and titled Artificial Intelligence System and Method of Use. This non-provisional utility patent application also claims priority to and the benefit of co-pending U.S. patent application Ser. No. 17/074,270, by Charles Chadwick and Samuel Brotherton titled Voice Analyzer For Interactive Care System filed on Oct. 19, 2020; which claims priority to and the benefit of U.S. provisional application Ser. No. 62/916,793 filed on Oct. 17, 2019 and titled Artificial Intelligence System and Method of Use. This non-provisional utility patent application also claims priority to and the benefit of co-pending U.S. provisional patent application Ser. No. 63/289,745, by Charles Chadwick, Dr. Darin Ragozzine, Blake Wilkey, and Samuel Brotherton titled Automated Story Model Collaboration System filed on Dec. 15, 2021. This non-provisional utility patent application draws priority from the referenced patent applications. The entire disclosure of the referenced patent applications is considered part of the disclosure of this non-provisional utility patent application and is hereby incorporated by reference herein in its entirety.

COPYRIGHT

A portion of the disclosure of this patent document contains material that is subject to copyright protection. The copyright owner has no objection to the facsimile reproduction of the patent document or the patent disclosure, as it appears in the U.S. Patent and Trademark Office patent files or records, but otherwise reserves all copyright rights whatsoever. The following notice applies to the disclosure provided herein and to the drawings that form a part of this document: Copyright 2020-2022, Live Circle Inc., All Rights Reserved.

TECHNICAL FIELD

This patent application relates to computer-implemented software systems, data processing, and machine learning systems according to example embodiments, and more specifically to an automated story model collaboration system.

BACKGROUND

Current technology systems tend not to be designed to work across all learning contexts. Since learning may take place both temporally and over time between different entities (e.g., between people, between people and machines and between machines and machines), a failure to work across all learning contexts may mean a narrower set of contexts for the technology to evaluate in any time frame related to collaborations between entities. In turn, a narrower set of contexts may limit what a technology system may consider when gathering and evaluating evidence, making predictions, recommending a next action, or communicating with entities. Reduced contextual knowledge may impact the relevance of reasoning functions of a technology in the moment, prevent machines as well as people from learning from a full context (which may often involve both people and machines), and applying what is learned to achieve goals appropriate to this fuller context. The challenges of contextual learning, or contextual reasoning, and applying knowledge appropriate to the evaluated context may fall into at least five core areas: observation, emulation, simulation, individualization, and propagation.

Observation

Observations may be described as whatever facts are made available to AI systems for processing. Facts may be used differently by symbolic or reasoning models than by deep learning models. The former may apply rules to the facts and the latter may treat facts as input layers into neural networks to perform an assigned task. In the former, inputs, processes, and outputs tend to be inspectable; in the latter, processes are not inspectable and the models themselves tend to be characterized as "black boxes." Yet, for most tasks, the latter is generally regarded as more empirically effective for achieving desired outcomes This dichotomy between reasoning and deep learning AI models creates challenges in worlds such as medicine, where inspectability may be required by physicians to attest to an analysis before billing for it, but where machine learning (ML) grade empirical results may also be required. Further, logical reasoning and deep learning models may use vastly different methods with different inputs and data needs. For example, the former may require complex webs of organized information (i.e., a knowledge graph) from which to deduce relationships and infer actions. The latter may require enormous volumes of more unstructured data necessary to discover or learn generalizable patterns. These differences foster a natural divide between model types and their practitioners. Attempts at hybrids that reconcile the advantages of each tend to be ad hoc, rather than integrated system-wide into a unified model offering both inspectability and effectiveness.

Emulation

Emulation is used here to describe whether an AI system "behaves" as if it understands the person and knows what is important to that person, including their goals. This "behavior" may be observed or inferred through engagement technologies that control how users and AI systems may interact with each other. Engagement technologies (e.g., chatbots) typically draw from a library of scripted communications based on actions that are often "matched" to a predetermined set of actions by an underlying model. This matching process, known by one of ordinary skill in the art as intent recognition, tends to rely heavily on the underlying model's identification of the user's current context, from the user's contemporaneous input.

There are various limitations to current intent recognition methods that prevent more emulative behaviors. These include the data and architectural design limitations of AI models underlying the engagement technology as well as the limitations of many engagement technologies themselves. AI models tend not to be trained to parse between multiple concurrent contexts to determine which is most important to a user, or to build up a longitudinal construct of the user by comparing the user's comparative conversational or action histories over time across all contexts.

Multicollinearity of contexts is the norm of human experience—a lot is going on at any moment, and the most important contexts to a person may simply not be visible to many AI systems. This may help explain why certain observed AI behaviors may be described as "robotic" or simply as irrelevant to the end users. This problem may not only be rooted in engagement technology issues, but also more deeply in the adaptability of the underlying model to discern what may be important to the user in a given context. Models tend to focus on analyzing narrowly drawn temporal contexts that may not account for personal goals. Consequently, AI-driven recommendations may be shown to improve only some parts of a person's life—without regard to the "whole person." And often, without regard to the "real" context.

Tasks assigned to the AI tend to be limited in scope to promoting an organizational or commercial need, not an individual one. So, AI system "behaviors" tend to involve only narrowly defined tasks: "Take pill when [condition X]" without layering them into more complex contexts or sets of needs. As a result, as models, they may overweight the stated importance of actual language used by users, have only limited theories of context, and restrict "intent" to a modest inventory of available actions. In effect, the limited action inventory may result in predeterminations of contexts that may not match the user's reality. Obvious consequences may include mismatching recommendations and a person's ability to execute, and unintended consequences may include failing to reach goals of greater importance because they may not be factored into the AI models.

Turning to engagement technologies themselves, the communications of the AI model's action, which may include language responses, tends to be pre-scripted, which in turn may lock the same communication to the same determination of the same context. This leads naturally to recurring experiences where users receive the same response to what users actually understand to be different situations. This diminishes the effectiveness of the communications, which in turn may inhibit future user interactions, thus depriving even advanced underlying models of new inputs for training and other purposes. Additionally, engagement technologies tend to be "bolted on" to underlying models, rather than integrated into how they operate. Consequently, it may not be easily known whether it may be an action recommended by the underlying model or instead how the recommendation is communicated that impacts the user. This may be true even where action inventories available to an AI model may be richer and language models more linguistically advanced.

Thus two main questions still appear largely unaddressed. First, what is the best next action for the user in view of the user's goals of importance and concurrent contexts, and second, how can what needs to be said be said in a way that guides the user's next action?

Simulation

Simulations are commonly performed for planning purposes in many fields. They may use various methods to mass generate "what if" scenarios based on known inputs and known end-points. Some simulation methods involve deep learning optimization models, such as reinforcement learning, which have been shown to excel at playing games involving various players and a goal, which may typically be described as "winning." Games tend to have known end-points, when the game ends, where real life may not. So, how can scenarios be developed and simulated that reflect a sufficient number of life choices so as to be relevant in the moment, for most moments of daily life?

Individualization

While AI systems may perform certain emulations, not all AI systems are centered on people, and fewer still are centered on each unique person. AI models tend to be organized for purposes of macro analysis of various populations, business needs, and so forth. AI data models naturally tend to follow organizational imperatives to harness actions of "workers" and distribute the products of those actions for commercial reasons to others described as "consumers" of the product, who are seen through the lens of the product, as an endpoint. Consumer concentrations have tended to be defined geographically, and reaching these concentrations economically has tended to wed organizations to specialized production technologies that lower unit costs and further entrench a "produce and sell" culture involving the same products, with limited variation. This creates natural disincentives to change "how actions of workers" are harnessed (e.g., new methods of distributing work) and how AI models may be individualized for either workers or consumers or both. These disincentives may involve the perceived disruptions that individualization may cause to established "ways of doing business." Matters of enterprise risk, pressures to maintain silos of knowledge, privacy concerns, perceived lack of commercial viability, perceived issues of scalability, and so forth conspire to produce a paucity of human-centered AI models and fewer still, if any, that continuously evolve and generate insights into what may be important specifically for each individual as a "whole person".

Conventional systems may facilitate the preservation of many business imperatives, such as specialization of knowledge, but fail to leverage it for greater value by making it more available to more people to use. It is commonplace to hear of the "democratization of information." But that requires a balancing of individual and organizational requirements for what information is collected and how it may be used. Conventional systems fail to strike this balance in various respects, and, in turn, fail to facilitate greater leveraging of data. "Legacy data" may be data that is not mediated by an abstraction model to become more readily useful for systems and for the people who interact with them. Too often, specialized knowledge and resources remain in silos that make it harder for non-experts to access, coordinate and work across.

The problem extends beyond technology in various respects that perhaps have impeded more discovery of novel technological solutions. For example, in medicine, silos of specialized knowledge are rarely knitted together and routinely fail to take into consideration the outsized impact on health outcomes of social determinants of health. Evaluation of these determinants tends to fall outside the scope of medical training. Additionally, current systems tend to reinforce the needs of specialized areas of practice, which then perpetuates the siloization of knowledge in everyday practices. As a result, it is commonplace for specialists with the same patient not to talk to each other or themselves not to be cognizant of the impact on the patient's health of their various commingled recommendations.

Propagation

Many industry standard data management platforms tend to produce 'context-free' data, creating a syndrome of statistics for statistics sake, with potentially little determinative value. Consider for example, the boss whose view of his team's performance may be based on poorly correlated or even anti-correlated metrics of performance. What tends to be lacking are the narrative abstractions required to model and successfully propagate insights rather than simply data. Propagating insights may require a complex, goal-driven data model to mediate between observations and abstractions, in a manner that both machines and people may "understand".

SUMMARY

According to one aspect of the example embodiment disclosed herein, an automated system for improving the efficiency of collaborations between various entities (i.e., users) includes a processor to receive and transform at least one original input from at least one user into a first interim representation of the at least one original entity input comprising at least one universal datatype, and to transform the at least one original entity input into at least a second interim representation comprising at least a second universal datatype; a compiler to transform the plurality of interim representations into a target language comprising data structure dependencies and relationships embedded in Story Objects of a universal Story Object Hierarchy; a knowledge base to store Story Objects encoded by the compiler; a user's Story Model comprising an ensemble of deep learning models, classifiers, and the like custom trained to instantiate user inputs into Story Data Types used by Story Objects of the Story Object Hierarchy; an Actualizer, including an ensemble of deep learning models for each user (human or machine), to compute and optimize a choice of Story Objects in the Story Object Hierarchy representing a Narrative Segment or best next action most likely to advance the user toward the user's Envisioned Story, which may be representative of user goals; a Story Model Network to facilitate a negotiation between Actualizers of each user in a collaboration; a language generator to transform the Narrative Segments and negotiated choices of Actualizers into a contextual natural language for users, including non-human entities, conforming to a universal layer of abstraction for use by all users.

According to another aspect of the example embodiment disclosed herein, an automated method for improving the efficiencies of collaborations between users may include the steps of recommending a best next action by a user's Actualizer by first establishing from user inputs a most likely relevant narrative context; establishing a most likely relevant narrative context using Story Data Types and Story Objects of a Story Object Hierarchy; constructing values for user attributes and goals based on the Story Object Hierarchy; determining from goals constructed based on the Story Object Hierarchy a user's envisioned story; selecting one or more best next actions from available or discovered actions to advance the user towards the user's envisioned story; choosing a best method to communicate the selected one or more best next actions based on the Story Object Hierarchy, the chosen best method to communicate being the method most likely to advance the user towards the user's envisioned story; negotiating or collaborating with Actualizers of other users to determine the optimal user to take the selected one or more best next actions; directing the optimal user to take the selected one or more best next actions by communicating with the Actualizer of the optimal user; receiving new user input after communicating the selected one or more best next actions to the Actualizer of the optimal user; evaluating user progress towards the envisioned story after completion of the selected one or more best next actions; repeating the process for each and every user to guide each action of each user, including between other users, using the same Story Object Hierarchy; and recommending for each user a best next action for their most likely relevant narrative context.

According to a third aspect of the example embodiments disclosed herein, an automated system and method for resolving different user's system profiles to communicate and collaborate with each other efficiently may include representing each user as an actualizer model (e.g., a type of reinforcement learning model), which runs constantly, and can receive/dispatch messages from other user's actualizer models, keep track of its own user's story history (e.g., user goals, priorities, outstanding requirements/needs, etc.) and coordinate with other user's equivalent representatives (e.g. actualizers). As a result, the various example embodiments disclosed herein provide means and methods for resolving disparate user requirements via machine-learning powered negotiation between agents (e.g. actualizers) representing the best interests of each user, wherein the best interests of each user are determined empirically by each user's story model inputs and reflected in their attribute profiles and story histories. Each user's agent works autonomously to resolve disparate user requirements and advance its own user's goals/outcomes, while simultaneously trying to remove as many impediments for network members as possible. The various example embodiments disclosed herein merge an actor model and sequence prediction/global optimization via reinforcement learning applied to the problem domain of resolving individual needs, removing impediments to productivity and goal attainment and network-level solution optimization across a range of organizational and social network optimization problems.

According to a fourth aspect of the example embodiments disclosed herein, an automated method for improving the efficiencies of collaborations between users may include the steps of context-masking all user inputs; transforming all context-masked inputs into interim representations; compiling interim representations into a Story Object Hierarchy comprising Story Data Types; instantiating Story Data Types with user specific data for use by User Story Models; generating through non-instantiated Story Data Types an anonymized, context-masked information on an individual user; aggregate anonymized, context-masked information on a plurality of individual users for population level data modeling. As a result, data processing tasks for users can be performed while maintaining the confidentiality of user data and user identities.

BRIEF DESCRIPTION OF THE DRAWINGS

Embodiments are illustrated by way of example and not limitation in the figures of the accompanying drawings, in which:

FIG. 28 illustrates Story Model—stores, particularly user and global predicate stores.

FIG. 41 illustrates a flow in the Story Model—models, particularly a Drift Detector—Content Similarity Profiler.

FIGS. 48-50 show how semantic similarity between text segments derived from predicates may be used by the example embodiment to calculate a topic embedding for predicates.

FIG. 48 illustrates a flow in the Story Model—models, particularly Topics as Predicate clusters.

FIG. 50 illustrates a flow in the Story Model—models, particularly Autoencoder-based semantic similarity topic modeling.

FIG. 53 illustrates Story Model—models, particularly composability of Narrative Segments, also referred to as use cases.

FIG. 53A illustrates Story Model—models, particularly composability of Narrative Segments, also referred to as use cases (example single action use case)

FIG. 53B illustrates Story Model—models, particularly composability of Narrative Segments, also referred to as use cases (atomic use case example with children use cases)

FIG. 53C illustrates Story Model—models, particularly composability of Narrative Segments, also referred to as use cases (composite use case example).

FIG. 54 illustrates Story Model—models, particularly labeling use case containers (examples).

FIG. 54A illustrates Story Model—models, particularly containers for Atomic use cases (example).

FIG. 54B illustrates Story Model—models, particularly containers for Composite use cases (example).

FIG. 54C illustrates Story Model—models, particularly containers for Atomic use case and Composite use case (example)

FIG. 58 illustrates a flow in the Story Model—models, particularly resolving encoded SVOs in knowledgebase.

FIG. 61 illustrates a flow in the Story Model—models, particularly an example of encoding context masks.

FIG. 63 illustrates a flow in the Story Model—models, particularly collaboration and the Actualizer: Collaboration through recursive message passing.

FIG. 66 illustrates a flow in the Story Model—models, particularly computing and executing winning negotiations between user models.

FIG. 67 illustrates a flow in the Story Model—models, particularly escalation and non-responsiveness.

FIG. 80 is a flow diagram of Story Model Inputs during a Video conference, with particular regard to creating universal formats by data type and associating extractions with classifier scores, as inputs into Story Models.

FIG. 85 illustrates a flow in the Story Model instance—Video conference—remote care, particularly transcription during a video call.

FIG. 88 illustrates a flow in the Story Model instance—Video conference—remote care, particularly user-defined annotation of displays.

FIG. 91 illustrates a flow in the Story Model instance—Video conference—remote care, particularly how a user revises notes/comments (example embodiment).

FIG. 94 illustrates a flow in the Story Model instance—Video conference—remote care, particularly case management, and professional engagement.

FIG. 96 illustrates a flow in the Story Model instance—Video conference—remote care, particularly case management—compliance—industry behavior model (by role).

FIG. 98 illustrates a flow in the Story Model instance—Video conference—remote care, particularly request-queue processing.

FIG. 101 illustrates a flow in a Story Model instance—others, particularly auditing activity codes for session (with annotation during and/or after session).

Figure 108:
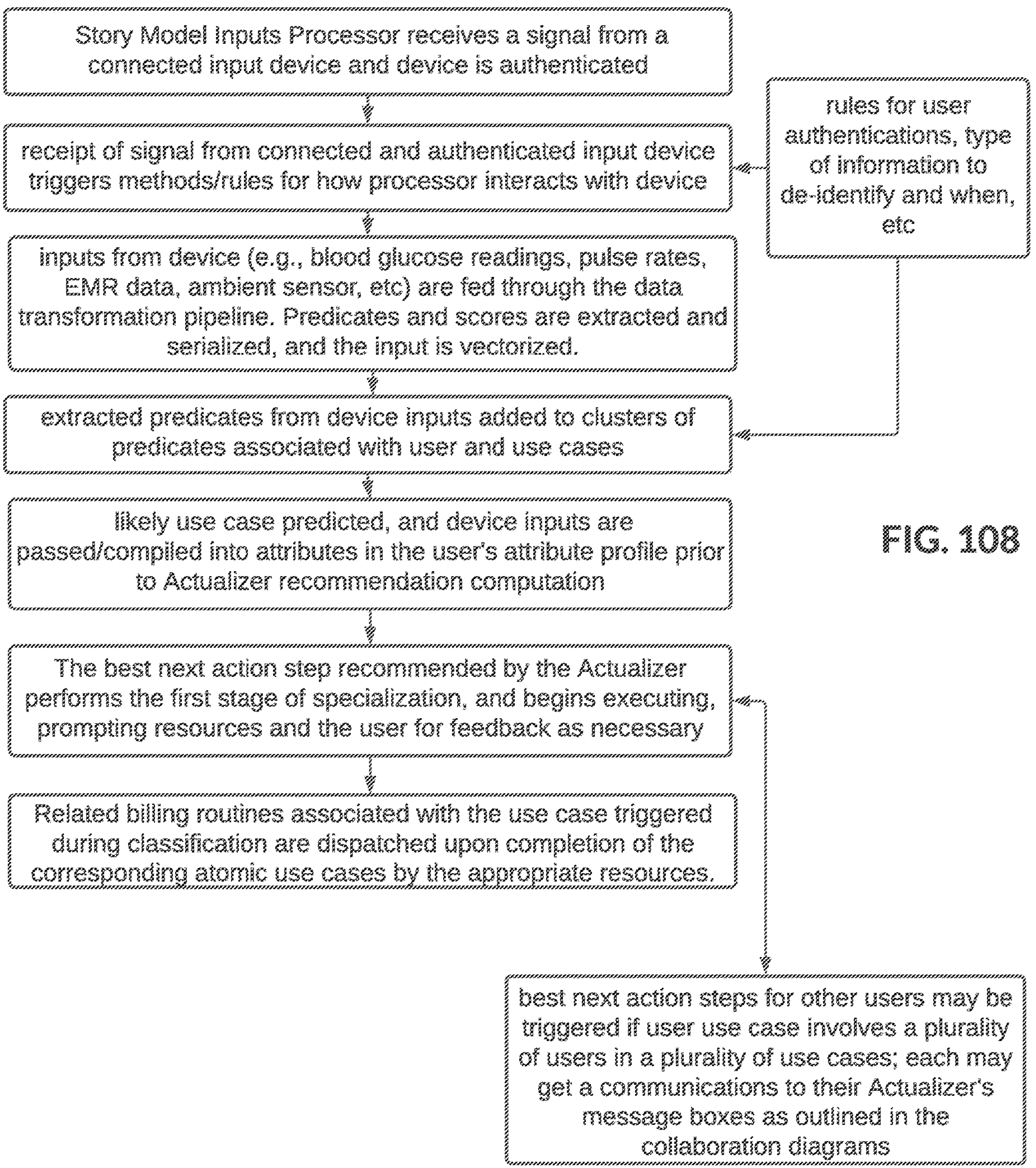

FIG. 108 illustrates a flow in a Story Model instance—others, particularly generating various recommendations (Narrative Segments/use cases for the best next action) and NL communications (based on communications strategy use cases) for various users in a collaborative setting (e.g., hospital) from various datastreams, including data from various devices whose output may be formatted as a data type used by the example embodiment and processed as Story Model Inputs.

Figure 109:
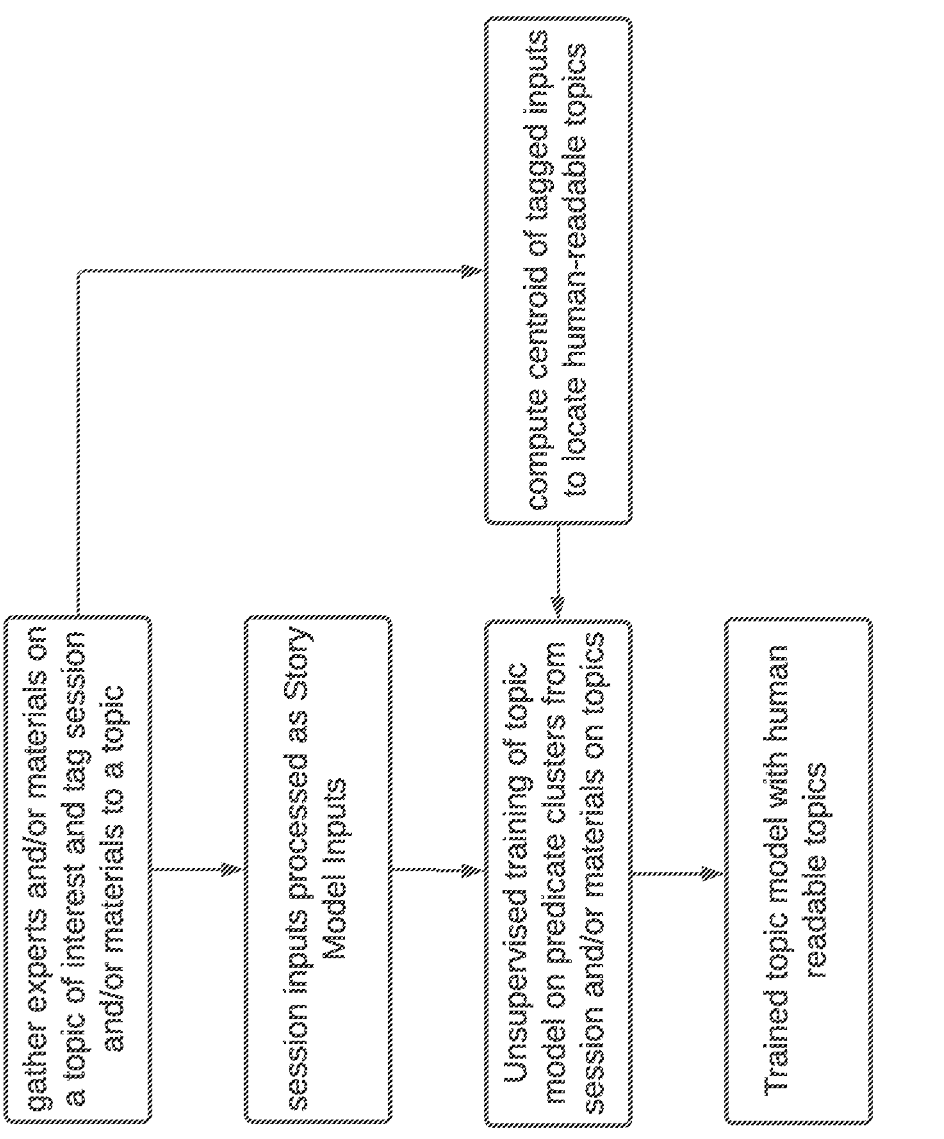

FIG. 109 illustrates a flow in the training steps for a Topic Model.

Figure 110:
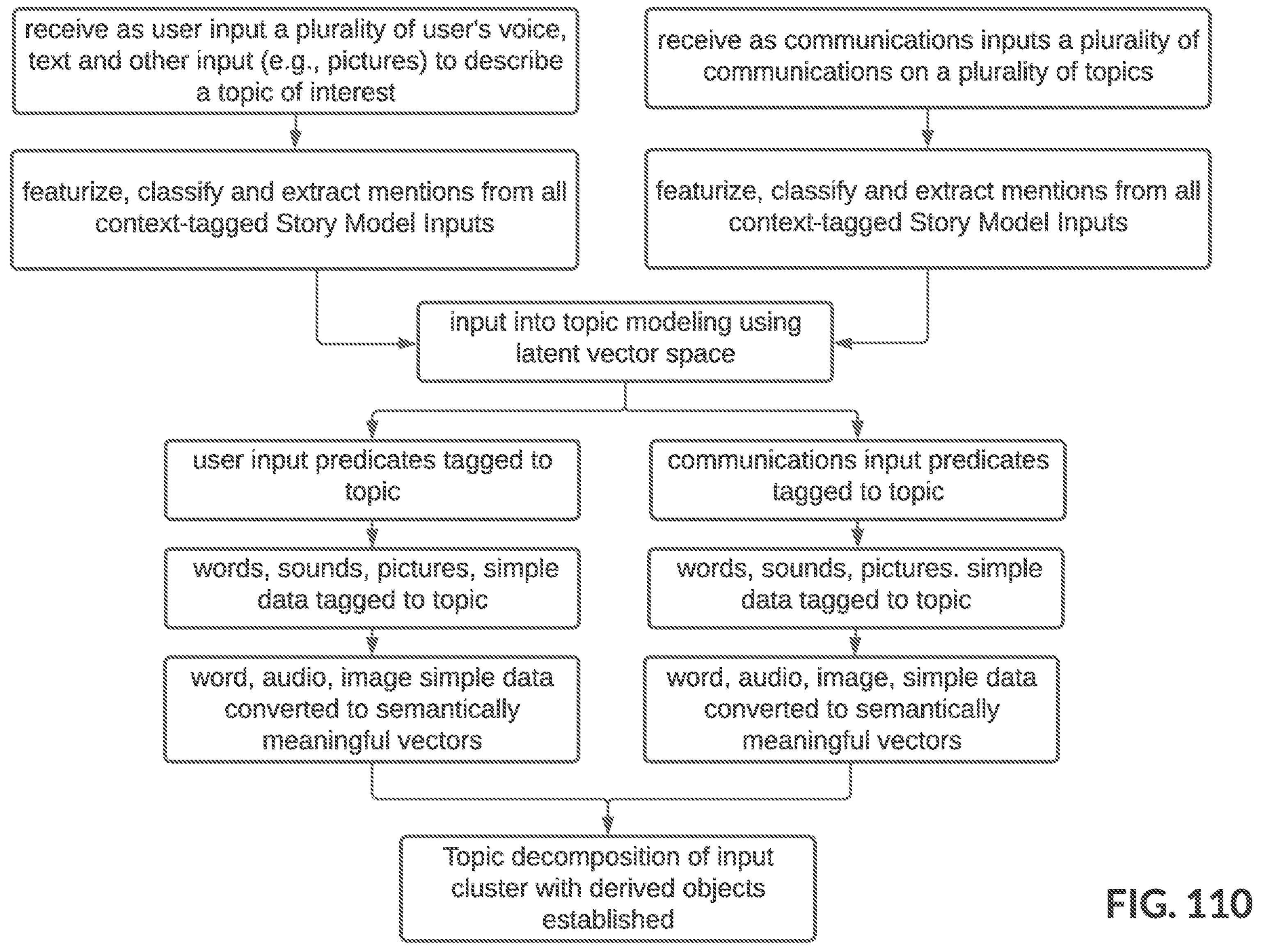

FIG. 110 illustrates a flow in the use of a trained topic model to derive topics from multiple datastreams, including from users and various produced communications on various topics (e.g., videos, papers, speeches, reports, studies, etc.).

Figure 111:
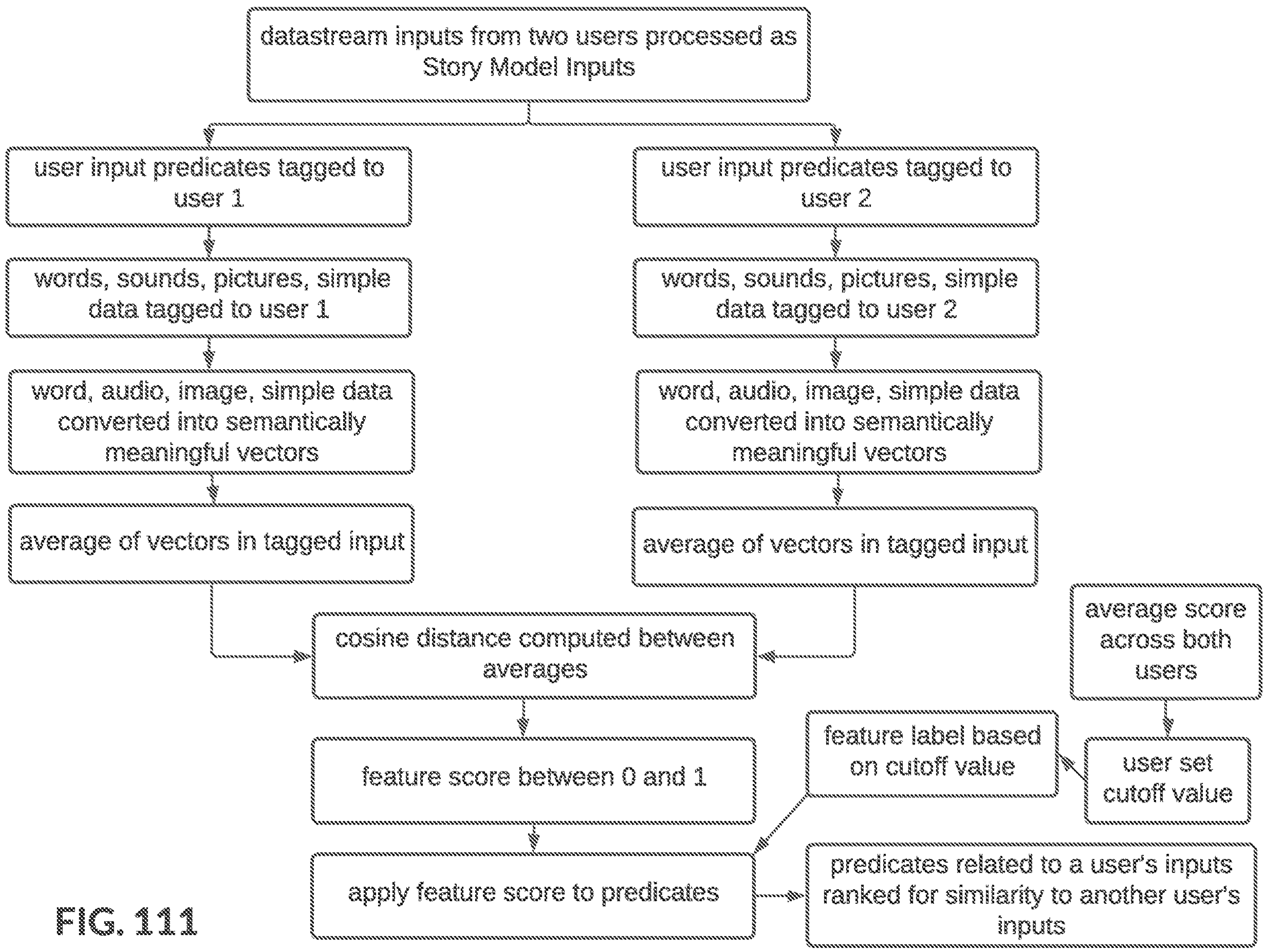

FIG. 111 illustrates a flow in another method that the example embodiment may use to determine similarity between inputs, (e.g., reciprocity).

DETAILED DESCRIPTION

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

As will be described, the example embodiment may use a hybrid of reasoning and deep learning AI models to facilitate user inspections of evidence as well as to provide task efficiencies associated with processing evidence. Inputs processed as evidence may be parsed and transformed by the example embodiment and organized into multiple simultaneous contexts in which an evaluation may take place. This evaluation may be conducted using various methods, including interim representations of the inputs that may be valued (e.g., probabilistic predicates, scores) in addition to their culminating expression as narrative abstractions, which may be valued. As will be described, these narrative abstractions may be emulative of the narrative abstractions people often use to communicate to others what they think, what they feel, what they do, what they did do, and what they want to do.

As will be described, a user may refer to a person and/or to a device that operates software which may be connected in various ways (e.g., cloud, APIs, other) and in virtually any context to the example embodiment. While many example uses provided herein involve people, it is understood that avatars, agents, software systems, and other products of software and in combinations thereof may be users. For example, the precision of an image detection software system in the case of a picture of a frowning man processed by that image detection system may depend on learning that the man's most likely relevant context is a specific event in the man's home life, to which the object detection model may not have native access, enough image training data, or the abstraction layers in its software design to develop a narrative framework. To continue with the illustration, the image detection software may receive via APIs or by other means from the example embodiment an information that improves the detection performance of the object detection software user. As another example, a user may be an electronic medical records system that may access the example embodiment to summarize a patient's records from a given time period into a digestible narrative that is both machine and human readable. To continue with the electronic medical records example, this narrative may improve machine-human interactions by making the outputs of machines more relatable, while reducing human burdens associated with recapping the most salient contents of a record, Such transformation of patient record inputs into machine readable narratives may also "teach" machines to process disparate facts observed across domains into a highly contextualized analytical frame that other technologies then may use. For example, narrative patterns surfaced by a longitudinal analysis by the example embodiment of a patient's many records may be used to trigger alerts to the patient's devices in a patient's home as well as to the devices of those caring for the patient.

A narrative may refer to an account of a sequence of connected actions, or events, using symbols (e.g., text), sounds, pictures and other types of data to represent the account.

The example embodiment may receive as inputs information in various narrative forms and combinations thereof, for example, clinical narratives, patient journeys, electronic medical record notes, videos, movies, photo albums, books, entertainment, articles, news reports, speeches, general conversation, and so on. While people may tend to use multiple forms of narrative to communicate and have a natural facility at combining them and at understanding these combinations, machines have tended to fail in this regard. Through various processing pipelines and system functions, the example embodiment may facilitate the transformation of inputs from any user into machine readable narratives and combinations of machine-readable narrative forms. The narrative abstraction layer that facilitates this transformation may reduce issues of interoperability between machines that currently may not "speak the same language" or flow insights generated in one domain across domains efficiently, if at all.

Furthermore, the example embodiment may identify, manage, analyze, and propagate user inputs within and between systems as a universal form of narrative, story. Story may refer to narrative structures, such as patterns of conflicts and resolutions, character transformation expressed in terms of these, and dyadic interplays between characters, or plots, which are interrelated sequences, which propagate a story, and conclude in a denouement, where all strands of the plot may be "wrapped up." The example embodiment may use a system of data structures, learning systems and processing systems emulative of how people use stories to identify, analyze and prioritize the relevance and importance of various contexts. People routinely ask others, who have "read" (e.g., novel) or "seen and heard" (e.g., movie) the same story, "Did you like the ending?" "Did you like the book or the movie better?" People tend to make up stories, tell stories, sell stories, compare stories, and analyze stories, as a way of relating to each other. Meaning, people understand themselves and others through story.

The example embodiment may derive and encode story elements from various human interactions, including dialogue. To illustrate story elements in a dialogue, consider this simple example dialogue: Speaker 1: "I didn't feel well but went to the game anyway since it gave me a chance to catch up with my son. He's a season-ticket holder, you know. Can you believe the lead they ran up in the second quarter?" Speaker 2: "Bet that made you feel better." This example dialogue contains story elements, such as a conflict ("didn't feel well"), which is overcome; an action, which is taken ("went to the game"), and roles, which are played (a dad role to "catch up with son" and a fan role). Speaker 2 suggests the fan comment ("lead they ran up") may be the antidote to "didn't feel well", and establishes a moment of reciprocity between the two speakers.

The example embodiment may identify and "manage" a user story in various forms, including dialogue, text, video, music, and various other forms of communication and combinations thereof. As a collection of narrative elements that may have a discernible relationship to each other that people are quick to process, story may have a discernible logic across forms of its expression—which the example embodiment may formalize into machine readable methods and systems. The example embodiment may use story in some sense the same way people do, to show how the specifics of life and its many challenges may be mediated by the abstraction of "story", to establish a relatability between users, regardless of differences in people's or machine's language.

In the example embodiment, people may use story to signal to others, and to reaffirm for themselves, which abstracted relationships are important to them. The example embodiment may also use story instructively, or didactically, to make a point, and in effect to help people manage challenges by describing them and solutions to them in a manner to which they may be accustomed—but, with evidence they may not have, simulated in a way they may not be able to, instantly, using potentially millions of possible scenarios. The example embodiment may predict from simulations and important goals the consequences of potential actions, or non-actions, that people may not otherwise have considered—or been able to—and render a recommendation for the next action. The example embodiment may simulate stories, using evidence, and information unique to each person, to help people make sense of things, relate their experiences to others, and to communicate what may be personally meaningful to them. In other words, the example embodiment may represent methods and systems that may emulate "story" to help people see possibilities, and to take actions in the moment, not simply to describe current or past events.

Turning now to a more detailed description, the example embodiment may serve as a robust insight model for each individual user that leverages a Story Object Hierarchy based on story structure to advance each user towards the goals important to them. An insight in this sense may refer to a pattern or relationship discovered during the analysis of empirical data over time, which has predictive power with respect to goals that may be important to the user. Importance in the example embodiment may be expressed as a numerical value quantifying various aspects of predicted relationships between various data types, including between Story Data Types in the Story Object Hierarchy. For example, a security code may have high importance to the role of a door locking system to provide only authorized access. In the example embodiment, the empirical data as well as goals (e.g., improving a role performance) may be expressed in terms of evaluable narrative abstractions. Furthermore, the Story Object Hierarchy may be used by the example embodiment in various ways to identify more meaningful narrative contexts based on various quantifications. For example, the Story Object Hierarchy may be used to encode predicates, the probabilistic logic elements extracted from observations of user inputs as story elements, which in turn may be associated with importance, and other metrics. A recommended best next action for each user to reach goals of importance to them, based on an analysis of the empirical data for each user now also represented as one or more quantified narrative abstractions, may be generated by each user's insight model (e.g., via an ensemble of deep learning models, including optimizers). In turn, the recommended best next action may be communicated by the example embodiment to each user in natural language, and thereby complete the realization of the Story Object Hierarchy via the self-construction of related Story Objects—from processed inputs through communication of a best next action based on it. This cycle of instantiation in the example embodiment, which may commence with every new input from or about every user, may create a unified narrative model to characterize interactions with and between all users as well as to determine and communicate which action may be the best next action to advance each user towards their own specific goals.

In the example embodiment, the Story Object Hierarchy may refer to data structure dependencies and relationships embedded in Story Objects used by the example embodiment to emulate certain narrative abstractions and the interplay between them. This interplay may be characterized in various ways, including for example as a sequence of interdependent actions (and in some instances non-actions), which may involve one or more humans and/or one or more non-humans as agents of the action or alternatively as objects of the action. Interplays may be observed and also contextualized as evidence for use in prediction as well as inductive or deductive reasoning. (e.g., "The key broke off inside the lock and now the lock won't turn"). Further, these interplays may be mapped to a narrative abstraction. For example, the reasonable observation "The key broke off inside the lock and now the lock won't turn" may be said to characterize a conflict in a story about a door locking system. The narrative abstraction illustrated here of a conflict may derive from an observation involving known or knowable facts regarding the relationship between keys and locks. As will be described, known facts in a knowledge base may be operated on by AI programming tools involving logic when evidence of known facts is identified by the example embodiment from inputs received from users, including user systems, for example a door locking system. Story Objects may be used by the example embodiment to construct a representation of each user's current or past story based on probable evidence of these interplays as well as to construct a representation of each user's future story based on simulations of these interplays, also based on probable evidence and goals set for their outcome.

As will be described in detail herein, the Story Object Hierarchy may compile various interim representations of processed inputs into a "program", or series of instructions written in terms of Story Objects and their capabilities. This resulting "program", or "target output," may describe an abstract story in a form that Story Model functions then may execute, which is what is meant by the term "executable story". The compilation process culminating in an executable story may begin via an input intake and transformation process analogous to lexing/parsing by traditional compilers. In the example embodiment, input streams of Story Model Inputs produced by the Story Model Inputs processor may be recorded and parsed by extractors and classifiers that are constituents of the Story Inputs processor. These processed inputs, referred to as Story Model Inputs, combined with stored knowledge, may then allow for the construction and syntactical ordering of narrative abstractions (which may become Story Objects at runtime) into intermediate representations, which may resolve to create the 'target output'—an executable 'story' expressed in terms of Story Objects and their capabilities. As typical of a compiler, an intermediate representation of an input source (e.g., language) and target output (e.g., an Abstract Syntax Tree) may be constructed by organizing Story Objects built from incoming Story Model Inputs into a layout that is capable of being executed by Story Model functions (e.g., Actualizer optimizations). The process may culminate in an executable story, or program, expressed in terms of a universal set of interdependent, machine-readable abstractions (Story Objects)—which various Story Model functions may use to "play out" a story via the defined interplay between these Story Objects.

To propagate the behaviors of, and relationships between, Story Objects, each Story Object may be encoded with what it may need from other Story Objects to implement its own logic, including dependencies. In the example embodiment, Story Logic may refer to this logic, which may be expressed as a complex web of code that each Story Object may use to "construct itself" and to establish through such construction the interdependencies describing the Story Object Hierarchy.

In the example embodiment, Story Objects may contain units of code, which may manage the construction, mutation, consistency, and evolution of an encapsulated Story Data Type as well as perform certain functions or operations associated with that Story Data Type. In other words, a Story Object may consist of both data and code, where data may comprise an eponymous Story Data Type and code may comprise the logic to construct it. This is what is meant when a Story Object may be described as self-constructing. As an illustration, the narrative abstraction of a conflict in a story may be emulated in the example embodiment by the behavior of a Conflict Story Object and what it may need to do to resolve the dependencies of its Conflict Story Data Type. As to these dependencies, the code component of the Story Object may contain the logic to manage its respective Story Data Type in various ways, including how it may interact with other Story Data Types.

As will be described, Story Objects in the example embodiment may have dependencies on the behaviors of other Story Objects, including on the information contained within their respective Story Data Types. For example, a Conflict Story Object may construct a Conflict Story Data Type as well as implement a "resolve" method, which, when called, may dispatch/coordinate with other Story Objects, such as an action object called a Narrative Segment to obtain a next best action which may resolve the conflict in question.

Furthermore, Story Objects may have dependencies on various Story Data Types (e.g., Story Logs) not necessarily constructed through Story Object code, but which may store information produced by various other Story Objects that they may need. For example, the Conflict Story Object may construct its Conflict Story Data Type from, among various other data types, Story Logs. In the example embodiment, a Story Log may be a Story Data Type containing data about interactions between Story Objects but no code. So it may be read and written to, as a data structure, and may even be relational, but may not as mere data perform functions.

In other words, in the example embodiment, all Story Objects may have a respective Story Data Type, but not all Story Data Types may have a respective Story Object. However, note, Story Data Types, as data, may feed or derive from Story Objects interactions, and may be used by the example embodiment to execute various functions and operations, including those necessary to evaluate and direct the interplay between Story Objects.

For example, among various functions that may use Story Data Types is Impact Analysis, which the example embodiment may conduct after the Actualizer recommends a best next action, which may be expressed as one or more Story Objects (e.g., Narrative Segments). As will be described, Story Logs, which may contain information about Story Objects as well as information from Story Data Types, may be used by the example embodiment to perform this analysis. In addition to using Story Data Types in its functions, the example embodiment may establish values for them. For example, through a process described later as Current Story Generation, the example embodiment may generate a value for a Story Data Type, such as Current Story Snapshot, by constructing it from evaluated Story Objects. The example embodiment may also "complete" various Story Data Types from various stores of Story Object information, including their requirements. For example, a Story Data Type, a Narrative Template, may be populated in part from stores about Story Objects and computations involving them, and in part, as will be described, from an analysis by the example embodiment of the user's interactivity with various elements of the Narrative Template itself.

At any moment, the Story Object Hierarchy may be characterized as emergent, since it may "emerge" from constantly changing interactions between Story Objects compiled from constantly changing processed inputs from users or about users. Furthermore, self-construction of the Story Objects and satisfaction of their dependencies, while encoded consistently to reflect the Story Object Hierarchy, may result in innumerable different instantiations, since input data used for the instantiation of Story Objects and their respective Story Data Types may also include data specific to the user. As a result, the example embodiment may propagate a story-based representation of every user based on a common set of narrative abstractions while each user may also be represented uniquely.

When constructing itself, each Story Object may use the Story Logic encoded into it to retrieve information in the knowledge base about its respective Story Data Type. To complete its self-construction, each Story Object may also use code to retrieve information in datastores processed from user inputs to instantiate itself as an object representative of an actual user and an actual user's story. In other words, Story Objects may contain their own rules for relationships with other Story Objects (via encoded Story Logic), their own requirements for which information may be needed from a knowledge base, and their own requirements for which information processed from user inputs they may need to instantiate a representation of a user and a user's processed input. In a sense, a Story Object may act as a template, which after being "identified" from processed inputs by a narrative 'compiler' may be "completed" via code that uses Story Logic to satisfy its dependencies on various other Story Objects and via code that uses the knowledge base and user data to satisfy other requirements for specific instances of the Story Data Type it may contain.

As a brief illustration of Story Logic, using various terms that will be described later, let's begin with the Narrative Segment Story Object. (Note, this illustration of Story Logic is not meant to be comprehensive but rather to show example relationships, including dependencies, which may exist between various Story Objects and the Story Data Types they may contain. Story Logic may refer to the code component of the Story Object that may be charged with satisfying the dependencies of its eponymous Story Data Type and conducting interactions with other Story Data Types, as illustrated here.) In the example embodiment, the Narrative Segment Story Data Type may have an action component comprising a subject, verb, and object (SVO). The subject, S, of the SVO may be the agent of the action (V) and fulfilled by a Role Story Data Type within sets of roles comprising a person's Identity Story Data Type (e.g., the subject, S, of the SVO may be a role, such as "doctor"). Meanwhile, Role may have a verb-object set, which may match the VO in the Narrative Segment's SVO component (e.g., S treats (V) headache (O). Note, a Role (e.g., patient) may also be an O, object of the verb, in the Narrative Segment (e.g., doctor (S) treats (V) patient (O)). So, the Narrative Segment may have a dependency on Role for completion of the action (V) as either its subject or object, or both. Note how in the illustration a role, e.g. doctor, may be the subject and another role, e.g. patient, may be an object. Role, in turn, may require a Deliverable Story Data Type, which may be a changed state of the object of the verb to meet requirements of the role e.g., examine patient (VO)=>examination (D)=>diagnosis (D). Furthermore, in the example embodiment, Deliverables may be chained (e.g., examination=>diagnosis=>treatment plan), creating a Deliverable Chain; a sequence of actions may be inferred from this Deliverable Chain (e.g., diagnosis may imply doctor examined the patient, and the type of examination, say, an annual physical, may imply the doctor tested motor reflexes), and in turn, a series of skills may be inferred from an associated series of actions (e.g., conduct reflex tests, analyze blood tests), which may also be expressed as SVOs. Roles, which may require deliverables, may exist in dyads involving other roles and their deliverables (e.g., a patient-doctor dyad may involve patient-pharmacist and doctor-pharmacist role dyads to resolve "doctor treats patient." For example, a Narrative Segment action specifying an order for single actions that a "doctor writes prescription" and a "patient takes pills" may have among its dependencies the mediating role of a pharmacist to "fill prescription," "dispense pills").

To continue illustrating Story Logic in the example embodiment, an exchange of deliverables between roles (e.g., prescriptions from doctors, consents and co-pays from patients, pills from pharmacists, etc.) may describe a Contract Story Data Type. The Contract may be established and maintained as a ledger of gives and gets of deliverables between roles, and to define the sequences as may be specified by the Narrative Segment. So, Role may have a dependency on deliverables and deliverables and roles together a dependency on a Contract. In this manner, a Narrative Segment, which may have a role dependency, may thus also have a dependency on contract. When the example embodiment recommends a best next action (e.g., via methods of optimization that may involve an ensemble of deep learning models, as may be referred to collectively as an Actualizer) for a user, the recommendation may be a Narrative Segment, which may be instantiated by the Story Logic resolving the Narrative Segment's dependencies on other Story Data Types and by self-construction of the Narrative Segment Story Object and dependent Story Data Types from user data stores and the knowledge base.

Meanwhile, new incoming data from or about the user may be compared by the example embodiment to requirements of the Story Data Types being instantiated. As will be described, these evaluations may be used for various purposes, including to recognize and resolve conflicts, Conflict also being a Story Data Type. Conflicts may inform attributes during updates of the Current Story Snapshot Story Data Type and of the Envisioned Story Snapshot Story Data Type, where targeted attribute values contained as output in the latter may be dependent on current attribute values contained as output in the former. Values of these Story Data Types may feed into the Actualizer to optimize the selection of a Narrative Segment (also called a recommendation or best next action) most likely to advance the user towards the user's Envisioned Story Snapshot, which may be representative of user goals. In the example embodiment, the Narrative Segment may address certain conflicts in the way of user goals, which may be derived from an analysis of any failure or set of failures observed in the chain of interdependencies from an action (e.g., an Actualizer recommendation) to a satisfied contract. Failure to satisfy a contract may include, but may not be limited to, missed roles, skill shortfalls, missed deliverables, deliverables that don't meet standards, imbalances in exchanges of deliverables between roles, and various other impediments to complete recommended actions, which may create inspectable conflicts. During instantiation, predictions of conflicts may be rendered by evaluating propensities to miss the assigned role, apply a needed skills, and so forth, based on what may be known about the user. Meanwhile, to propagate a story, ledgers in contracts may be "rebalanced", to address priority conflicts, which may, based on new likely generated conflicts, perpetuate a constant rebalancing, which the Actualizer may factor into its process of recommending the next Narrative Segment.

Regarding instantiation, this may refer to various methods of connecting a Story Data Type, user data, and knowledge encoded in a knowledge base to complete an instanced representation of a user in the example embodiment for use by what will be described later as the user's Story Model. When in the course of the descriptions the knowledgebase is described as "encoded", what is meant is that the data needed to complete the Story Data Type (i.e., implement itself and its dependencies consistently), may be found in the form required in the knowledge base. In the example embodiment, the knowledge base may contain "real world" information about a thing or an observation about a thing, such as its properties ("fish are undrownable", "tables have legs", "doctors have licenses," etc.) as well as conditions to distinguish between properties (e.g., "tables may have no fewer than three legs when freestanding"). In the example embodiment, instantiating information may include, but may not be limited to, abstractions about things expressed as nouns and verbs, which may operate in various relationships to each other (e.g., subjects, verbs, objects of verbs). For example, "doctor" and "treats patients" may be in the knowledge base of the example embodiment. When the term "resolved against the knowledge base" is used, it may mean that the information "encoded in the knowledge base" for Story Data Types may be found or discovered by various methods, within the knowledge base.

Meanwhile, as it relates to specific user information, this may be stored in a protected database that may be accessed (with permission) to complete the instantiation of the Story Data Types for each user. Information may include details processed from user inputs or about the user, such as behavioral (e.g., traits), biological (e.g., health status), biographical (e.g., married, kids, college degree) and other information specific to the user. Note, it may not be necessary for this user data to be stored within the example embodiment, as long as access to it may be provided, to instantiate the Story Data Types, so that the resulting Story Data Types may be representative of users, and so that inputs from users and/or about them may be used by various functions of example embodiment to advance users towards their goals.

For the purposes of illustrating how the above Story Object may be instantiated, let's take a Story Data Type called Contract, which will be described in more detail later. In the example embodiment, a Contract Story Object may "know" from requirements how to "build itself" (e.g., via the Story Object Hierarchy) using incoming processed user inputs (e.g., specific "evidence" of a contract) and encodings in the knowledge base about "contracts" (e.g., general properties of a contract). Furthermore, since a Contract by rule of its relationships with other Story Objects (e.g., Story Logic) may require at least two roles, the Contract Story Data Type depends for its own instantiation on at least two instantiations of the Role Story Data Type.

Terms used above will be described in greater detail, but the above may provide a general overview of the web of co-dependent data types (Story Data Type), the rules (Story Logic) that define their relationship to each other, and how various structures (e.g., knowledge base, database) may relate to each other and to the Story Data Types. In the course of the descriptions, types of Story Data Types, their rules and structure will be described.

Next, let's turn briefly to various methods and models that the example embodiment may use to leverage the Story Object Hierarchy (e.g., the instantiation of Story Objects using Story Logic, resolutions against the knowledge base, and data specific to a person) into a robust insight model for each user to advance users towards their respective goals, based on empirical data and the Story Logic encoded in the instantiated representation of each user.

To accomplish this, the example embodiment may use various AI methods and models. These may include, but may not be limited to, probabilistic programming, AI computational tools and ensembles of deep learning models that may perform various tasks to transform input datasteams into Story Data Types, including Narrative Templates, a Story Data Type, that may facilitate user interaction with their insight model. Each user's insight model may be referred to as a user Story Model. The methods and models used by a user's Story Model may be combined in various ways to learn more about users and their conflicts, and how to help resolve them, in the course of making and executing recommendations for each user. Beginning with probabilistic programming, this may operate on the encoded knowledge base (i.e., its constituents may be tagged to Story Data Types) to perform various logical functions and tasks, based on probability. While the importance and method of establishing probability will be discussed later, for now it is helpful to know, for example, that probabilistic programming may use information encoded in the knowledge base to meet various requirements of Story Data Types and/or of users who may wish to inspect certain inputs or outputs of the example embodiment through the Narrative Template Story Data Type. As another example, probabilistic programming may perform specialization logic related to certain Story Data Type requirements not considered immediate priorities of the ensemble of deep learning models, because the ensemble may be busy executing a different optimized action, but which users may consider actions or tasks still to be done, perhaps even in priority. Meanwhile, the just mentioned optimizers that are used by a user's Story Model may use Story Data Types to perform optimizations that generate other Story Data Types, such as best next actions, based on input values constructed from still other Story Data Types, as will be described shortly.

Thus far, a brief overview of relationships between Story Objects, Story Data Types, Knowledge base, data base, and various methods and models that use them has been described. The overview now continues with a more detailed look at how Story Data Types may act as an abstraction layer to mediate between other abstractions (e.g., various user "roles"), between representations of users themselves, and, as also will be described, between data of other systems that by themselves may not represent actionable insights (e.g., "what do I do with this information?"). Additional terms will be introduced during this overview, but it may be helpful to first describe the example embodiment in more broader terms, so it may be clearer how the example embodiment works, generally. (Afterwards, more detailed descriptions will be provided.)

To emulate human behavior, the example embodiment may model user situations and interactions in terms of story as specified herein to optimize actions and how to communicate them. In other words, the emulative behavior of the example embodiment may be inputs and outputs described in terms of narrative elements. Since narrative elements may be observable as behaviors (e.g., words may be considered actions), they may also be inspectable through Natural Language Processing (NLP) pipelines that transform language-based inputs into machine-readable data but also Natural Language (NL) outputs from the example embodiment.

In the example embodiment, an ensemble of deep learning and other artificial intelligence (AI) models custom-trained for each user (User Story Model) may interact with users in real-time to characterize each user's current story and then, based on the ensemble's real-time assessment of a user's many attributes, goals, and current contexts, recommend one or more actions in real-time, optimized to advance each user towards each user's envisioned story. In the example embodiment, the ensemble of deep learning models may be trained to simulate each user's behavior, and to suggest a best next action (Story Data Type, also referred to as BNAS or recommendation), which may be optimized to help each user achieve their envisioned story (e.g., Story Data Type). Thus, in the example embodiment, the best next action recommended may also be the action which has the highest likelihood of advancing the users towards their goals. Since the recommendation may be imbued with Story Logic, which may be propagated through optimization by virtue of output recommendations that are themselves Story Data Types, recommendations may reflect a personally relevant narrative context for the next action.

The example embodiment may take as evidence in its computations a user's real-life actions as well as real-time assessments of user attributes, including those based on validated health instruments (e.g., anxiety and quality of life), using classifiers and extractors trained to detect conditions in real-time from everyday conversations, images, and sounds in a user's life. The example embodiment may compute recommendations for the best next action for each user from user inputs (e.g., what a user says) or from inputs about the user (e.g., a health score, lab result, data from an electronic medical record, etc.), and may communicate these recommendations to each user as well as to other users, to determine which user may not only be best suited to act on the recommendation, but also who, by doing so, advances the most towards their own goals.

The recommendations for the user may be computed in real-time and delivered through a natural language transformation of the computed best next step, based on a mode of interaction preferred by the user. The user may interact with the example embodiment to accept, reject, modify, comment on, or simply create the recommendation (e.g., a doctor-user may determine the best next action for a patient-user, wherein the best next action may then be executed by the example embodiment.) The example embodiment may display for the user inspectable inputs into models used to generate recommendations, live annotations of processed user inputs before and after certain model computations, and audit trails for inputs and outputs, which may be commentable.

The user's Story Model may determine from user inputs when a user may be drifting from goals for which a recommendation is generated, in which case, the drift may trigger recommendations to either redirect the user towards prior goals or to infer a new set of goals and generate a new set of recommendations for the new goals accordingly. In the example embodiment, the process of receiving inputs by or about the user and of making recommendations specific to the user may be ongoing, and factor in not only inputs but also knowledge gained of the user and the user's goals over time. Thus, the example embodiment may be continuously updated or trained to make increasingly better recommendations to assist each user in reaching each user's own goals—in other words, to advance them continually, through an optimized sequence of actions, towards their envisioned story.

The example embodiment may use various methods to generate personally relevant insights from user inputs and to quantify their value. These methods may value relationships between abstractions instantiated per the example embodiment's Story Object Hierarchy. In the example embodiment, user inputs may map to these abstractions, after various transformations. For example, input data may be interpreted via a user's Identity (a Story Data Type) as a composite of all of a user's roles at any given time, which may exist in a dynamic hierarchy that may change in relative importance to each other based on context, user goals, and the situation. Roles (Role Story Data Type) in the example embodiment may be weighted (e.g., by importance) and associated with various actions and abstractions based on them, which may also be valued, as will be explained. As new data on a user comes in from any interpretable source, the attributes of that user may be updated. For example, audio input of "I forgot to take my pills" may lead to the attribute of task completion of taking pills significantly decreasing along with associated values, e.g., a decrease in the importance of the role of diabetic, a loss of mental clarity skill, etc.

At each moment, with a set of current attributes (referred to as a current story snapshot, as will be described later) and a defined goal to set a metric (typically a weighted sum of distances between the current and goal role importances), the example embodiment may identify the user's best next action to take by determining, via an ensemble of models that optimize actions (referred to collectively as an Actualizer), which task completion item would result in the best metric improvement in general, factoring in the user's existing skills/competencies (e.g., role Story Data Type) and contracts. It may also identify conflicts (Story Data Type), reasons why valuable tasks cannot be taken, in the form of missing skills or contracts where the other party did not fulfill a deliverable (Story Data Type) with resulting consequences. Through observation and validation, it also may learn which actions are most "comfortable" to the user, even when these may not be the most rational choice in the sense of metric improvement.

Once the example embodiment identifies the single best next action and associated conflicts, it may then propagate the story forward by assessing what would happen next if the user performed the suggested step. This new state may be analyzed the same way as identifying the best next action. Continuing forward, the example embodiment may "propagate" the story using the Story Object Hierarchy and inputs from users or about users—assuming the ensemble of models may be sufficiently trained. The meaning of each action may be understandable to users, owing to the rendering of narrative abstractions for each action into the natural language users may already be accustomed to seeing, hearing and processing, as people.

In the example embodiment, the Story Logic encoded in each Story Object, may support the propagation of story as a human interpretable account of the empirical data from user inputs, and also may make "story" machine readable, since the Story Logic may organize processed inputs into data structures for narrative elements. Conversions of narrative abstractions into code by the example embodiment may facilitate the quantification of abstractions, which in turn may be used in various other computations, including optimizations. Consequently, a "language of story" may also serve as a "language of computers." The Story Object Hierarchy may be human intelligible and facilitate an exchange of abstractions between machines.

In the example embodiment, a custom-trained ensemble of learning models (e.g., deep learning and logic-learning models) to advance each user optimally towards their goals may be referred to collectively as a User's Story Model, inputs into the User's Story Model as Story Model Inputs, interactions between users as a Story Model Collaboration or negotiation, which may take place between user Story Models through a Story Model Network, and the overall model of all users as a Story Model Collaboration System. The inspectability of the Story Model by the user based on user interactions with the example embodiment and archived source of original inputs (e.g., voice recordings, raw video) may deepen both the accuracy of the Story Model representation of the user's real-life story and the user's trust in it.

In the example embodiment, custom-training (i.e., learning about a specific user) of each User Story Model may happen continuously, based on real-time and continuous user inputs, inputs from user devices (e.g., metadata, wearables), and inputs about users, including from other users and their devices or systems (e.g., electronic medical records, lab results). Collectively, these inputs may be referred to as "datastreams," and may be processed by the example embodiment in segments, or "data slices", based on how the input devices chunk the data they dispatch to the example embodiment. User interactions with the example embodiment and with other users that produce datastreams may take place through devices connected to the example embodiment. Each input datastream may be tagged to the respective device (e.g., phone, computer, camera), user (e.g., user Identity, User Story Model), and communications modality (e.g., call, email, chat, video conferences), establishing what may be referred to as a context-tag. Regardless of whether the user interacts with the User's User Story Model or with other users through their user Story Models, the interaction may be context-tagged. Context-tagged interactions between users may be handled as interactions between User Story Models. During an interaction, context-tagged datastreams may be converted into type-specific formats, transformed into tensors for use by deep learning models for evaluation—e.g., classifiers trained on validated health assessment instruments (e.g., quality of life, anxiety) and extractors trained on validated expert models (e.g., care model, or other professional service models). These classifiers may be multi-stream (e.g., raw audio and text inputs) deep learning models classifiers trained on high quality reference data such as clinical trial data, custom-trained on the user's voice through transfer learning, and produced as single tensor output (e.g., combining custom-trained Automatic Speech Recognition (ASR) and text classification). The classifiers' output tensors may be context-tagged scores, and the extractor's output tensors may be context-tagged mentions, which can be resolved into subject-verb-object (SVO) sets. So multiple scores from multiple classifiers (including heath classifiers for quality of life and anxiety) and multiple extractions from multiple extractors may be mapped to the same context as well as to each other using the same input. The scores and extractions, in turn, may provide evidence used in the construction of multiple narrative abstractions. Thus, from the same input, the example embodiment may generate multiple scores, multiple extractions and multiple abstractions.

Furthermore, the multiple scores, extractions and abstractions generated by the example embodiment from the same input may be of various different types, which may be used together to yield richer insights. For example, a total quality of life score, which may tend to be inversely correlated to an anxiety score, is nonetheless a different type of health assessment than an anxiety health assessment, and when analyzed in combination with anxiety assessments may yield an additional insight, for instance, that a person may be more anxious in a particular area of life than another; this insight, in turn, may facilitate a sharpening of the focus of a therapy, or of a goal specific to reducing anxiety in that area of life.

To generate insights for use by users as well as by functions of the user's custom insight model, the example embodiment may use various methods. The example embodiment may generate and make inspectable to users' multiple insights by analyzing different scores, extractions and abstractions in exhaustive combination, among other analyses, of the same input. In turn, the example embodiment may use the same processed inputs during attribute construction and goal setting to propagate insights from the same input from the time of input until the time an optimizer ingests these multiple "insights" to make a recommendation based on them, at least in part. (i.e., the example embodiment may consider all of a user's evaluable contexts, not only the "current" contexts of one set of user inputs). Furthermore, the example embodiment may compare different inputs (e.g., one utterance to another), and their associated scores, extractions and abstractions, to continue insight propagation from one input to the next, and to store these and refer to them (e.g., via Story Logs) for use by various functions.

To illustrate, the example embodiment may use an ASR to transcribe into text what a user may say, and then via the insight extraction process, leveraging incoming Story Model Inputs, process this text into tensors. At the same time, for the same inputs, the example embodiment may process the acoustics themselves into tensors. A tensor may then be created by the example embodiment combining both text and acoustic tensors from the same input into one tensor suitable for insight extraction. As will be explained, classifiers may use the input tensors to render scores, as may be determined or not by each classifier, and extractions may use the input tensors to identify subjects and verbs and objects, or mentions, as may be determined or not by each extractor. In turn, extractions may be associated with scores via shared input. Meanwhile, the extractions may be transformed from their interim representation (e.g., SVOs, scores, predicates), as will be described, into narrative abstractions. As a result, the same user input may be scored, extracted, and associated with narrative abstractions in exhaustive combinations to generate multiple insights.

To illustrate various methods for how multiple insights may be generated from the same user input, let's use as an example of a user's input the words, "I lifted mom." Like all input, the words may be transformed by the example embodiment into multiple contemporaneous representations (e.g., input data formatted by data type and transformed into tensors), interim representations (e.g., SVOs, Scores, Predicates derived from extractors and classifiers), and target language representations (i.e., Story Objects from narrative abstract syntax tree compilations and Story Logic self-constructions). Beginning in the illustration with interim representations, scores may be rendered by multiple different classifiers trained on multiple different validated health instruments, such as quality of life assessments, with subcomponents that may be scored, anxiety, caregiver reaction assessments, with subcomponents that may be scored, and so on. Note, scores may also be rendered by various devices, say, for heart rate or blood glucose levels, which may be received concurrently with various other scores. Scores and extractions associated with the same input (e.g., involving subjects, verbs and objects such as "I lifted mom," and predicate extractions, as will be described) may produce, for example, an insight that the speaker may have low emotional quality of life and physical quality of life and above normal anxiety for "I" "lifted" "mom".

Let's move next in the illustration to the Story Object Hierarchy Compiler (which may manage the interim representations). In the example embodiment, the Story Object Hierarchy Compiler may translate Story Model Inputs processed from various input data types into an executable story expressed in terms of Story Objects and their capabilities. This executable story may be used by the example embodiment to identify retrospectively from source "languages" the presence of interplays between narrative abstractions, such as may be found in stories, and to recommend on the basis of Story Model functions which future or prospective interplays, if acted upon by the user, may lead optimally to a user's goals. In the example, "I lifted mom" may be characterized as a retrospective compilation—from the interim SVO, Scores and predicate representations into Story Data Types—to identify candidate child, caregiver and nursing roles, which in turn, through Story Logic, may involve various dependencies on other candidate Story Data Types, such as deliverables, contracts, Narrative Segments and so forth.

To describe this further, the noun "mom" in "I lifted mom" may be compiled into a Role Story Data Type involving a role set of mother-child, and "I lift mom" may be compiled into the action component of a Narrative Segment (SVO) that may describe the action of a caregiver, another role (Note the dependency between the Story Data Types). So, in this instant example, the speaker may be predicted to be both a child and a caregiver as well as the agent of the action in each case. To continue with insight generation, let's say the spoken words, "I lifted mom," receive a classifier score for anxiety, indicating perhaps that "lifting mom" may be an anxiety-producing action. Furthermore, in the example embodiment, roles themselves may be scored. To continue with the example, scores from health instruments such as caregiver reaction assessment, which also may be trained as integrated acoustic and text classifiers, may score certain caregiver roles and perceived burdens associated with them (e.g., lack of family support, financial burdens, scheduling burdens, health burdens, and impact on self-esteem). In the example, let's say the caregiver reaction score for "I lifted mom" indicates a higher perceived burden in the area of "caregiver health." Let's also say, for purposes of illustration, that the caregiver reaction score (e.g., negative caregiver health score) may be correlated to the quality of life score (e.g., low physical well-being), which taken together may suggest that the person speaking may not only be a child, as determined from extractions and abstractions from "I lift mom," but also that the caregiver role associated with the speaker may be viewed as burdensome by the speaker to the speaker's health.

As an example of leveraging still more insights from the same input from the same input, consider now that an extractor trained on ranges of motion may predict from the extracted word "lift" in the example illustration that certain muscle groups may be involved, which the example embodiment may also associate with other scores, extractions and abstractions from the same input. As a result, from the same input, the speaker in the example instance may be predicted by the example embodiment to have at least two simultaneous, contextually relevant roles (e.g., child and caregiver) with anxiety about lifting mom, where each role may be further defined (e.g., the speaker's voice may be predicted to be male, thus through inference predicting that the predicted speaker/child/caregiver may be a type of child, a son) and correlated to scores, which by correlation between them may also further define context of the same input. For example, from the low quality of physical health and high caregiver health burden predicted from classifiers, which may also be associated with the extractions of a lifting event and thus a certain likelihood that the lifting may involve muscle groups, additional candidates for evidence to describe the context may be surfaced to a user as well as used to generate logical queries (e.g., muscles used to lift involve back muscles=>are back muscles sore?), which may be executed by probabilistic programming over a knowledge base, as an example method.

To recap the above illustration, the example embodiment may use various methods to generate from the same user input multiple insights into multiple concurrent contexts (e.g., speaker may be predicted to be a son who may have a sore back from lifting his mother, which he may do as a caregiver, but which, by doing, may impact the son's desire to fulfill the lifting role of a caregiver, and which, upon further analysis may suggest that the son may have an injury that may need to be addressed). Meanwhile, from the same input, it may be learned that the "mom", another role, and the "object" of the action may also be a "patient" in that caregivers and patients may be in role sets. So, a string of insights may be generated from analysis of scores, extractions and abstractions, context tagged to the same input, and used to predict the likely situation, which may be repeated from one set of inputs to the next, and thus continuously expand the inputs for analysis.

Note also, while the above illustration may focus on insights from contemporaneous inputs, users may be represented longitudinally in the example embodiment using the same data types, used to establish an instance and to maintain the logic of the interdependencies (e.g., via Story Logic), histories of these interdependencies (e.g., via Story Logs), and other various methods. This persistence of interdependency between various data types and representations of inputs, over time, in turn, may facilitate multiple additional insights for any temporal input.

In the example embodiment, both classifiers and extractor model observations, along with the model's level of confidence in these observations, may engender the creation of predicates. Predicates thus may be mapped to the same context as the scores and the extractions, facilitating multiple dataviews of the same context. Predicates and SVOs may be deemed resolved when they meet requirements for storage and usage by models in the example embodiment. (Specifically, predicates may be deemed resolved when their arguments are complete, or if they simply match other predicates in the knowledge base. SVOs may be deemed resolved when a path between an S, V, and an O may be traversed in the same order in a knowledge graph, linking objects and subjects by edges which reference actions (verbs). Both methods may be known by one of ordinary skill in the art.) Scores, predicates and SVOs may be tagged to the input data slices from which they are derived, as well as to metadata about these same data slices (i.e., context-tagged user, device, and communications modality data). This tagging may be referred to as data annotation, or annotation. Annotation imbues different input and processed data with machine readable connections to facilitate analysis by User Story Models, and is performed automatically by the example embodiment.

Resolved, context-tagged, and annotated SVOs and predicates (including those associated with scores) may be encoded in the datastores, and associated with graphs, as Story Data Types. In the example embodiment, Story Data Types may be elements from which a logical story may be either derived from Story Model Inputs or generated prospectively from them. In the example embodiment, Story Data Types may be structured in ways appropriate to their particular function. Each particular Story Data Type (e.g., Contract, Role, Conflict, etc.) may have a platonic (pure) representation detailing its constituents and composition. The relationships between the various Story Data Types and their dependencies may be implemented to reflect the Story Object Hierarchy, as previously described. Story Data Types may be instantiated in many different ways. For example, an action associated with a role may be extracted from Story Model Inputs and labeled using labels established for the respective Story Data Type. Additionally, various Story Data Types may derive from an analysis of other Story Data Types (e.g., Story Logs, Conflicts, Contracts). For example, a conflict may have a dependency on Contract ledgers ("gives" and "gets" between roles in a Contract) at instantiation time, where a conflict may be specified in various ways, for example, by a deficiency or net debit in terms of role performance, as captured by the contract to which a ledger belongs. In other words, narrative abstractions (e.g., Story Data Types) may be used to create and establish a value for other narrative abstractions (e.g., other Story Data Types). As yet another example of Story Data Type instantiation process, predicates, SVO's, and scores from classifications may serve as input into the creation of a Story Data Type (e.g., Current Story Snapshot). However structured, Story Data Types may represent a layer of abstraction derived from what may be referred to as probabilistic predicates. Note, all input data may be rendered into probabilistic predicates.

In the example embodiment, AI computational tools may examine datastream inputs to recognize and extract facts, things that may be known about a thing, as "probabilistic facts". These "probabilistic facts" may be expressed in terms of probabilistic predicates (created from incoming data streams). As will be explained later, (see FIG. 17 descriptions), probabilistic predicates may be interpretable as logical elements and assigned a loss function, or probability, after analysis of extractions or classifications. Introducing probability into logical functions may reduce logical inconsistencies between logical statements and improve the likelihood that the logic functions of the Story Model may achieve user aims in real world scenarios. Probabilistic predicates created by the Story Model Inputs may be managed logically by the probabilistic programming language of the example embodiment (e.g., Problog). All data processed by the example embodiment may be converted or transformed into predicates. So, at least one predicate may exist, or be created through conversion of other input data types, for each Story Model Input.

Note, while predicates may be created by various methods, once structured, they may be used by the example embodiment regardless of which method may be used to create them. For example, classical AI techniques (e.g., entity-component based knowledge graph resolution, stochastic fuzzy matching models, hierarchical graph models, hashmap classifiers, etc.) may constitute example embodiments for classifiers and extractors that may extract predicates. Predicates produced in this manner may be stored and used as other predicates in the example embodiment, for example, to construct user attributes.

Meanwhile, non-predicate input or processed data may be associated with predicates, and thus propagate the narrative abstractions evidenced by predicates throughout the Story Model. Outputs from Story Model models may be converted into predicates, for example. In sum, predicates may serve as the evidence needed to universally represent all Story Model Input data as narrative abstractions. As a result of the foregoing, all Story Data Types evidenced by associated predicates may be used by probabilistic programming code to reason in terms of predicate statements and fulfillments.

The predicates themselves may be stored in a probabilistic knowledge base implemented as a knowledge graph. (See Wang, Daisy Zhe, "A Probabilistic Knowledge Base System", (PowerPoint presentation). Data Science Research CISE University of Florida, 2013.)

In the example embodiment, Story Data Types instantiated to reflect the Story Object Hierarchy may be derived from multiple other logical elements (e.g., probabilistic predicates) extracted from input data streams. In other words, in the example embodiment, narrative abstractions may have a logical relationship to each other, while also being rooted in logical, evaluable statements with probability (e.g., probabilistic predicates) extracted from observed or inferred user behaviors, or actions.

For example, a simple statement such as "I took mom to the doctor's" may be handled by the AI probabilistic programming tools in the example embodiment as a logical statement, with some probability of truth, that "mom needs to see a doctor"; but, this same statement, "I took mom to the doctor's", may be used to generate a higher level abstraction, also logical, to identify the speaker in that moment as a "caregiver" (e.g., Story Data Type called "role").

The example embodiment may use combinations of these derived, encoded logical elements (Story Data Types) in its Story Model functions to produce multiple levels of abstraction based on the same initial logical extractions and Story Logic.

To explain further, Story Data Types, and the Story Logic that may resolve dependencies between them, may be used by the user's Story Model to evaluate and optimize actions in terms of what may advance a user's story. The user's Story Model, in its functions, may emulate the interplay between various narrative abstractions that may characterize a story. For example, among the narrative abstractions used by a user's Story Model may be roles (e.g., a Story Data Type), actions (e.g., Story Data Type called Narrative Segments), conflicts (e.g., a Story Data Type) that may emerge between roles (e.g. from missed deliverables e.g., a Story Data Type) in a contract (e.g., a Story Data Type) between roles or prevent desired roles from being played (e.g., from a lack of role competencies/skills), and outcomes, including resolutions (e.g., a Story Data Type, also referred to as best next action), over a given period of time. Consistent with story structure, the example embodiment may not merely be about a sequenced account of actions, or events, or even forecasting them, but also about identifying and resolving conflicts. The example embodiment may use the Story Logic encoded in Story Objects (and at run time in Story Data Types) in various ways to create a representation of a user story or to progress it. As an example, a progression of a story (e.g., in literature or drama) may come from multiple users/agents with interconnected roles driven by conflict that may be connected to missed Deliverables in a Role Contract.

A Narrative Template (e.g., Story Data Type) may be used by the example embodiment to provide a user with stylized dataviews of various other Story Data Types, including computations based on them, as well as to respond dynamically to emergent needs of various system functions for certain data inputs from the user. For example, a case management case executed by Narrative Segments may require input from a user on a particular topic in order for the Narrative Segment to continue with its actions. The resulting request to the user may take place through a Narrative Template, and the response from the user may also be routed through the Narrative Template. Narrative templates in general may read the output of story models and present their insights to end users. In cases where immediate or real time functionality is required, they may post client requests to the backend requesting the backend perform a specific task or compute a certain piece of information for display.

To describe this further, information about a Story Object, including information about its requirements, may be stored for access by various system functions and operations, including those that may populate a Narrative Template. The example embodiment may also perform computations on various types of information from stores based on requirements in various forms and formats useful to the user. For example, a Narrative Template may be used by the example embodiment to generate a form of natural language story, using filters, various Story Data Types and topical views of Story Model Inputs. In some cases, a Narrative Segment may define a story in terms of other Narrative Segments and their dependencies, which the example embodiment may then use a Narrative Template to express. For example, a Narrative Segment may specify actions involving Story Logs which may reference other Story Data Types, including other Narrative Segments and their respective action components—to determine which actions to feature in a story derived from Story Model Inputs, along with which dependencies on which Roles and on which Deliverables to surface, as well as which attributes, such as certain validated health scores, to reinforce in a story, for example to contextualize which challenges with which role a person may have, and so forth.

Through tools made available via the Narrative Template, users may see various progressions of their "story" over time, for any time frame and other filtering criteria they may choose. Additionally, various progressions of a user's story may be compared and analyzed, to produce insights inspectable by the user. For example, the user's "actual" story, based on observed actions (e.g., logs and Story logs), may be compared to the progression of recommended actions, with analytics based on impact analysis of the recommendation on changes in attributes and information from the user's behavioral model. As a result, the Narrative Template may highlight which recommendations, when acted on, produced which inflections in the user's progress. Furthermore, depending on the Narrative Template and requirements of Story Data Types on which it may be dependent, a Narrative Template may be used to graph a natural language story, annotate it with quality of life and other health scores by classifiers trained on validated health instruments, and to highlight topics associated with inflections. Filtering criteria and options for display methods may be made available to users to manage various dataviews and displayed forms of a story, as well as of other information managed for display by a Narrative Template.

The user's Story Model may update Narrative Templates automatically, from new Story Model Inputs, and archive iterations.

In addition to displaying information for user inspection, Narrative Templates may be used to facilitate and guide interactions between users and their Story Model. In the example embodiment, an annotated natural language story may be commentable, thanks to a Narrative Template. Various interactive tools may be provided by a Narrative Template so a user may add input about what is displayed, to approve it, comment on it, modify it, reject it, or to add new information altogether, depending on constraints of a particular instantiation of a Narrative Template. User comments or other interactions via the Narrative Template may then be treated as Story Model Inputs, and flow back through Story Model functions, to update Narrative Template displays, thus facilitating the user's management of their own story.

In addition to providing commentable views of a user's current story, a Narrative Template may be used by the example embodiment to display a user's story trajectory, meaning actions forecast into the future, using various simulation methods, which may incorporate Story Log and other user information into their calculations. Once displayed, the trajectory of future actions, which may be represented by the Narrative Template as plotted points on graph, among other methods of display (using whichever basis for an axis as may be available through a filter), may be manually adjusted by the user. In turn, these user adjustments may be treated as Story Model Inputs, and thus may factor into new value constructions for attributes and goals. In addition to factoring into attribute and goal constructions, the trajectories created by the user manipulation of the display of the original trajectories may be used by the example embodiment to rerun the simulations using the user's new inputs (i.e., manipulations), obtained via the Narrative Template, to generate a new trajectory based on them and on what the user's Story Model may already "know" about the user (e.g., via Story Logs, Identity) and on user filters. The new trajectories generated by the example embodiment may update the display managed by the Narrative Template for user inspection. Insights derived from evaluable differences between user manipulated trajectories of their story and the trajectories of their story generated by the user's Story Model may be displayed by the Narrative Template.

To derive insights from user manipulated trajectories of their story, the example embodiment may use various methods. For example, user manipulated plots on a story graph (displayed interactively via a Narrative Template), may be mapped to values constructed for user attributes and goals (e.g., user current and envisioned story snapshots), differences calculated, and then expressed in various ways via a Narrative Template. Additionally, a probability may be applied to the likelihood of the user closing the gap, if there is one, over the period of time for which a trajectory is generated. This probability may be determined using various methods. For example, required role competencies may be compared to current role competencies (e.g., medical student≠surgeon, and the progression between the two takes time), deliverables for future states compared to current deliverables (medical degree≠board certification), and so forth. So, if a medical student today may want to be a surgeon tomorrow, the example embodiment may determine the medical student has 0% likelihood of accomplishing that. But if the medical student wishes to do better on an exam tomorrow, the medical student may be predicted to be more likely to do so, provided conflicting attributes are down-weighted (e.g., social roles) along with related "social" contracts (e.g., reschedule a night out with friends). These may be only certain aspects of the user's story, which may be shown by a Narrative Template at whatever level may be made available via filtering criteria.

Furthermore, Narrative Templates may be used to provide users insights into what may be required to achieve a certain "story" or goal. For example, the knowledge base used by the example embodiment may contain information related to requirements for roles, including associated actions, competencies/skills, deliverables. Deliverables may be chained, or ordered, in many cases (e.g., medical degree comes before board certification). Thus, a Narrative Template may be used to respond to a user question about what the user may need to do to achieve a user goal, based on comparing encoded knowledge base information, for instance about roles, actions and deliverables, user data, and instantiation of user data in Story Data Types. Note, answers generated by the example embodiment, and then shared via a Narrative Template from such user queries themselves may not be based on optimizations, unless the Narrative Template is used to generate optimizations based on them. However, only optimizations generated by the user's Actualizer may take in the full context of what is "known" about a user to generate the best next action.

Narrative Templates may accommodate various user needs for inspectability into information besides their "story" that may matter to them, which may be "known" or inferable and computable by the example embodiment. For example, a Narrative Template may be used to provide commentable views of a transactional history between two instantiated roles, say, in a legal or business contract, as may be generated by Narrative Segments with contract and role and other Story Data Type dependencies. Narrative Templates may be required by any Story Data Type for an inspectable view of that Story Data Type.

Additionally, Narrative Templates may be used to acquire inputs from the user to complete the instantiation of various Story Data Types, including Narrative Templates themselves. Narrative Templates may be required by the example embodiment to inform, through user inputs, various user Story Model processes (e.g., attribute construction) or to instantiate various Story Data Types (e.g., Role, Contract), which in effect may be use cases created for involving users in improving system efficiencies. For example, a Narrative Template may be required, in an example embodiment, by a Narrative Segment to fill in missing information required from the user for the probabilistic programming to execute specialization logic. As another example, a Narrative Segment may require a Narrative Template during envisioned story generation to obtain user inputs on goals, via data stores that the example embodiment may use to populate the Narrative Template. To describe this example in greater detail, a Narrative Segment may specify a method of projection, for instance, where users may participate in a goal setting process involving the use of stories to determine a user's desired future state. In such cases, a Narrative Template may be used by the example embodiment to present stories themselves as the stimuli for user responses. Stories used as stimuli by a Narrative Template—via the example embodiment—may be shown in various forms (video, text, etc.) including combinations thereof. Furthermore, stories may be generated as stimuli by the example embodiment from various sources, including from the user's story, generated as described above, or simply from stories available to the public, which the example embodiment may handle as Story Model Inputs. In the example embodiment, another method of projection may involve simulation (e.g., Monte Carlo) of Contract role choices, which may be associated with future Identity values. In this case, the user may see results of the simulation via the Narrative Template and continue to fine tune them until satisfied with a chosen story as displayed by the Narrative Template.

To continue with the description of various methods of projection, user responses to stimuli presented via a Narrative Template may be scored by classifiers relating quality of life assessments (e.g., measures of emotional, financial, physical, and social well-being) to help evaluate responses and tie them to topics and locations in the stimuli, to deepen the analysis and generate insights based on it. In other words, in the example embodiment, stories themselves may be stimuli used to generate and evaluate other stories. During the course of such a method, the Narrative Template may iteratively show various views of the Story Data Types used in the simulation, including annotations, which may themselves be commentable. For example, potential conflicts may be surfaced by the Story Model and presented through the Narrative Template, including for narrative summary and discussion. Among other projective methods, a Narrative Template may be empowered to query the "back-end" to obtain or generate specific media/insight, e.g., to obtain photos, videos, and various other user inputs via Story Model Inputs that the user then is asked by the user's Story Model, or by another user, to talk or write about, comment on, rate, and so forth. In these various manners, a user's Story Model may use Narrative Templates to help the user manage abstract goals (e.g., identification of desired roles), evaluate importances, and inform the prescriptive actions recommended by the User's Story Model to help user's overcome abstract conflicts that may stand in the way of desired goals.

Note, conflicts may be determined many ways, including, for example, by analyzing evidence suggested from health classifier scores (e.g., anxiety, quality of life, caregiver reaction) that may be associated with a competency (e.g., mental acuity, which anxiety may diminish) required to perform certain roles (e.g., caregiving), associated with certain deliverables. Similarly, certain goals may be expressed from an analysis of scores as new scores to reach (e.g., to lower anxiety), for which the user's Actualizer may then optimize action sequences facilitating instantiation of the deliverables and other related narrative abstractions. Just as certain "negative" classifier scores may be used to determine the likelihood of certain conflicts, "positive" classifier scores may be used as inputs into goal value construction as well. For example, a high self-esteem score for a caregiver role (e.g., via caregiver reaction assessment score), high quality of life scores, and low anxiety scores may suggest the importance to the Identity of the user of the caregiver role and thus perhaps goals related to furthering this role. To continue with examples of how scores may be used in relation to each other and to goals, say a user may have a relatively high self-esteem score as a caregiver, but a higher caregiver burden score for the caregiver's health and a low quality of physical life score. In combination with extractions related to, say, "lifting" and "sore back", various goals may be constructed. For example, "less lifting" may be a reasonable goal to construct from the evidence of the scores and extractions of a user's inputs evidencing wishes to be a caregiver but negative scores associated with "lifting" extractions. So while increasing fitness may be a likely constructed goal, perhaps "finding help" to assist with the "lifting" may be another. Scores, extractions, and abstractions (e.g., roles) may be used by probabilistic programming and AI computational tools to generate insights for the user and for ingestion by other model functions.

The Story Model functions (models) may create quantifiable values for Story Data Types that may be used by the example embodiment to generate current data views of user actions and optimizations for user's next actions. Optimizations in the example embodiment may include a recommendation for which resources to take which actions on behalf of which user that in so doing also advances each user towards their own envisioned story. The notion of agency inherent in story structure is also inherent in health care, and in many fields involving expertise, where a person may need the actions of another to accomplish not only big things, but also everyday life tasks.

In the example embodiment, agency may be described as an inherent feature of Story Objects, which recall may self-construct to satisfy the dependencies of their constituent Story Data Type on the Story Data Types of other Story Objects. Story Objects in the example embodiment may include, but may not be limited to, Identity, Role, Narrative Segment, Communications Strategy Use Cases, Conflict, Deliverable, Contract, and Resolution (i.e., a Narrative Segment generated as a best next action recommendation, also referred to as a Targeted Narrative Segment and a best next action (BNAS)), each with their eponymous Story Data Types. Other Story Data Types may include, but may not be limited to Current Story Snapshot, Envisioned Story Snapshot, Story Log, and Narrative Template. Story Data Types may be represented numerically, may exist in relation to each other as both logical and narrative elements, and may be used as types of relational data by various functions and operations of the example embodiment to advance users towards their goals In the example embodiment, Identity may be a composite of all of a user's roles at any given time, and may be characterized as a dynamic hierarchy of various user roles that may change in relative importance to each other based on context, user goals, and the situation. Identity may be represented numerically, based on a combination of constituents, such as weighted roles and associated contracts, actions (e.g., tasks), skills (e.g., aptitudes/competencies) and deliverables, which also may be evaluated and measured. The example embodiment may use various methods to measure and evaluate Identity constituents, and various other Story Data Types. These methods may vary by constituent, and may include, but may not be limited to measures for importance, completeness (e.g., of contract, of deliverable, etc.), satisfaction, and dissatisfaction. As an example of importance, it may measure how connected two constituents or Story Data Types may be to each other, using variable weights from 0 (totally unconnected) to 1 (connected perfectly). Constituent states and values may change moment to moment, creating changes in Identity states and values.

In the example embodiment, a user's Identity may be tagged to a user's name.

In the example embodiment, a Role, which may be a constituent of Identity, may be an aggregation of user skills/competencies (observed as a cluster of similar actions) associated with a set of deliverables (observed as a cluster of similar products of the clustered similar actions). In the example embodiment, roles may be dyads comprising pairwise complements (e.g., doctor-patient) or roles that may require a deliverable from each other (e.g., doctor-phlebotomist; doctor may need a blood test result from a phlebotomist to complete the doctor's deliverable of a diagnosis). An interplay may be any sequence of actions between roles. In the example embodiment, the interplay between roles may be encoded into contracts between them.

In the example embodiment, a Contract may consist of "gives and gets", or sequenced actions between roles, involving an exchange of deliverables between them (e.g., patient gives consent, doctor gives treatment). In the example embodiment, the order of "gives and gets" in a Contract may be determined by a Narrative Segment or simply observed from interactions between roles during Story Model Inputs. A contract may be explicit in the Story Model even if in life certain contracts may be considered implicit (e.g., a friend who takes another friend to dinner may expect to be taken to dinner in return, at some point). A contract may be used by the example embodiment to represent relationships transactionally and to "keep score" of credits and debits, a ledger of actions, between roles imputed, observed, or agreed to be played. In other words, a contract may represent exchanges of deliverables during role-based interactions, which may be context-tagged and include various types of interactions. For example, a contract may be used to represent planned interactions, such as may characterize a collaboration at work, or unplanned ones, such as may characterize a social engagement. In the example embodiment, multiple contracts may be used to represent different interactions within similar contexts, such as a collaboration. To illustrate, a collaboration involving a boss and two co-workers who report to the boss (e.g., have the same boss), may be represented as several contracts: one between the boss and worker 1, one between the boss and worker 2, and one between worker 1 and worker 2. Meanwhile, to continue the example, all three roles may each have a contract with the organization that employs them all. In other words, a contract may represent a way to manage pairwise relationships within contexts involving multiple different roles. The use of multiple contracts to characterize a collaboration may facilitate multiple ways to not only view a collaboration, but to identify and isolate many variables associated with it, including consequences and conflicts that may be predictable from them.

In the example embodiment, contracts may be used to track deliverable exchanges between a role and its complement (e.g., doctor-patient. vendor-client), or between a role and another role not its complement, per se, but which may produce a deliverable needed by the role (e.g., doctor-phlebotomist; doctor may need to see a lab result produced by a phlebotomist).

Contracts may be used by the example embodiment to document and interpret the interplay between multiple concurrent roles. For example, a doctor may also be a vendor and the patient may also be a client. So a dyad (e.g., doctor-patient) may be associated with another dyad (e.g., vendor-client), thus associating various levels of abstraction to characterize the same exchange of deliverables. This may facilitate multiple views and analysis of the same temporal relationships between entities but co-existing in potentially different roles contexts (e.g., is the "doctor" ordering more lab tests to run up a bill or because the doctor cannot make a diagnosis with them?).

In the example embodiment, contracts and ledgers may support various Story Model functions, including the evaluation of importances. For example, importance may be measured between a role and user goals (e.g., how important is the "doctor" role to a person in medical school whose goal is to become a doctor?), between actions and deliverables (e.g., drawing blood has high importance to producing a blood sample), between skills/competencies and actions (e.g., is the doctor trained to draw the blood?), and so on, such that each "give and get," which may involve deliverables (Note, in the example embodiment, a communication may be a deliverable), may have one or more measures of importance. Thus, contracts may be among various methods used by the example embodiment to evaluate and manage importances. Recall, importance may be expressed mathematically as a variable weight.

Contract, as a Story Data Type, may be used by the example embodiment to monitor exchanges of deliverables (e.g., Story Data Type) between roles, and to identify a "missed deliverable." A missed deliverable, which may be detectable through an analysis of contract ledgers, may be among various ways a Conflict (e.g., Story Data Type) between roles may be recognized. Such a ledger also may be used to produce metrics for evaluating choices a user makes relative to other choices they may have (e.g., which role to play or which role not to play, given a choice between roles) and relative also to choices made by other users with whom they may have a contract.

In the example embodiment, a completed exchange of deliverables between roles in a contract may be used to signal a completed contract, which in turn may represent completed Narrative Segments and fulfilled roles, if the completed actions in the contract are the actions recommended by the Actualizer along with all of their dependencies.

In the example embodiment, a Narrative Segment may be a single action or a strictly ordered sequence of single actions. A narrative may be composable from one or more Narrative Segments. When one or more user actions is detected during Model Inputs, the actions may be characterized as one or more Narrative Segments, and when one or more actions are recommended by the User's Story Model, the actions also may be characterized as one or more Narrative Segments. A recommended action or series of actions, which may be one or more Narrative Segments may also be referred to as one or more targeted Narrative Segments, or targeted narratives. Narrative Segments may also be referred to as use cases. See FIG. 22 for more detail on Narrative Segments as a Story Data Type.

In the example embodiment, the action component of a Narrative Segment may be observed as resolved SVOs, where the subject (S), as the agent of the action (V), may map to an abstract and/or specific role (e.g., "nurse", "advanced practice registered nurse") and may be tied to an Identity (e.g., "Jane") comprising many roles, which the example embodiment may use to identify the entity (e.g., the person, Jane). These resolved SVOs may be described as a constituent of the Story Data Type, Narrative Segment. In the example embodiment, SVOs may be transformed into predicates, and in turn may be operated on by probabilistic programming language that uses predicate logic. Furthermore, as a Story Object, the Narrative Segment may be encoded with Story Logic. As an example of dependencies established between Story Objects, the Role Story Object may be encoded with Story Logic requiring at least one instantiation of one action, or one Narrative Segment Story Object.

Figure 2:
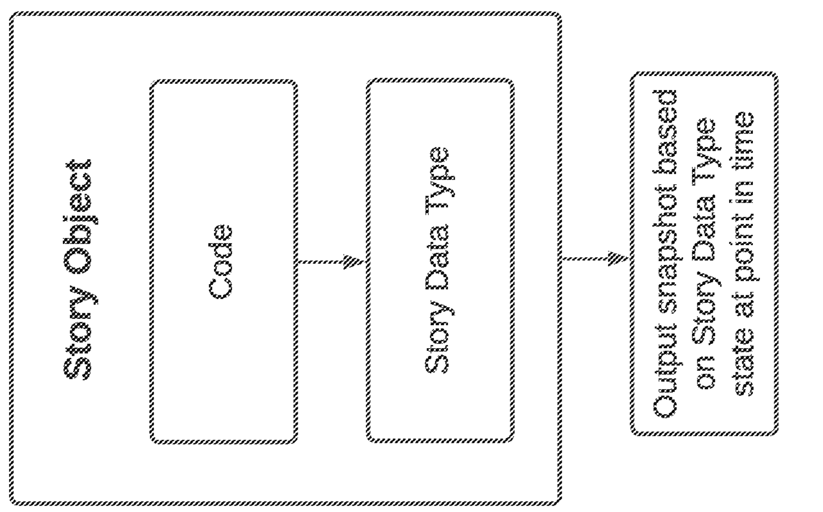
FIG. 2 illustrates a Story Model Overview, particularly a Story-driven data design, showing the relationships between Story Objects and Story Data Types.
Figure 2A:
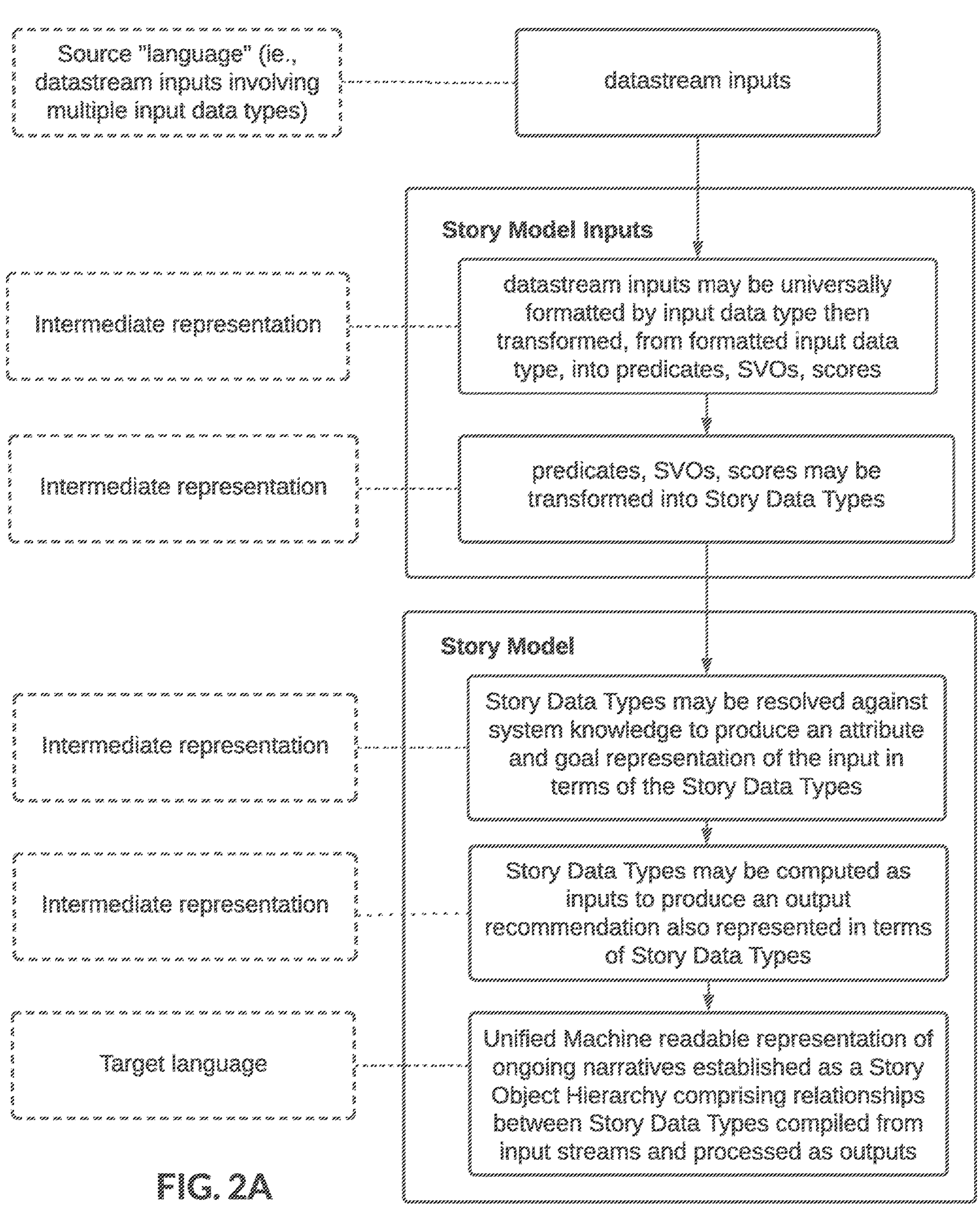
FIG. 2A is a flow diagram illustrating steps of an automated method for compiling datastream inputs into a Story Object Hierarchy consisting of Story Data Types.
Figure 2B:
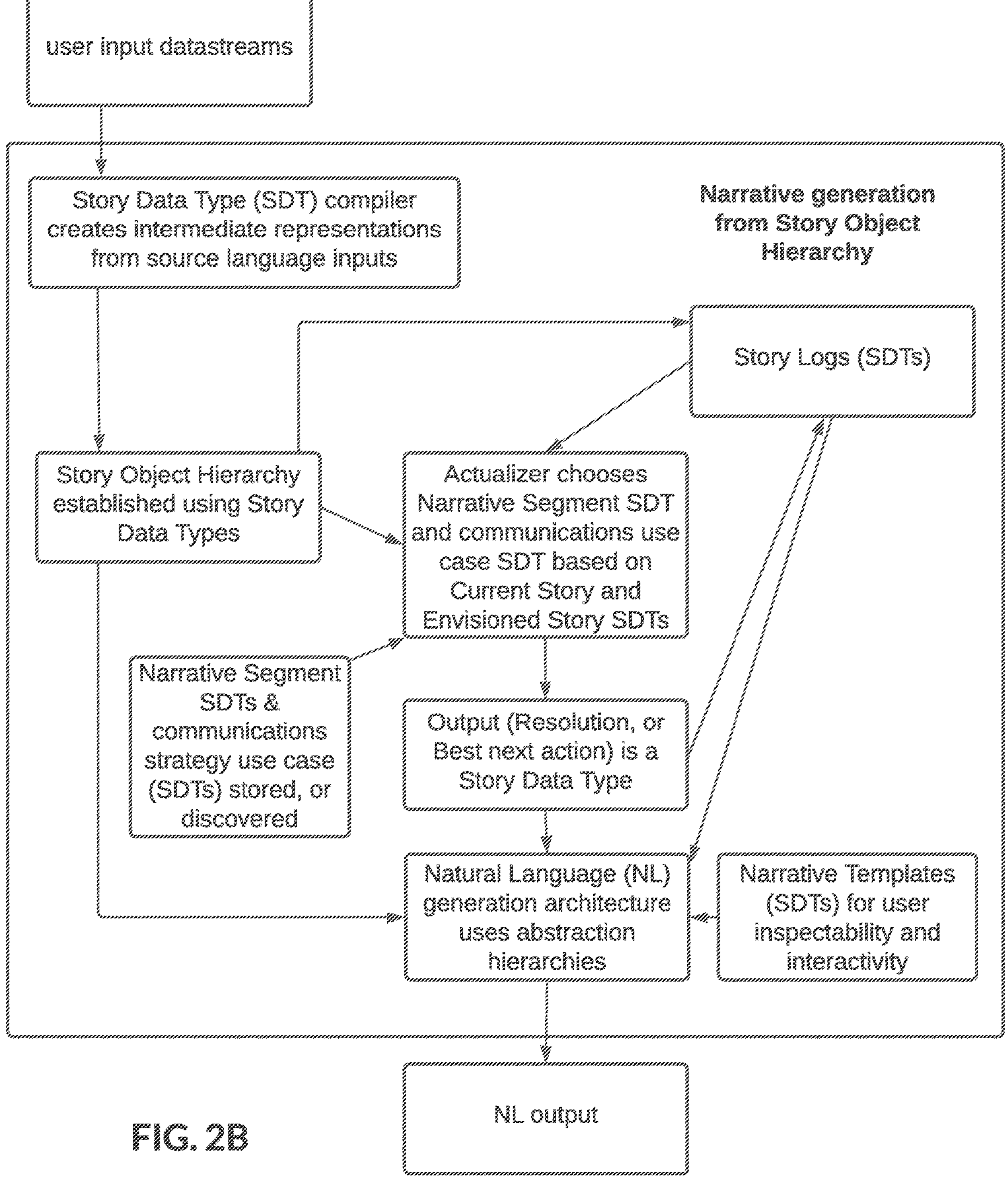
FIG. 2B is a flow diagram showing an overview of how the Story Object Hierarchy described in 2A may propagate through Story Model functions to render a natural language (NL) output for the user.

See FIGS. 2A and 2B for more details on the Story Object Hierarchy.

A conflict may be an impediment to a desired outcome. A conflict may be determined many ways by the example embodiment, including, but not limited to, an inspectable deficit in contracts (e.g., imbalances in deliverables between roles in an agreement).

A resolution (e.g., best next actions, or Narrative Segment or Narrative Segments chosen by the Actualizer, also referred to as targeted Narrative Segments) may be a cluster of similar actions to overcome a conflict.

Outcomes may be the perceived or measured value of a deliverable.

A deliverable may be the product of one or more actions and may have various measurable qualities. A product of an action may refer to the sum of all state changes (of objects of the verb) resulting from the execution of that action (e.g., draw blood (VO)=>drawn blood). Note there may be nounal equivalencies for changed states (e.g., "drawn blood-"~"blood sample". In the example embodiment, deliverables may be "chained" to reflect a sequence of products, for example, as a result of a sequence of actions, to produce the next product (e.g., blood sample=>lab report). Associated with deliverables may be various qualities and characteristics that may be measured and compared against standards for these same deliverable qualities and characteristics. In the example embodiment, a deliverable may have a characteristic description stored in the knowledge base, A characteristic description of the deliverable may be general, and may be associated with other descriptions of the deliverable that detail the relationship between the parts that comprise it, as well as their properties and the requirements for producing and assembling them. Requirements may include specifications for particular production of a specific deliverable, if applicable, and may include, among other information, costs and due dates, as may be determined for a particular deliverable. Story Model Inputs such as scores (e.g., quality of social life, quality of financial life, emotional quality of life, etc.) may inform Story Model functions, such as behavioral modeling, and be tagged to actions (e.g., Narrative Segments) that empirically show progression or digression from user goals. Thus, narrative abstractions and scores may be linked, and may be used retrospectively to determine correlations, including causations. They may also be used prospectively. For example, scores may be set as targets (goals) and used to optimize which Narrative Segments may be most likely to advance the user towards these.

In the example embodiment, users may be active participants in their own story's development and in the development of other users' stories. Users may interact with their User Story Models through conversation, as well as through various methods of inspecting the state of their current story or progress towards their envisioned story. Various methods may be used by the example embodiment to display and describe for user inspection the dataviews available from Story Model Inputs.

As will be explained in greater detail later, dataviews may be provided by the example embodiment of various reporting and document management requirements for live, searchable, inspectable, commentable, auditable and archivable information as may be required by certain Narrative Segments (e.g., case management cases). These Narrative Segment requirements may specify the structure and nature of interactive templates, or Narrative Templates, to progressively populate "documents", "page views" etc., based on requirements. A Narrative Template may be populated using various methods. These "document" requirements, which may include specifications for information to be acquired from a user, may be stored and accessed by client request and by other methods known by one of ordinary skill in the art to manage communications between the "front end", such as may be represented by a Narrative Template, and the "back-end", here represented as functions involving Narrative Segments. Narrative Templates may be used to define what Story Model Inputs and inspectable Story Model outputs the example embodiment may gather and how to display these for user comment, original user inputs, and so forth, during the user's interactions with the example embodiment, as well as make requests of the backend to generate specific insights or requests when required by user action.

In the example embodiment, views of context-tagged data slices already processed and annotated as previously described during Story Model Input may be exposed to the user, and rely, for instance, on Narrative Templates to protect privacy and legal constraints (e.g., Health Insurance Portability and Protection Act)—who sees what, if you will.

To continue more generally with various types of displays, display methods in the example embodiment may include, but may not be limited to, filters for what is displayed and graphical techniques for how it is displayed (e.g., live user scores animated as graphical lines or changing numbers), as well as Natural Language (NL) generated descriptions to describe the display from underlying predicates and scores processed during Story Model Input. Displays may include graphical interpretations of the annotated data from Story Model Inputs as described above as well as various interactive methods for users to input comments. The user interface, as may be determined by the Narrative Template, may be used to accept user input, such as comments, and also, through Story Model Inputs, to display outputs based on user inputs. Displays may include transcripts of the user's spoken words processed as input by a custom-trained automatic speech recognition (ASR) system on voices like the user's voice, in addition to graphical treatments of scores and extractions rendered in real time by the classifiers and extractors respectively. For example, using a Narrative Template, a transcript generated by the ASR from a video's audio channel during a video call and annotated with scores and extractions, may be transformed from the underlying predicates and scores into a real time natural language display (e.g., "[name] has leg injury", "low physical quality of life"). Likewise, displays may include text from an email or chat or other datastream of the text data type formatted and processed as Story Model Inputs.

To continue with Story Model Inputs, the example embodiment may summarize annotations generated during Story Model Inputs for text (e.g., transcript) in whole or in part, using a transformer (e.g., GPT-3). The summary may comprise new language and may be displayed with scores corresponding to segments imported for summarization. In addition to transcripts, other datastream inputs, including video/images and device readings (e.g., blood pressure, or log data containing information such as user location) may use logs and other contemporaneous information about the source data slices, or derived from it, such as predicates, to pair scores and extractions to associated video/images and device readings. Depending on the Narrative Template, these views may be displayed to the user when a section of the display is activated by mouse-overs or other activation techniques known in the art. The foregoing displays may be rendered as a graphical widget that unifies the display of multiple annotated data views, including context-tagged transcripts, videos, scores and so forth.

Beyond inspecting their story's state, users may edit or add to Story Model Inputs in the example embodiment—again, subject to the Narrative Templates, if specified by the Narrative Segment The displays generated from processed Story Model Inputs may be interactive, and commented on by the user via Story Model Inputs using interactive tools. In the example embodiment, interactive tools may include an audio tool to capture the user's comments and associate these with a section of text, or a graph, or other output (e.g., image extracted from a video) that may be highlighted by the user for comment. The user comments, or user annotations, may be received by the example embodiment as new context-tagged datastream inputs and processed as new Story Model Inputs. In the example embodiment, a user may share comments with other users (based on permissions), and establish a comment thread, tagged to what is displayed and how. To further aid users in assessing their own story and progress, summaries of topics may be generated by abstractive summarizers, which in turn may be commented by users. In the example embodiment, Story Logs, which may include user action histories, may be used to evaluate user action histories and audit changes in the user's story, including ones the user contributes to through the user's context-tagged interactions with the Story Model (e.g., through communications, comments, input into displays). Story Logs may furnish user-specific training data to agent models, as evidence of actions taken before or after a recommendation, to improve Story Model evaluations.

In the example embodiment, Story Model Inputs such as predicates, scores and metadata (e.g., logs from user interactions with other users) may feed into a value construction process, referred to as a user's Current Story Generation (also referred to as Attribute Construction). During Current Story Generation these inputs may be evaluated and produce (via validated method where appropriate) numerical representations of a user's current story, derived from evidence gathered, i.e. Story Model Inputs. In the example embodiment, user attributes may derive from any Story Model Inputs for which a category of values may be characterized and established. In the example embodiment, attributes may include personal attributes, such as evaluations, aptitudes, and scores, and also social attributes, such as a user's many roles and relationships, which may be expressed as graphs. Attributes may retain their context tags through evaluations, allowing them to be viewed in multiple contexts, thereby assisting in evaluations of, for example, improvements in a user's remote care versus improvement in in-person therapy. In such an example, improvements may be measured in part by quality of life or anxiety scores. In the example embodiment, other examples of attributes may include, but may not be limited to, evaluations of traits, which topics dominate in which contexts, which user roles are of highest value to user, which conflicts with user goals are surfacing, how many of a user's contract requirements are outstanding, and so on. These may be inspectable as values since they may map to source predicates. As a result, a user may learn, for example, which contracts most impact which roles.

The number of attributes constructed during Current Story Generation may be constrained only by the richness of the evidence, the dataviews of that evidence (e.g., context tags), and the requirements of the empirical model used to calculate the attribute value, referred to as Current Story Snapshot Generation. In the example embodiment, Current Story Snapshot Generation may take the probability constituent of the predicates, normalized across user populations, and perform attribute-specific calculations to derive an accurate numerical picture of the user state, which may be input into the user's custom-trained Actualizer. Construction in the example embodiment may take place continuously, based on streaming Story Model Inputs. A user's Current Story Snapshot, which is the output of Current Story Snapshot Generation, may be the last step of the user's Current Story Generation process. The user's Current Story Snapshot may be a collection of validated metrics describing both user characteristics and social/relationship characteristics between the user and their network. In the example embodiment, a snapshot of all attributes after construction may also be referred to as an attribute profile, or simply, the user's Current Story.

A series of Current Story snapshots may provide a longitudinal view of the user's story, expressed as the numerical values of attributes over time. These values may be traceable to the primary data from which the predicates used to construct the attribute values are extracted, as well as to the SVOs that are converted into predicates as Story Model Inputs. The values produced by the Story Snapshot Generation may also be transformed into predicates themselves, and in turn converted into SVOs. Predicates from Story Model Inputs that may feed into attribute construction, plus the construction value expressed as predicates after construction, may create a temporal connection between the two sets of predicates and related SVOs. SVOs may characterize user actions, and may be transformed into natural language. As a result of the foregoing, a list of actions associated with user attributes may be expressed in natural language, by context, by chronology or by any other filter used to create a dataview supported by the example embodiment. In the example embodiment, these Natural Language Processing (NLP) conversions may feed into a template, or alternatively, an abstractive summarizer (e.g., a transformer, such as GPT-3), to generate a new natural language narrative summary for a chosen dataview of actions. The user's Current Story thus may facilitate a real-time construction of a user-specific narrative summary, based on evidence and a particular dataview.

Returning to the main flow in the example embodiment, once attribute values are constructed, and generated as output as a snapshot of User's Current Story, they may feed into another value construction process, Envisioned Story Generation. Envisioned Story Generation may include setting goals from user input, from a specialist override (e.g., doctor) and/or from goal candidates discovered through a goal discovery process, which also may be referred to as Goal Hypothesis Generation. Envisioned Story Generation may generate as its last step a snapshot of the values generated. This output may be referred to as the Envisioned Story Snapshot, or simply, Envisioned Story.

During Envisioned Story Generation, a goal discovery (Goal Hypothesis Generation model) process based on evidence of user behavior (e.g., expressed as attribute values) may analyze attribute profiles and Story Logs, which may capture attribute profiles over time, look for statistical norms for a cluster of similar users, identify deficiencies, and then generate candidate goals. In the example embodiment, the envisioned story construction process may then compute the urgency of stated goals by users and imputed goals from goal discovery (Goal Hypothesis Generation). The output of Envisioned Story Generation may be a value, for example, between 0-1, for each attribute. In the example embodiment, this value may represent an increase or decrease in the attribute value generated during attribute construction. The degree to which the computational analysis of derived goals from goals discovery and the stated goals extracted from user utterances or received through interactive displays are aligned may inform an NL response. The NL response may take into consideration the conversational context in which utterances may be uttered as well as the active communication strategy for any concurrently running BNAS's. User inputs may be processed through Story Model Inputs and used to update the attribute profile and in turn the Envisioned Story. Thus, users may determine through their interaction with their User's Story Model, and specifically, conversational and display interfaces linking to the Envisioned Story model, their own goals. Once the user confirms goals, if confirmation is required by the logic of the context, Envisioned Story Generation may produce a matrix containing all of a user's goals, expressed as values, for inputs into the Actualizer. This may be represented as a snapshot, or matrix, of values. In the example embodiment, goals for users may be expressed in the system as target values for user attribute values.

Once the Envisioned Story Generation has created a snapshot of the user goals, the Actualizer may take in as inputs a sequence of Current Story Snapshots and Envisioned Story Snapshot. In the example embodiment, the Actualizer may be tasked with achieving the user's Envisioned Story. A series of sequenced snapshots from the Envisioned story may provide the Actualizer a dimensional and longitudinal set of data for its evaluations and optimizations. Likewise, the series of sequenced snapshots received by the Actualizer of the user's current story may provide a dimensional and longitudinal set of data for its evaluations and optimizations. In the example embodiment, the Actualizer may use these inputs to generate a sequence of actions learned from training that may have the highest probability of achieving the user's desired goal state.

In an embodiment, the training of the Actualizer may be customized to the user through a process involving multiple models (e.g., deep learning models). In the example embodiment, these multiple models may include, at a minimum, three user level models. These may include, but may not be limited to, the Actualizer's decision model (e.g., a policy, in deep learning reinforcement learning), the user's agent model that simulates the impact of user choices (e.g., an adversarial or cost-function model used to train the Actualizer), and the user's behavior model to predict the likelihood a user will do a given thing. Trained on these models, the Actualizer may use optimization strategies to perform the main task of recommending user choices, represented in the example embodiment as actions to be taken. The actions available as choices for the Actualizer to optimize may be expressed as Story Data Types, specifically Narrative Segments. In the example embodiment, Narrative Segments may have requirements, attributes, and goal parameters themselves. These may correspond to the attributes and goal Story Data Types in user attribute profiles and Envisioned Story Generation. Thus, Story Logic may be propagated through Story Model functions, connecting users, current user stories, targeted narratives and envisioned stories. In other words, in the example embodiment, the Actualizer may generate a sequence of Targeted Narrative Segments (actions) most likely to achieve users' unique goals. It therefore may represent how users may progress from current to envisioned story states.

For the Actualizer to generate effective sequences of actions for the user, it first may be trained. During training, the Actualizer may learn action sequences which may maximize impact on user goals conditional on the user's story (history of current user states, or snapshots). The Actualizer may train by evaluating simulated action sequences, relying on estimates of the impact of performing a certain action on the user state by some external source (e.g., Story Logs). Therefore, the strategy used by the Actualizer may have a dependency on an agent model at training time. The agent model may estimate the effect of specific recommended actions by the Actualizer on the user's story state. The agent model may take similar inputs—namely an attribute profile and goal set. However, it also may take a single 'use case,' or Narrative Segment, as an input as well as a communications strategy use case. The goal of the agent model may be to quantify the impact of performing a given action on the 'state' to assist in training the Actualizer and in simulating potential paths during use case resolution. This may manifest as a new attribute profile/goal set, which may represent the "expected state" of the user, in the current context, after the input action has been executed.

The Narrative Segment chosen by the Actualizer as representative of the best next action (Recall, a Narrative Segment chosen by the Actualizer may also be called a targeted Narrative Segment) for the user, may be surfaced by the User's Story Model as a recommendation by NL. Just as the Actualizer may choose the best next action, the Actualizer also may choose the optimal communications strategy to communicate that action. This choice may be from available strategy use cases indexed and stored, and available to the Actualizer for optimization. By optimizing both the next action and strategy for communicating it, the example embodiment may a mass evidence to determine optimal combinations of actions and communications about them, as well as to isolate impact of each. For example, a patient user with high scores for anxiety and user attributes characterizing a "warm" personality may be shown to "respond" best to "gentle" words nonetheless spoken with power via text-to-speech communications.

Note, interactions between Actualizers and between users and their Actualizers may be processed as Story Model Inputs, and used as evidence by the example embodiment.

When a use case is active, evidence (e.g., predicates from Story Model Inputs) may constantly be gathered in the context of the Narrative Segment. This evidence may be constantly evaluated to construct/update new attributes, which may reflect changes in the user's story state. When a targeted Narrative Segment (recommended action) is acted on by the user, the final attribute profile constructed from all evidence gathered during execution may reflect the impact of the user's actions on attributes during the action window, and is logged in Story Logs. The Story Log constitutes ongoing training data for both agent and behavior model, which in turn may update the Actualizer.

Once the recommendation is determined by the Actualizer, the NL generation system may consider both conversational context and Story Logs to produce a natural language communication that sounds natural and topically relevant. The user response may be processed to determine user acceptance of the Actualizer's recommendation and subsequent fidelity of the user to the recommended action. If a recommendation is rejected, the second recommendation in the rank order of recommendations produced by the Actualizer may be surfaced, provided the user response does not signal a departure from the context used to generate the recommendation. A method for determining drift in user actions from recommended actions may be triggered based on context-tagged responses that fall outside normative responses for the topics associated with the recommended action.

In the example embodiment, continuous user inputs (including responses to recommendations) may be continuously compared to recommendations made by the Actualizer. A method for detecting how well a user's behavior may track to the behavior (action) recommended by the Actualizer in a given context may be deployed by the example embodiment. This method may be referred to as use case resolution. The core use case resolution concept may be the notion of drift, which the example embodiment may detect by calculating vector similarity between topic-views of a use case recommended by the Actualizer and the topic-view generated by evaluating incoming predicates over some time window in the appropriate context. When drift is detected, the model may also perform Narrative Segment (use case) classification (e.g., via deep learning) on incoming predicate cluster/resulting attribute updates to generate alternative Narrative Segments (use cases) that the user may be drifting towards.

Not all drift may be a problem. However, in the example embodiment, the Story Model models may always calculate drift during any communication/collaboration context, and escalations may occur, or put another way, the models may do something about it, if the detected drift is both persistent (not transient over a longer period of time) and severe (the distance in topic space is large). When both conditions are met, the User's Story Model may dispatch a "drift event" to the Actualizers of all involved users. The Actualizers then attempt to determine the best way to resolve the drift via negotiation.

The Actualizers who receive a "drift event" may run a simulation (using the agent model to simulate attribute profile updates) to determine the impact of switching use cases on the user's envisioned story A negative impact, relative to the currently active action sequence, may constitute a cost, while a positive one a benefit. In the example embodiment, the User's Story Model may also conduct sentiment analysis on, and apply validated measures of reciprocity, emotional well-being, anxiety and other measures to, the inputs during each interaction (e.g., audio, text, video or combinations thereof), and similarly calculate emotional cost or benefit. If the net benefit of switching is greater than the cost, the Actualizer may silently switch to the new use case. If the opposite is true, the user may be informed via NL generated communications, and an attempt to realign their actions with the Actualizer's recommended Narrative Segment (use case) may begin.

In the example embodiment, drift may be evaluated by a deep learning topic model customized to the contextual requirements of the user's Story Model. To apply topic modeling to a context, a vector space representation of predicates may be constructed, in such a way that predicates "similar" to one another semantically may also be closer together in that vector space than predicates that are less similar. The predicates themselves may be unlikely to offer enough signal for an autoencoder to generate a compelling latent space representation alone, so the Story Model models may augment signals using the knowledge base and NL generation models, and, in such cases, the example embodiment may then generate an embedding space by embedding vectors consisting of generated summaries, SVOs, which may include predicate-derived data types and the predicates themselves.

For this embedding space to be useful in evaluating drift, a Topic Model must first be trained via a process that may be referred to as topic discovery. In topic discovery, predicate-derived vectors known to have an interpretable 'topic' may be embedded—for example, predicates related to different health care treatments. Once embedded, these points may define a region in topic space. By calculating the centroid of those embedded points, reference vectors may be obtained that may be used to represent a particular topic—which may be used to create topic decompositions for arbitrary embedded vectors. As a result, whenever predicates are extracted during a video call or other communications context, predicate vectors may be embedded, averaged, and used to obtain a representative vector for that period of communication. The basis in terms of which this vector is expressed may be changed to see how much of each of the known "topics" it contains, and distance in this space may be used as a measure of how close two predicate clusters, as well as to understand the structure of that similarity in terms of each vector's topic decomposition, may be, which may be crucial to detecting topic drift during use case resolution.

The foregoing described management of the user's progress towards goals, from recommendations through drift identification and course corrections, when necessary, may likely involve other users. Each user, who may be represented by a User Story Model, each of which may pursue above-described optimizations on behalf of its user, also may render optimizations for which resources may be best to perform a given recommendation. This may be accomplished in the example embodiment through a real-time exchange of information between User Story Models. In the example embodiment, User Story Models may negotiate and collaborate with each other. This feature may involve a number of methods, including for example a variant of the actor model, known to one of ordinary skill in the art. In the example embodiment, Actualizers may collaborate using a variant of the actor model. Every Actualizer may be equipped with a message box for handling incoming requests made of it by other Actualizers. These requests may modify the Actualizer state in myriad ways, and trigger a context-masked run of the full Actualizer strategy. Naturally the communication may be two-way, so if Actualizer A sends a request to Actualizer B, another request to Actualizer A may be part of the resulting flow. This back-and-forth communication between Actualizers in service of attaining some goal for the user they represent may be characterized as a negotiation. In the example embodiment, a negotiation may be one form of collaboration. The most direct method of collaboration may be described as task enqueuing. Take for example, a patient and doctor working together to execute a given treatment. The Actualizer for the patient may need inputs or tasks from the doctor to execute properly. It may send a message to the doctor's Actualizer asking, for example, for a prescription refill. The doctor's Actualizer may be able to immediately fulfill this task, or it may have to send a response to the patient's Actualizer requiring further action from the patient before proceeding.

Sometimes a message may not contain an action (use case) to execute, but may instead contain a state update or a goal set which the other user's Actualizer may need to solve. Perhaps a doctor's Actualizer needs a patient to reduce their resting heart rate by 10% before some treatment is deemed safe. In the example embodiment, rather than recommend a use case, the doctor's Actualizer may send a message to the patient's Actualizer with a goal update within their collaboration context. For example, a patient's Actualizer may then begin working on that goal, and notify the doctor's Actualizer when it has been achieved.

In the foregoing, a User Story Model has been described that represents available user actions in the form of Story Data Types encoded during Story Model Inputs according to Story Logic that may be propagated throughout each user's Story Model. The Story Data Types, when identified as inputs, may represent evidence of action and attributes of users used by an Actualizer custom-trained on the user's goals and observed or inferred user behaviors. The recommended actions of the Actualizer described above may also use evidence to optimize resources. Through a method of negotiation, or collaboration, between one user's User Story Model and other users' User Story Models, the example embodiment may advance each user optimally towards their goals, including by helping other users reach theirs. The Story Model Inputs may be inspectable (e.g., actual recordings, live produced transcripts, etc., occurring during Model Inputs), as may certain states of the user's representation in the User's Story Model, which may be determined through interactions with the user and between users. In sum, the example embodiment, a User's Story Model may learn from interactions with its user and its user may learn from interactions with their own Story Model which best next actions to take in a given context for them to advance towards the goals important to them, in that context as well as longer term. The process of using evidence gleaned from daily life to make and adjust recommendations, afford inspectable interactions, and facilitate collaborations between users through their respective Story Models may repeat continuously and occur in real time in the example embodiment.

In the example embodiment, instances of the above-described Story Model Collaboration System may include, but not be limited to a variety of collaborative activities in a variety of industries, which may facilitate better working relationships and better outcomes for participants, through use of evidence of behavior and of validated health and other scores and other models such as care models that may also be validated. One such instance of the example embodiment may be in healthcare, and involve remote care through video calls or video conferences, as described in various figures herein.

Figure 1:
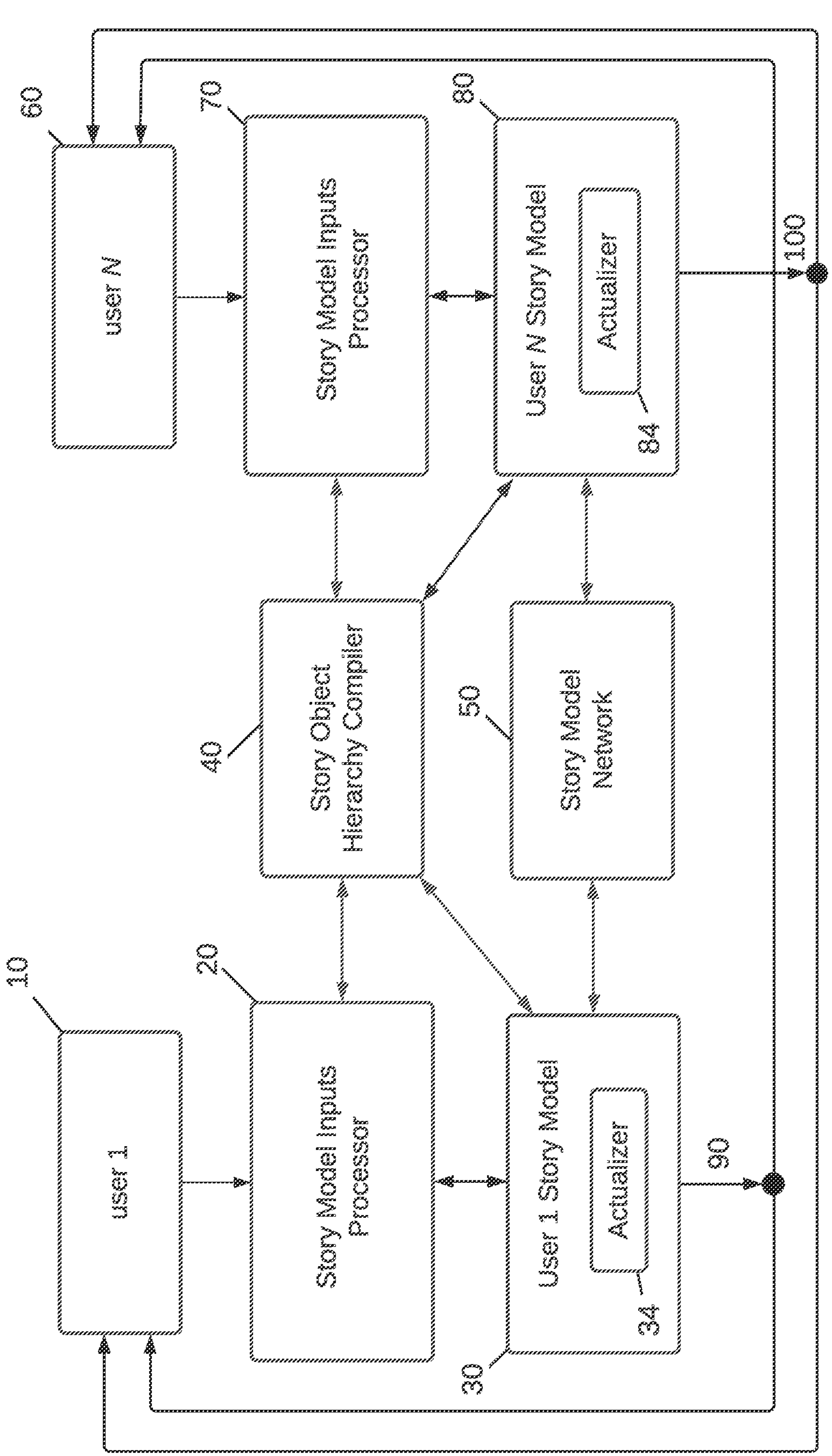
FIG. 1 is a block diagram illustrating the collaboration between users of the Automated Story Model Collaboration System in accordance with various embodiments.

Example Embodiments of the Disclosed Systems and Methods—Details of Specifications Referring now to the Figures included herewith, FIG. 1 is a block diagram illustrating the collaboration between users of the Automated Story Model Collaboration System in accordance with various embodiments. In particular, FIG. 1 illustrates a collaboration between N user Story Models through a Story Model Network. (Note, in the figure, the term "User N" is meant to convey that any number of users, or N users, may collaborate with each other using the Story Model Collaboration System.)

Referring to user 10 in the block diagram, a user may refer to a person and/or to a device that operates software which may be connected in various ways (e.g., cloud, APIs, other) and in virtually any context to the example embodiment. While many example uses provided herein involve people, it is understood that avatars, agents, software systems, and other products of software and in combinations thereof may be users. Outputs of of user 10 maybe streaming data of various types and in various combinations (e.g., text and images, such as emoji's), and feed into Story Model Inputs Processor 20.

In the example embodiment, Story Model Inputs Processor 20 may receive inputs from user 10 and processe these inputs first into a universal format used for the type of data the user input 10 is determined to be, which may include a video stream, and audio stream, device readings or text inputs. Then, operating within Story Model Inputs Processor block, the Story Model Inputs Processor 20 may pass the data, once formatted into a universal format by datatype, into an Insight Extraction Flow or Simple Data Conversion Flow, based on a determination of input data type. During Extraction Flow, data may be transformed into vectors which in turn flow into classifiers and extractors trained to extract from inputs certain higher-level descriptors of user activity, entities they are mentioning, actions they are performing, scores describing their state or the state of various story model objects. These scores, extracted entities and predicates may then feed into the Story Object Hierarchy Compiler 40. Meanwhile, Simple Data (e.g., metadata such as device readings, timestamps, log data, etc.), while not requiring extraction, may also pass into Story Object Hierarchy Compiler 40.

Inputs received by Story Object Hierarchy Compiler 40 from Story Model Inputs Processor 20 may be encoded by Story Object Hierarchy Compiler 40 into Story Model Objects, such as roles, contracts between roles—etc. These story model objects along with the raw scores generated by classifiers and extractors may then be passed to User 1 Story Model 30. The Story Model Inputs processor 20, together with the processing methods of transforming User 10 inputs and outputs (e.g., predicates) into universal datatypes used by user story models (e.g., User 1 Story Model 30) may be referred collectively throughout the disclosure as Story Model Inputs.

The User 1 Story Model 30 receives as input the outputs of the Story Model Inputs Processor 20, that is, a collection of scores and story objects (active roles, contracts, etc.)—these are then turned into strictly numerical representations during User's Current Story Generation, which may output a snapshot of the user's Current Story, a profile of user attributes expressed in terms that include values for Story Data Types, which may characterize a representation of the user at a particular moment in time. A copy of the Current Story Snapshot a tory Data Type) is generated that then feeds into Envisioned Story Generation, which outputs user's goals as an Envisioned Story Snapshot (a Story data Type), characterizing a set of target values for attributes. The Envisioned Story Snapshot is like the attribute profile, but reflects a different subset of story model inputs focused on proxying the state the user would like to reach—a User's goals. In User 1's Story Model 30, the stream of Story Model Inputs and the continued transformations into computable Story Data Types may be used in various ways by Actualizer 34 depending on User 1's current story state. The Story Model's "brain" may be characterized in the example embodiment as the Actualizer (e.g., a reinforcement learning policy), which chooses the next best action/executable Narrative Segment to attempt to reach User 1's goal state from User 1's current state. Once chosen, a narrative segment may begin executing—narrative segments are executable blocks of probabilistic code written in terms of story model objects, and as such, need updated data to instantiate those objects for execution. During execution, new streams of story model inputs are logged—creating Story Logs, or a Narrative History (a sequence of attribute profile snapshots) which the model can use to gauge the effectiveness of the executing narrative segment at moving the user towards their goals (impact). Once the Narrative Segment is finished executing, the actualizer will take the impact and a current/envisioned attribute state into account, and begin the process again at the first step in the process.

The Story Object Compiler 40 is a compiler which receives, as input from the Story Model Inputs Processor during its normal execution, a series of raw classifier outputs, extracted predicates and SVOs, and direct user inputs and then constructs from those appropriate hierarchies of story model abstractions (roles, contracts, etc.) which will then serve as inputs in the user Story Model (e.g., User 1 Story Model 30). In the example embodiment, the Story Object Compiler 40 may be involved in various stages of value construction in the user Story Model to create new interim representations of data as computable Story Data Types (e.g., Current Story Data Type, Envisioned Story Snapshot).

The output of the User 1 Story Model may include 90, which may include various ways for user 1 and user N to interact with each other or with their Story Models in the example embodiment. For example, at 90, a Narrative Template to guide a particular interaction may launch when the Narrative Segment chosen by the Actualizer requires the launch of the Narrative Template. In another example embodiment, at 90, the output may be a natural language output related to the Story Model's Actualizer's choice of how best to communicate the Best Next Action Step.

In the example embodiment, Actualizers may negotiate with each other for resources to take the Best Next Action Step recommended for their user through the Story Model Network 50.

Referring now in FIG. 1 to 60, 70, 80 and 100, these are mirrors of 10, 20, 30, and 90 respectively.

FIG. 2 illustrates a Story Model Overview, particularly a Story-driven data design, showing the relationships between Story Objects and Story Data Types. Recall, a Story Object may contain both an eponymous Story Data Type and code to construct it and perform functions associated with it. Story Data Types themselves may only be data in a data structure, not code, but which may still be relational. In the example embodiment, Story Objects may be encoded with Story Logic and instantiated using information from Story Model Inputs and the knowledge base (and in the case of some Story Data Types during Story Model functions e.g., Current Story Snapshot). The output of a Story Object may be a snapshot of the state of the Story Data Type based on constructions of it at that time. Story Objects may propagate Story Logic through Story Models and collaboration between users through their respective Story Models. In the example embodiment, instantiated Story Data Types may be used by each user's Story Model to facilitate contextually rich optimizations of action sequences to help each user reach their own goals.

Story Objects in the example embodiment may include, but may not be limited to, Identity Story Object, Role Story Object, Narrative Segment Story Object, Communications Strategy Use Case Story Object, Conflict Story Object, Deliverable Story Object, Contract Story Object, and Resolution Story Object (i.e., a Narrative Segment generated as a best next action recommendation, also referred to as a Targeted Narrative Segment and a best next action (BNAS)), each with their eponymous Story Data Types. The Story Data Types that may be contained within their respective Story Objects may include, but may not be limited to the Identity Story Data Type, Role Story Data Type, Narrative Segment Story Data Type, Communications Strategy Use Case Story Data Type, Conflict Story Data Type, Deliverable Story Data Type, Contract Story Data Type, and Resolution Story Data Type (i.e., a Narrative Segment generated as a best next action recommendation, also referred to as a Targeted Narrative Segment and a best next action (BNAS)). As described earlier, not all Story Data Types in the example embodiment may be contained within an eponymous Story Object. But, all Story Data Types may support Story Model functions. Story Data Types in the example embodiment may include, but may not be limited to, the Identity Story Data Type, Role, Narrative Segment Story Data Type, Communications Strategy Use Case Story Data Type, Current Story Snapshot Data Type, Envisioned Story Snapshot Story Data Type, Story Log Story Data Type, Conflict Story Data Type, Deliverable Story Data Type, Contract Story Data Type, Resolution Story Data Type (also referred to as "Best Next Action (BNAS)", "Recommendation", "Targeted Narrative Segment" and simply the Narrative Segment chosen by the Actualizer), and Narrative Template Story Data Type. In the example embodiment, Story Data Types may be represented numerically and may exist in relation to each other as both logical and narrative elements.

FIG. 2A illustrates the flow for compiling datastream inputs into a Story Object Hierarchy consisting of Story Data Types. A compiler, in computer science, refers to a process which translates one 'language' (generally a human readable programming language) into another language (executable machine code) via an intermediate representation which renders the input in terms of a set of hierarchically organized abstractions from which functionally equivalent machine instructions can be generated. The example embodiment performs a similar operation, where an input language (English, for example), or an input (e.g., audio or video e.g., via processes described in the descriptions) that may be transformed into language, may be transformed into a series of intermediate representations (e.g., predicate and SVO hierarchies), so that it may be rendered into another 'language'—the Story Object Hierarchy. This target language results from multiple intermediate representations. In contrast to other target languages, the target language in the example embodiment may be expressed in terms of narrative abstractions (e.g., Story Objects, such as, Identity, Roles, Narrative Segments, Conflicts, Contracts, Deliverables, etc.) organized according to an encapsulated, emergent Story Object Hierarchy which may implement Story Logic. In terms of this Story Object Hierarchy, the 'important structure' of any situation may be rendered in a unified way, enabling a host of genericized functionality across many different application domains as detailed in the example embodiment.

In the example embodiment, generation of narrative abstractions may start with transformation of extracted inputs into evaluable logical statements, called predicates. A probabilistic programming language that uses logic in its operations with the assistance of a knowledge base or entity component model may determine logical relationships between various processed predicates. However, the example embodiment may further encode predicates as new logical types as a method for implementing Story Logic. These new logical types may inherit the underlying logic of the primary extraction, and naturally, they may be tagged to it. Besides "chaining" the logic between "logical layers", the method may also facilitate logical operations on abstractions themselves. Probabilistic programming language that uses logic in its operations may use these various logical layers to encode abstractions during Story Model Inputs for storage in the knowledge base, while facilitating various Story Model functions, such as specialization, which may be performed at Story Logic (narrative abstraction) or only predicate logic levels.

During runtime, the emergent Story Object Hierarchy, expressed through instantiations of Story Objects, may produce information that may populate Narrative Templates, which as described may be inspectable, formatted outputs of the Story Model generated for user review and interaction.

Referring specifically to the flow illustrated in FIG. 2A, datastream inputs may be considered the source data for conversion into intermediate representations. The source data for a compiler is normally a first language (English, C+, etc.). In the case of the example embodiment, it may be that the "first language" may actually be tensors produced from language as well as non-language datastream inputs. These transformations of various input datastreams are described in detail in FIGS. 7-20, and may result in predicates, SVOs and scores (which may be viewable within a topic decomposition), as outputs of Story Model Inputs. These, in turn, may be transformed into Story Objects, through the Story Object Hierarchy, which also may be outputs of Story Model Inputs. And so, during Story Model Inputs, input data streams may be transformed into various universal data types used by the example embodiment, namely, predicates, SVOs, scores, and Story Data Types.

For example, let's say that the input data stream includes various snippets of a person talking: "Man, my father really gets on my nerves", "Gotta call my dad . . . ugh". In the example embodiment, these different expressions of the same thing may turn into a series of observations, such as "relationship_quality(user, dad, poor, 0.21), which, in conjunction with similar observations may characterize the natural language input in terms of story.

Next, as it relates to Story Data Types, they may be resolved against the knowledge base into story structures, for example, actions involving agents with roles that may be in conflict. To return to the illustration of the son, the prior expression derived during Story Model Inputs now in Story Model functions may become, for example: Role(father, son),quality=0.21, conflict: poor communication, with child nodes linking together the SVOs that contributed to that observation. Note, the abstraction may exclude specific object instances. In turn, during Story Model functions, this may produce attribute and goal representations of the input in terms of Story Data Types.

As a result, a unified, machine-readable representation of ongoing narratives may be compiled from incoming data streams. Rendering narrative abstractions into machine readable relationships with each other may serve various purposes. The Story Object Hierarchy may be used, for example, to de-identify personally identifiable information by excluding object instances, making the data usable by other systems with less risk of identification of exposing a person's Identity. It may also generate richer associations between narrative abstractions, contexts and multiple health classifier scores. For example, using what a person says, the example embodiment may use classifiers trained on validated health instruments, such as quality of life and anxiety, to render and analyze scores in topical areas (e.g., social, emotional, financial, and physical) pertaining to quality of life and anxiety health assessments, and map these to narrative abstractions, to generate rich, real-time, contextual insights. Recall, insights may refer to what may be considered meaningful to achieving goals of importance to an individual. (Note, in the example embodiment various methods may be used to quantify importance. See earlier descriptions, as well as FIG. 37 and FIG. 69 descriptions on "importance" and how it may be derived by the example embodiment or stated by users and evaluated).

Unlike systems that may only derive an "insight" from certain biometrics, the example embodiment may generate insights from scores, extractions and narrative insights to produce a more contextually relevant picture of the user, on the one hand, and to make a recommendation based on this fuller context, on the other hand. For example, a user's Story Model may "know" from classifiers that the user may have a certain level of anxiety and from extractors that the user may be "going on job interviews." Furthermore, from new Story Model Inputs, the user's Story Model may contextualize the extraction, "going on job interviews," along with other extractions, such as "not affording rent", "caring for mom", and so forth, all of which may be used to establish a more meaningful personal context for understanding the conflicts that may correlate to the user's scores (e.g., anxiety, quality of life). What's more, a best next action recommended by the user's Actualizer may factor in these extractions and scores, including conflicts associated with them, as constructed attribute and goal values. Recall, the output of the Actualizer may be a Narrative Segment, a type of Story Data Type which in conjunction with the other Story Data Types, may implement Story Logic as an emergent structure—reflective of the Story Object Hierarchy In other words, if lowering an anxiety score is the goal, the Actualizer may recommend the best action to take next towards lowering anxiety—using narrative abstractions masked to the user's personal context. Outputs of Actualizers in the example embodiment may be generated to advance a user's story, not simply to produce an insight that the user may not know how to act on.

The "insights" generated by the example embodiment may be shared with people and with machines through Narrative Templates, as described below. So, in a broad sense, the machine-readable narrative abstractions may facilitate better communications of insights not only with people about live situations, but also with each other using narrative elements emulative of how people communicate. Further, the example embodiment may facilitate how each user may act on these insights by determining through the Actualizer the best next action for the user based on them.

FIG. 2B is a flow diagram showing an overview of how the Story Object Hierarchy described in 2A may propagate through Story Model functions to render an NL output for the user. The figure begins with processing input data into intermediate representations and the establishment of a Story Object Hierarchy which then may feed outputs into NL generation architecture. As illustrated, the "compiled" abstractions may also feed into the Actualizer and Story Logs, which may be updated by outputs of the Actualizer. Then, both Actualizer outputs, which may be Narrative Segments and Communication Strategy use cases, as well as the updated Story Logs, may feed into the NL generation architecture. Meanwhile, information in Narrative Templates associated with other Story Data Types, such as Narrative Segments, may also feed into the NL generation architecture and shape its output. Thus, the foregoing shows the persistence of Story Data Types instantiated by the compiler for use by Story Model functions. This persistence may result in NL outputs based on narrative abstractions, but also demonstrate how all data stream inputs may be converted into them (e.g., audio, sensor data, text, images, etc.). Consequently, the NL output of the NL generation architecture may be expressed in terms of narrative abstractions emulative of how people may communicate, which tends to be in various narrative forms. These various narrative forms, which may be determined by Narrative Templates, may include various combinations of communications modalities (text, video, audio, etc.). For example, depending on the Narrative Template, an output may be a mobile text response with embedded videos slices from a datastore on a topic with contextual relevance for the user.

Figure 3:
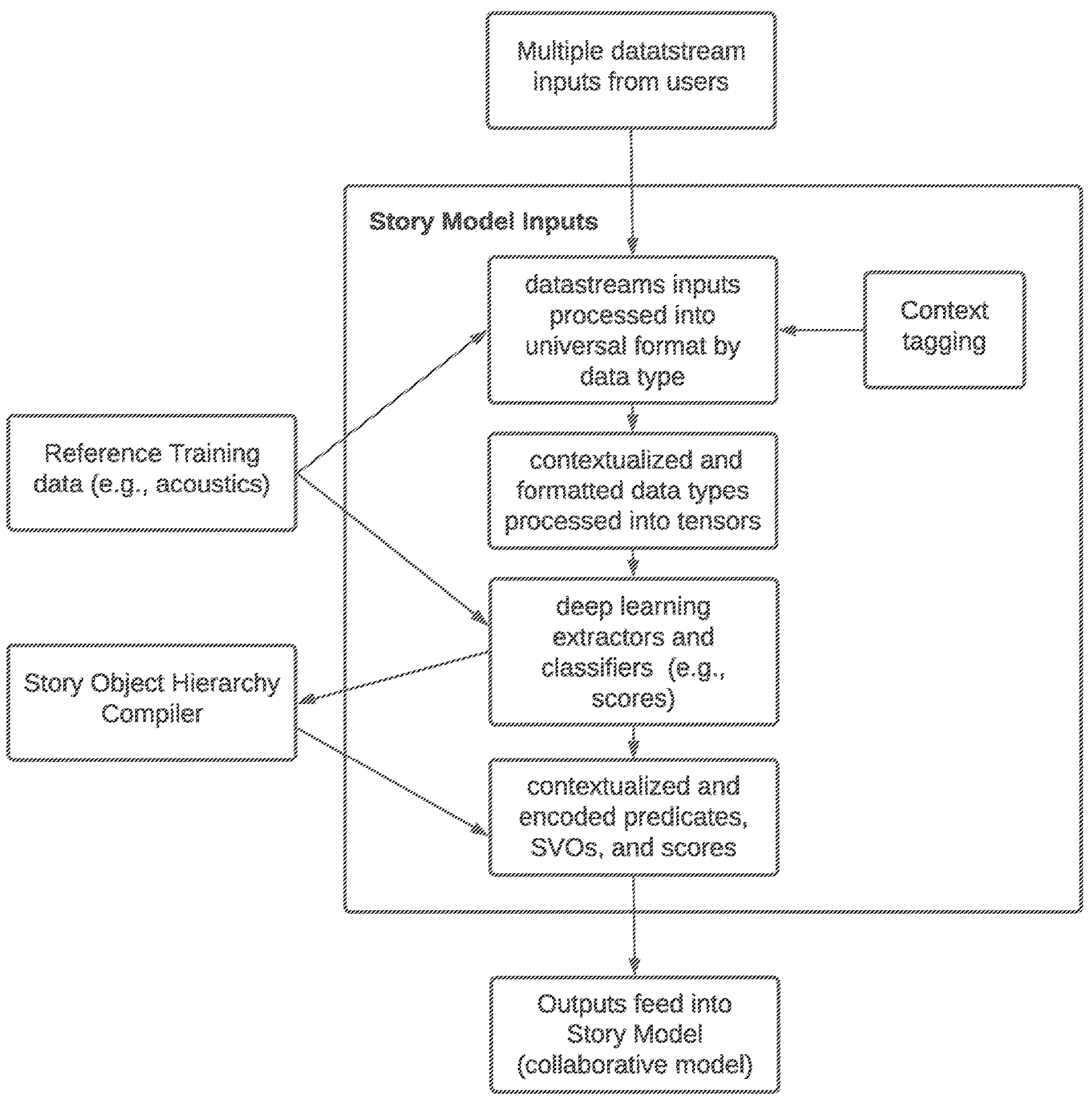
FIG. 3 illustrates a flow between Story Model Inputs to produce context-tagged outputs usable by the user's Story Model.

FIG. 3 illustrates a flow between Story Model Inputs to produce context-tagged outputs usable by the user's Story Model. Data types output from various devices may be formatted by the example embodiment into a universal format for that data type. For example, MRIs may require different data type formats than brain imaging or certain lab test results. Specifically, FIG. 3 illustrates stepwise moves from multiple datastream inputs into a universal format by data type. Next, in FIG. 3, the data formatted by data type may be processed into tensors for use by trained classifiers and extractors to produce scores and extractions, from which predicates may then be created and SVOs resolved.

Figure 4:
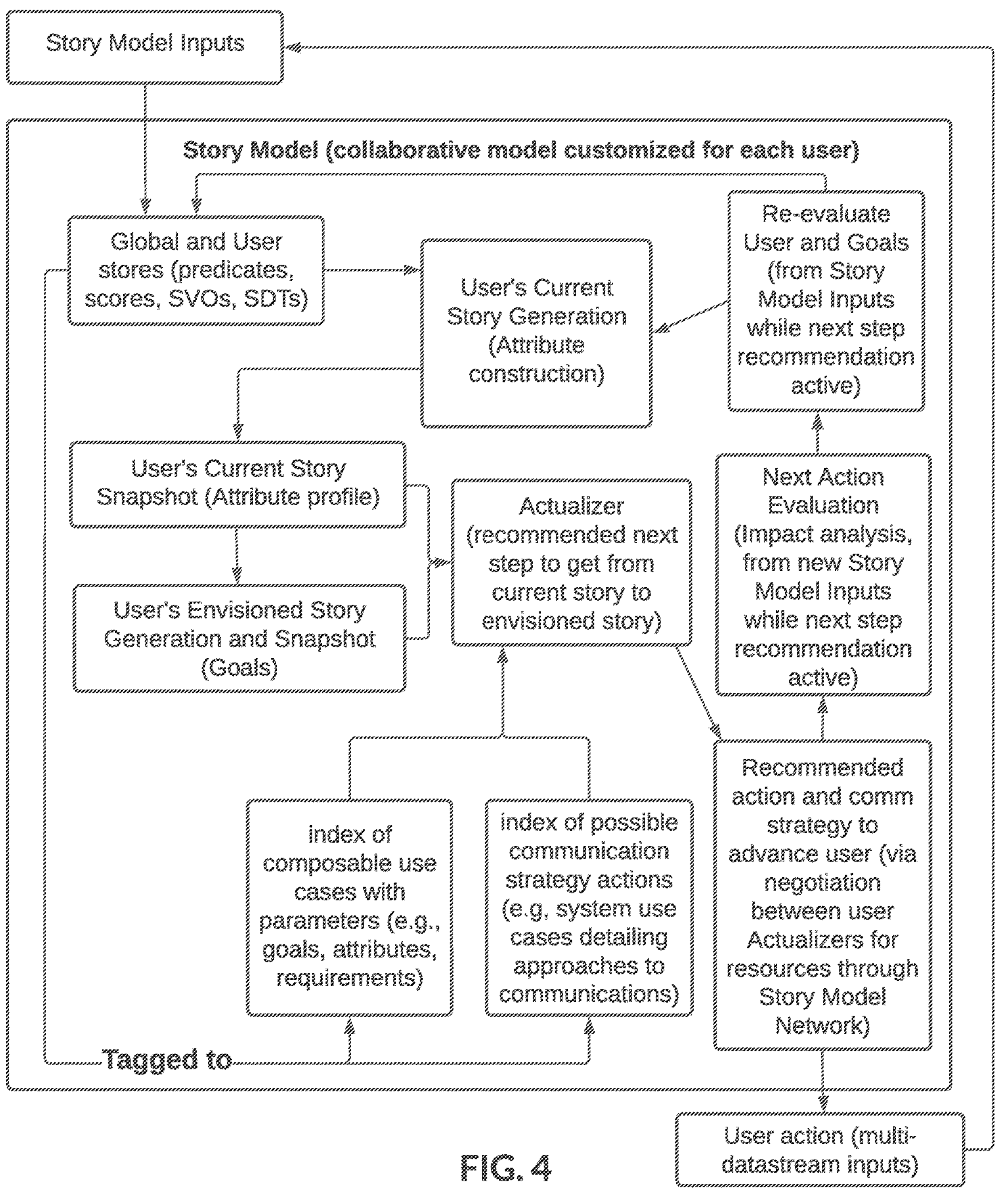
FIG. 4 provides a Story Model Overview, particularly showing the flow from user action inputs, or Story Model Inputs, and data involving Story Data Types derived from these inputs into Story Model processes.

FIG. 4 provides a Story Model Overview, particularly showing the flow from user action inputs, or Story Model Inputs, and data involving Story Data Types derived from these inputs into Story Model processes. In the flow depicted in FIG. 4, inputs from Story Model Inputs may flow from global and user predicate stores used to construct user attributes, to an envisioned story, where goals may be constructed from user attributes. Goals and attributes then both may flow into the user's Actualizer, as may an index of Narrative Segments, or actions/use cases, available to the Actualizer to optimize a best next action. Additionally, an index of use cases developed for various communications strategies may be available to the Actualizer to optimize how to communicate the best next action. In FIG. 4, the results from the user's Actualizer may be communicated with all Actualizers meeting certain requirements, as will be explained below. To continue, a negotiation may ensue between Actualizers meeting requirements, and the outcome, or next best action, communicated in Natural Language (NL) to the user of each user's Actualizer, if that user may be requested/invited/assigned to take an action. Next, the action of the user agreed or assigned to perform the action (Note, a user response, as Story Model Input, may be characterized as evidence of a user "action") may be processed as new Story Model Inputs, which also may be used to evaluate the impact on progress towards user goals. Also, as will be explained, the evaluation resulting from impact analysis may produce evidence from Story Model Inputs to formulate new attribute values, which in turn may be used to perpetuate the input/output process between users and the example embodiment.

Figure 4A:
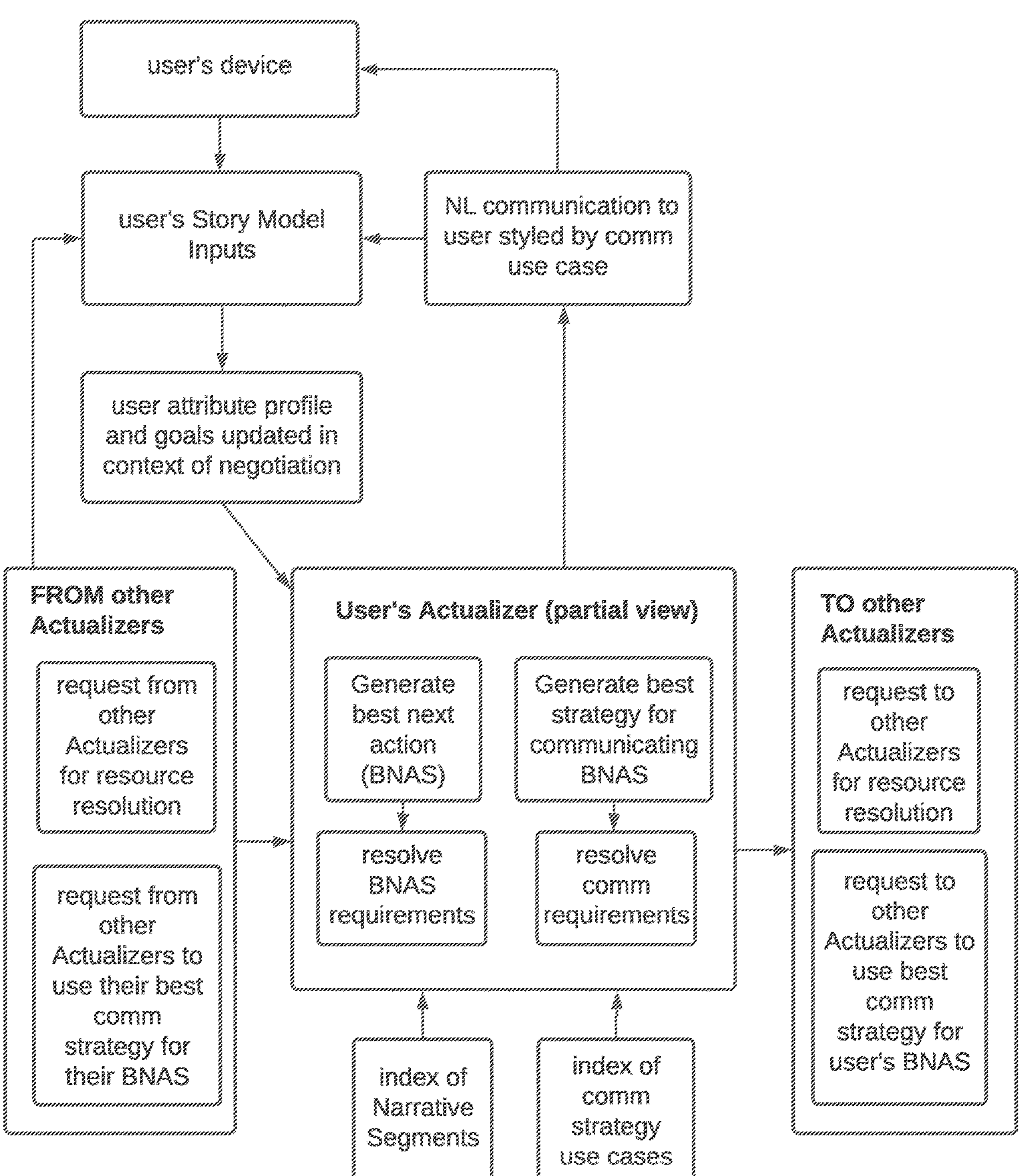
FIG. 4A is a flow diagram showing how users may interact with their Actualizers, and how their Actualizers may interact with the Actualizers of other users in a Story Model Network.

FIG. 4A is a flow diagram showing how users may interact with their Actualizers, and how their Actualizers may interact with the Actualizers of other users in a Story Model Network. See flow and descriptions in figure. See also FIGS. 63-66.

These interactions between users and their Actualizers and between each user's Actualizer and other users' Actualizers in the example embodiment may resolve resource requirements for best next action recommendations as well as strategy requirements for the best way to communicate the recommendation.

In the example embodiment, each Actualizer may have a message box, which it may use to send/receive messages to/from other Actualizers. Messages between Actualizers may be processed as Story Model Inputs, and like other Story Model Inputs, context-tagged. For example, a message may be a negotiation and the relationship between users of the negotiating Actualizers may be characterized as Story Data Types (e.g., roles and role-sets such as father-son, patient-nurse, friend-friend, etc.). Further, each Actualizer may determine if the request it receives from other Actualizers advances its own user's goals.

As elsewhere described, Actualizers of users may interact with each other on behalf of their users to advance their users towards their Envisioned Story. When the Actualizer returns a best next action, the Actualizer may also return a use case specifying the style and structure of communications (e.g., NL) for how to communicate the best next action. In effect, the Actualizer may specify which actions, along with which requirements and goal parameters, the example embodiment may follow to execute the communications.

These use cases may be referred to as communication strategy use cases. These communications strategy use cases may have a Communication Method ID referenced in the user's Story Log (See FIG. 35). These communications strategy use cases may be identical in structure to Narrative Segments, but may be purposed for use by the example embodiment as instructions for the system itself on how to model the NL communications. In other words, there may be a separate communications use case for each BNAS for each user at a given time.

In the example embodiment, a communication strategy use case may include a variety of actions that embody specific strategies of communication. The embodied communications strategies may include, but may not be limited to, tone and manner (e.g., "gentle and sensitive", with actions such as NL conditioned in soft language before generating NL); meter, pace and frequency of communications; reciprocity requirements (e.g., boost reciprocity, which may mean "mimicking" another speaker's "speaking style", for instance), modality of communications (e.g., text vs email); delivery agent or channel (e.g., a communications may be more apt to be listened to when it comes from one person rather from another); word choices for context appropriateness (e.g., words in some contexts may be used to convey urgency, in others calmness); length of communications; and so forth. A communications strategy case may be generated as a recommendation by the Actualizer, and evaluated during impact analysis as a separate but related factor to isolate whether it is the recommendation or how it is communicated that correlates more highly to movement towards an Envisioned Story.

In addition to tools that may facilitate a user's inspection of and comment on various Story Model functions (e.g., Impact analysis), users may interact with their Story Model and their Story Model may interact with their users through any modality of communications supported by the example embodiment. Interactions between users and their Story Model may be processed as Story Model Inputs.

In the example embodiment, the chosen modality of communication by the user's Story Model to the user may be optimized by the Story Model. While each Story Model may communicate with their own user through NL, output may not be limited to speech or text output. For example, a user's Story Model may text a "thumbs up" image in response to a user's spoken question. Recall that the user's Story Model learns which strategy may be effective for communicating with the user via analysis of user actions after the Actualizer makes a recommendation.

Additionally, unlike other systems, the example embodiment may observe the impact of its own behaviors, evaluate that impact on a user's progress towards goals, and adapt to produce new behaviors based on what it learns from modeling incoming facts is optimal for attaining user goals.

As an illustrative example, the example embodiment may use a measure described as reciprocity to score the similarity between what it may communicate and what a user may communicate (See FIG. 111 on reciprocity, a method that may be used to compare any two sets of inputs). The example embodiment may set its own reciprocity targets and optimize its own communications use case selections and specializations to achieve the right level of emulation with a user. In this manner, the example embodiment may optimize its own behaviors from evaluated, synchronous or asynchronous sets of observed behaviors between user and system behaviors. And, unlike typical engagement technologies, the example embodiment may not have to predetermine either a scripted action or a scripted response (i.e., its own behavior). Rather, the example embodiment may recommend real-time action to each user that is predicted to move each user towards their goals. The action recommendations of the example embodiment may be the result of optimizations predicated on observed behaviors, actions customized to the user, measured outcomes and personally relevant narrative contexts.

Further, to facilitate interactions between users and their Story Models, a user may name their User Story Model (e.g., "Elsa", "Frank", etc.), which may be trained on their user's voice, among other attributes, and which may act on behalf of the user. In this sense, a user may collaborate with their own Story Model to accomplish their goals. In acting on behalf of their users, a user's Story Model may play various roles itself. In one case, a user's Story Model may act as a virtual assistant, in another a virtual coach, in another a virtual nurse, and in such role as may pertain to other virtual "experts" or combinations thereof, each according to roles and requirements. By whatever name, a user's Story Model may process Story Model Inputs to generate and communicate recommendations for the user, based on evidence of "what works" in guiding the user towards their envisioned story.

For example, if "Chad" is known by the example embodiment to be more apt to "listen to" his daughter on matters of personal health, the system may determine, if Chad's BNAS relates to Chad's fitness, that the communications strategy use case may be an action for Chad's daughter to talk with Chad about Chad's BNAS. Here, "talk" may refer to whatever may be the optimal modality for communications with Chad, such as a phone call. Meanwhile, if the negotiation between Chad's Actualizer and his daughter's Actualizer is successful, then his daughter's Actualizer may determine the communications strategy use case most appropriate for its communication with Chad's daughter about Chad's BNAS. To continue with the illustration, Chad's daughter's Actualizer may call Chad's daughter to tell her to call Chad about Chad's BNAS. In turn, Chad's daughter may call Chad, and the conversation between Chad and his daughter may be processed as Story Model Inputs, and thus continue the recommendations loop.

A name provided by a user to the user's Story Model to represent the user's Story Model may be treated as an entity by the example embodiment tagged to the user's Identity. Likewise, the roles that the user's Story Model plays during interactions with the user or on behalf of the user with the Actualizers of other users may be tagged to roles. This may facilitate an analysis of which roles played by the user's Story Model may be most associated with the user's progress. For example, in some cases, the virtual role may be as a receptionist while in others a coach or nurse or a financial planner, or . . . etc. In part, the Impact Analysis performed by the example embodiment after a recommendation may facilitate the determination of which roles the user relies on the Story Model to perform.

To continue with personification of the Story Model as a user itself, the name given by the user to their Story Model may be associated with its own identification number. This identification number may be used by various systems to identify the Story Model, while protecting the Identity of the user who may be tagged to it. For example, if the user names their Story Model "Elsa", then when the user receives a text message from their Story Model the text message may be associated with the name "Elsa," context tagged, and so forth, and appear as "Elsa".

Note, unlike chatbots, Story Model communications may not need to prescribe actual language communication, but rather use Story Logs and the actual conversational context to generate new NL responses.

Figure 5:
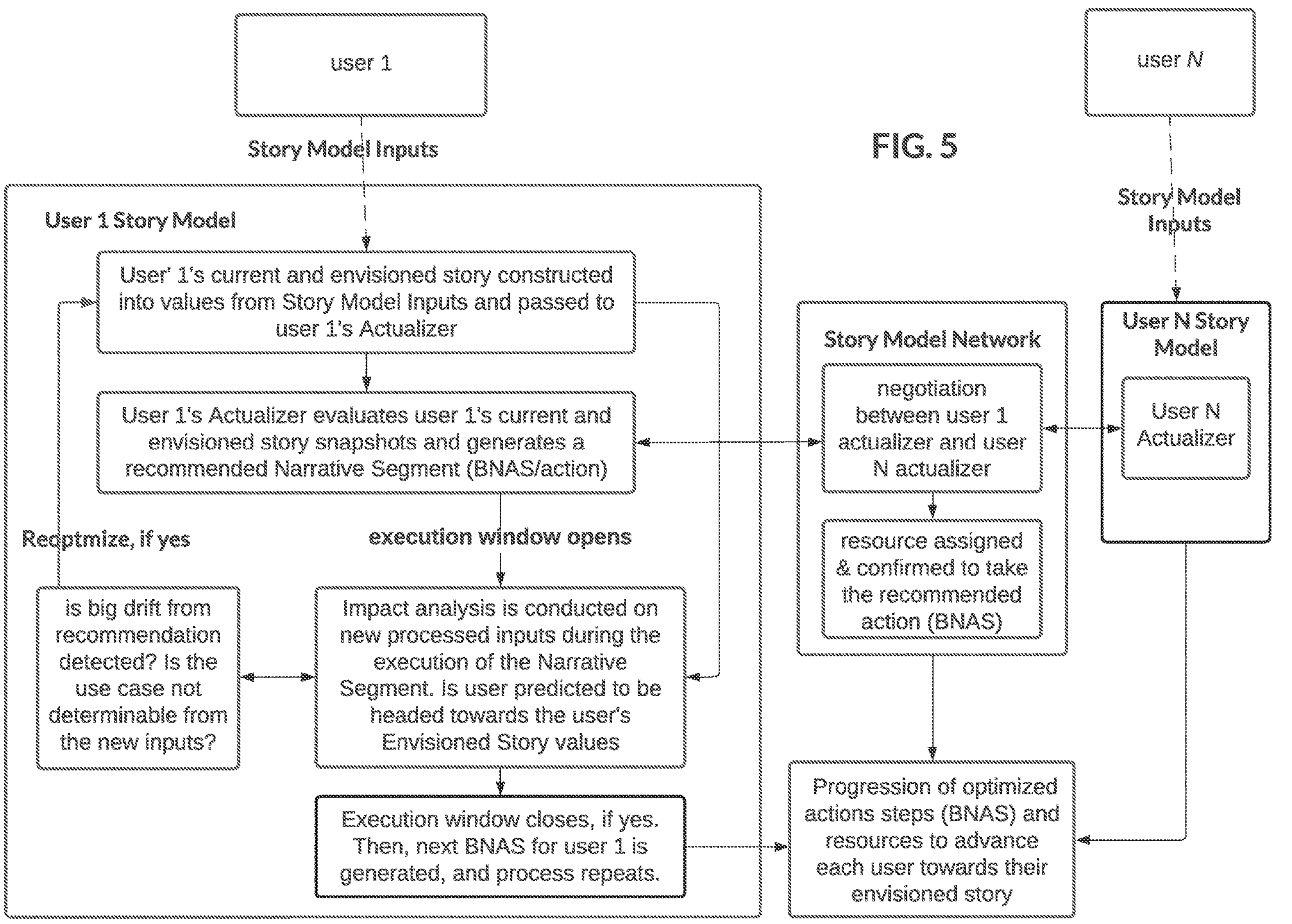
FIG. 5 illustrates a Story Model Overview, particularly showing how user Story Model functions of each user's Story Model may use a Story Model Network to support Collaborative Story Model Instances (e.g., collaborations, or negotiations, between the Story Models of different users).
Figure 6:
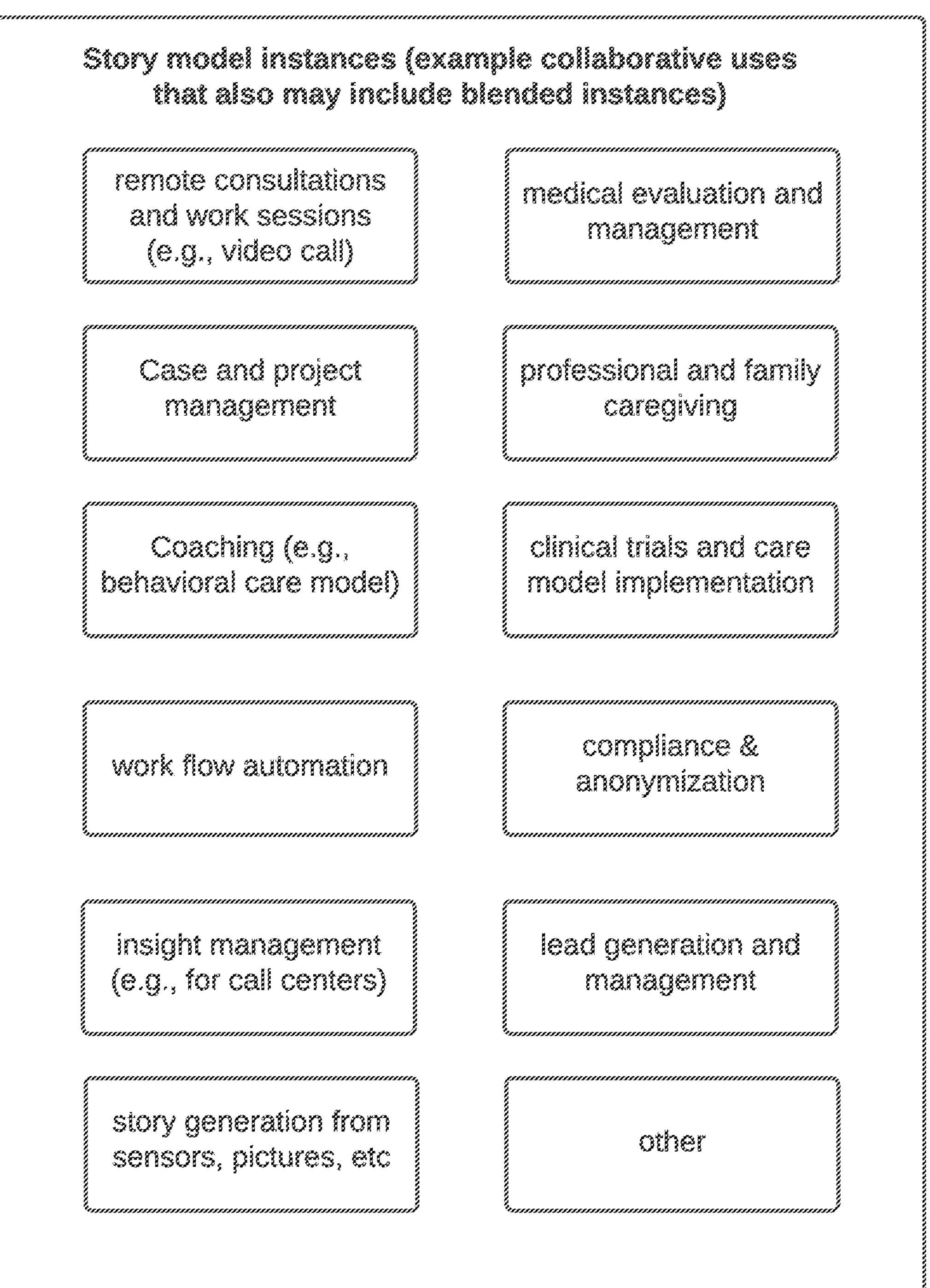
FIG. 6 illustrates a Story Model Overview, particularly example collaborative Story Model instances (example uses), which may represent only a small fraction of the potential uses of the example embodiment in the everyday lives of consumers and businesses.

FIG. 5 illustrates a Story Model Overview, particularly showing how user Story Model functions of each user's Story Model may use a Story Model Network to support Collaborative Story Model Instances (e.g., collaborations, or negotiations, between the Story Models of different users). See flow and descriptions in figure. The figure illustrates the continuous learning functions of each user's Story Model, including from interactions with other user Story Models though a Story Model Network. The learning of each user's Story Model may include, as illustrated, when a user may be determined by the example embodiment to be drifting from a recommended action or when a use case may not be determined from Story Model Inputs. It should be noted that the user's Actualizer, while not a behavioral model, may be trained by one (See FIG. 37) to attempt to empirically determine whether or not users are doing actions as well as by other models to improve the likelihood that an action recommended by a user's actualizer (See FIGS. 73-77) may be an action that a user may also be more likely to take. The use of evaluable narrative abstractions in a user's actualizer's consideration of a recommended best next action for a user may propagate across the Story Model Network to establish a progression of recommendations and actions for each user that may characterize at any moment that user's current story and progress towards the user's envisioned story FIG. 6 illustrates a Story Model Overview, particularly example collaborative Story Model uses, which may represent only a small fraction of the potential uses of the example embodiment in the everyday lives of consumers and businesses. In particular, remote consultations and work sessions, represented in FIG. 6, are described in detail in FIGS. 78 through 101. Note, instances of the example embodiment described in the collection of figures associated with potential uses of the example embodiment may also be descriptions of the example embodiment. Thus, even if described in just one instance (e.g., CPT code audit trail in FIG. 101), the description may be of the example embodiment. The example embodiment may support instances named in FIG. 6 and instances not named in FIG. 6, but which may use the example embodiment, including various instances of it. For example, indications of interest described in FIG. 105 as a method of negotiation in support of a lead generation instance also may be used by the example embodiment in instances which may not be lead generation instances. For example, in certain situations, when determining the best available resource for the best next action.

Figure 7:
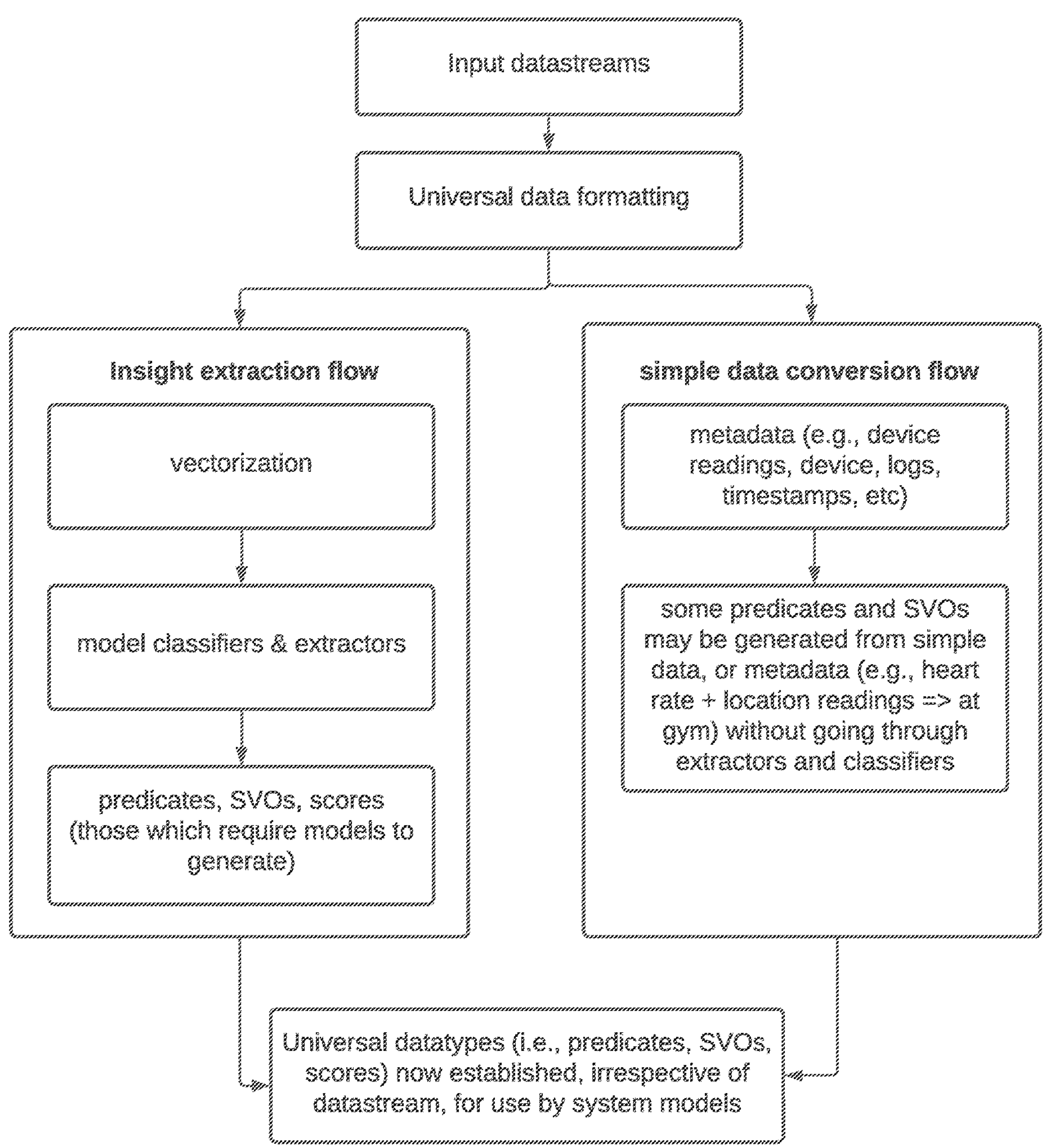
FIG. 7 illustrates a flow of Story Model Inputs particularly for standardizing data types for use by system models from input datastreams.

FIG. 7 illustrates a flow of Story Model Inputs particularly for standardizing data types for use by system models from input datastreams. In the example embodiment, Story Model Inputs may refer collectively to various methods of receiving and processing incoming datastreams, and then transforming these into universal data types used by the Story Model. These universal data types may be predicates, scores and SVOs, including those that may be encoded as Story Data Types. The Story Model Inputs may be processed and transformed in stages with key flows described as first receiving datastreams from users, followed by formatting data universally by data type, then transforming the formatted data by data type through either Insight extraction flow or simple data conversion flow into universal data types. For insight extraction flow, the first step may be vectorization, followed by extraction and classification, then transformation into universal data type. For simple data conversion, the conversion may be directly into universal data types.

For a more detailed overview of the flow, let's start with the incoming datastreams. These may be multiple datastreams of multiple data types (e.g., audio, video, text, device readings) from multiple devices (e.g., laptop, phone, computer, camera, cloud—other systems) connected to the Story Model Collaboration System. These multiple devices may be used by multiple users, each of whom may be connected to the example embodiment through their devices. Multiple datastreams from these multiple users may involve multiple modalities of interaction (e.g., call, conference, email, device readings, web). During processing, these incoming datastreams may be processed into a universal format by data type (e.g., audio, image, text), and tagged to source devices (e.g., camera, phone, etc.), modalities of communication (call, email, videoconference, chat), and user, thus establishing contextual tags for all data universally formatted by data type. Datastream inputs universally formatted by data types may be featurized by data type and then transformed either through insight extraction flow or simple data conversion flow into tensors. In the example embodiment, tensors transformed from formatted data may be merged regardless of data type into a single tensor for input into the system's multi-factor machine learning models. Tensors processed from input datastreams may be used by health assessment classifiers trained on validated heath instruments to score inputs, and by extractors trained on composable or discoverable Narrative Segments (i.e., use cases) encoded in a knowledge base to extract evidence of user actions from inputs.

Figure 8:
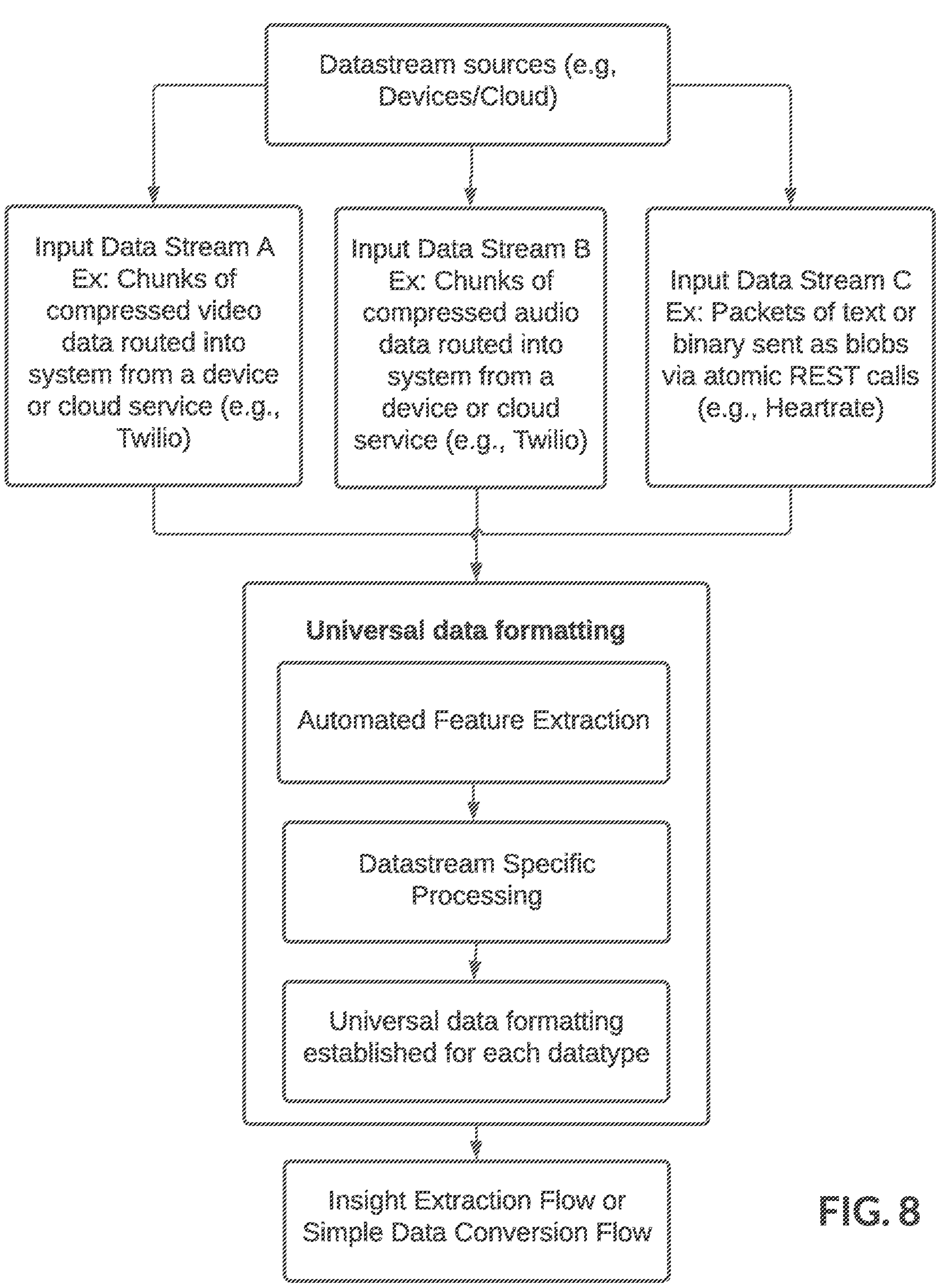
FIG. 8 is a flow diagram for Story Model Inputs relating specifically to creating a universal format for each type of received datastreams.

FIG. 8 is a flow diagram for Story Model Inputs relating specifically to creating a universal format for each type of received datastreams. In the example embodiment, all data of a particular supported data type (e.g., video, audio, text, binary) may have some number of standard transformations applied to it. In automated Feature Extraction, every stream may be received as data packets coming through a code structure for handling a data stream (e.g., GenServer's erlang process). No matter what type of input data comes through, it may be processed here. The data then may pass into Datastream Specific Processing, where a stream may be translated from the received provider format (e.g., Fitbit, wearable) into a universal representation of that type of data in the system. For example, audio data coming from different sources may be processed into one format to standardize its format to that expected by the audio pipeline.

Figure 9:
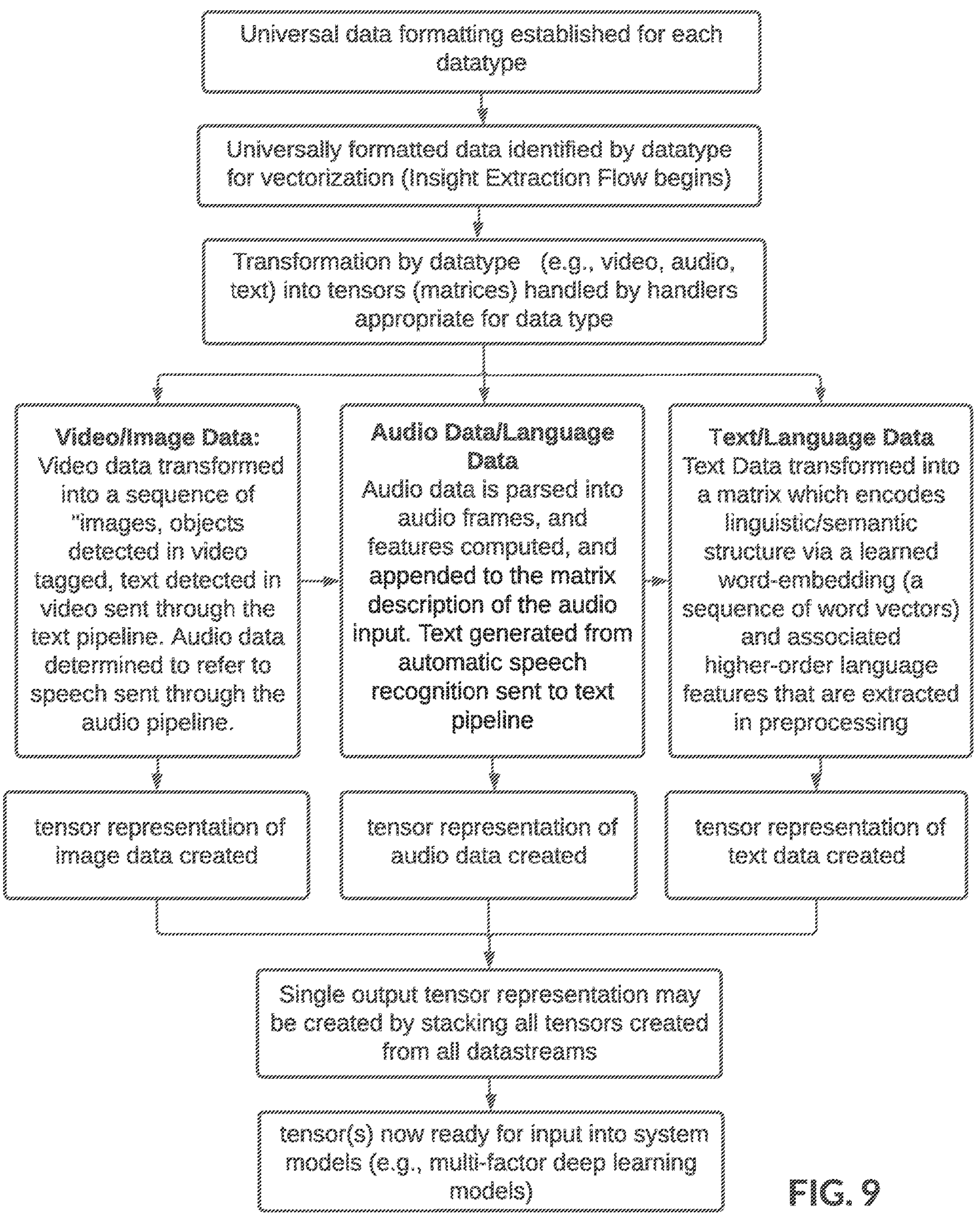
FIG. 9 illustrates the transformation flow of Story Model Inputs from formatted data by data type to vectorization.

FIG. 9 illustrates the transformation flow of Story Model Inputs from formatted data by data type to vectorization. Vectorizing the universally formatted input data may turn it into tensors, a term known in the art to describe vectors or matrices used by deep learning models in the example embodiment. In the example embodiment, transformation by data type (e.g., video, audio, text) into tensors (matrices) may be handled by handlers appropriate for the data type. For example, in the case of Video/Image Data, Video data may be transformed into a sequence of "images" represented by RGBA (red-green-blue-alpha) pixel values at every pixel on that particular frame. Additionally, other computer vision derived methods like optical character recognition (OCR) and object detection known to one of ordinary skill in the art may be applied to the images that comprise the video to identify the presence of objects, including text which may be embedded in an image. Text, once extracted by OCR methods, may be sent through the text pipeline. Meanwhile, a tensor representation of image data may be created.

In the example embodiment, audio data, which may be determined to refer to speech, may be sent through the audio pipeline and featurized using two processing streams. One stream may be for acoustics, the other for speech-to text routines, such as automatic speech recognition (ASR). Text generated from ASR may be sent to the text pipeline. Meanwhile, all non-speech audio data, which may include sounds later identifiable by the example embodiment as objects (e.g., car horn, cat's meow, etc.), may be processed acoustically.

For all audio data sent to the Audio Data/Language Data, Audio data may be parsed by the example embodiment into audio frames, and features computed, and appended to a matrix description of the audio input. Audio frames may be used to characterize the wave-form amplitude at a specific input frequency, along with extracted metadata about the audio. Audio features, such as volume, range, power, peak-to-average power ratio, pitch characteristics including centroid, crest, flatness, kurtosis, roll-off, skewness, slope and spread, among others, may be calculated and appended to the matrix characterization of the audio input. A tensor representation of audio features may then be created.

Text generated by ASR, OCR, users (e.g., chat, emails, comments, etc.), the system itself (e.g., a NL communications resulting in a textual representation), or received by the example embodiment from other sources (e.g., physician notes in an electronic medical record), may be sent to the text processing pipeline.

In the example embodiment, Text/Language Data may typically be linguistic and may be the result of actual written or spoken interactions with a User's Story Model or through devices, user's interactions with other users' Story Models. This data may be transformed into a matrix which encodes linguistic/semantic structure via a learned word-embedding (a sequence of word vectors) and associated higher-order language features that are extracted in preprocessing, such as n-grams, encoder-decoder intermediate representations of the text optimized to a specific task, or syntax graphs. A tensor representation of text data may be created by the example embodiment. Tensors produced during vectorization by data type may be used by system models using that data type.

In the example embodiment, illustrative of an economic use of tensors, a single matrix representation may be formed by stacking the matrix representations generated by each data-stream processing pipeline. This may create a single input into multiple machine learning models, which may now be interpretable by the system's various multi-factor deep-learning models. Tensor(s) may now be ready for input into system models (e.g., multi-factor deep learning models)

Figure 10:
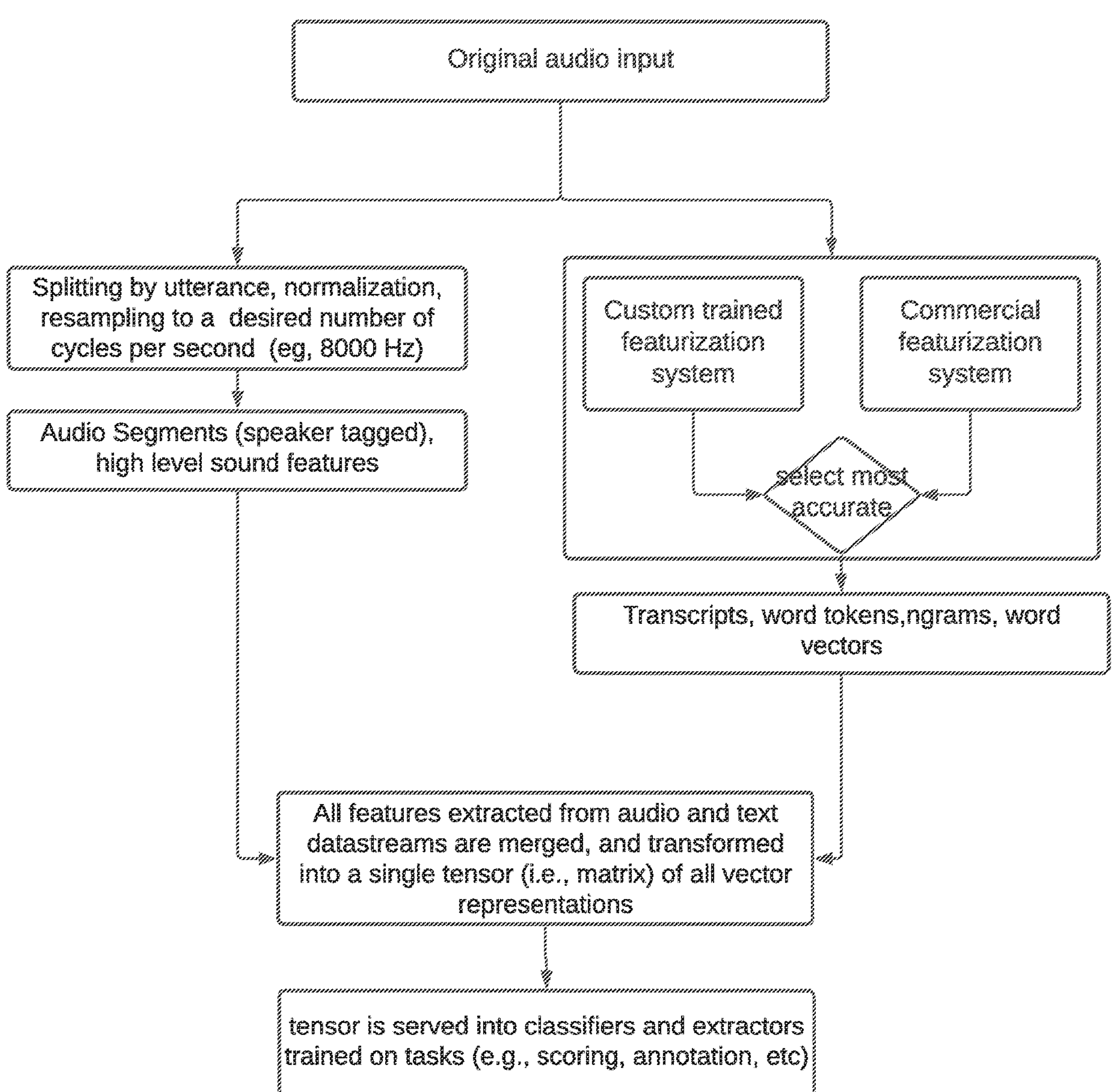
FIG. 10 illustrates Story Model Inputs—Insight extraction flow—custom ASR featurization and vectorization, particularly, audio featurized into two streams of different data types and merged into one tensor.

FIG. 10 illustrates Story Model Inputs—Insight extraction flow—custom ASR featurization and vectorization, particularly, audio featurized into two streams of different data types and merged into one tensor. This may include different streams for acoustics and speech-to text routines. The custom speech to text system may be trained on voices similar to voices in a reference data set, and the text produced by the ASR may be augmented by transfer learning. All streams may be featurized and transformed into a single output tensor used by the example embodiment. The training data for the custom-trained ASR may be reference data, including audio data, involving validated research, for instance, research conducted during a clinical trial, which may use statistical power to validate findings. Thus, the processing systems in the example embodiment of inputs for use by extractors and classifiers may themselves be trained on prior validated data.

Figure 11:
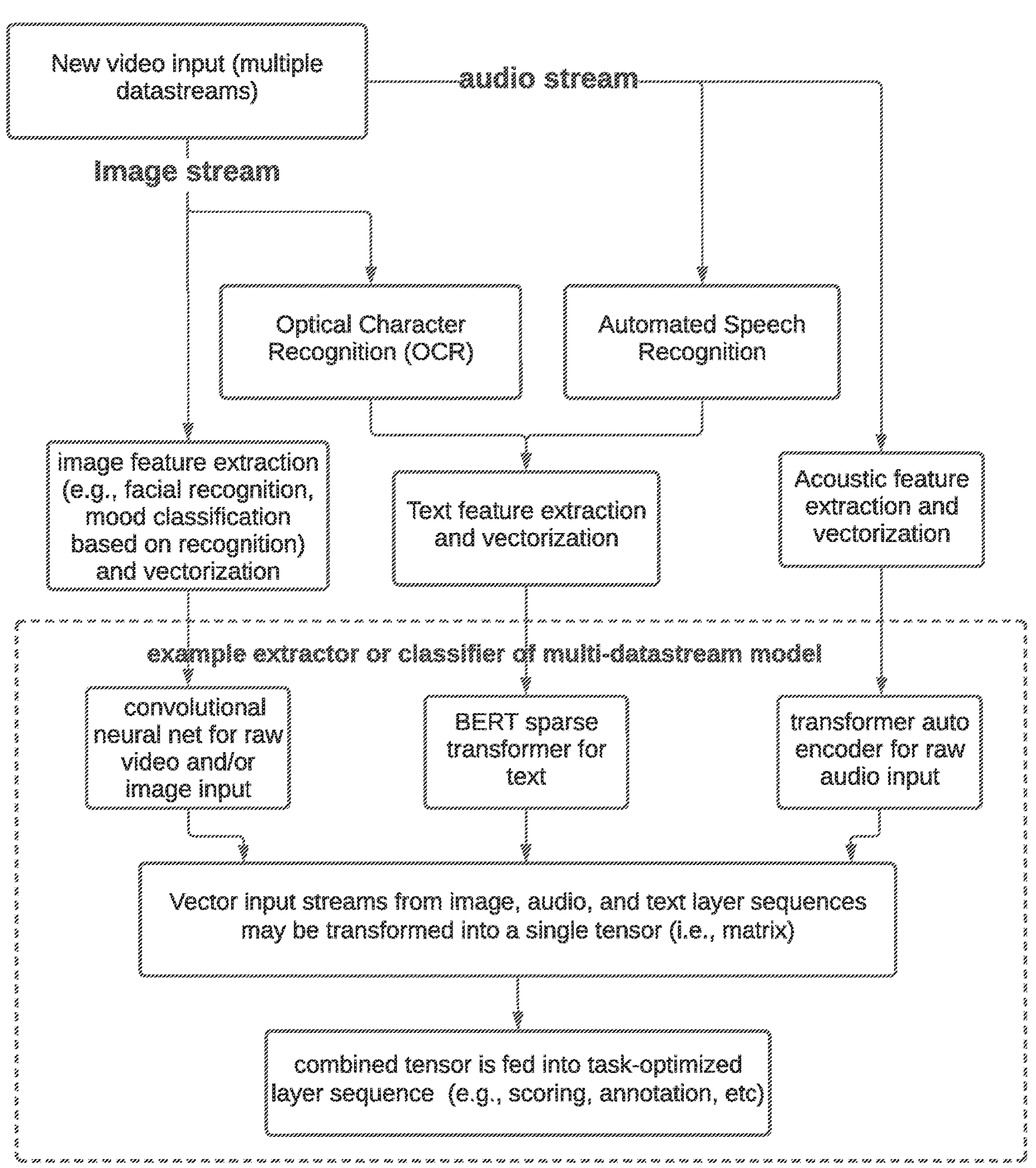
FIG. 11 illustrates Story Model Inputs—Insight extraction flow—vectorization, particularly deep learning video datastreams, featurized by data type and transformed into tensors, including at the end of processing, potentially, a single tensor for use by classifiers and extractors.

FIG. 11 illustrates Story Model Inputs—Insight extraction flow—vectorization, particularly deep learning video datastreams, featurized by data type and transformed into tensors, including at the end of processing, potentially, a single tensor for use by classifiers and extractors. FIG. 11 illustrates a featurization flow from video input into extractions from datastreams by data type, and vectorizations into tensors used by classifiers and extractors as layers in their evaluations/analysis.

Figure 12:
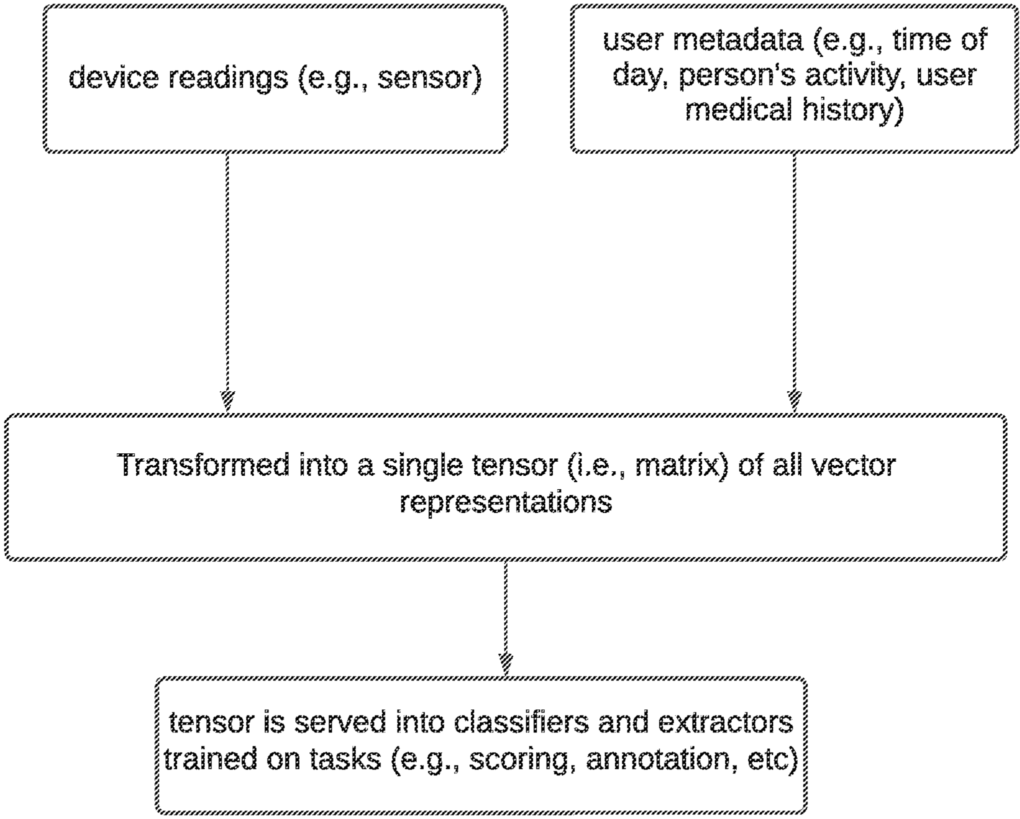
FIG. 12 illustrates Story Model Inputs—Insight extraction flow—vectorization, particularly simple data transformation into a tensor.

FIG. 12 illustrates Story Model Inputs—Insight extraction flow—vectorization, particularly simple data transformation into a tensor. In the example embodiment, data received from wearables, or from other devices or systems, may be characterized as simple data, such as readings (e.g., oxygenation levels, expressed as a percentage). This simple data, as will be explained, may be converted into predicates or otherwise used for evaluation during a method used by the example embodiment referred to as attribute construction, which may establish a numerical and validated basis for a user's current story.

Figure 13:
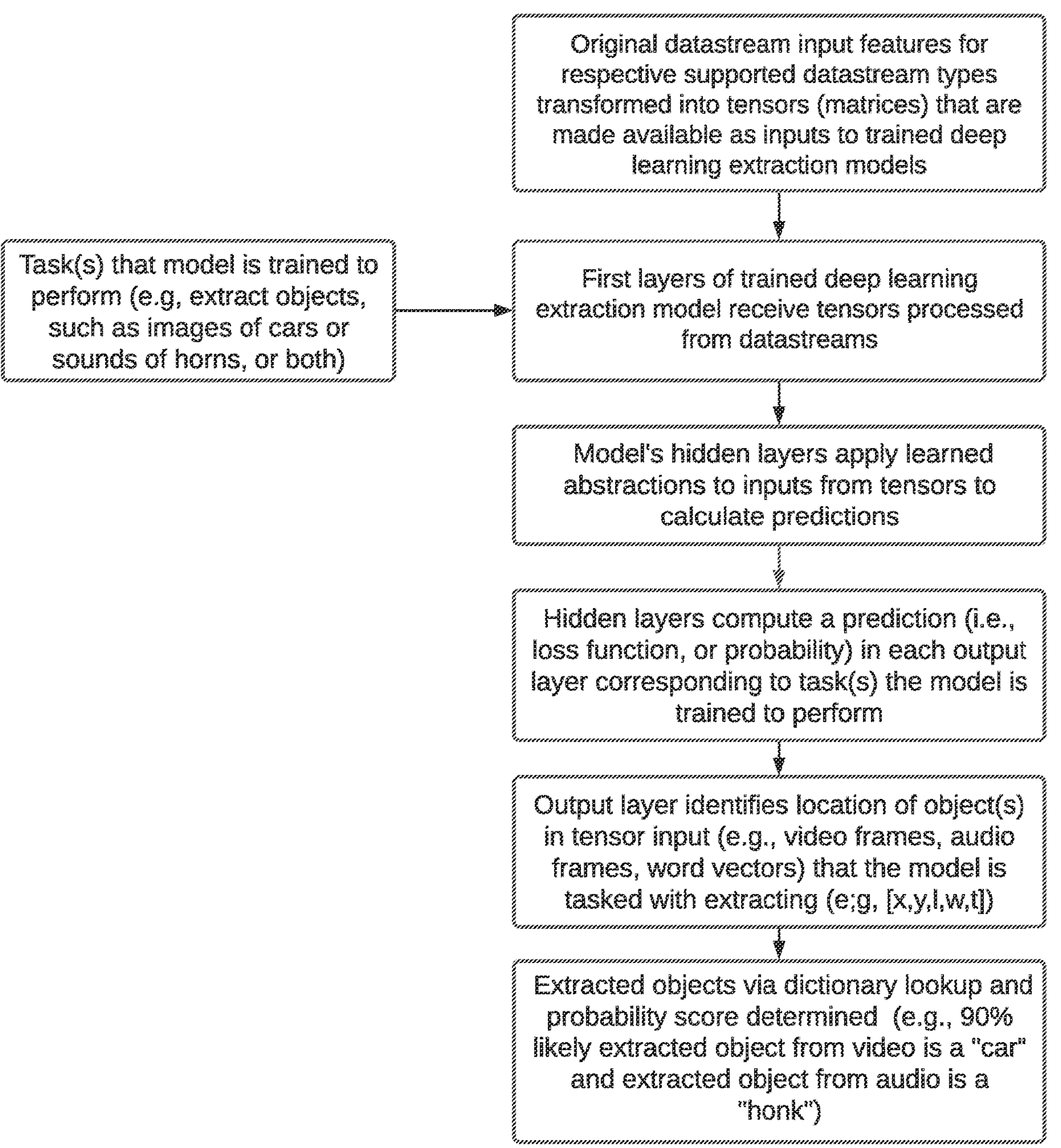
FIG. 13 illustrates Story Model Inputs—Insight extraction flow—extractors, particularly how deep learning extractors may work on multiple featurized datastreams in the example embodiment.

FIG. 13 illustrates Story Model Inputs—Insight extraction flow—extractors, particularly how deep learning extractors may work on multiple featurized datastreams in the example embodiment. The matrices, or tensors, transformed from universally formatted datastreams may be received by the first layers of the trained deep learning neural net. The number of first layers to receive the matrices initially may depend on how many datastreams are involved, e.g., one layer for video, another for audio or text. (Text input may be featurized as a sequence of word vectors, which otherwise may be handled as all other objects by the deep learning extractor process.) Or, they may depend on how many tasks are to be performed by the deep learning. For instance, one task may be to determine if a certain illness may be predicted from the input, another an age, or a score, and so on. Every layer may transform the input tensor into another tensor. In other words, the output of one layer may go into the next layers (child layers). Every layer may feed the next layer. It may keep doing this until it resolves it into the targeted or final output layer, which may be the model's prediction. Every prediction may be performed as a task, and there may be an output layer for every task.

Figure 14:
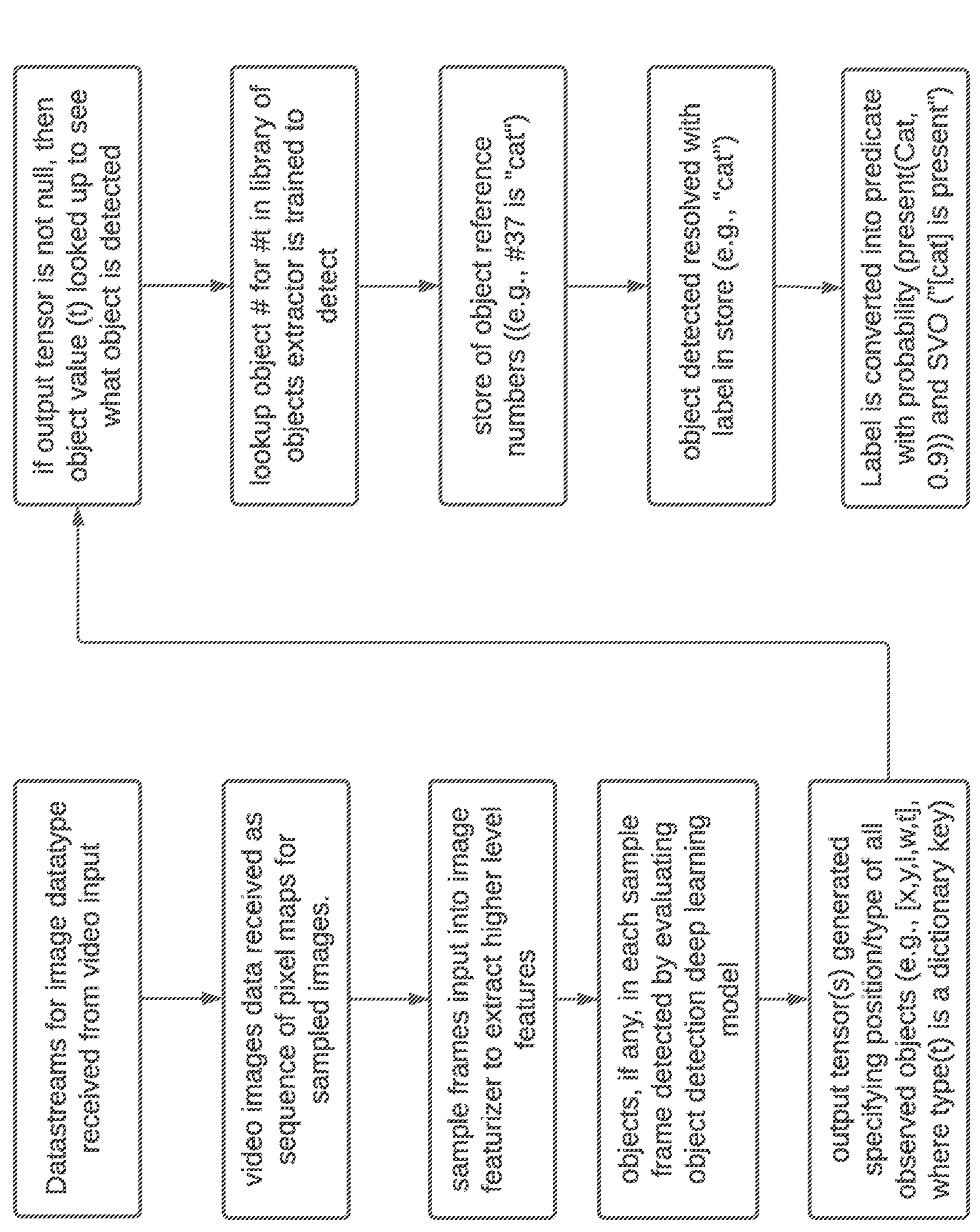
FIG. 14 illustrates Story Model Inputs—Insight extraction flow—extractors, particularly video—object detection (image of a cat).

FIG. 14 illustrates Story Model Inputs—Insight extraction flow—extractors, particularly video—object detection (a real cat). This process follows the process described in FIG. 13, but applied to objects.

Figure 15:
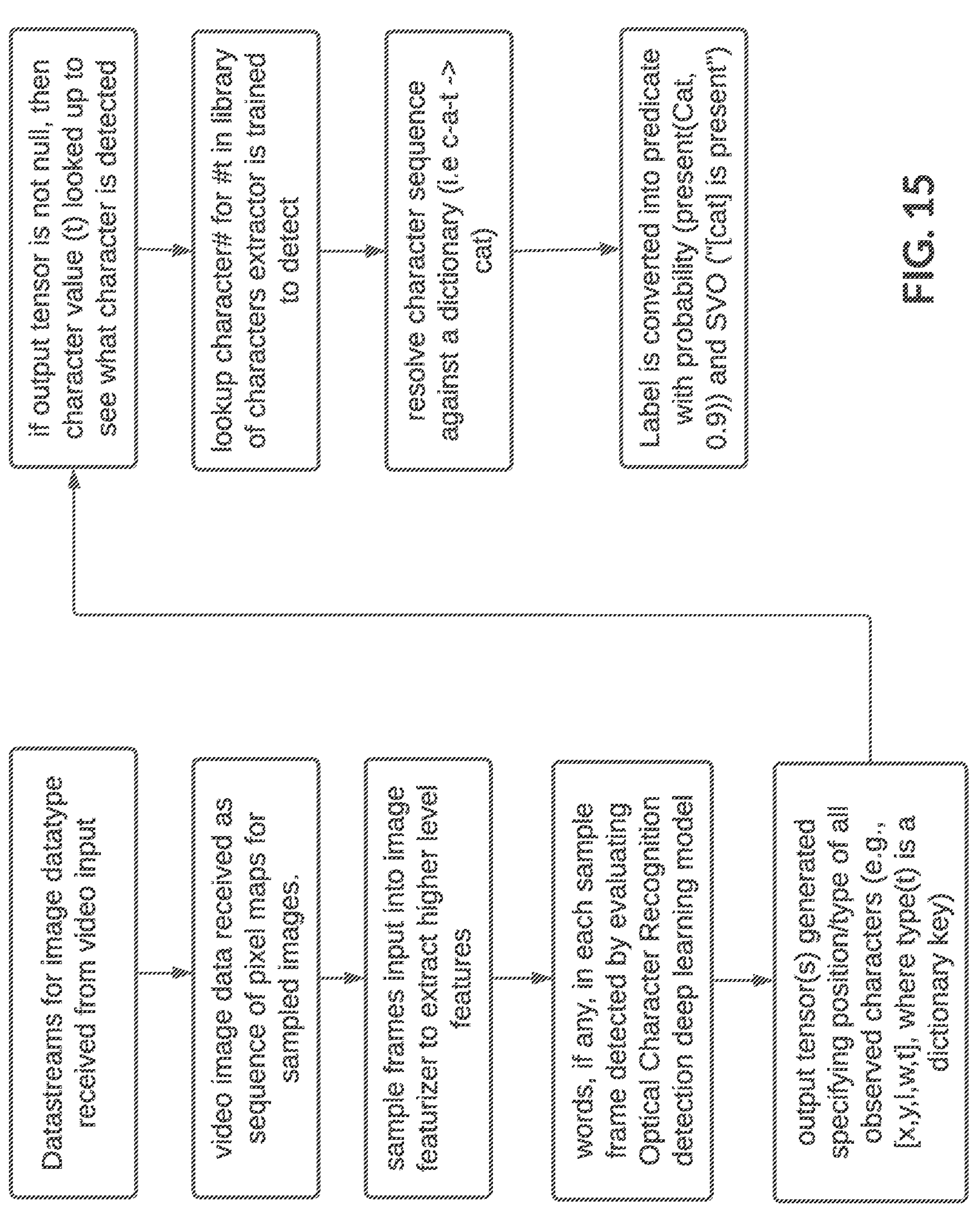
FIG. 15 illustrates Story Model Inputs—Insight extraction flow—extractors, particularly video—OCR (e.g., the word, "cat").

FIG. 15 illustrates Story Model Inputs—Insight extraction flow—extractors, particularly video—OCR. This process follows the process described in FIG. 13, but applied to text detected in a video or image.

Figure 16:
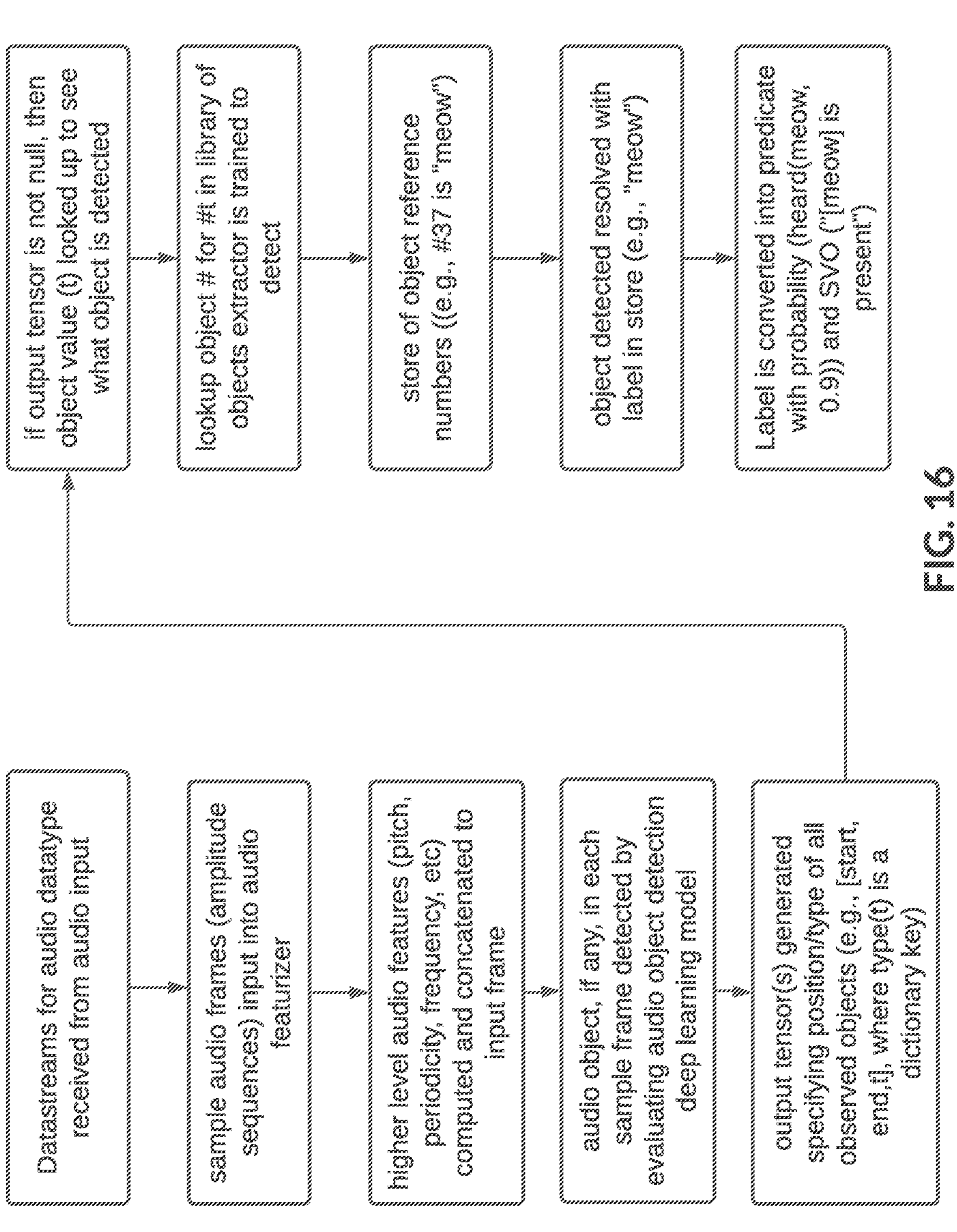
FIG. 16 illustrates Story Model Inputs—Insight extraction flow—extractors, particularly audio—object detection (sounds of a real cat).

FIG. 16 illustrates Story Model Inputs—Insight extraction flow—extractors, particularly audio—object detection (sounds of a real cat). This process follows the process described in FIG. 13, but applied to sounds detected in audio input (e.g., audio tracks in a video).

Note, text extraction also follows the process described in FIG. 13, but applied to text, which generally also may be regarded as just another object to extract, but with methods associated with its data type.

Figure 17:
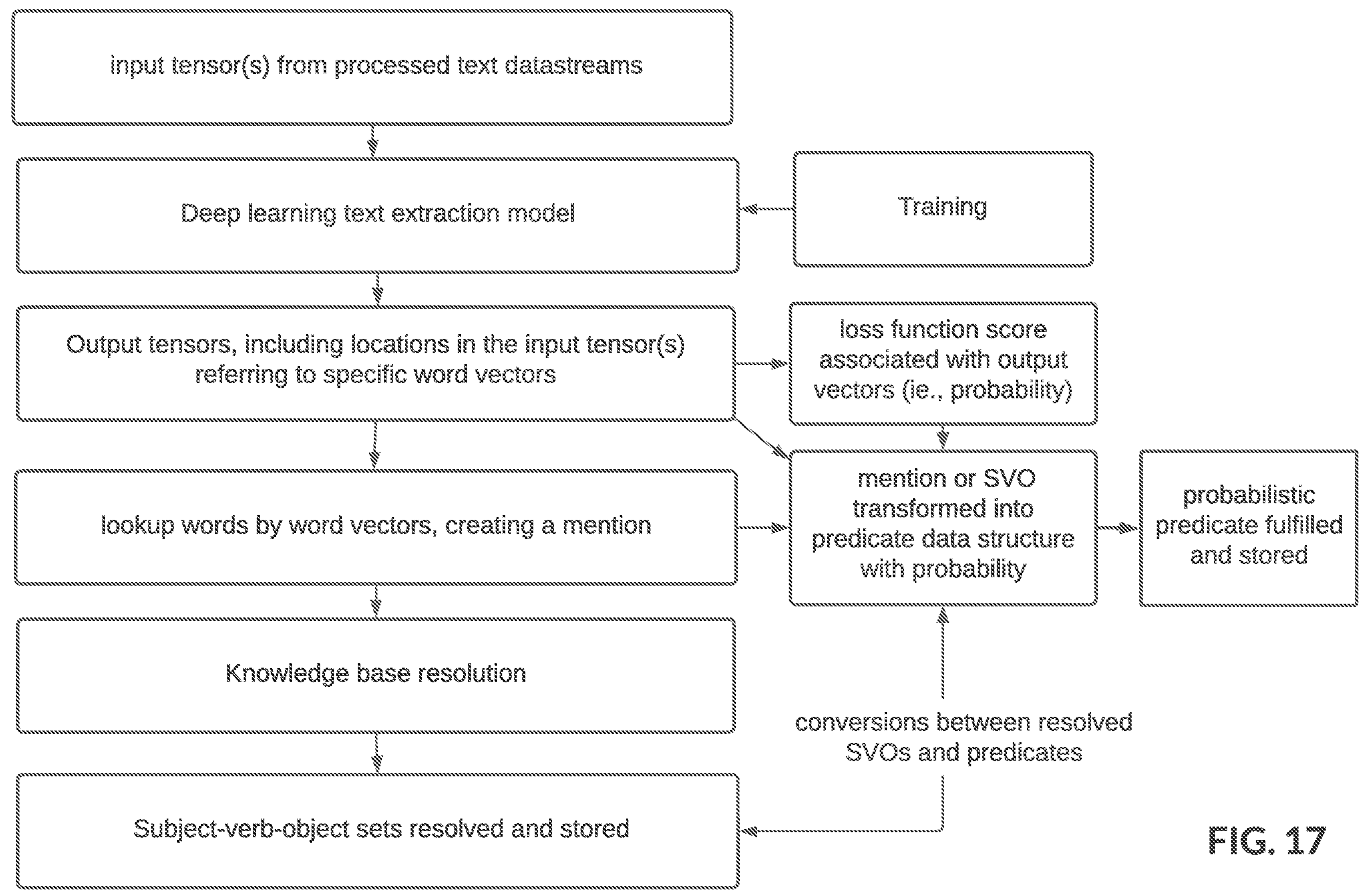
FIG. 17 illustrates Story Model Inputs—Insight extraction flow—SVOs and predicates, particularly producing SVOs and predicates from deep learning text extraction models.

FIG. 17 illustrates Story Model Inputs—Insight extraction flow—SVOs and predicates, particularly producing SVOs and predicates from deep learning text extraction models. In the example embodiment, "predicate" may refer to probabilistic predicates. While predicates are evaluable statements normally associated with a Boolean value, such as "true" or "false", in the example embodiment, predicates are associated with a probability (i.e., a likelihood of being "true" or "false"). For example, it may be said with some certainty that a banana may be yellow, but it also may be true that a banana may not always be yellow. The statement, the "banana is yellow" may be, say 90%, likely to be true, if it is said by someone who is not color blind who is visually inspecting a banana at the time, but only 50% true if it is said by one speaking generally of bananas, which may turn brown and stay brown longer than they were ever yellow. On the other hand, for comparison, a blood pressure reading from an FDA approved gauge may be more likely closer to 99% true at all times. In these examples, note the use of conditions, (i.e., "if") in determining a probability. In the example embodiment, conditions may be rendered into logical expressions (e.g., conjunctive normal forms) and used by probabilistic programming language to make logical predictions.

As data structures, in addition to probability weights, probabilistic predicates may have heads, which may act as labels (e.g., "banana") and arguments, or bodies (e.g., "yellow"), which may act as attributes (e.g., "yellow" may become "brown"). Note the arguments may change, which may provide flexibility in determining the state of the thing (e.g., yellow, brown) and logical inference (e.g., yellow banana=>brown banana). For example, since a banana may be yellow before it turns brown, a brown banana may be older than a yellow banana. For example, it may be said with some certainty that a banana may be yellow, but it also may be true that a banana may not always be yellow. The statement, the "banana is yellow" may be, say 90%, likely to be true, if it is said by someone who is not color blind who is visually inspecting a banana at the time, but only 50% true if it is said by one speaking generally of bananas, which may turn brown and stay brown longer than they were ever yellow. On the other hand, for comparison, a blood pressure reading from an FDA approved gauge may be more likely closer to 99% true at all times. In these examples, note the use of conditions, (i.e., "if") in determining a probability. In the example embodiment, conditions may be rendered into logical expressions (e.g., conjunctive normal forms) and used by probabilistic programming language to make logical predictions. In the example embodiment, probabilistic predicates may be used by various AI computational tools and probabilistic programming languages (e.g., Problog) to determine states of "facts," assign probabilities to these, and draw logical inferences from them.

As to SVOs, tokens, ngrams and vectors may be used to determine subject-verb-object (SVO) sets. SVOs may be described as natural language grammatical and semantic units.

The example embodiment may generate universal data types, such as predicates (probabilistic predicates) and SVOs, from Story Model Inputs for use by deep learning and other models. These may be extracted in the example embodiment by a process that vectorizes input data and extracts/creates predicates from the tensor output. These vectorizations and extractions, and scoring by classifiers, may happen constantly throughout the system, and may be performed by extractors and classifiers trained on reference data characterized as prior validated data.

With further regard to FIG. 17, text extraction may involve deep learning text extractors trained on a reference data set. A reference data set may be data validated by randomized controlled clinical trials, including care model data as well as data using validated health instruments. In the example embodiment, text extractions from Story Model Inputs text may be encoded to a care model, or other professional service model.

Note, not every model used by the example embodiment may take exactly the same input. In the example embodiment, multiple models may run simultaneously, some of which may require vectorized data first to do extractions while others may require simple data only (e.g., timestamps, device readings), which in turn may be converted into predicates later and without either vectorization or extraction. Additionally, predicates may be associated with SVOs and vice versa, which may be used by the system to represent the same data in different ways depending on a model's needs (e.g., NLP v attribute construction or optimization). The universal data types created by the example embodiment for use by its systems may create efficiencies for system operations and performance.

For example, let's say a person's facial expressions are being recorded during an interaction with the example embodiment. A facial recognition system trained to recognize (classify) faces may be used by the example embodiment to identify a person's face and return a person's ID. Further, the facial recognition system used by the example embodiment may be trained to classify and score facial expressions based on labeled expressions. To continue with the illustration, expressions similar to expressions used to train a classifier on happiness scale may return a score associated with the label, "sad," along with a level of certainty using the loss function, say "0.7". This classification occurs in a particular context that may be tagged by the example embodiment to the user, for example, at home after a day at the office. A schema for the example predicate, which may illustrate what kind of data may be stored (not its format), may be "User ID 0177:is sad, probability 0.7." This schema also may be associated with metadata illustrated as a schema, for example [date from device],[universal coordinated time],[list of context masks from handling of input stream by example embodiment].

As to generating SVOs from input data, there are various methods. For example, text data may be parsed into a syntax tree, and everything except the S,V,O may be discarded. For video, SVOs may be determined by a series of methods. For example, an object detection model may be trained to detect similar clusters of actions that may characterize certain observed behaviors for which a label may be created (e.g., frowning, running, eating, etc.). Let's say, for purposes of illustration, the object "fish" is detected, "eating" as a series of actions is detected, and the face of a person is detected and matched to a User ID. Libraries of labels created during training to describe similar object or objects (e.g., "fish", "person", eating,") as well as the person's name associated with the User ID, may be looked up by the example embodiment. As the next step in rendering an SVO form the detected objects, the example embodiment may resolve the labels against the knowledge base, to determine that Person [Chad] eats fish. (See SVO resolution).

Recall that input may be expressed as a predicate. And so, the SVO, "person eats fish," in some instances may be associated with a predicate, "Chad is eating fish, 0.7," if desired, using in part the loss function of the object detection model. Conversion from predicates to SVOs may be a straight-forward matter of discarding the probability constituent and converting the data type.

Figure 18:
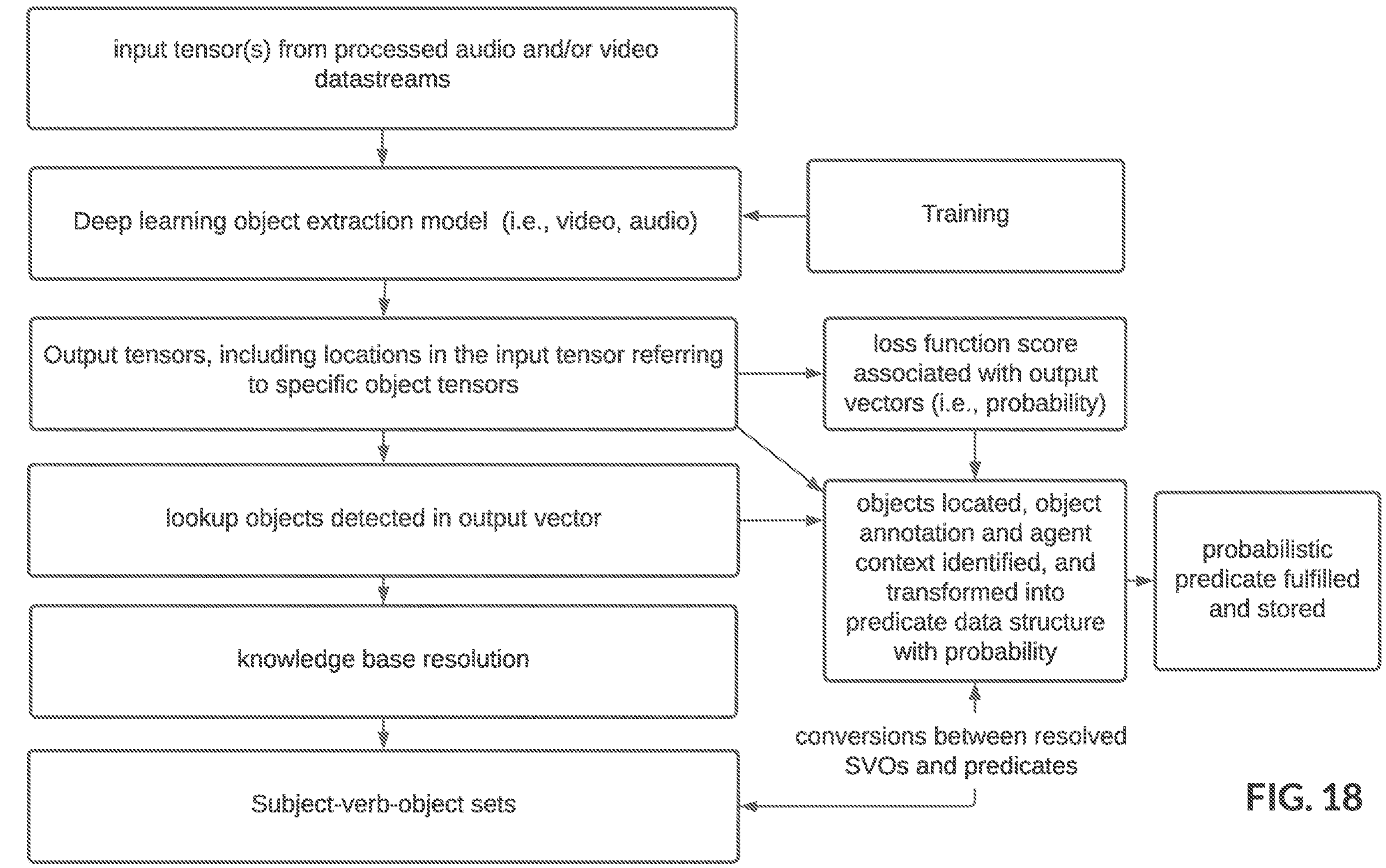
FIG. 18 illustrates Story Model Inputs—Insight extraction flow—SVOs and predicates, particularly producing SVOs and predicates from deep learning object extraction models (e.g., video or audio).

FIG. 18 illustrates Story Model Inputs—Insight extraction flow—SVOs and predicates, particularly producing SVOs and predicates from deep learning object extraction models (e.g., video or audio). In the example embodiment, a deep learning model trained to identify certain objects, such as audio or images (e.g., video), may identify and extract the objects from Story Model Inputs, then lookup annotations for detected objects stored in a library of objects, which may then be used as the basis for SVOs and predicate transformation.

Figure 19:
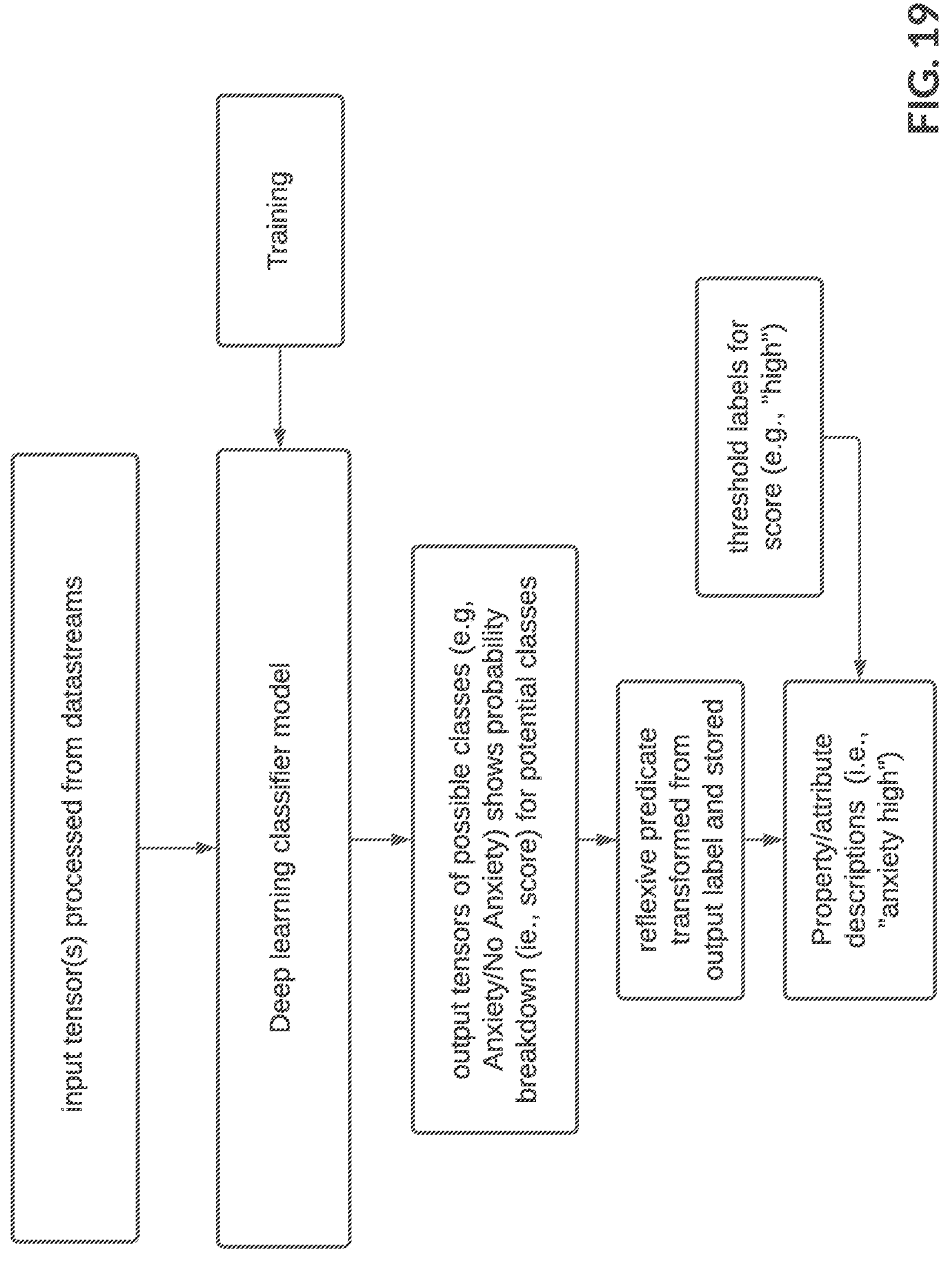
FIG. 19 illustrates Story Model Inputs—Insight extraction flow—scores from classifiers, particularly producing scores and predicates from deep learning classifier models (e.g., text, video, audio).

FIG. 19 illustrates Story Model Inputs—Insight extraction flow—scores from classifiers, particularly producing scores and predicates from deep learning classifier models (e.g., text, video, audio). In the example embodiment, scores from classifiers trained on a reference data set may be rendered in real-time and associated with other extractions to create a body of Story Model Inputs useful to Story Model functions, such as attribute and goal construction.

Figure 20:
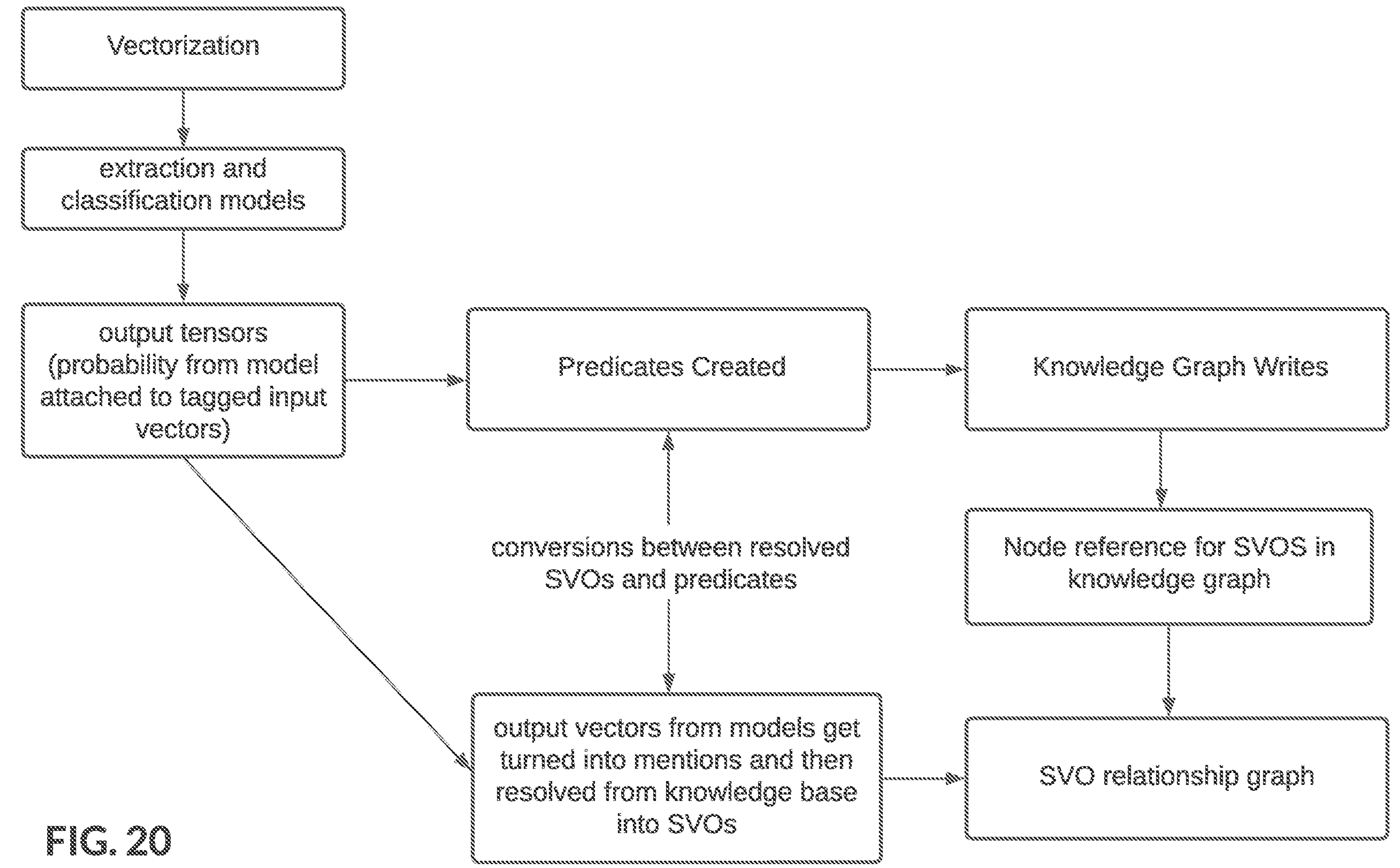
FIG. 20 illustrates Story Model Inputs—insight extraction flow—SVOs, predicates, graphs, particularly converting data formatted by type into standardized data for use by system (e.g., predicates, SVOs, scores).

FIG. 20 illustrates Story Model Inputs—insight extraction flow—SVOs, predicates, graphs, particularly converting data formatted by type into standardized data for use by system (e.g., predicates, SVOs, scores). The output of the insight extraction flow, as illustrated in FIG. 20, may be universal data types used by the example embodiment in its Story Model functions. In the example embodiment, all input data may be treated as context in the 'story' of a user, and so for every piece of input data entering the system, irrespective of datastream, a predicate representation of that input may be generated. In addition, in the example embodiment, this predicate representation may be added to one or more inference graphs (e.g., via Problog) at multiple scopes (e.g., user cluster, use case clusters, etc.).

In FIG. 20, a Knowledge Graph write is also described. A knowledge graph may be a set of nodes, which represent named entities, connected by a set of edges which define the relationships between those entities. Based on the output of extraction models, new entities and relationships may be inserted into the graph.

As is also shown in FIG. 20, predicates may be converted into SVOs and vice versa, and output vectors from models may be transformed into mentions and then resolved from knowledge base into SVOs in the example embodiment. Further, a knowledge graph may be generated by the example embodiment showing the relationships between various SVOs.

Figure 21:
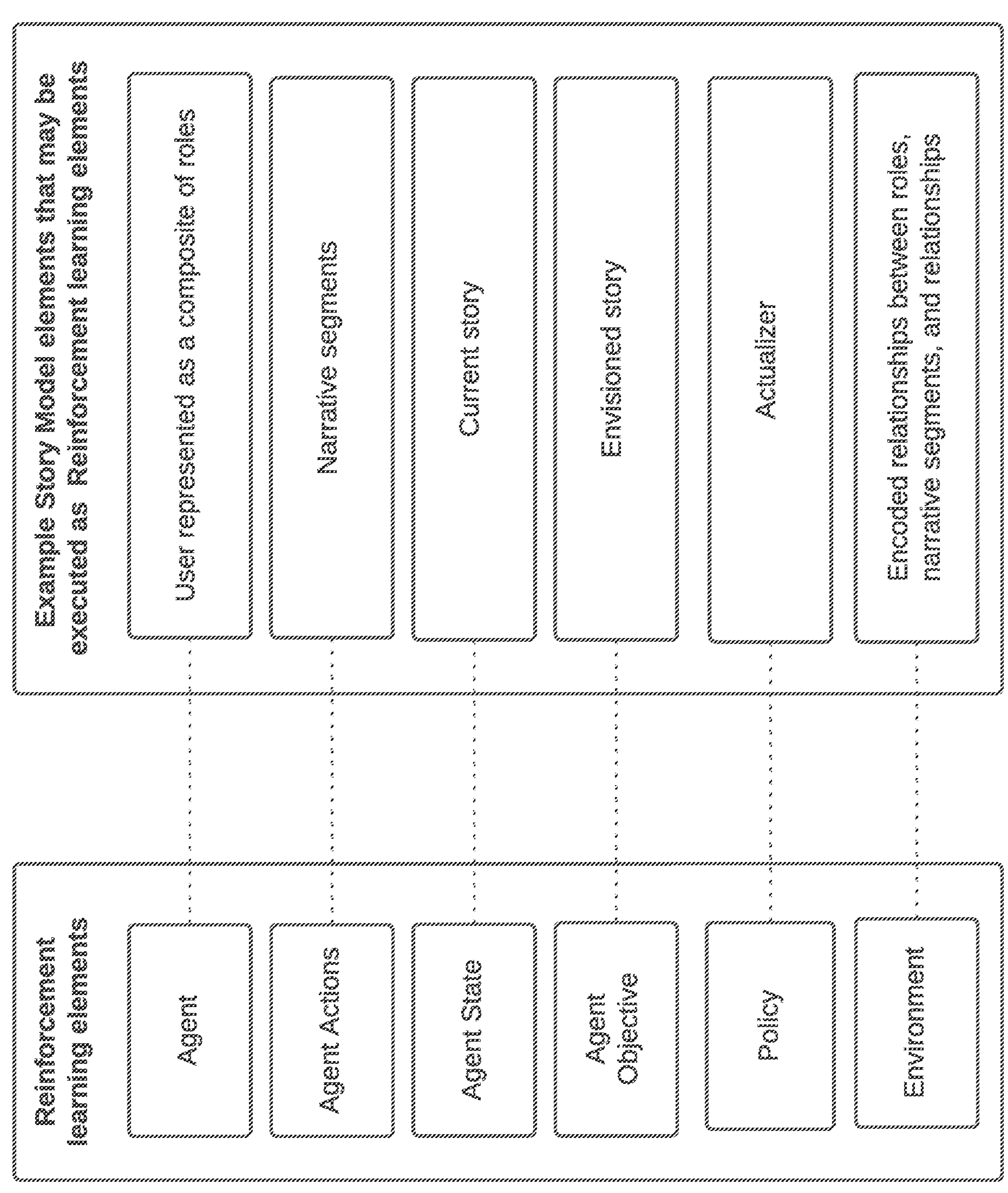
FIG. 21 illustrates aspects of a Story Model, including an overview of terms, and particularly data types and models for use by adapted versions of various optimization models (e.g., reinforcement learning).

FIG. 21 illustrates a Story Model—overview of terms, particularly data types and models for use by adapted versions of various optimization models. Story Data Types may be used in the example embodiment by different models and combinations of them, including different optimization models (e.g., reinforcement learning, behavioral models, agent models).

In the example embodiment, models or combinations of models may be continuously evaluated to determine which model or models may be best suited to meet Story Model requirements. Story Model requirements may be analyzed and updated based on evidence (e.g., via Story Logs and system logs) showing which models or combination of models may have the greatest impact on advancing each user towards their Envisioned Story. In the example embodiment, models most suitable for use by Story Models may be determined from a "library" of models available to the Story Model that may be dispatched in the moment to meet Story Model requirements. In the example embodiment, a model may manage other models based on requirements. For example, the specialization logic of a chosen Narrative Segment (atomic use case) comprising strictly ordered actions may be executed in great detail (e.g., all actions related to opening a door) by an Actualizer or alternatively through probabilistic programming. (See FIG. 57). While Story Datatypes may be adapted for use by different models, they may retain their logical relationships between each other, as per the Story Logic, regardless of a preferred model or combination of models, including optimization models and level of specialization logic.

In the example embodiment, an optimization model (e.g., reinforcement learning model) or combination of models (e.g., behavioral model, agent model, reinforcement learning model), may be determined that satisfies the optimization requirements of the Story Model. Optimization models in the example embodiment may be tasked with generating from available options a likely best next action as well as the best resource to take the action. In the example embodiment, an optimization model (e.g., reinforcement learning model) may be trained on agent and other models, which may also be optimization models, which may be continuously trained, and which may inform the generation of the best next action that may also be the action likely to be taken.

In the example embodiment, as is described below, various Story Data Types may be identified and propagated by the Story Model throughout its operations by various models to continuously advance a user towards a user's goals. Following this description, another description will be provided showing how an ensemble of optimization models, including an adapted reinforcement learning model, known to one of ordinary skill in the art, may be mapped to certain Story Data Types and Story Model models.

Referring to FIG. 21, the Story Data Type used to represent the user in the example embodiment may be referred to as Identity. User Identity may be tagged to a user entity in the example embodiment. Note, however, that a user Identity may not only be the user entity in the example embodiment, but also a characterization of the user as a composite of many roles, which may also be Story Data Types. For example, while a person, "Chad," may be an entity, and "Chad" may be represented as an Identity, Chad's Identity may be a composite of roles such as "doctor", "father", "landlord" and so forth. In the example embodiment, an Identity may be determined by tagging various roles extracted from Story Model Inputs to a user, for example, by context. In the example embodiment, Identity also may be characterized as a set of computed values, or product, of all of a user's many roles, each having varying degrees of significance, based on the user's context (e.g., conducting surgery v fixing dinner), user goals (e.g., father role v surgeon role), and so forth. In the example embodiment, roles that comprise an Identity may be associated with predicates evaluated during User Current Story construction, and therefore valued, with targets set during User Envisioned Story construction, and therefore valued, and with user actions evaluated after a recommendation, and therefore valued. Thus, a value for Identity, which in the example embodiment may be comprised of roles, may be computed. Likewise, a snapshot of the relative values of each role in the dynamic relationship between all a user's many roles may be determined. In the example embodiment, Identity may be a method by which to evaluate and value patterns of choices made by users, evidenced from Story Model Inputs as actions made by the user between roles. To return to the above example, if "Chad" wishes to be a "better father" this may have implications for which actions involving which roles and which contexts that Chad's Story Model may recommend to "Chad" to take.

Meanwhile roles, as elsewhere defined, may be an aggregation of user skills (observed as a cluster of similar actions) associated with a set of deliverables (observed as a cluster of similar products of the clustered similar actions). A user may have many different roles, which may be tagged to the user's identity. A user's roles may be instantiated to reflect an emergent Story Object Hierarchy from Story Model Inputs and analyzed for use by the Story Model.

In the example embodiment, a cluster of similar actions associated with a role may also be encoded as a Story Data Type, which may be referred to as a Narrative Segment. In the example embodiment, a Narrative Segment may be a single action or a strictly ordered sequence of single actions. A narrative may be composable from one or more Narrative Segments. When one or more user actions is detected during Model Inputs, it may be characterized as one or more Narrative Segments. In the example embodiment, Narrative Segments may represent the "action" that a user has taken or may take, from an inventory of potential actions, or from a discovery of Narrative Segments from traversals of the knowledge base (e.g., when classification of a Narrative Segment may fail).

Recall, the action component of the Narrative Segment may be SVOs. In the example embodiment, the action component of the Narrative Segment may be used to define actions that may be simple (e.g., "open the door") or complex (e.g., a therapy session), which in turn may be executed. For examples of complex actions that a Narrative Segment may execute, see descriptions of case management cases (e.g., FIG. 78). In the case of mental health therapies, complex actions may define "what" information may be needed from the user that maps to a goal parameter for a protocol, and then in conjunction with a communications strategy use case, define "how" to obtain that information. Both may feed into NL that the patient may respond to, which in turn may become Story Model Inputs used to determine the patient's progress in the protocol. In this example, complex actions of a Narrative Segment may involve the concatenation of a sequence of SVOs, with conditions that generate "what to say" in a speech, therapy session, etc., with requirements, for instance, for their topic and order, suited to their purpose.

In the example embodiment, Narrative Segments may be extracted during Story Model Inputs as evidence of actions linked to certain roles (a simple example of Story Logic involving a role) during Current Story construction. For example, an extraction of context-tagged inputs (e.g., conversation taking place in a blood lab) may be characterized as "draws blood," the action piece of a Narrative Segment. In turn, this extraction may be associated with a role, for example, phlebotomist. One of the actions of a phlebotomist may be to draw blood. So, here the Narrative Segment, characterized as"draw blood," may suggest that the role of a phlebotomist is being performed. For evidence of that, another Story Data Type referred to as a Deliverable may be determined or inferred from Story Model Inputs, here, a blood sample. If the Narrative Segment extraction is about "draw blood", there may be a blood sample. Thus, together, Narrative Segments and roles and deliverables as Story Data Types may be used by the example embodiment to extract and test evidence.

Meanwhile, the same Narrative Segment may be used prescriptively to describe action(s) recommended by the optimizer for users, likely playing certain roles. (As described elsewhere, Role in Story Logic may be representative of associations between certain actions and certain deliverables (e.g., drawn blood, or blood samples)). For example, a Narrative Segment expressed to a user in Natural Language as "draw blood" may be a verb-object (VO) set associated with a "phlebotomist" role in the medical space. So, the action to draw blood may be a future action that is recommended to a phlebotomist whose role may include to draw blood. Here again, inference may be used by the example embodiment to determine that if there is a blood sample, a deliverable requirement may be met and the role of phlebotomist satisfied.

In the example embodiment Narrative Segments may have attributes, requirements and goal parameters that may correspond to user attributes and goals constructed during the User's Current Story Generation and User's Envisioned Story Generation, respectively.

Each Narrative Segment (use case) may be assigned a number (use case ID), and indexed in a map of all Narrative Segments that may be referenced in each user's Story Logs and made available to each user's Actualizer.

In addition to choosing Narrative Segments, Actualizers may choose how to optimize the communication of these chosen Narrative Segments. The Actualizer may determine the optimal communications strategy use case from an index of various communications strategy use cases, which may be stored. The communications strategy use cases chosen by the Actualizer may be used in the example embodiment to structure and stylize how the NL Generation module communicates the Narrative Segments.

Referring next in FIG. 21 to Current Story, recall that Current Story may be a Story Data Type constructed from Story Model Inputs. In the example embodiment, this construction may refer to the validation and characterization of an attribute from the "evidence" gathered during Story Model Inputs. In the example embodiment, the construction of the user's Current Story may result in a snapshot of computed values for user attributes at the time of construction. Values may be generated for each attribute, including for attributes that are also Story Datatypes, for example, Roles, Contracts, and so forth. Thus, the construction of the User's Current Story may be a construction of values for attributes, including those that are Story Data Types.

New values for attributes output by the User's Current Story may be generated during construction of the User's Envisioned Story, another Story Data Type. The construction of the Envisioned Story may result in a snapshot of target values for user attributes, including those that are Story Data Types. Thus, the same Story Data Types may receive both current and target values from User's Current Story and User's Envisioned Story constructions, respectively. The User's Current Story outputs and User's Envisioned Story outputs, or snapshots, may be tensors or converted into tensors before feeding into an optimizer. As a result, user attributes extracted and encoded as Story Data Types from Story Model Inputs may now have been quantified as values for use by an optimizer (e.g., deep learning optimizer) that may compute from these values an optimal output.

Next, the constructed attributes and goals from the User's Current Story (i.e., User attribute profile) may update custom-training models in the ensemble of models, which collectively may be referred to as the Actualizer. In the example embodiment, the Actualizer's updated models may include an agent model (e.g., may be a deep learning model), which may quantify the impact of a particular action on a user's current story (attribute profile). In the example embodiment, an agent model may use the constructed attributes and goals from the User's Story History as captured by Story Logs, as well as the index of Narrative Segments and of the communications strategy use cases available to the model to learn the impact of certain actions on a User's current story. In the example embodiment, a model (e.g., agent model) trained on user behavior may work to quantify the cost of model predictions made by an optimization model, allowing that model to learn strategies and surface best actions to take next towards the user's envisioned story (e.g., a deep learning model such as a reinforcement learning model). In other words, it may "spar" with the user's goal optimizer to train the user's Actualizer on how a user's actions can be expected to impact their current story.

In the example embodiment, a goal optimizer may use the same constructed attributes and goals from the User's Current Story and Envisioned Story, respectively, as well as the index of Narrative Segments and of communication strategy use cases available to learn the user's best next actions to achieve goals. In other words, both agent and goal optimizer may be trained on user attributes, goals, Narrative Segments, and communications strategies. In the example embodiment, this tandem of optimizers, including one trained on best action towards a user goal (goal optimizer) and another trained on likely next action (agent model) a user may take, may teach the Actualizer, as a trained ensemble of models, "what is working." In other words, "how" a user may tend to meet goals. In time, a user's different optimizer models may be trained collectively to better reflect the actual individual user. Over time, "what works" for each user may diverge considerably from an "initial" characterization of "what works."

In the example embodiment, each user's Actualizer may be a model custom-trained on each user's actions, attributes, and goals (e.g., via Story Logs) to generate a recommendation and how best to communicate it. In the example embodiment, each recommendation may be a Narrative Segment (use case) predicted by the Actualizer to be most likely to advance each user towards each user's envisioned story. The recommended Narrative Segment (i.e., Targeted Narrative Segment) may be communicated by the example embodiment via NL to the user in a manner prescribed by the communications strategy use case, and in turn, the user's response, which may represent evidence of an action, may be processed as Story Model Inputs. In turn, these may be evaluated and used during impact analysis to determine if the user is likely to be executing the recommended action, the recommended action is likely complete, drift is detected, and so on, until a new recommendation may be generated and communicated by the example embodiment via NL to the user in a manner prescribed by the communications strategy use case. This entire process may then repeat. The process, which may happen continuously and in real time in the example embodiment, may continuously propagate from new "evidence" (via processing of Story Model Inputs) values for Story Data Types. This propagation may facilitate, by operation on them by the example embodiment, increasingly relevant interactions with users and increasingly useful recommendations.

Referring still to FIG. 21, various models known to one of ordinary skill in the art may be adapted for use by the Story Model. For example, certain aspects of the example embodiment may map to certain reinforcement learning concepts, as will be explained below.

An Agent (actor) in a reinforcement learning model, which typically may only be an entity referred to as a user, in the example embodiment may be represented instead as a composite of user roles, or user Identity.

Agent Actions in a reinforcement learning model, which may be the actions available to the agent, may be represented in the example as Narrative Segments.

Agent State in a reinforcement learning model, which may be current actions, may be represented in the example embodiment as the user's Current Story, including certain elements comprising a user's Story Log, which may log actions. Recall that in Current Story, predicates from Story Model Inputs may be evaluated as evidence of actions and constructed into user attributes (which may include social information) for all users.

Agent Objective in a reinforcement learning model, which may be the objective by which to measure the success of actions, may be represented in the example embodiment as the user's Envisioned Story. The Envisioned Story may return a list of "hypothesis" goals. In reinforcement learning, these may be called candidate Objectives.

Policy in a reinforcement learning model, which may be the strategy that a reinforcement learning agent uses to meet an objective, may be represented in the example embodiment as the ensemble of models referred to as the Actualizer. The Current Story (Agent State, in a reinforcement learning model), Envisioned Story (Objectives, in a reinforcement learning model), and index of Narrative Segments (Agent actions, in reinforcement learning) may be fed into the Actualizer, trained on "how a user meets" goals (e.g., a Policy, in a learning reinforcement model), which returns a best next action recommendation that the user is also predicted to take (Narrative Segment).

Environment in a reinforcement learning model, which may be states external to the agent, in the example embodiment may be represented as the encoded relationships between roles, Narrative Segments and relationships. In the example embodiment, Environment may also be represented partially as states embedded in the User's Attribute Profile (their social network and some scores) and from the use case attributes (constructed from narrative scope predicates).

In the example embodiment, every user's Actualizer may initially be trained on the same models, before specialization begins as a result of user interaction. However, in the example embodiment, each user's Attribute Profiles (Agent State, in reinforcement learning) and goals may be user specific from the outset, so different actions may be recommended by the Actualizer, for each user from the outset. The Actualizer may add the returned Narrative Segment (use case) to the user's "Custom Use Case" and begin executing it, including requirements for it.

In the example embodiment, each user's Actualizer, which may generate a recommended sequence of actions for each user to reach each user's envisioned story (Objective/goal), may communicate with other users' Actualizers. In the example embodiment, resources needed to execute a recommendation may be resolved (i.e., identified, determined to have the requisite skills, availability, etc.) and notified through interactions between Actualizers, as described elsewhere.

After execution of the recommended use case, changes will have been made by other components of the example embodiment to the attribute profiles involved. The action will also have potentially affected them, and the progress towards the user's goal will have changed in some way. In the example embodiment, this may all be teased out by "Impact Analysis" and then fed back into each user's Actualizer for the next action recommendation. So, a continuous loop may be established based on recommendations, observed behaviors, then new recommendations. In the course of such operations, the example embodiment may adapt models to the degree they may perform better than other models (e.g., reinforcement learning).

Figure 22:
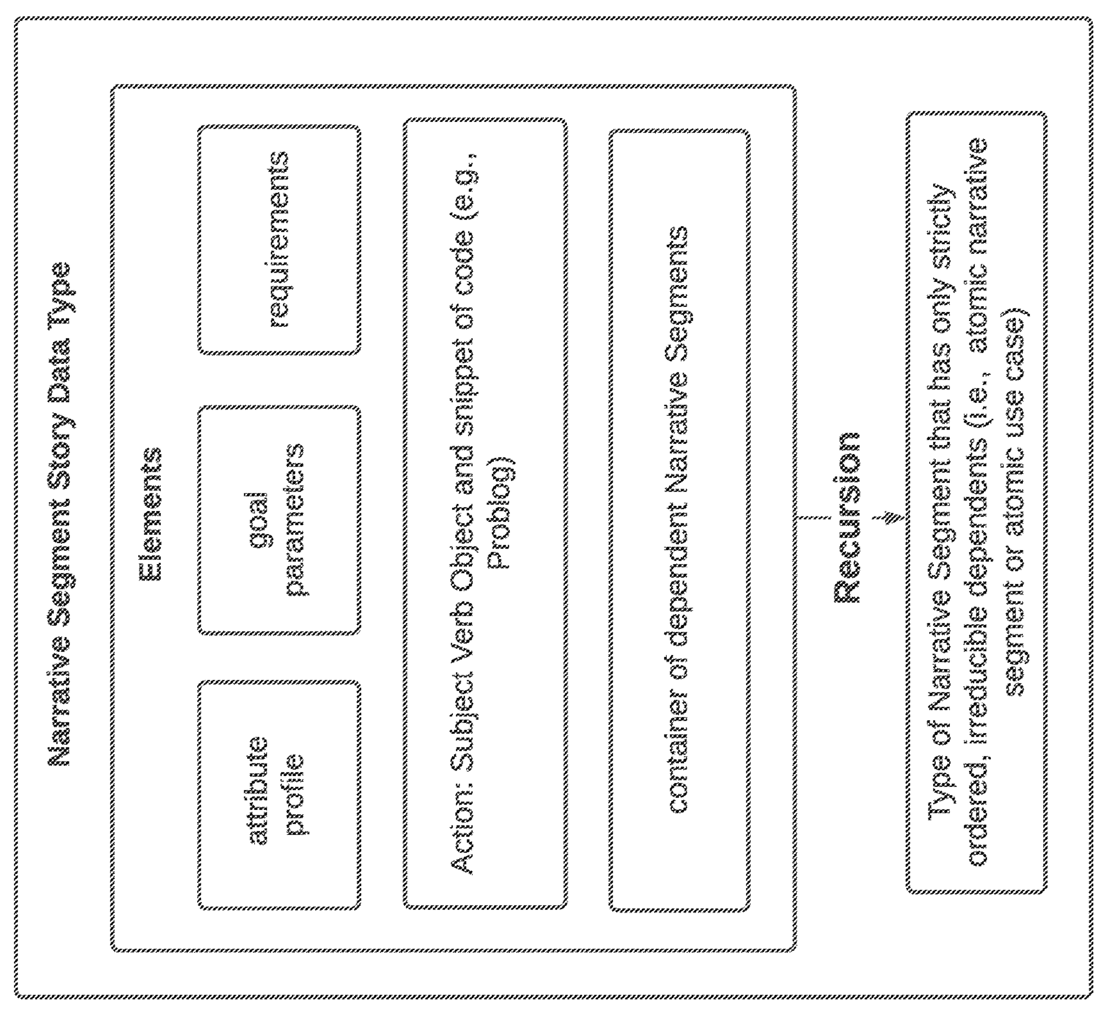
FIG. 22 illustrates a Story Data Type that may be referred to as a Narrative Segment.

FIG. 22 illustrates Story model—data types. The Story Data Types described in the overview may follow a Story Logic, as described below. Story Logic may be encoded as "requirements" of a Story Data Type, since they involve rules for relationships with other Story Data Types, among other requirements.

FIG. 22 illustrates the constituent elements of Story Data Type referred to as a Narrative Segment. In the example embodiment, the Narrative Segment may be a recursive data type comprising an action, attribute profile, goal parameters, requirements, and a container of dependent Narrative Segments. In the example embodiment, these may be inputs into the Actualizer, which may both customize and optimize action sequences for each user (i.e., a custom optimization of Narrative Segments). Narrative Segments may be labeled, and as earlier described, may be assigned an index number for use by various models of the example embodiment.

In the example embodiment, the Action of a Narrative Segment may comprise a SVO, which may express a NL action and a snippet of code (e.g., Problog), both of which may be "extracted" during Story Model Inputs or alternatively used prescriptively as part of the Story Model's recommended action as well as part of the NL communications to the user of that recommendation. In the example embodiment, the Narrative Segment Story Datatypes may be encoded through actions, attributes, goal parameters, requirements and dependencies with Story Logic.

In the example embodiment, attributes of the Narrative Segment may be defined as the representations of evidence that the above-described "actions" in a Narrative Segment contribute to reaching goals parameterized for the Narrative Segment. In the example embodiment, Narrative Segments available to all users, which may be characterized as general Narrative Segments, may be the starting point for customizing Narrative Segments for an individual's specific goals. In the example embodiment, the starting point for customization may be the evidence initially for generated Narrative Segments imported from research on "best practices" (e.g., clinical trial data) to identify action sequences and measures for their success in a studied population. The example embodiment may build evidence from extracted predicates, scores and simple data (e.g., evidence from location data, attendance records, scores for physical quality of life, device readings, type of action, such as related to a sport or interest) and quantified, to degree possible, to determine if the attribute exists to support a particular goal for which a Narrative Segment may be customized (e.g., improve [name's] tennis game).

In the example embodiment, goals parameters may be defined for a sequence of actions using a general Narrative Segment and tailoring it through Narrative Segment customization to reach goals. Goal parameters may be tagged to the Narrative Segment and may represent targeted states, (i.e., cluster of similar predicates for an envisioned story), as goals for abstract and real users. For example, an abstract user may be an "athlete," or role referred to as "athlete, and goals may be "better athlete", "more physically fit", "healthier bodyweight", etc. A goal for a customized Narrative may be [name]=>better tennis player. Narrative Segment goal parameters may be constrained by attributes required to support them and requirements needed to execute them.

In the example embodiment, requirements may refer to what else a Narrative Segment may need to be executed by the model. For example, a Narrative Segment (use case) for losing weight may require the presence of a treadmill or equivalent machine, a nearby gym, or an outdoor track, or alternatively, a game the user likes that burns calories (e.g., tennis) for which other equipment may be required, such as a racket, balls, court, etc.

In the example embodiment, dependent Narrative Segments may refer to Narrative Segments required for the Narrative Segment to execute. For example, "find court" may be the action of a Narrative Segment on which the Narrative Segment "play tennis" may depend. To continue with the example, "call tennis club" may be the action of a Narrative Segment on which the Narrative Segment "find court" may depend. In other words, one action or sequence of strictly ordered actions may be required to facilitate another action or sequence of strictly ordered actions.

In the example embodiment, a Narrative Segment having dependent Narrative Segments may be referred to simply as a Narrative Segment. However, note that the recursion may continue until a leaf is reached, or said a different way, a Narrative Segment is determined to have no further dependents (A strictly ordered irreducible dependent is reached). This leaf, or irreducible dependent, may be a Narrative Segment. In descriptions herein, a Narrative Segment that is a leaf, with no further dependents, may be referred to also as a Narrative Segment. However, it may also be referred to as an atomic Narrative Segment or atomic use case, to signify that it is irreducible. However, when referring to a Narrative Segment, the terms "leaf", "atomic Narrative Segment", "atomic use case" "leaf Narrative Segment," may relate more to the position of the Narrative Segment in a tree of Narrative Segments during recursion than to whether it is still just a Narrative Segment, which it is, just one with no dependents. It will be assumed throughout descriptions of specifications that recursion of Narrative Segments may take place until a leaf is traversed.

In the example embodiment, Narrative Segments may be combined into a composite of multiple different Narrative Segments. The principle features of this composite may include its use as a container of Narrative Segments for naming collections of Narrative Segments and its use by the Actualizer in simulating which order of Narrative Segments in the composite to recommend as an action for a user. For example, a composite named "wake up routine" may involve "gentle wake" and "forced wake" routines as potential actions for a user's Actualizer to consider when optimizing a next action recommendation (See FIG. 54). In FIG. 54, for illustrative purposes, the "gentle wake" routine may be a Narrative Segment with no dependencies. To continue with the illustration, the "gentle wake" routine may involve a strict order of actions, making it an "atomic narrative (atomic use case)." The actions may be, in order, 1) open door, 2) walk to son's bed, 3) touch son on shoulder. This strictly ordered sequence of actions may be evaluated as only one unit by the Actualizer in its determination of which from an available set of actions to recommend. If the Actualizer recommends "Gentle wake", then each of the actions described above for the "gentle wake" atomic Narrative Segment may be executed in strict 1,2,3 order. Meanwhile, available actions for evaluation by the Actualizer may also include "Forced Wake" routines. To continue with the illustration, a forced wake may be a composite of two single action Narrative Segments (i.e., atomic Narrative Segments/ atomic use cases), such as "shout at son" and "bang on door". Thus, in the illustration, the actions available for evaluation by the Actualizer may be "gentle wake", which may be treated as a single unit by the Actualizer in its evaluation, and "force wake", which as a composite may contain at least two single actions, or two atomic Narrative Segments, which may be executed in either order, or only one of which may be executed. In other words, the Actualizer may have three potential actions to evaluate: one from "gentle wake", two from "force wake."

To continue with reference to the illustrated example, both "gentle wake" and "force wake" may comprise a composite, "wake up routines", and illustrate how in the example embodiment a composite may comprise other composites (e.g., "force wake," as illustrated, may itself be a composite of Narrative Segments). To conclude with the illustrated example, the Actualizer in one instance, based on Story Model Inputs and what it has learned from user attributes and goals, may choose "bang on door" in preference to "shout at son" from the composite "wake up routines" or, given other Story Model Inputs and what it has learned from user attributes and goals, "gentle wake".

In sum, the Narrative Segment, as a Story Datatype, may facilitate a traversable graph with a composable recursive merge.

Figure 23:
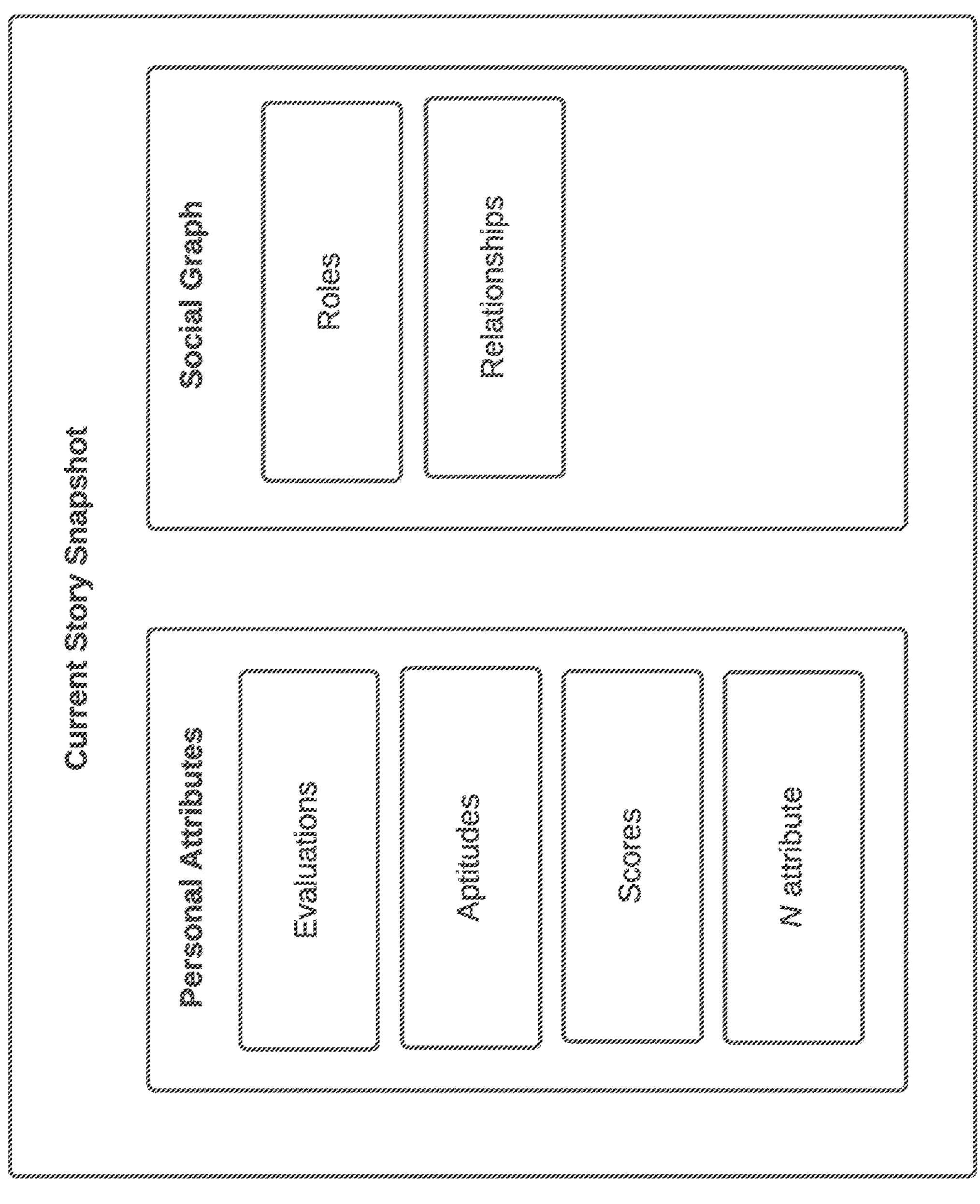
FIG. 23 illustrates a Story Data Type that may be referred to in the example embodiment as a user's Current Story Snapshot, or user attribute profile.

FIG. 23 illustrates a Story Data Type that may be referred to in the example embodiment as a user's Current Story Snapshot, or user attribute profile. The user's Current Story Snapshot may contain user attributes constructed from evidence scored and extracted from Story Model Story Inputs, through a method described elsewhere. The user attributes themselves may have a value determined by the construction method. The snapshot of user attribute values upon construction may be contained in Story Logs and used to feed the ensemble of models comprising the Actualizer (e.g., reinforcement learning, agent model, behavior model). The values in the Current Story Snapshot may also be used as a basis for constructing goal values or targeted attribute values during Envisioned Story value construction. In the example embodiment, an attribute value may be generated for any data for which sufficient information may be scored and extracted to comprise a category deemed worth valuing, including Story Data Types.

In an example of the embodiment, user attribute values may be both validated and characterized, to the greatest extent possible. By validated, it is meant that user attribute values may have sufficient statistical power and significance to reliably measure the attribute. For example, an attribute for fitness may be computed from a combination of predicates extractions and scores produced by the deep learning models. A validated 'fitness' attribute may be one shown to distinguish between "fit" and "not fit" individuals. Meanwhile, by characterization, it is meant that the metric for distinguishing "fit" and "non-fit" individuals may be used across a large population.

As shown in FIG. 23, attributes for each user may be identified, including by type. In an example embodiment, user attributes may include individual attributes and social attributes, although any distinction between the two may be tagged or mapped to the same user Identity and cross-referenced to each other, and include all context tags and Story Logic encoded in the values generated from attribute construction.

FIG. 23 illustrates several example individual attributes, which may be described as evaluations, aptitudes, scores, and N attributes.

In the example, an evaluation of a user's Ability/Aptitudes in different domains, may be constructed from predicates (e.g. Fitness: 0.7, Musicality: 02).

Likewise, in the example embodiment, Abilities/Actions may be computed from evaluating predicates associated with actions in different domains, e.g., canLift (Weight<200), canPlay(Piano, skill=0.6) user.

As to scores, in the example embodiment these may be within or across domains (Body mass index, Height, Weight, IQ, anxiety, QoL, etc.) and may be generated by classifiers during Story Model Inputs.

Meanwhile, N attributes is used in the FIG. 23 to convey that the number of attributes may be limited only by the richness of the data used by the example embodiment to construct and measure attributes and categories of attributes from Story Model Inputs. For example, constructions of user attribute values may be from simple location data (e.g., "[person] is at rehab center, 0.92), or role-based extractions (e.g., "[role] is a physical therapy patient", 0.67). There may be N predicates for N extraction types, including extractable Story Data Types. In the example embodiment, evidence of user attributes may be constructed from Story Model Inputs for Story Data Types, such as role, contract, deliverable significance, and so forth.

As a further illustration of the range of attributes that may be constructed, user attributes may include topics surfaced in discussions that evidence an interest in certain activities, as well as communications attributes.

Referring still to FIG. 23 examples, social attributes are depicted here as well. In the example embodiment, a social graph may be created for each user, showing that user's connections to other users, scored along several axes (intimacy, frequency of contact, volume of contact, reciprocity, etc.).

In the example embodiment, social attributes such as Roles may be encoded as specialized edges between users. (e.g., father role connects father and daughter). Defining Roles as edges may define them relationally. Each edge may be associated with predicates, actions, and Narrative Segments (use cases) that the Actualizer may consider during its strategy formation.

Figure 24:
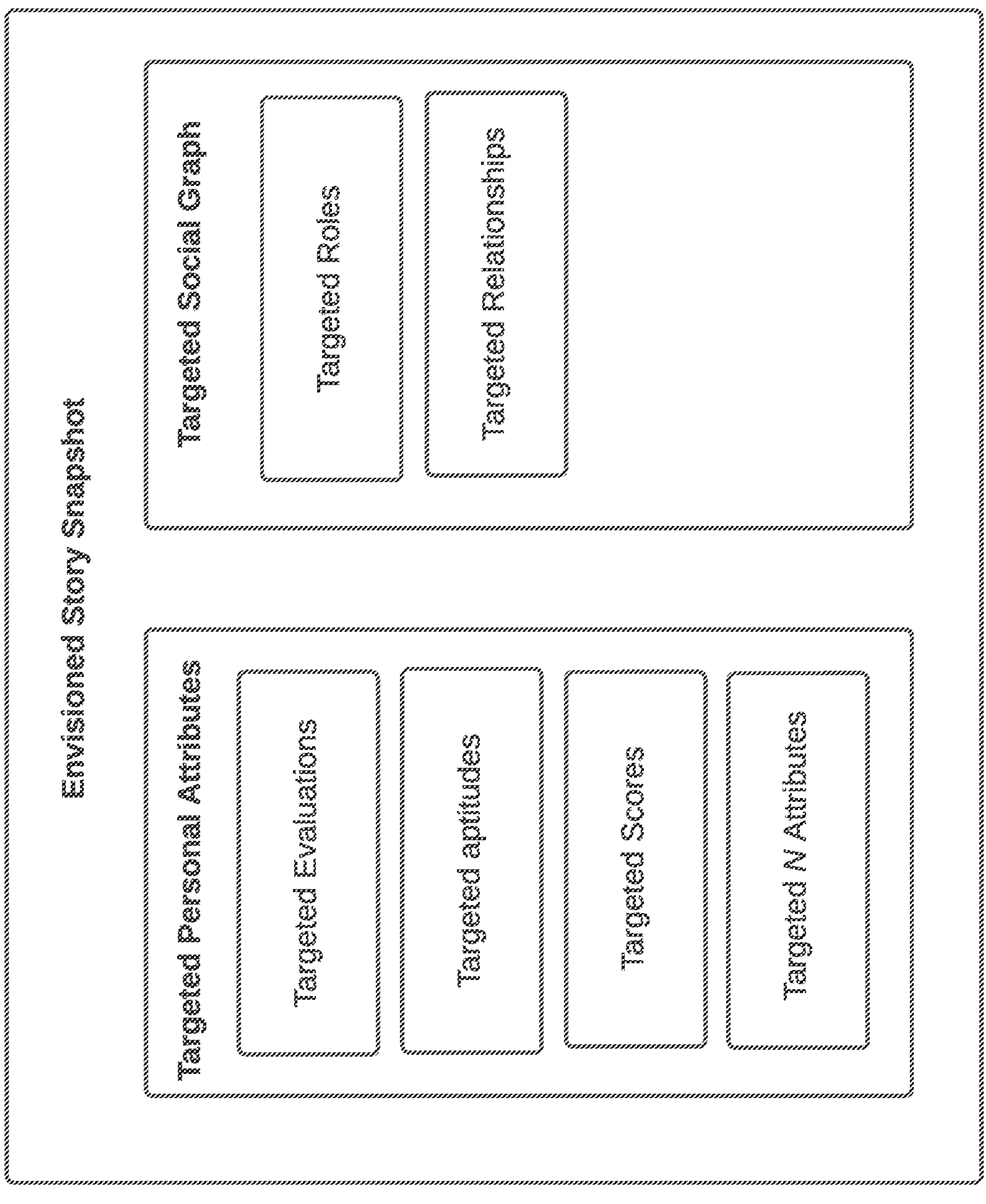
FIG. 24 illustrates a Story Data Type that may be referred to in the example embodiment as a user's Envisioned Story Snapshot.

FIG. 24 illustrates a Story Data Type that may be referred to in the example embodiment as a user's Envisioned Story Snapshot. The snapshot may be of user goals expressed as targeted user attribute values, constructed as described elsewhere. The snapshot of targeted user attribute values (Envisioned Story Snapshot) upon construction may be contained in Story Logs, and, like the user's Current Story Snapshot, the user's Envisioned Story Snapshot may be used to feed the ensemble of models comprising the Actualizer (e.g., reinforcement learning, agent model, behavior model).

With specific reference to the user's trained behavior model, both user's Current Story and Envisioned Story snapshots may feed into this model in the example embodiment, and provide inspectability for users into a prediction of likely user behaviors/actions as a result of the Actualizer's recommendation that the user receives. This inspectability may occur through a user interface that may accept user edits, comments and the like, which in turn may be processed as Story Model Inputs and thus loop into constructions of both the example embodiment's representation of the user's Current Story and Envisioned Story, creating a feedback loop of sorts.

With reference in the example embodiment to both the user's Current Story and Envisioned Story Snapshots, sequences of these snapshots may be provided to the Actualizer, to in effect establish for analysis by the Actualizer a running story, or movie, of sorts comprising a change of inputs more reflective of the user's context than a single snapshot may be.

Figure 25:
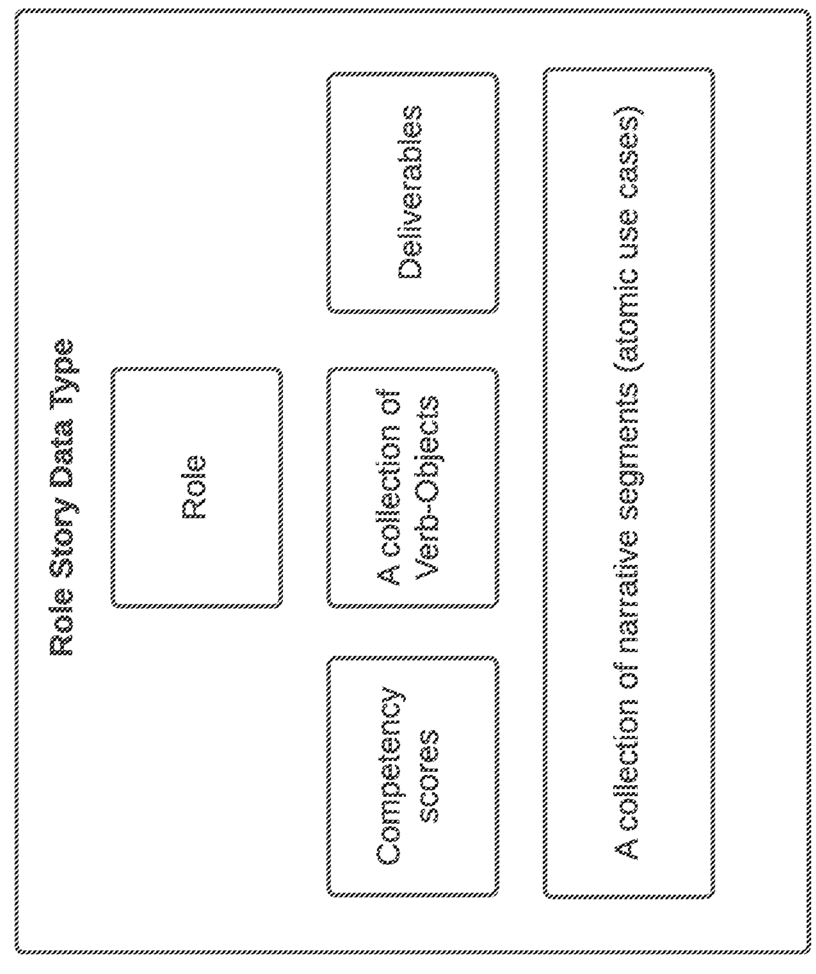
FIG. 25 illustrates Story model—data types, particularly Abstract roles (template) in the knowledge base.

FIG. 25 illustrates Story model—data types, particularly Abstract roles (template) in the knowledge base.

Role as a Story Data Type in the example embodiment may be used by system models for evaluations of a user's current story, conflicts, available actions, and envisioned story. Independent of its association with a given user pair or dyad (e.g., doctor-nurse, landlord-tenant, etc.), a role may represent an aggregation of skills—which may be observed as a cluster of similar actions, or tasks, expressed as verb-object sets (VOs), or actions,—that may be associated with a set of deliverables, which may be observed as a cluster of similar products of the clustered similar actions. An Abstract "role" may live in the knowledge base.

As illustrated in FIG. 25, a role in the example embodiment may be associated with a collection of VO's (actions) that the role is capable of performing at execution. The VO's may be connected to a role in a graph like structure, which in the example embodiment may make a role an SVO cluster.

FIG. 25 illustrates that a competency score may be associated with each VO. A role may not just be the ability to perform an action, but also an estimation of competence or expertise required based on the complexity of the deliverable. This may be reflected in the example embodiment as a weight on the edge connecting each VO to a role for each user who overlaps with that role.

FIG. 25 illustrates that deliverables may be associated with each VO. Each "action" that belongs to a role in the example embodiment may have associated with it various success criteria and a deliverable which defines successful execution.

FIG. 25 further illustrates that a role may be associated with a collection of Narrative Segments, which may require VO's from that cluster to execute. Recall that Narrative Segments may have an attribute profile that requires skills to resolve resources, which may include the user. In the example embodiment, in the form of VO's, the above may be equivalent to a family of Narrative Segments requiring a certain specialization.

Figure 26:
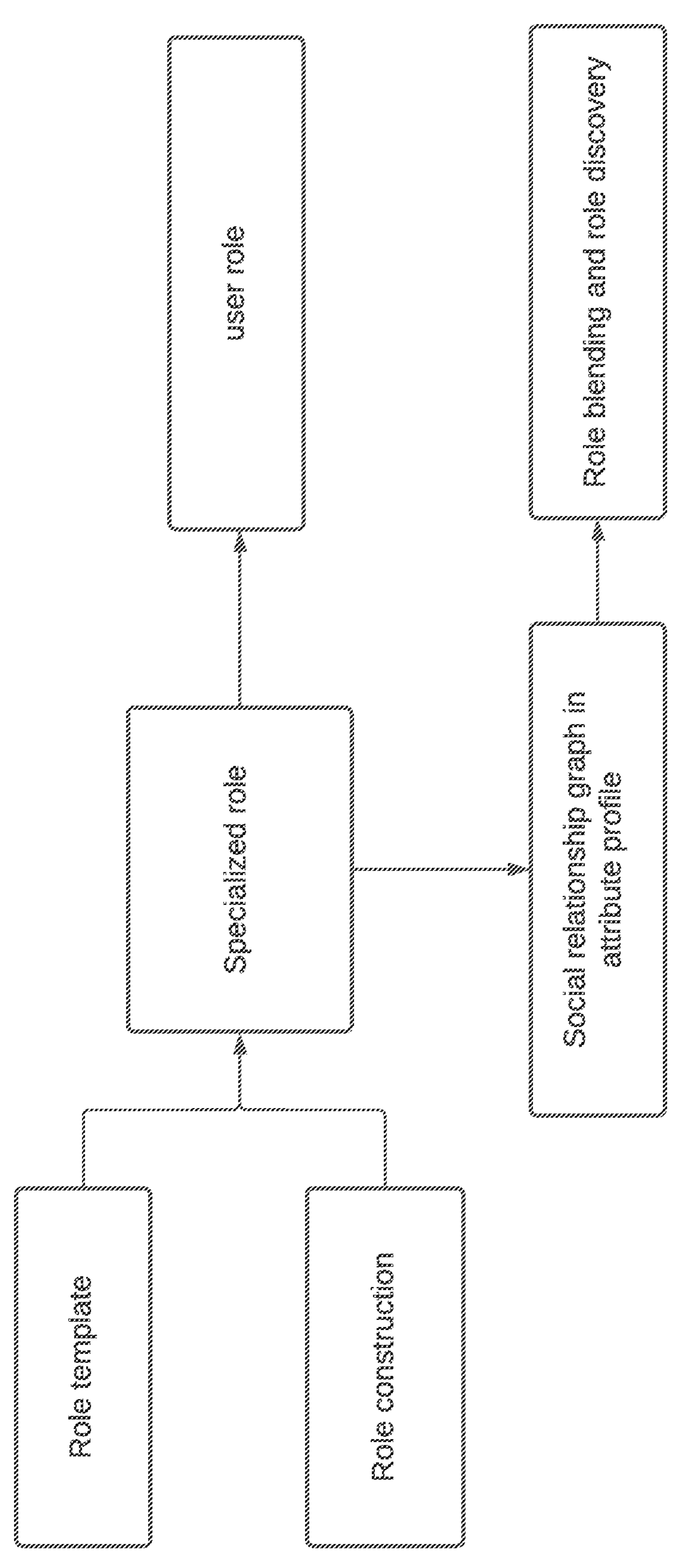
FIG. 26 illustrates Story model—data types, particularly representing a user's specified roles as they may appear in the user's attribute profile.

FIG. 26 illustrates Story model—data types, particularly representing a user's specified roles as they may appear in the user's attribute profile.

In the example embodiment, an abstract definition of a role may be described as a connection of VO's to a "role" node in the knowledge base. This abstract definition of a role may also be referred to as a role template, and be used to represent core relationships embedded in the role Story Data Type that may be said to characterize the role at a general level. For example, it may be definitional of a "doctor" that the doctor treats patients. In the example, the role template for a doctor may include the VO, "treats patients." Note in this example that the object here may be another role.

In the example embodiment, Story Model Inputs may provide the evidence (e.g., scores and predicates) gathered about users by the example embodiment to construct a specialized role from the abstract role (defined in the knowledge base).

Further, in the example embodiment, an "instance" of a role associated with a user may exist as a collection of "competency weights" for each edge of the graph specific to that user, object pair. This may be called a specialized role.

The example embodiment may specialize role at the user level, as well as providing a concept of a composite role.

In the example embodiment, a reference to this "specialized" version of the role may be stored in the users Attribute profile graph, in their social relationship graph. So a user may have multiple roles per person in their network, and may likely have modified role responsibilities per person.

In the example embodiment, the system may blend roles (i.e., create a composite role) and discover new roles, as it may infer a person's role from what they *do*, and even understand the priority of the roles in practice from analyzing their social interactions.

In the example embodiment, Role may be propagated as a Story Data Type from its extraction from Story Model Inputs to use in Story Model functions.

For example, in Current Story Generation/Snapshot (Attribute Construction/Attribute Profile), an abstract role may be defined in the knowledge base, but a specified role of it may also be defined (specific to each agent/object pair) in each user's attribute profiles, or more specifically, in each user's "social graph" section of the attribute profile. During Attribute Construction, specified roles may be constructed based on all information available about the role agent/object and references to them may be inserted into each user's respective social graph.

During construction, Roles in the example embodiment may be represented in linked pairs of Agent of action (S) and Object of action (O) relationships. For example, a father role may be linked to son/daughter roles; when one may be invoked, the matching pair may as well for the opposite role, and mapped back to the person. (Note, a person may be both a son and a father, but likely in relation to different users).

In the example embodiment, specified roles may diverge over time from abstract roles, to reflect the nature of each specific relationship. For instance, in some cases, perhaps financial support is part of the father role to a son, but in others it may be a less important part—the example embodiment may model differences based on each user's Story Model Inputs.

Once constructed, the graph of specified role associations may be stored in each user's attribute profile. The graph may be exposed to the Actualizer (e.g., an ensemble of trained models, as in a deep learning reinforcement model trained on an agent model) via values in the user's Current Story (Attribute Profile). This may propagate a user's roles as part of the user's real-world decision-frame (e.g., part of an Environment State, and, depending on the view, Agent State, in a learning model, such as reinforcement learning), which may be exposed to the Actualizer through the user's attribute profile.

Notably, the user's attribute profile may also be input data for the user's Envisioned Story, where user goals may be set. As described elsewhere, a wish expressed to improve a role (e.g., be a better patient, meaning adhere to what is recommended by a doctor) may be reflected in a user's Envisioned Story. Goal construction, meanwhile, may factor in derived importance from analyzed actions and other user inputs to generate new target values for certain attributes.

Since the Envisioned Story (including goal discovery/Goal Hypothesis Generation) may set the objectives for the Actualizer (i.e., learned strategy for reaching objectives), role may not just be a crucial state for determining the next action, but also an important piece of data for setting objectives for the Actualizer to optimize.

In the example embodiment, the function of the role Story Object, used as a basis to calibrate extant relationships observed by the system as predicates, scores and converted SVOs, through construction, may be used to predict best next action step, and satisfy requirements of a deep learning optimizer (e.g. reinforcement learning model that defines State and Goal). Role may play a significant part in defining a user's current story and as data may be used by the Actualizer to determine a next best action step towards the goals that the Actualizer attempts to optimize.

In the example embodiment, the significance of role may vary based on which particular goals may be in the processes of being optimized, the actual nature of the task (VO) that is recommended and the relationships between users in the context for which the recommendation may be generated.

Further, as a Story Object, Role may be central to propagating Story Logic throughout operations of the example embodiment, as explained in greater detail below.

An action statement having a subject (agent of the action), verb (the action), and an object (of the action), or SVO, may be developed (e.g., "[role] take temperature") during use case development/Narrative Segment development, and encoded as the Action of a Narrative Segment (see FIG. 22) in the knowledge base. Narrative Segments, which may be composited and labeled, may be associated with roles.

Meanwhile, conditions for the action of a Narrative Segment may similarly be defined as SVOs, and comprise dependent clauses that condition the scope of the action (e.g., "when [role e.g., patient] doesn't feel well, [role] take the temperature"). Dependent clauses (e.g., "when [patient] doesn't feel well") may be transformed into logical conditions for use by programming that uses logical operands (e.g., Problog) and may create dependencies for Narrative Segments. These conditions, which may be interpretable as predicates, may be used to test for evidence of a certain role and may include appropriate context-tags (e.g., location data indicating an urgent care location).

A sequence of action statements (SVOs) with conditions (also expressible as SVOs) may be ordered so as to produce a product of an action or a product of collective actions, characterizing a changed state of objects (i.e., the O that is the object of the V) of the actions (e.g., take (V) temperature (O)=>temperature taken, i.e. a reading (deliverable), which may be measured (e.g., high temperature, or "fever"). Thus, from the foregoing descriptions, a role may be identified with an action, as well as with a deliverable and measurement of the deliverable. A logical order of relationships may also be established by inference (e.g., device reading=>temperature was taken).

Meanwhile, requirements for the agent of the action (e.g., skills required of a role, such as nurse), the action (e.g., verb and object, or task, performed by a role, such as taking (V) a temperature (O)), the product of the action (e.g., deliverable of a role, a temperature reading) and sequence of action statements rolling up an aggregate set of actions into a cluster of related actions (e.g., "taking vitals") comprising one or more SVOs characterizing a role and its temporal or longer term fulfillment (e.g., nurse's near-term goal may be to "take vitals" and longer term goal to "help patients recover") may be established. "Taking vitals" may be a composite of composites of Narrative Segments, as illustrated in FIG. 22.

Requirements for predicates and SVOs may be established using the same Story Logic to describe logical relationships, and a chain of deliverables may be established by role from a sequence of action statements (i.e., SVOs) with conditions (i.e., SVOs), and associated sequenced actions (i.e., SVOs) for requirements, and encoded during Narrative Segment (use case) development. Predicate logic and SVOs may thus be established for action statements, conditions and requirements.

The following may further illustrate how Story Data Types may be used by Story Logic as a method to instantiate a user's story. In the example embodiment, an envisioned user story may involve fulfillment of certain user roles, near or longer term (e.g., an admitting nurse's immediate objective in an emergency room may be to take the patient's vitals, a longer term objective may be to be a comfort to the most acute patients and their families during acuity). Role SVOs, deliverable chains, and requirements may be deemed fulfilled when executed (i.e., evidence via predicates above a threshold for an encoded action).

Conflicts may be characterized as various impediments to a user's progress towards their Envisioned Story, which comprises the user's targeted attribute values, or goals. Targeted attribute values may include those for roles (e.g., "to be a better nurse"). Since roles may be established as goals in the example embodiment, conflicts may include impediments to role fulfillment. Impediments may include actions (SVOs) that prevent a role characterized at the task level as a SVO (e.g., nurse (S) draws (V) blood (O)) from being executed ((e.g., patient (S) will not give (V) blood (O)), a lack of skills required for agency of the action (e.g., nurse (S) can't find (V) vein (O)), etc. Sequenced SVOs between roles (e.g., patient-nurse, "patient extends arm", "nurse inserts needle"), each role having a deliverable chain (e.g., nurse: find vein, insert needle, etc.), may advance each other's roles or diminish them, leading to conflicts.

Sequenced SVOs between roles and their associated deliverables (e.g., drawn blood=>negative blood results=>discharge from urgent care) may be expressed in the system as contracts of gives and gets between roles (dyads). The gives and gets of a contract may be tracked, used to calibrate a value for the contract in each respective user's attribute profile, sequence a collaboration, flag a conflict and other various purposes. Various types of conflicts may be flagged by various methods in the example embodiment. For example, a conflict may be flagged by failure of role to execute SVOs associated with the role (i.e., evidence via predicates above a threshold and inference used to predict causes of failure). A basis for identifying and quantifying conflicts (e.g., via contracts between roles expressed as sequenced SVOs) as role deficiencies may be established. Once deficits in role related SVOs (skills, tasks, deliverables, requirements) are identified, actions may be identified that reduce or eliminate role deficiencies. In other words, conflicts may be resolved by actions (SVOs) that fulfill roles.

In the example embodiment, inputs into the Actualizer may include choices for actions from an index of Narrative Segments, choices for communications strategies from an index of communications strategy use cases, as well as values for user attributes and goals that may correspond to attributes and goals for the Narrative Segments, and which also may be derived, in part from Story Logs, which may include a history of user actions, and thus discoverable role data. The actions may be performed by the user or by others playing the same or different roles (which may be received also as Story Model Inputs). In the example embodiment, the Actualizer may optimize which choice of action for which user in a network of users may advance each user to each user's goals. In the example embodiment, this may result in no recommended change to a user's current course of actions as evidenced through Story Model Inputs or it may result in a recommended shift in which roles are played in which context in which time frame for which deliverables by which resource(s). In the example embodiment, depending on the choice made by the Actualizer, the agency of others may be recommended, and actions specified for a role important to goal-achievement for one user to be carried out by another user. As a very simple illustration, in the current example of the nurse, taking a patient's temperature may be performed by someone other than the nurse, provided the evidence of the patient's temperature is confirmed by the nurse who may be responsible for recording it on the patient's chart (e.g., example role requirements).

Figure 26A:
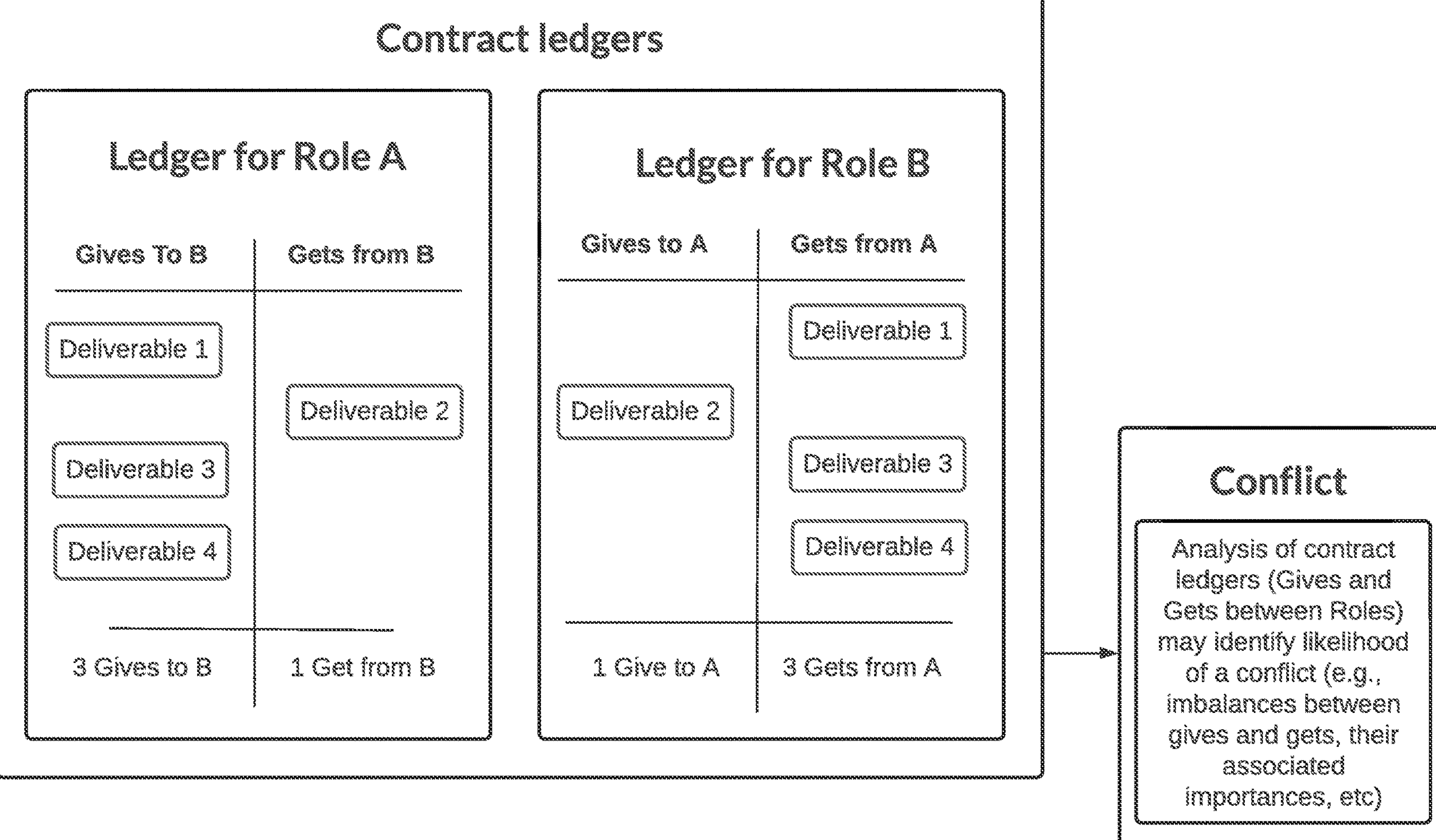
FIG. 26A illustrates Story Model—data types, particularly example aspects of a relationship between a Contract Story Data Type, a Role Story Data Type, and a Conflict Story Data Type.

FIG. 26A illustrates Story Model—data types, particularly example aspects of a relationship between a Contract Story Data Type, a Role Story Data Type, and a Conflict Story Data Type.

Recall that a Story Object may construct a Story Data Type from encoded dependencies on other Story Data Types. FIG. 26 A shows an example element of the Contract Story Data Type, a contract ledger, constructed by a Contract Story Object. The contract ledger may have a dependency, as shown, on various Story Data Types, including a Deliverable Story Data Type and a Role Story Data Type. In the example embodiment, a Contract ledger may be used for various purposes, including for example to establish an inspectable set (via narrative template) of required exchanges of deliverables between roles (e.g., via a Narrative Segment developed to dispatch specific Contractual actions). Another example purpose of the Contract ledger may be to "discover" existing contracts not formalized ahead of time but for which evidence in the Story Model Inputs exists and may be "discovered".

As also shown, a Conflict Story Data Type may have dependencies on the Contract Story Data Type. Through analysis of the Contract Ledgers, a Conflict Story Data Type may track and analyze various imbalances in the Contract Ledgers, for example, in exchanges ("gives" and "gets") of Deliverables between Roles. In the example embodiment, the Conflict Story Data Type may use various methods to quantify imbalances between Roles (e.g., number of exchanges between Roles in a Contract, importance of a Deliverable to completion of a Contract, and so on). The analysis in turn may be used by various Story Model functions, including for example, impact analysis as well as by various Story Data Types, including for example the user's Current Story.

Figure 27:
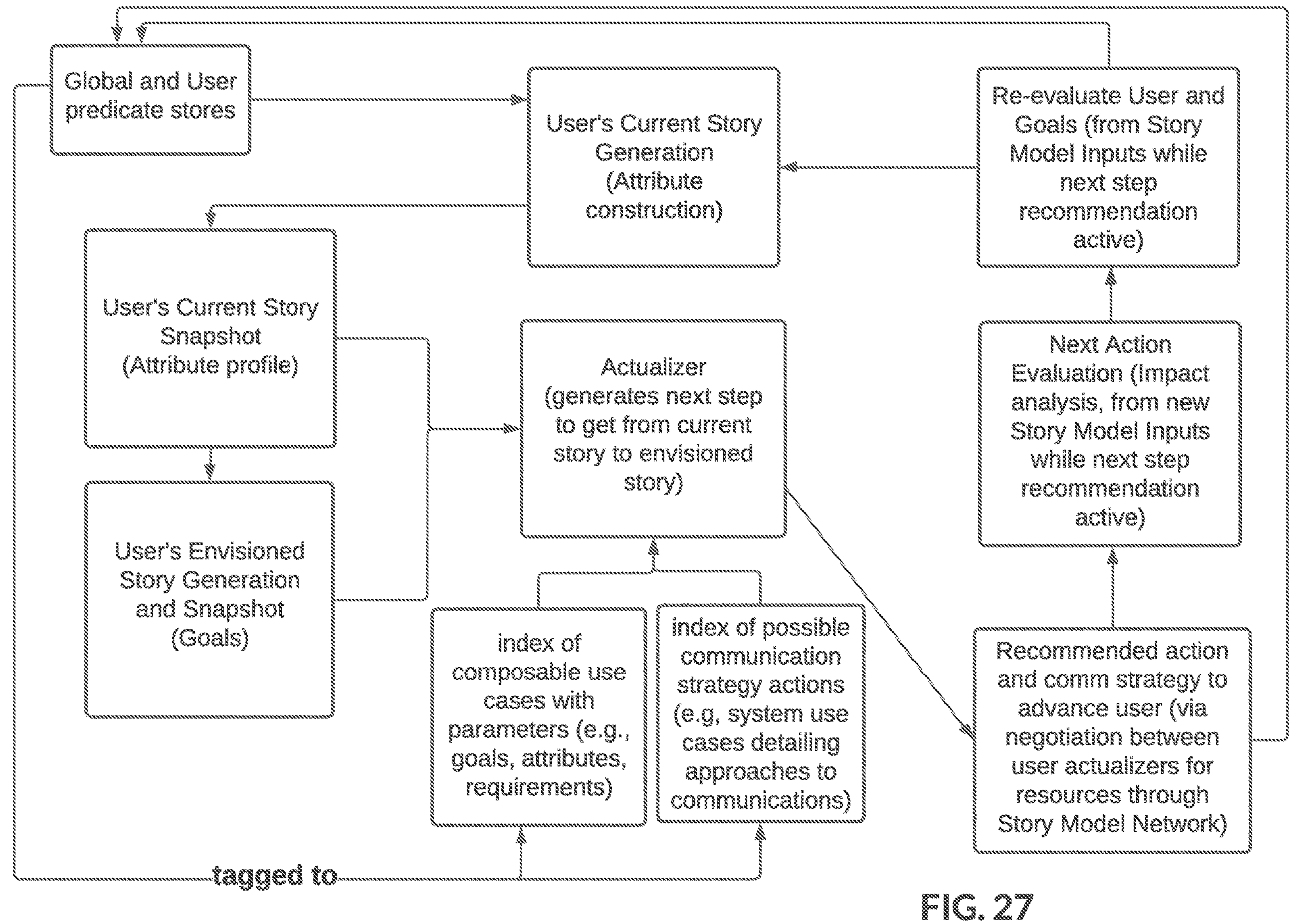
FIG. 27 is a high-level flow diagram showing continuous inputs and outputs of the Story Model in the example embodiment.

FIG. 27 is a high-level flow diagram showing continuous inputs and outputs of the Story Model in the example embodiment. In the diagram, Story Model Inputs, including extracted predicates stored and tagged to Narrative Segments (use cases) and to Communications Strategy use cases, flow into construction of the user's current and envisioned story. Next, snapshots from the user's current and envisioned story, as well as an index of Narrative Segments and an index of Communications Strategy use cases tagged to predicate stores, may feed into the user's Actualizer. In turn, the Actualizer may produce a recommendation for the user, described as the best next action, which may be the Narrative Segment chosen by the user's Actualizer for the user (e.g., targeted Narrative Segment). A recommendation for how best to structure the communication of the best next action recommendation may also be generated by the Actualizer. Next, the recommendation (Narrative Segment) of the Actualizer may be communicated to the user (not shown in this high-level diagram), based on the recommended communications strategy. Whatever action the user takes after receiving the recommendation may then be received as datastream inputs processed as new Story Model Inputs, which in turn may be used to update the user's current and envisioned story, until the user action completes (Note, not shown in this high-level diagram, but shown in other diagrams, are the action window, how drift may be handled, negotiations with other user's Actualizers, and various other processes described elsewhere). While the action window is open, impact analysis may occur. During impact analysis, ongoing updates to the user's current and envisioned story associated with the user's action after the user receives the Actualizer's recommendation may be continuously analyzed. In the example embodiment, this analysis may be to see if user's actions from the recommendation, gleaned from Story Model Inputs and continuously constructed into updated user Current and Envisioned Story, may result in the attribute scores moving closer to the target (user goals). This analysis continues, for each update of attributes and goals from user inputs, until the user's action may be considered complete, which may be determined by comparing Story Model Inputs against recommendation requirements. When an action may be deemed completed, the action window may close, and the updated current and envisioned story constructed continuously from new Story Model Inputs from the user during the open action window may now be used by the Actualizer to render the next recommendation, and a new action window may open. This generally describes a process that repeats continuously, and is provided as an overview.

FIG. 28 illustrates Story Model—stores, particularly user and global predicate stores. See descriptions in FIG. 28 diagram.

Figure 29:
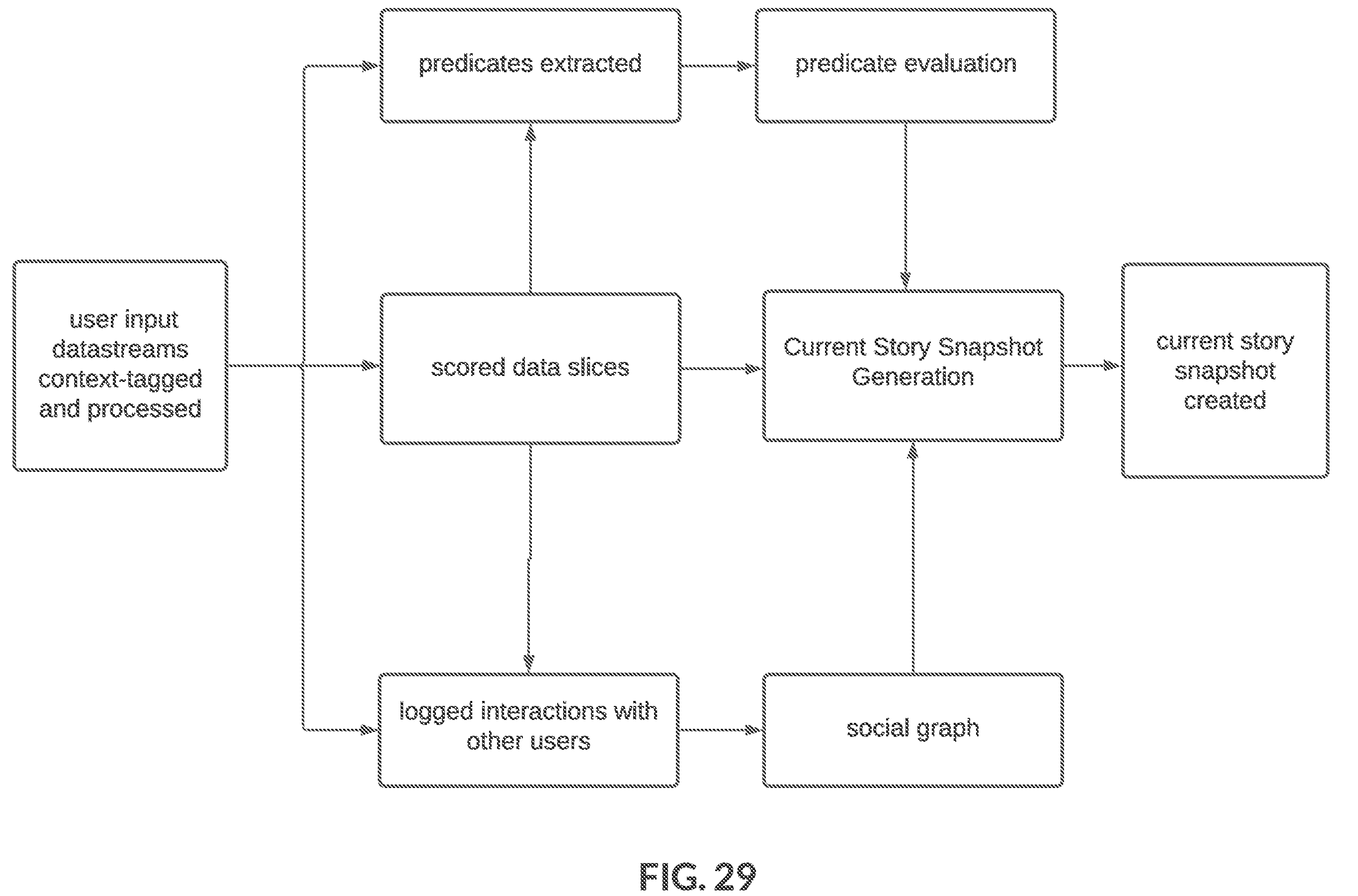
FIG. 29 illustrates a flow in the Story Model, particularly during Current Story Generation (Attribute Construction).

FIG. 29 illustrates a flow in the Story Model, particularly during Current Story Generation (Attribute Construction). Feeding into attribute construction/current story may be Story Model Inputs processed from user interactions. These inputs may represent several streams of universal data types, including Story Data Types, as evidence to be constructed into attribute values. These streams flow into the Current Story Snapshot Generator, as described below, to produce a snapshot of current attribute values from the input streams.

During Current Story Generation (Attribute construction), one stream of Story Model Inputs may be predicates extracted from real time analysis of data slices (video calls, images, text communications like notes/comments, etc.) related to individual attributes. These may be expressed as predicate graphs. In this stream, user, Narrative Segment, Communications Strategy use case, and user network (contacts) level predicate graphs may be evaluated to construct marginal probabilities of certain higher level attributes. Evaluations of these predicate graphs and resolved entities may be validated and characterized as a score (e.g., fitness=0.3). These scored predicate graphs and resolved entities then may feed into the Current Story Snapshot Generator for construction into attribute values.

Meanwhile, another stream of Story Model Inputs may be data slices for various platform interactions (audio, video, text) scored quantitatively by classifiers in a number of areas (financial QoL, anxiety level, etc.). Further, like all data, a predicate representation of this score may be generated and committed to storage, informing Story Model choices throughout the system. The score itself may already be a validated instrument and so can be directly passed through to the Attribute Construction process, where it may serve as an attribute in the user's current story snapshot in its own right.

Another stream of Story Model Inputs may comprise logged and graphed information about a user's social attributes, which may include Story Data Types (e.g., roles). This "social" graph may be derived from the user's Network (contacts), based on the user's behaviors on the platform and social media integrations. In the graph, each node may represent a user and each edge a type of relationship with an associated strength between users. (In this way, roles may be encoded relationally into an attribute). Relationship characteristics (openness, reciprocity, contact frequency, contact depth, topics discussed) may be identified and ascribed a value. This stream also may feed into the Current Story Snapshot Generator.

Figure 30:
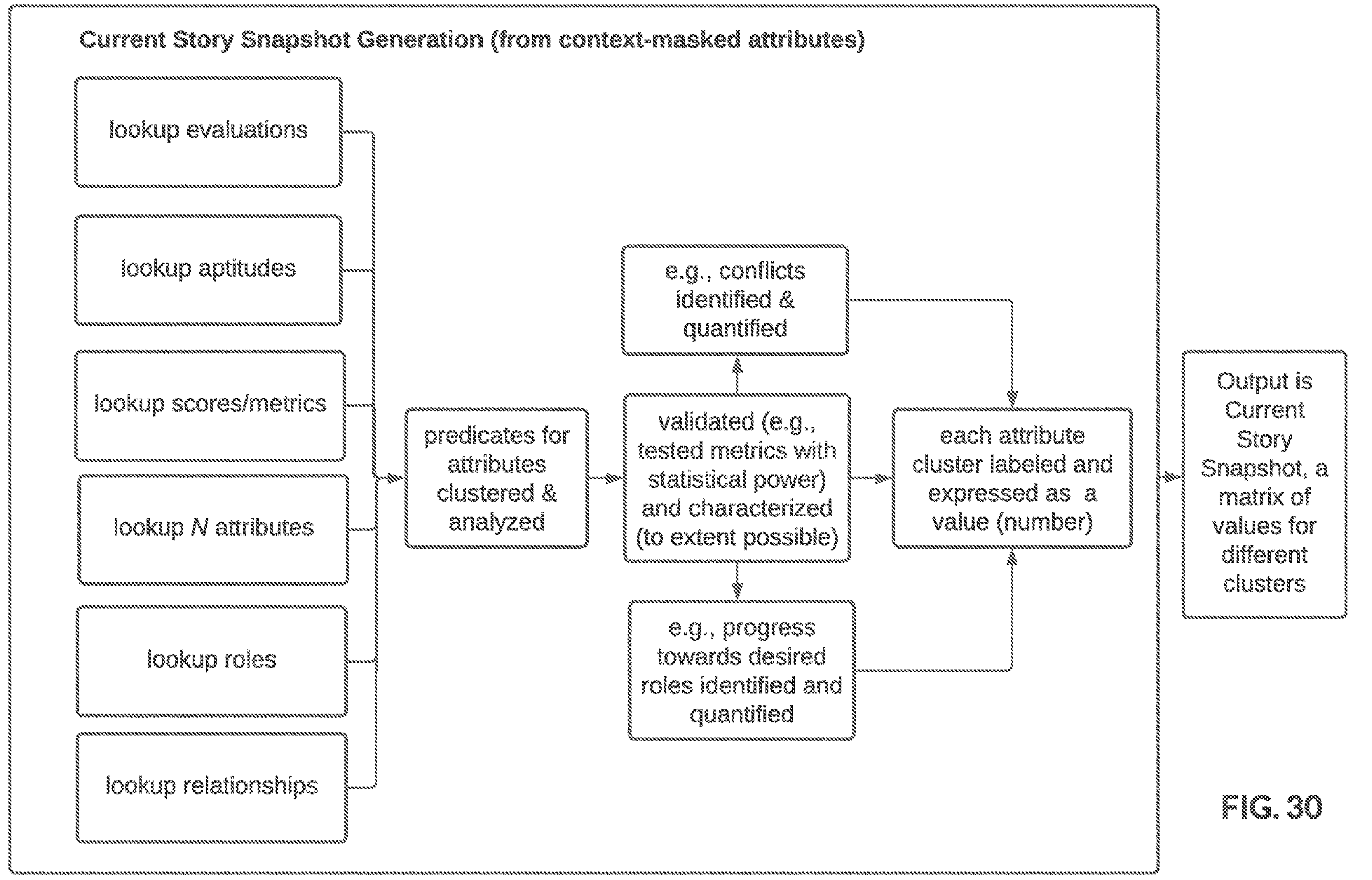
FIG. 30 illustrates a flow in the Story Model—models, particularly Story snapshot generation from attributes (context-masked).

In the example embodiment, a Current Story Snapshot Generator, as illustrated in FIG. 30, may construct attribute values from the above-described and evaluated incoming streams. These streams may include global scores produced by classifiers, evaluated predicates, and the user's relationship/role graph.

FIG. 30 illustrates Story Model—models, particularly Story snapshot generation from attributes (context-masked). See descriptions in figure.

Figure 31:
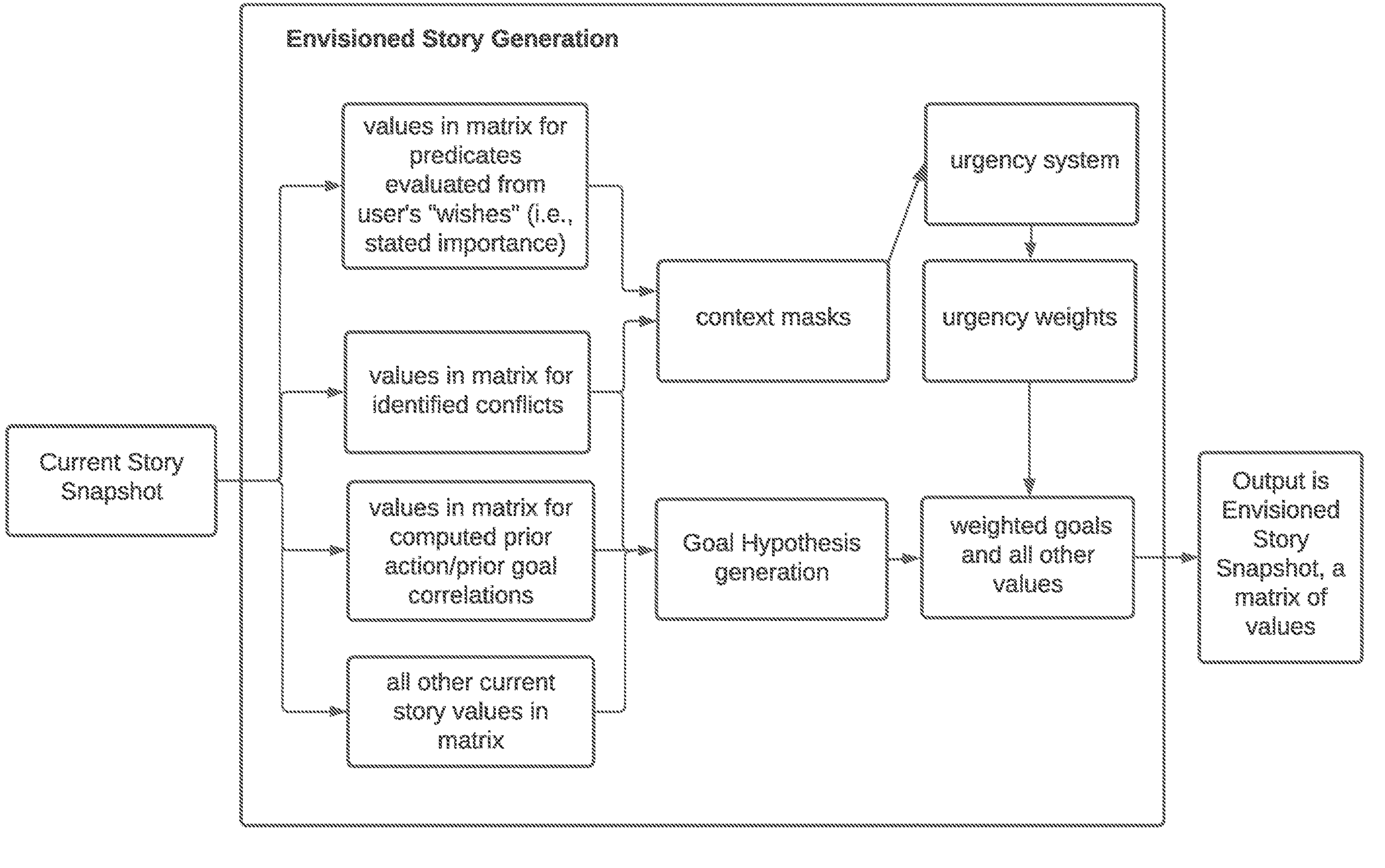
FIG. 31 illustrates a flow in the Story Model—models, particularly Envisioned Story Generation and Snapshot.

FIG. 31 illustrates Story Model—models, particularly Envisioned Story Generation and Snapshot. See flow and descriptions in figure.

Figure 32:
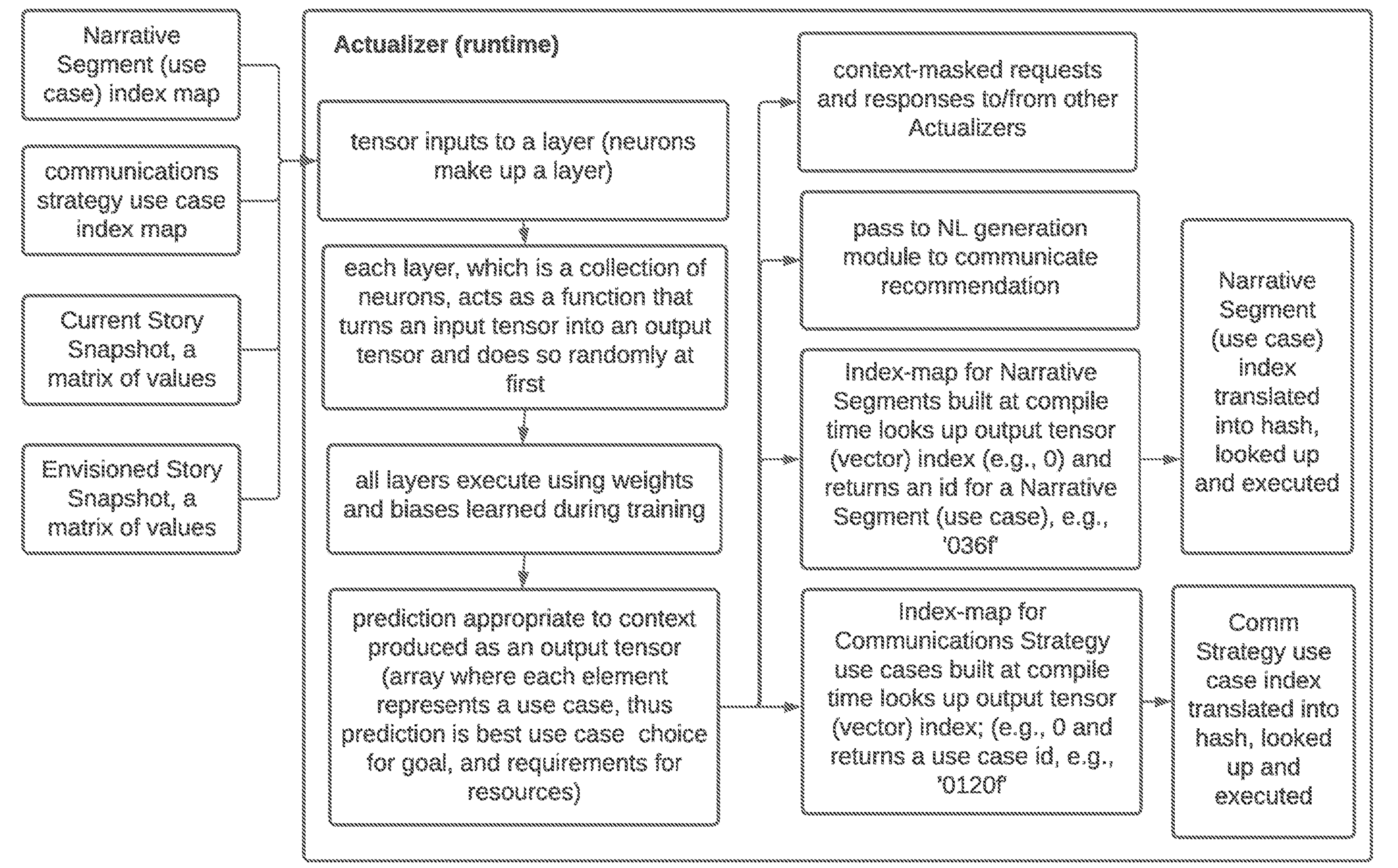
FIG. 32 is a flow diagram showing inputs and outputs of what may be referred to in the example embodiment as the Actualizer (runtime).

FIG. 32 is a flow diagram showing inputs and outputs of what may be referred to in the example embodiment as the Actualizer (runtime). See flow and descriptions in figure.

Note that the outputs of the Actualizer may be the result of an evaluation of all inputs, including a user's Current Story Snapshot, Envisioned Story Snapshot, available Narrative Segments and Communications Strategy use cases. During its evaluations, the Actualizer may determine that the best next action given a current context may resolve a particular conflict, or a multitude of conflicts, surfaced in its computations in favor of a recommendation that takes into consideration all relevant possibilities known to or computed by the example embodiment. As it relates specifically to the Actualizer's recommendation, it may not be the case that just because an action may appear to decrease goal progress in the short term, that it can't be beneficial to achieving a goal. A negative local impact may not be the same thing as a negative global impact. In the example embodiment, the Actualizer may learn sequences of actions. An action may have a negative local impact, but still be positive, and the ability to learn this may represent a more realistic approach to representing actions that take into account both short term contexts as well as longer term goals.

Figure 33:
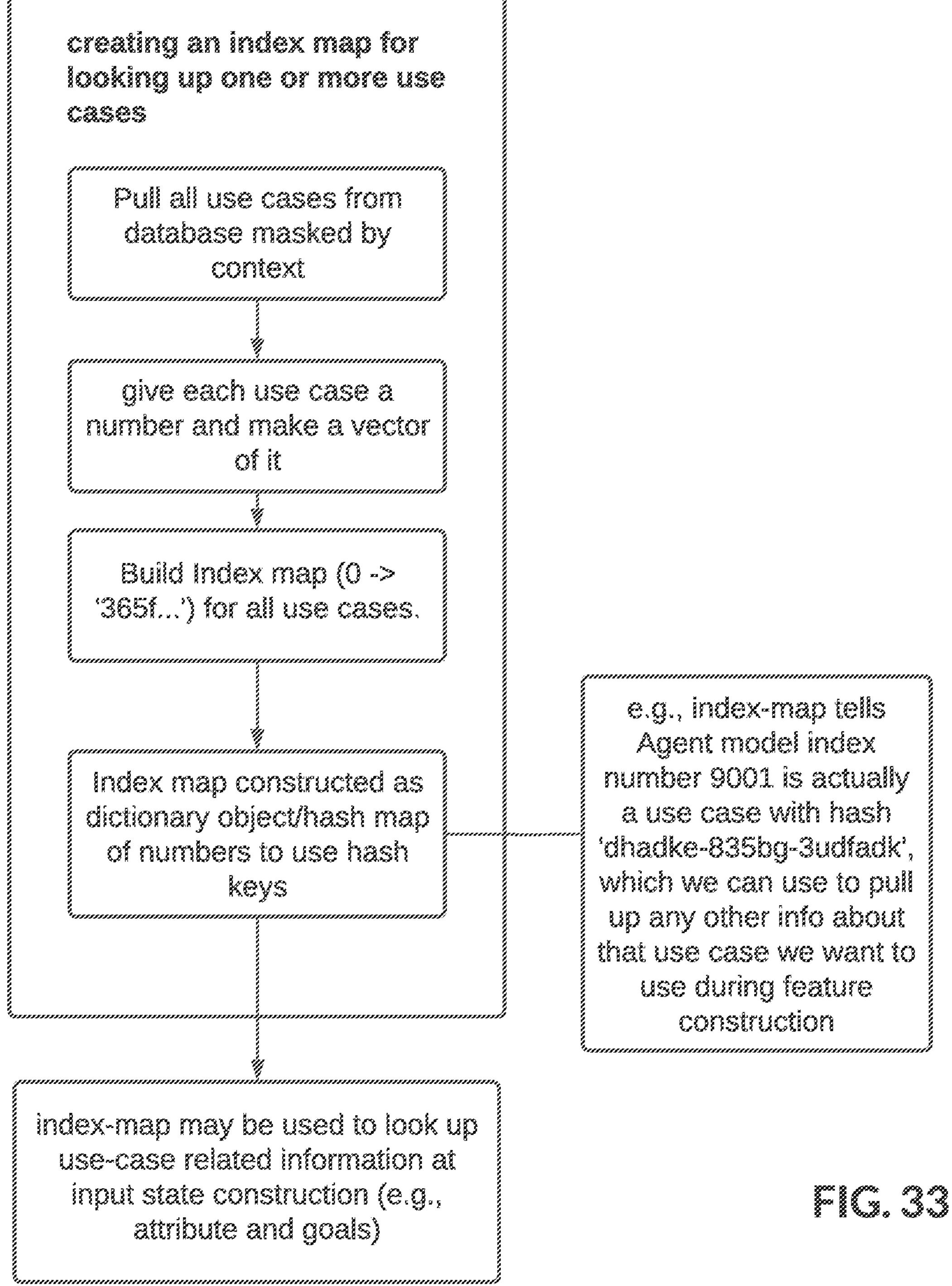
FIG. 33 illustrates a flow diagram in the Story Model—models, particularly index map for use cases.

FIG. 33 illustrates Story Model—models, particularly index map for use cases. See flow and descriptions in figure. Note, index maps may be created for Narrative Segments and for Communications Strategy use cases.

Figure 34:
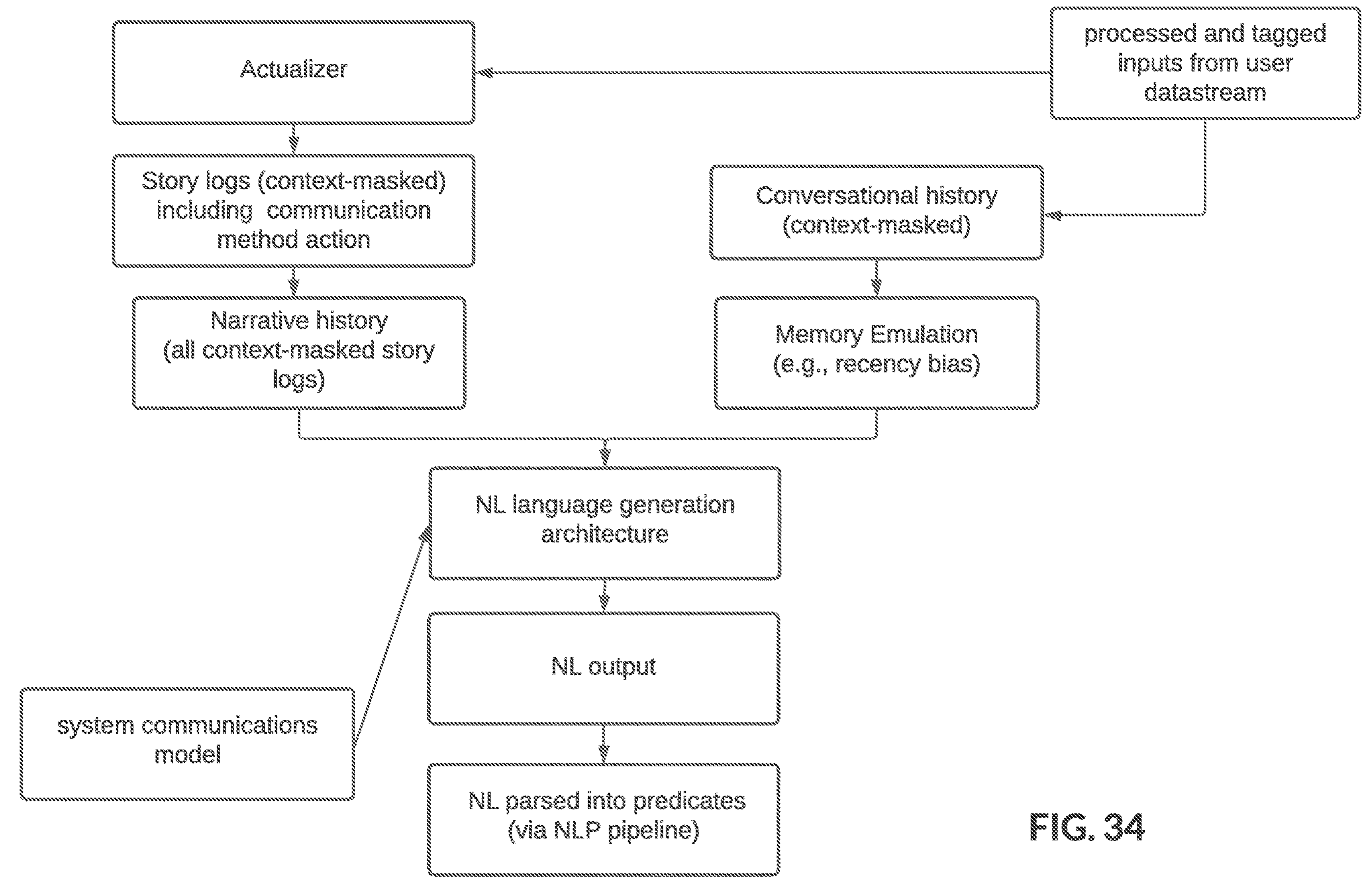
FIG. 34 illustrates a flow in the Story Model for Translating Best Next Action Steps into Natural Language communication.
Figure 44:
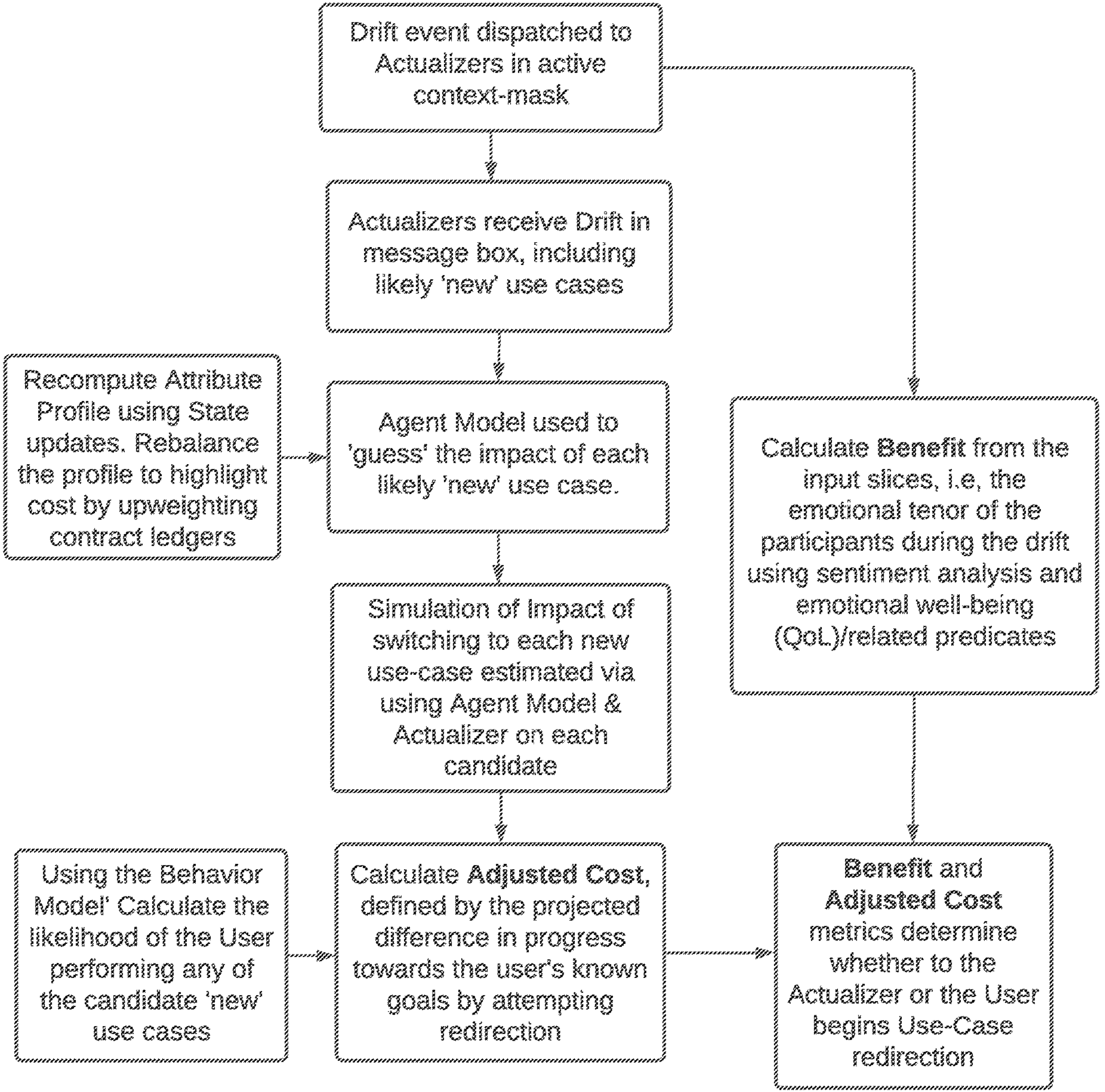
FIG. 44 illustrates a flow in the Story Model—models, particularly Desirability and Drift Amelioration.

FIG. 34 illustrates a flow in the Story Model for Translating Best Next Action Steps into Natural Language Processing communication. As illustrated in FIG. 44, there may be at least two flows of inputs into the NL language generation process for the outbound communications of the best next action.

One input flow may be from the Actualizer, which may produce a recommendations for a best next action as well as a use case for how best to communicate it. Recall that in the example embodiment, the Actualizer may choose a Narrative Segment as the best next action for a user, based on the user's Current Story and Envisioned Story snapshots as well as Narrative Segments, including user-customized Narrative Segments, that may be available to the Actualizer for optimization. Recall also that the Actualizer may choose a Communications Strategy use case for how best to communicate the best next action. More specifically, In FIG. 34, when the Actualizer makes a Best Next Action (Step) recommendation, a "Story Log" entry may be created, capturing all state when it is surfaced, as well as the model's recommendation and best method for communicating it (Communications Method ID). The Story Log also may identify which part of the code may be executing specializations of the active use case at the time of the recommendation. See FIG. 35 for Story Log detail and FIG. **4*a*** for Communications Method ID details.

From the story logs, a narrative and communications strategy history may be determined. Specifically, narrative history may be determined from the tensors produced by the current and envisioned story (attribute profile/goal state) logs from the Actualizer as well as from internal use case specialization states stored as histories in the database. This narrative history, which may include all context-masked story logs, then may feed into the NL generation architecture of the example embodiment.

Meanwhile, another flow into the NL generation architecture may begin with Story Model Inputs and the user's conversational history, which may be context-masked. Note, conversational histories may be created for each interaction between a user and the system as well as between different users who use the system to interact with each other. This conversational history may include log information, but also transcripts, extractions and other evidence of an interaction tagged to the user, communications modality and device. Recall also, in example embodiment, communication between the system and users may be bi-directional, and it may involve multiple users using multiple modalities (e.g., chat, text, voice, video, pictures or other communications modality).

Referring still to conversational history, since there may be a message history, the example embodiment may know the context of the current interaction (e.g., conversation) and be in a position, if needed, to generate Natural Language (NL) action redirections.

Having established a conversational history, which may include current Story Model Inputs, the example embodiment may weight more significantly in its analysis the current interaction than past interactions in weighing "what to say" to the user. This step may require Memory Emulation. In the example embodiment, memory emulation system may use an attention like mechanism to weight the more proximal conversational context more highly prior to producing NL output and outputs tensors. An "attention like mechanism," known in the art, may take vectors and compute pairwise dependencies and prioritize certain combinations over others.

Next, the full conversational context and narrative history may feed into a vectorization layer of the NL generation model (e.g., transformer such as GPT-3) which may combine the Actualizer, conversational, and Narrative Segment (use case) inputs into a tensor.

This tensor may serve as a context input into a NL generation model architecture, which generates a "next" response in the currently active user conversation.

As this model may be trained both on a large raw text corpus, and transfer learned into system's communications modality (e.g., chat), the system may condition against the elements of the attribute profile to force *topical* responses from the model. For example, say that the example embodiment may need to surface communication about the next best action step that has been surfaced. The example embodiment may accomplish this through context conditioning. At inference time (queries), the system may modify one part of the input; the system may massively increase the weight associated with the part of the context that refers to the most recently chosen action step. Due to that extra conditioning step, the example embodiment may force the model to prioritize one piece of context, which may cause the decoded new text to be focused on that topic.

NL output may then be generated. Raw NL output may be captured, and parsed as Story Model Inputs into new predicates, and thus become part of the next iteration's state.

In sum, FIG. 34 illustrates a method for how the example embodiment may determine what it communicates, and how, including what it may determine is important to comment on in a certain way. The example embodiment may use various methods to communicate with users.

Figure 35:
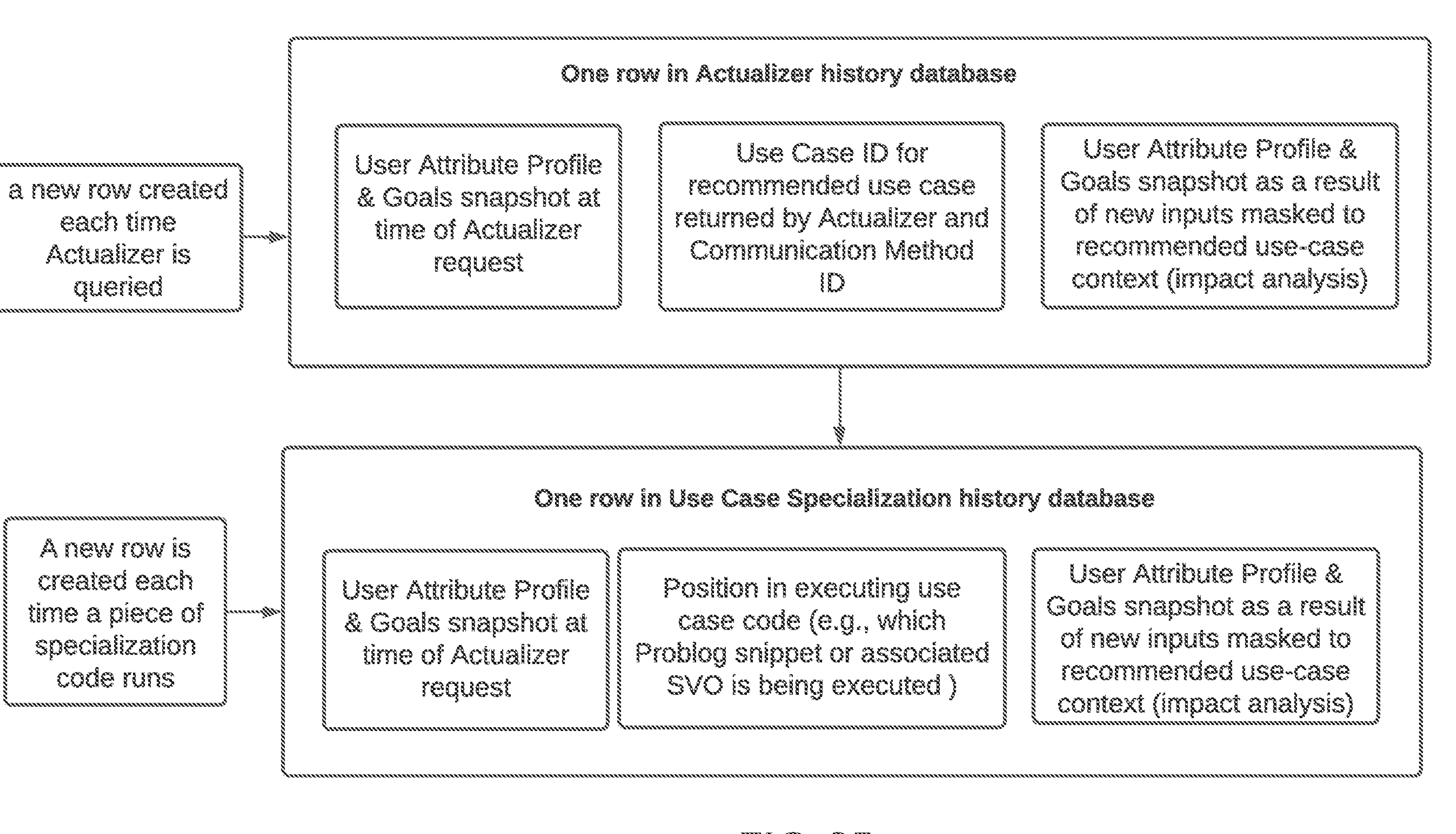
FIG. 35 illustrates Story Model—models, particularly a Story Log (for each context mask).

FIG. 35 illustrates Story Model—models, particularly a Story Log (for each context mask). See flow and descriptions in figure.

Figure 36:
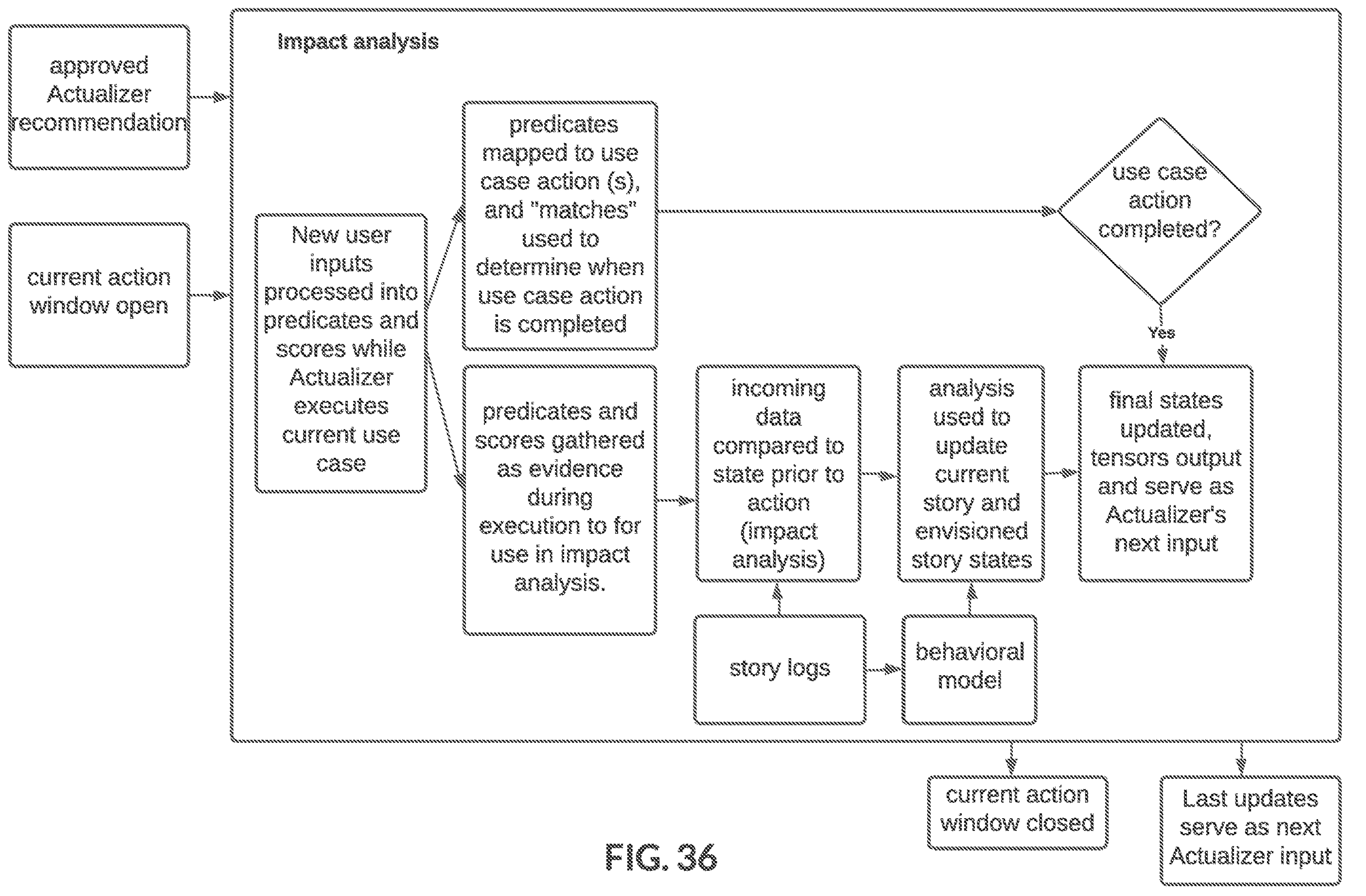
FIG. 36 illustrates the flow of Story Model steps during what may be referred to as impact analysis.

FIG. 36 illustrates the flow of Story Model steps during what may be referred to as impact analysis. In the example embodiment, impact analysis may occur after the user's Actualizer begins executing its recommendation for the user and ends when the recommended action may be completed. During impact analysis the impact of user actions on user attribute and goal values may be quantified continuously by the example embodiment. This continuous quantification may happen during what may be referred to as the action window, the period of time in-between activation of the recommendation and the completion of the recommended action.

To describe further what happens during the action window, recall that a recommendation made by the user's Actualizer may be the Actualizer's choice of Narrative Segment for the user, and that this may have dependent Narrative Segments also requiring execution (See FIG. 22). These may take time to execute. Additionally, if a user must perform the recommended action, this may take time. In the example embodiment, impact analysis may occur continuously during the action window. As FIG. 36 shows, during the action window, new Story Model Inputs from the user may be collected and processed, and as all Story Model Inputs, scores may be classified and new predicates extracted, and encoded as Story Data Types.

These new Story Model Inputs may be used during the action window as new evidence (e.g., from extracted predicates) for evaluation by the example embodiment during impact analysis. Specifically, these new Story Model Inputs may be compared as they are received to the state of the Current Story (user attribute values) and Envisioned Story (target attribute values, or goals) to when the recommendation currently being acted upon was made. The Current and Envisioned Story data, as well as record of actions, including current and prior actions, used for impact analysis may reside in the user's Story Logs. (See FIG. 35 for descriptions of Story Logs).

Further, Impact Analysis may furnish live data inputs into the behavioral model. While the action window is open, comparisons between recommended actions (e.g., by Actualizer) and actual actions (e.g., "observed actions" of the user based on the evidence of predicates from new Story Model Inputs), may be used to predict if a recommended action is the action taken, and to use this analysis to derive or interpret the importance of actions to the user. This derived importance, automated through inspection of the behavioral model and its outputs, may be used in the example embodiment as inputs into new, real-time attribute and goal value constructions—while the action window is open.

The results of the ongoing impact analysis of streaming Story Model Inputs during the action window may be used by the example embodiment to continuously update the user's current story and envisioned story, including new user goals. Each new update may also be compared against the prior update and the initial state, thus quantifying the difference in goal progress from previous actions, especially before the recommendation was made. Note, while these updates to the Current and Envisioned Story may happen continuously during impact analysis, anew recommendation may not be generated until the current recommendation actions complete, or fail (e.g., time out without a sufficient measured impact on the user's current story).

As illustrated in FIG. 36, predicates extracted from Story Model Inputs associated with the recommendation may be constantly compared to predicates associated with the Actualizer's executing recommendation, and may be used to determine when the recommended Narrative Segments may be completed.

When the recommended action may be deemed complete by the example embodiment through predicate analysis, the Current Story and Envisioned Story, which may be continuously updated during the action window, may be gathered as a sequence of snapshots and fed into the Actualizer for its next iteration of recommendations. In other words, the next state update for the next Actualizer choice may be the current state of the Current Story and Envisioned Story at the time the action is deemed complete. As a result of this continuous updating of new profiles/goal updates, updates may represent different states than initial states. It is this most recent state (post impact analysis), or sequences of snapshots of changing states, since the action window first opened, that may inform the next action chosen. The above may describe a core loop of the Actualizer (e.g., reinforcement learning agent trained on a strategy, or policy) and one characterized as in a constant state of iteration.

Figure 37:
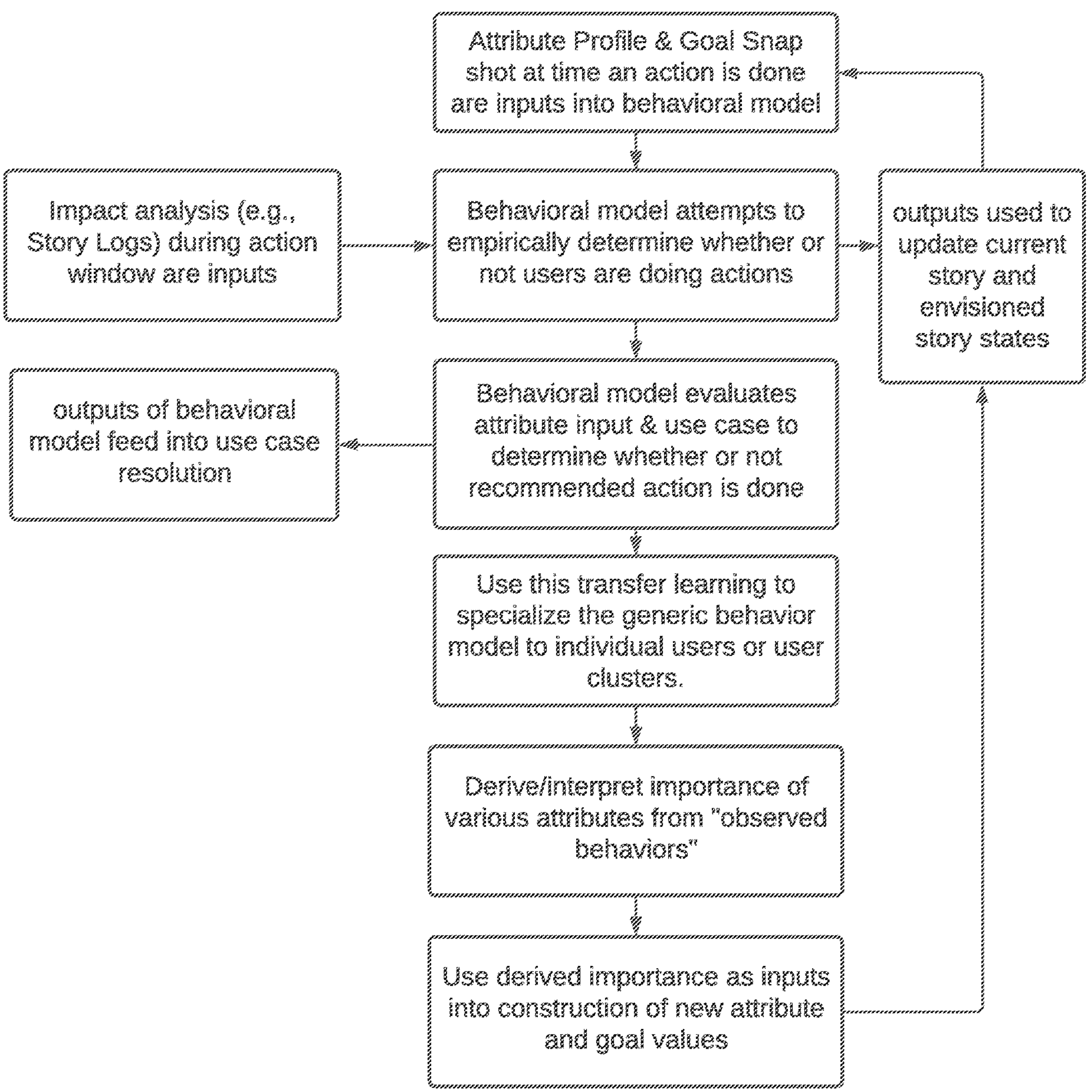
FIG. 37 illustrates a flow in the Story Model—models, particularly run-time use of Impact Analysis by Behavioral Models.

FIG. 37 illustrates Story Model—models, particularly run-time use of Impact Analysis by Behavioral Models. See flow and descriptions in FIG. 37, and also flow and descriptions in FIG. 69.

Figure 38:
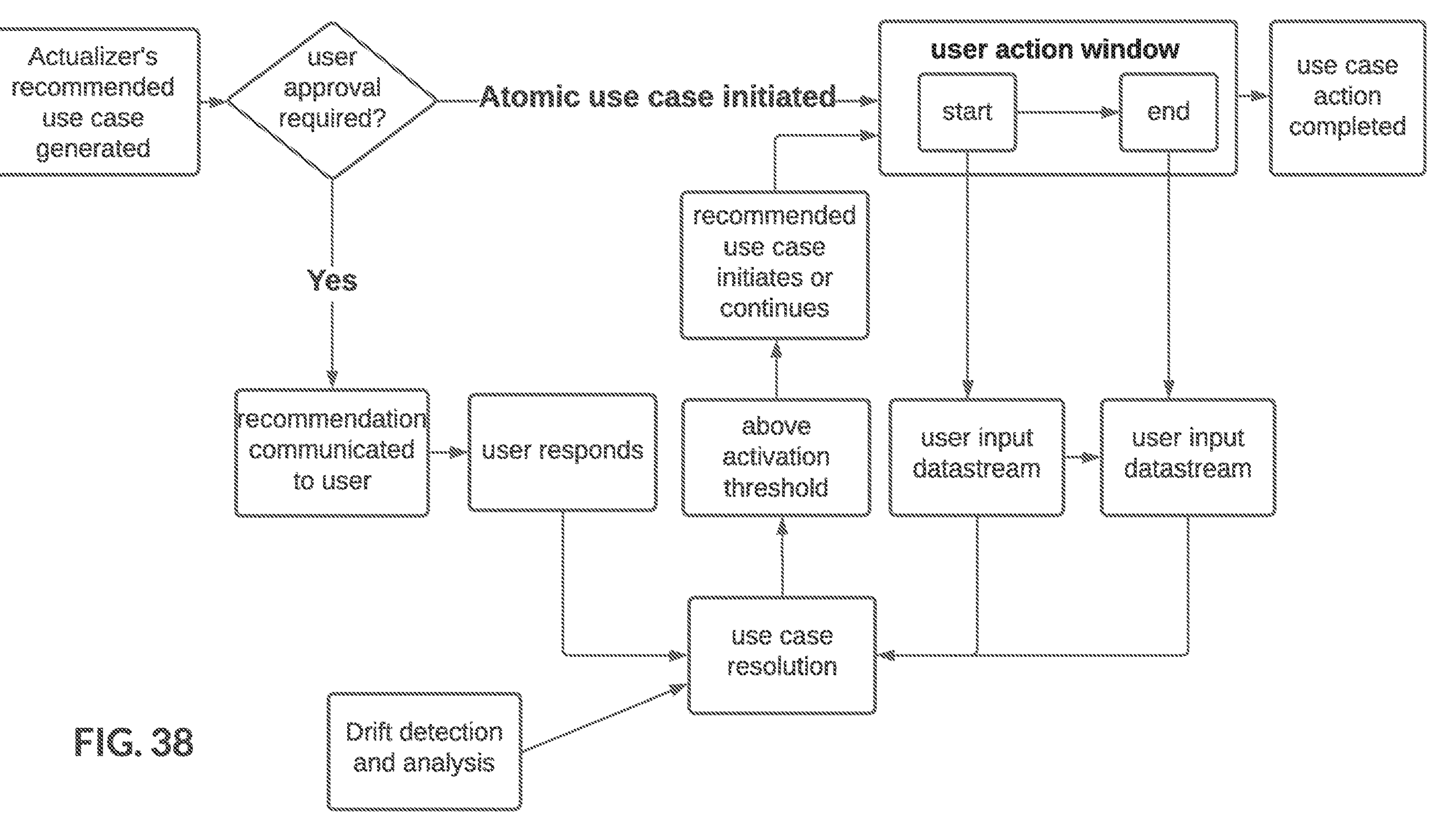
FIG. 38 illustrates a flow in the Story Model—models, particularly the system using input predicates to determine not only which use case to recommend but also if user is still in the recommended use case.

FIG. 38 illustrates Story Model—models, particularly the system using input predicates to determine not only which use case to recommend but also if user is still in the recommended use case. See flow and descriptions in figure.

Figure 39:
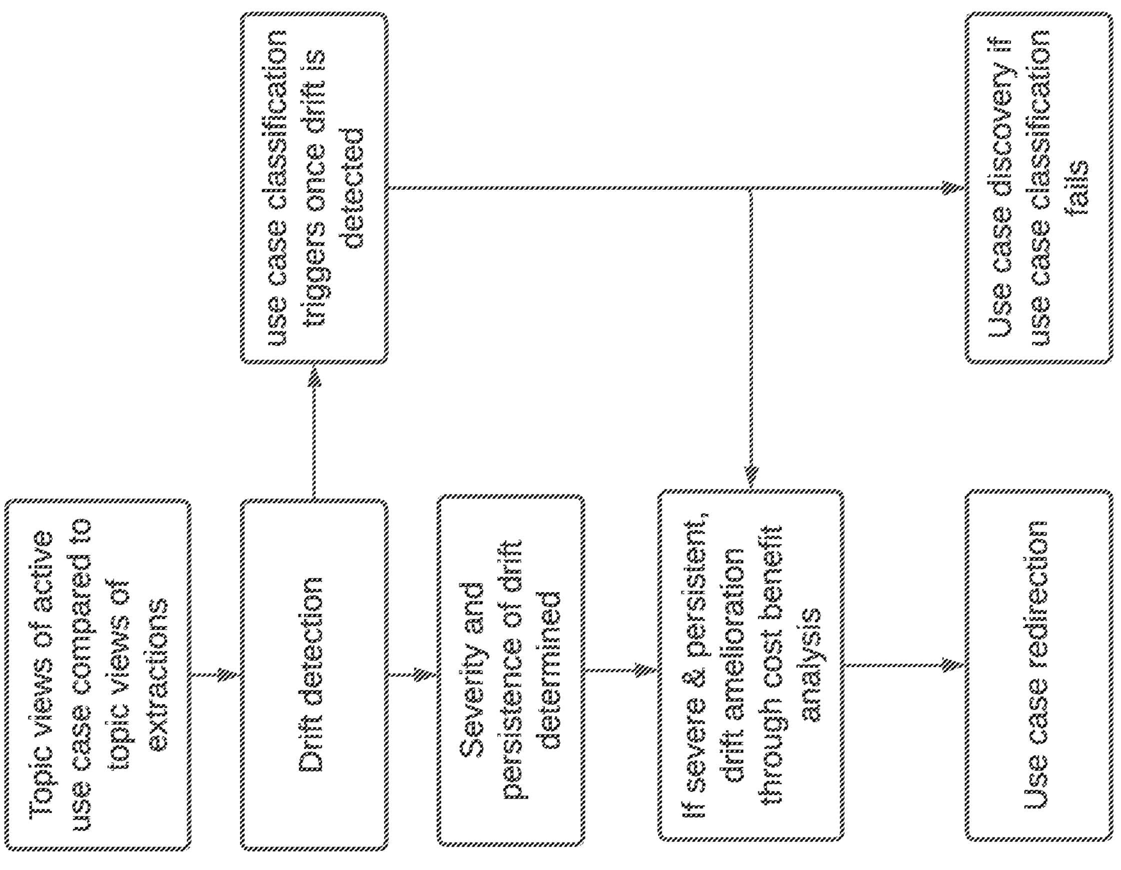
FIG. 39 illustrates a flow in the Story Model—models, particularly a summary of a use case resolution process after drift detected.

FIG. 39 illustrates Story Model—models, particularly a summary of a use case resolution process after drift detected. See flow and descriptions in figure.

Figure 40:
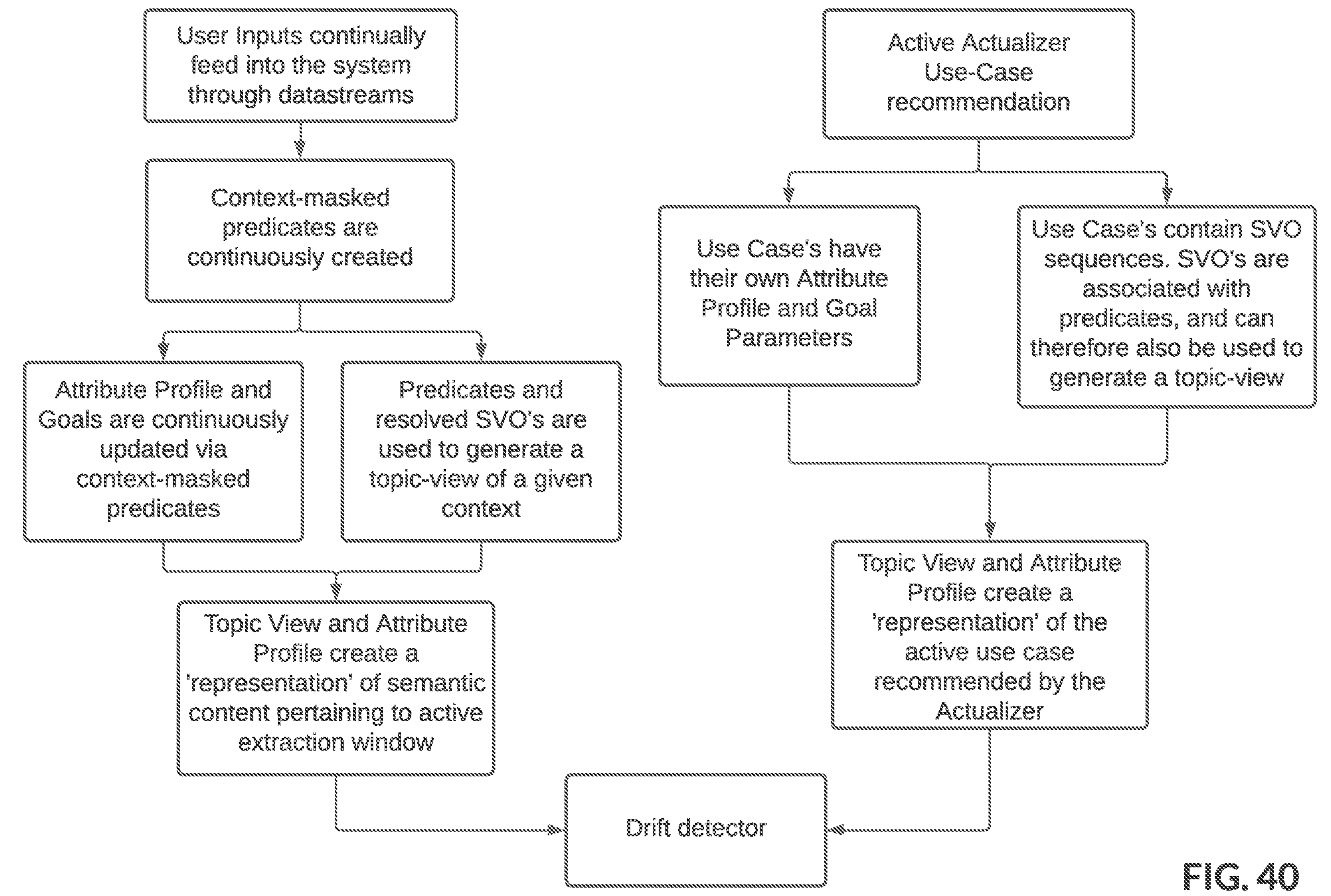
FIG. 40 illustrates a flow in the Story Model—models, particularly monitoring user Narrative Segment/use case.

FIG. 40 illustrates Story Model—models, particularly monitoring user use case. See flow and descriptions in figure.

FIG. 41 illustrates Story Model—models, particularly a Drift Detector—Content Similarity Profiler. See flow and descriptions in figure.

Figure 42:
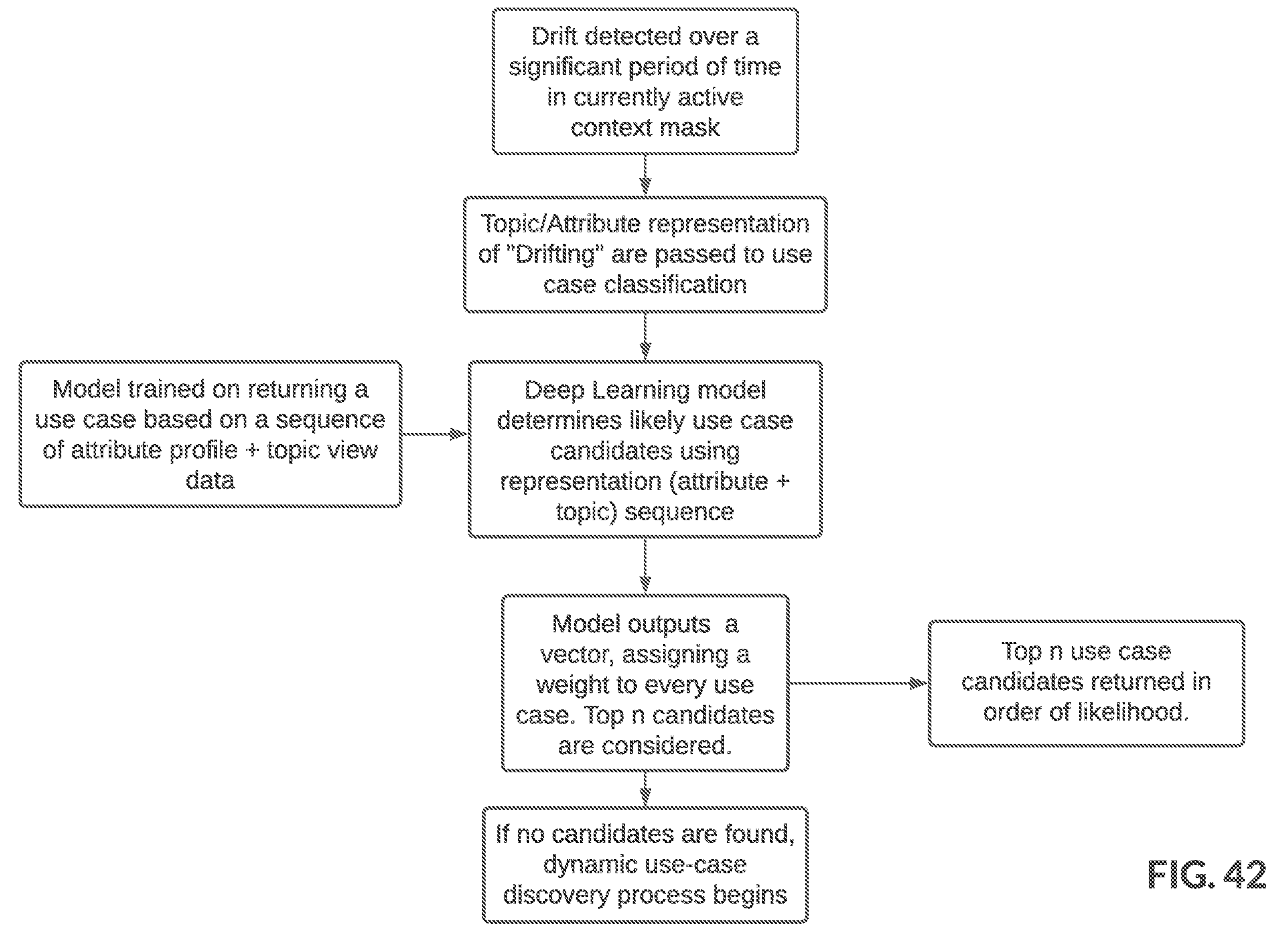
FIG. 42 illustrates a flow in the Story Model—models, particularly a Use Case Classification (after drift detected).

FIG. 42 illustrates Story Model—models, particularly a Use Case Classification (after drift detected). See flow and descriptions in figure.

Figure 43:
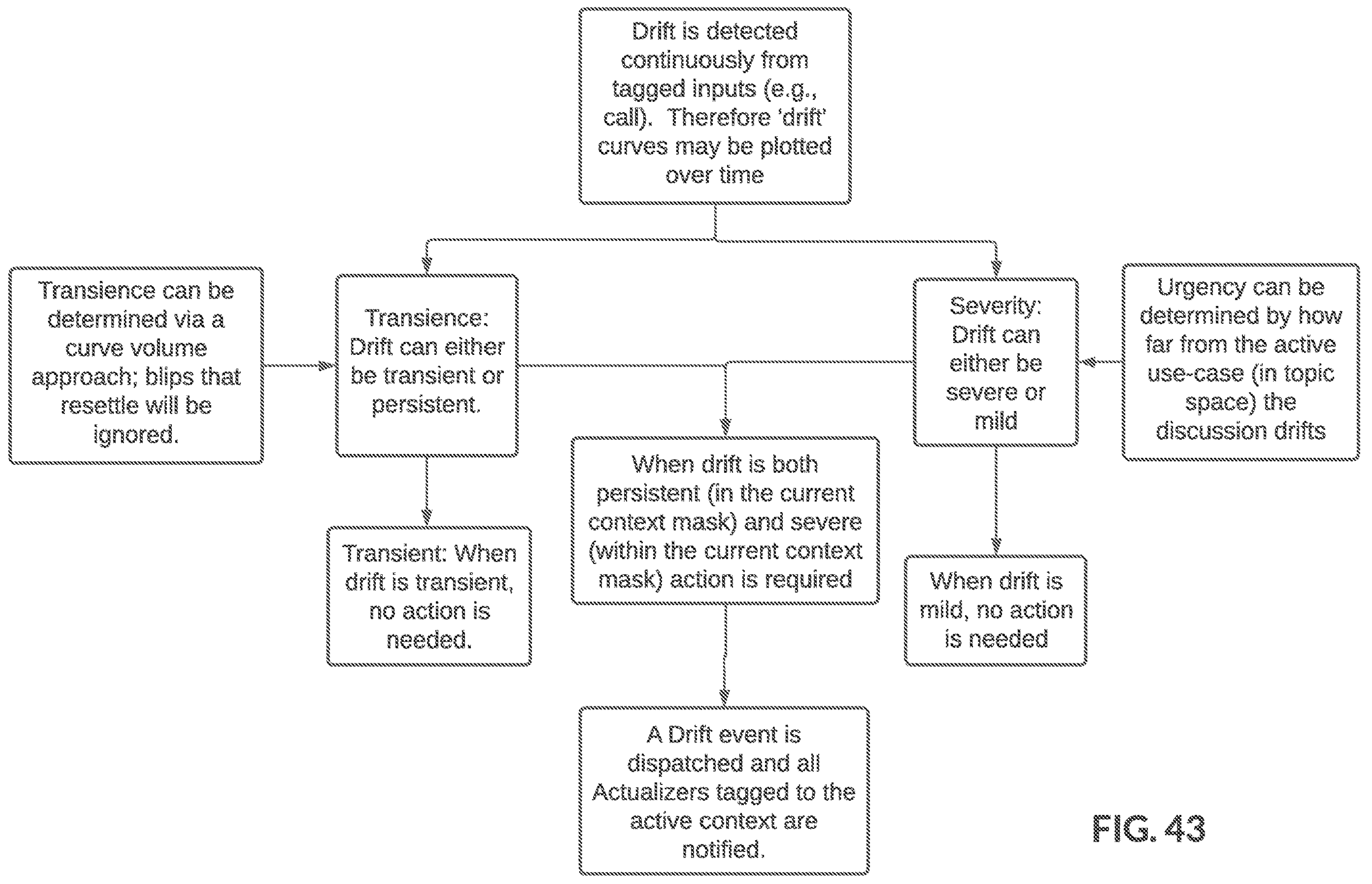
FIG. 43 illustrates a flow in the Story Model—models, particularly Handling Drift→Choosing an approach.

FIG. 43 illustrates Story Model—models, particularly Handling Drift→Choosing an approach. See flow and descriptions in figure.

FIG. 44 illustrates Story Model—models, particularly Desirability and Drift Amelioration.

Figure 45:
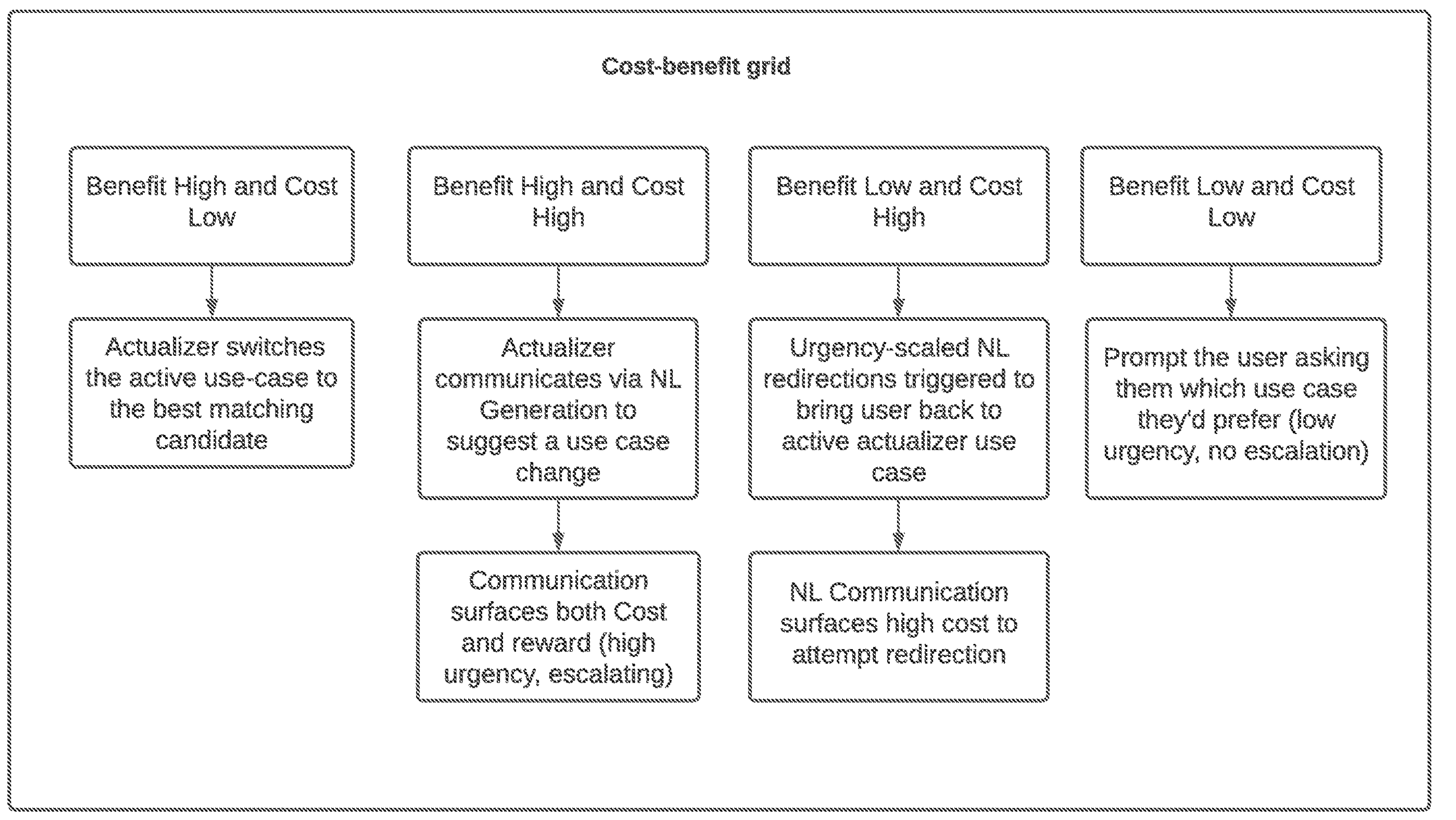
FIG. 45 illustrates Story Model—models, particularly Cost-Benefit assessment and actions that flow from it, including Use Case Redirection.

FIG. 45 illustrates Story Model—models, particularly Cost-Benefit assessment and actions that flow from it, including Use Case Redirection.

Figure 46:
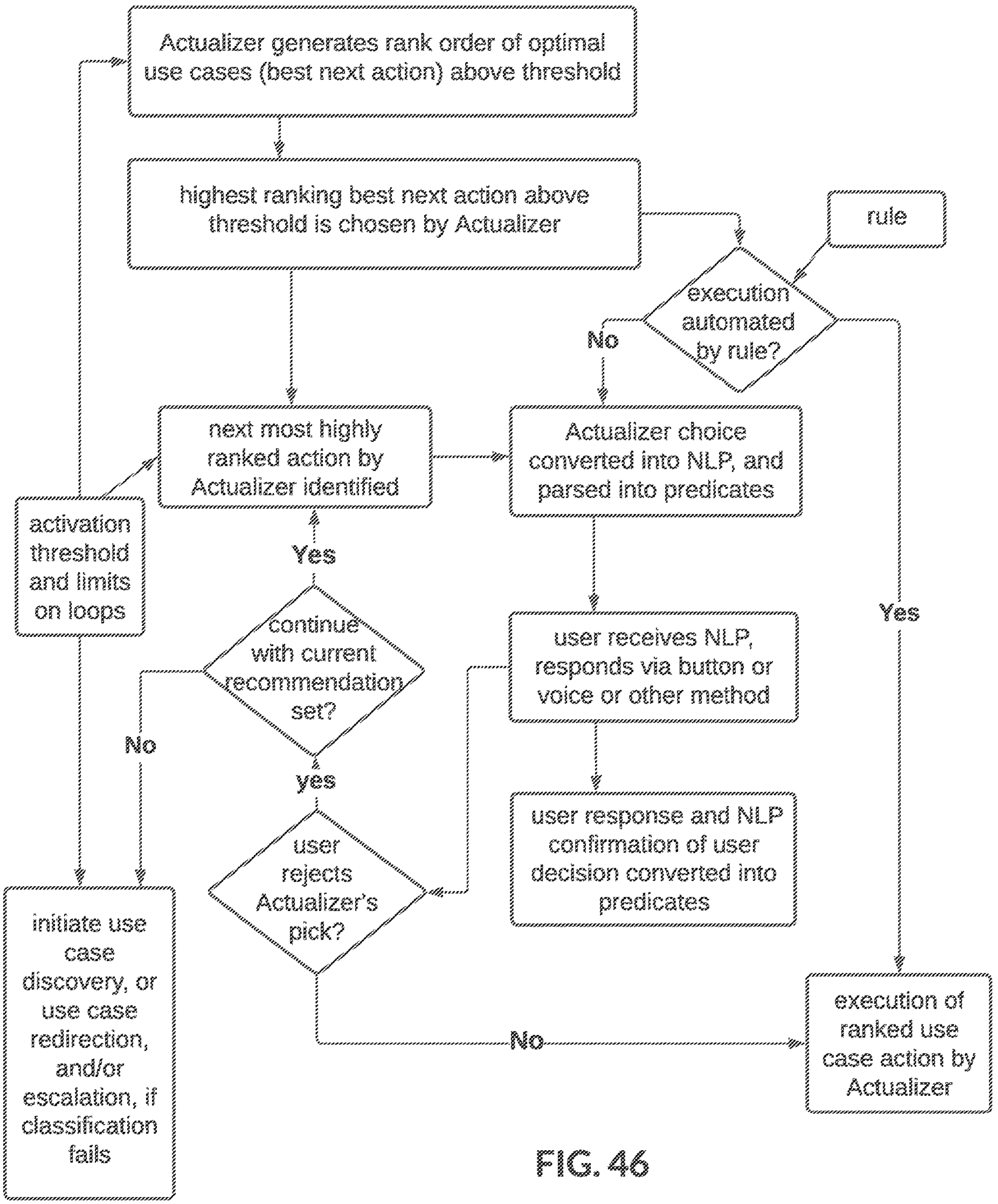
FIG. 46 illustrates a flow in the Story Model—models, particularly the system generating and displaying initial and multiple alternative recommendations based on user feedback during the action window.

FIG. 46 illustrates Story Model—models, particularly the system generating and displaying initial and multiple alternative recommendations based on user feedback during the action window. See flow and descriptions in figure.

Figure 47:
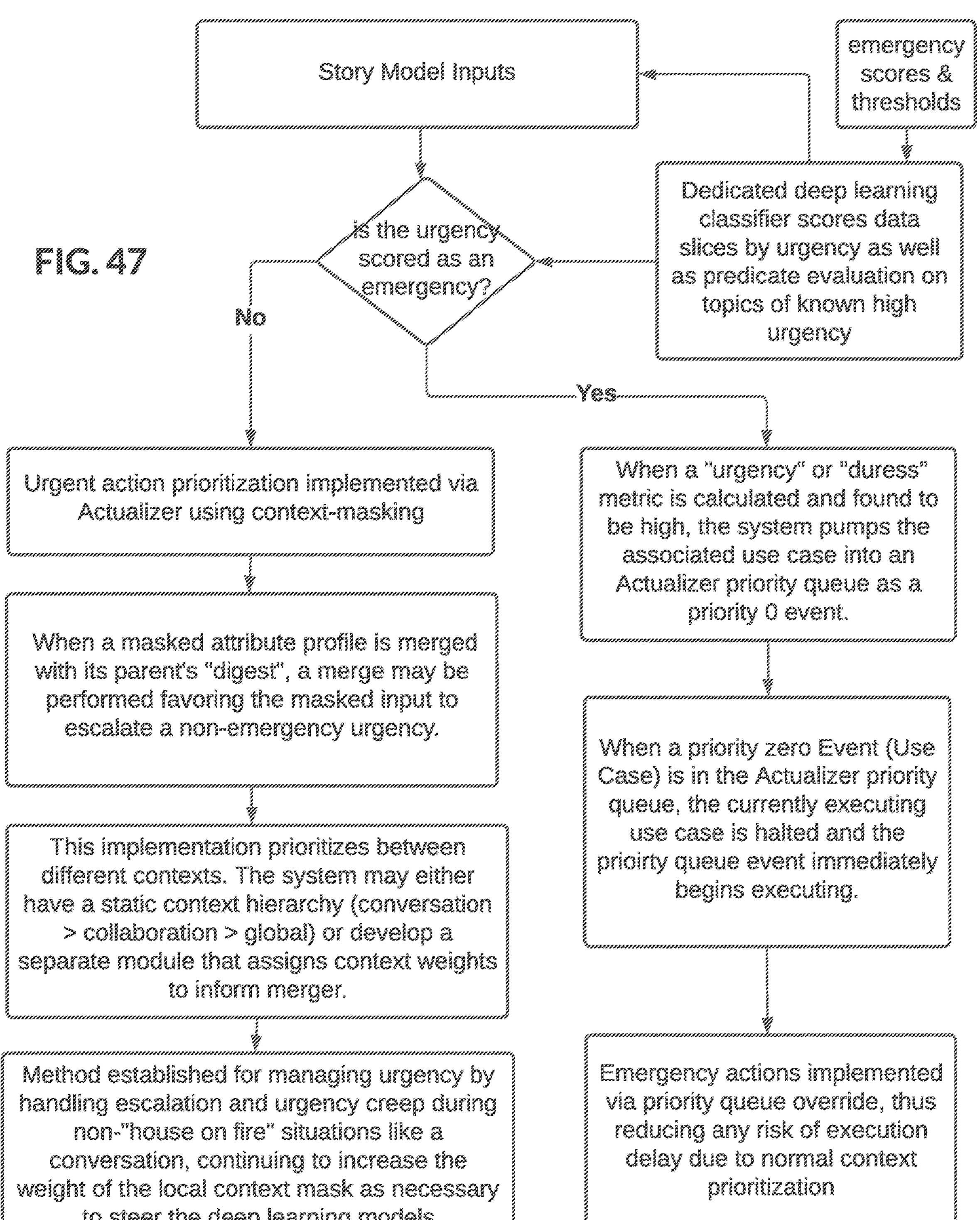
FIG. 47 illustrates a flow in the Story Model—models, particularly urgency & emergency handling.

FIG. 47 illustrates Story Model—models, particularly urgency & emergency handling. In the example embodiment, urgency and emergency may be handled as distinct concepts, and implemented in different ways, for example, via context-masking versus priority queue override. Handling urgency and emergency matters begins as illustrated Story Model Inputs, where a classifier trained to score data slices and evaluate predicates on topics of known high urgency renders an urgency score. If, as the next step, the urgency classifier score is determined to be above a threshold previously set for emergencies, the flow proceeds as shown in the right column containing the emergency steps. These steps essentially override Actualizer behavior and escalate tasks to 'emergency' status. This may be done to ensure there is reduced risk of execution delay due to context prioritization, which as will be described is the default routine for most non-emergency urgencies. When a "urgency" or "duress" metric is calculated and found to be high, the next step is for the system to pump an emergency use case associated with the urgency score into an Actualizer priority queue as a priority 0 event. Next, continuing with emergency steps, the currently executing use case is halted and the priority queue event immediately begins executing. Thus, in the foregoing manner, emergency actions implemented via priority queue override may reduce any risk of execution delay due to normal context prioritization. As to normal context prioritization, note also that every communication, or Story Model Input, may receive an urgency rating masked to a given context (See FIG. 55) and to what a person may say. Returning now to the figure, and specifically to steps shown after the urgency score is determined not to be for non-emergency urgencies, these steps may follow a normal context prioritization routine. This normal context prioritization routine may be performed by the Actualizer using context-masking. Referring next to the step performed by the Actualizer, when a masked attribute profile is merged with its parent's "digest", a merge may be performed favoring the masked input to escalate a non-emergency urgency. This leads to an implementation that then prioritizes between different contexts. At this next step, the system may either have a static context hierarchy (conversation>collaboration>global) or develop a separate module that assigns context weights to inform merger. Thus, through the foregoing, a method may be established for managing urgency by handling escalation and urgency creep during non-"house on fire" situations like a conversation, continuing to increase the weight of the local context mask as necessary to steer the deep learning models. The combination of features, which may include a dedicated classifier that may constantly score urgency from Story Model Inputs, may run concurrently, while independently, for a blended effect. In other words, while emergencies may be detected in the moment, so may non-emergencies and their escalations, if any, towards an emergency.

It may be noted here that the user's Actualizer, which may be tasked with recommending and executing only the best next action for the user, may base its recommendation on all of the user's Current and Envisioned Story Inputs, not only their requests. So, the Actualizer may not return a result based only on a user's stated request, but instead based on another pending request or in service of another goal. However, as described elsewhere through context-masking and the use of "digests", requests that may be non-emergency may be queued and resolved with dispatch by other models used by the example embodiment. The example embodiment may compare these non-priority (or non-emergency) requests to the goal parameters and attributes of available Narrative Segments (use cases) to determine which use case may then be executed by another method, such as probabilistic programming (e.g., Problog)

For example, from a user's Story Model Inputs, the Story Models may predict the user may be having palpitations (e.g., heart rate fluctuations detected from connected wearables) and increasing anxiety (e.g., high but not acute levels of anxiety detected by acoustic classifiers) similar to certain pre-acute stages of a condition, but not with enough statistical power to suggest either an emergency or a best next action in priority to another recommendation made already by the example embodiment.

To continue with the example of the person's racing heart, the context-mask and urgency blend (see context-masking in optimization) may suggest the person is actually at a ball game, which may mean that another role may also be being played, that of a sports fan, and that this may explain the person's racing heart, not simply the person's other potential role as a heart patient. If the user may express a wish, processed also as Model Inputs, say "Heavens help me", it may be determined that this statement is not an emergency, even if scored for low emotional quality of life and uttered by someone who may be a patient. Instead, in this example, the user's "wish" may be enqueued for execution by the probabilistic programming. In turn, the probabilistic programming may identify a communications use case designed for low emotional ebbs associated with basic types of events and then execute this and, through NL output, reassure the user that there's plenty of time left in the game. To explain further, it may be shown that low emotional quality of life may be improved through what is described elsewhere as reciprocity, a measure of similarity between what different speakers may say. Here, the user's interests, determined from the user's Narrative (Story Logs) and Conversational histories, which may be context masked to ball games, may be matched with expressions of support for a specific interest, and thus boost reciprocity. And so, in this example, the chosen communications use case may also be one that meets reciprocity targets, which may be set and measured during interactions.

Figure 55:
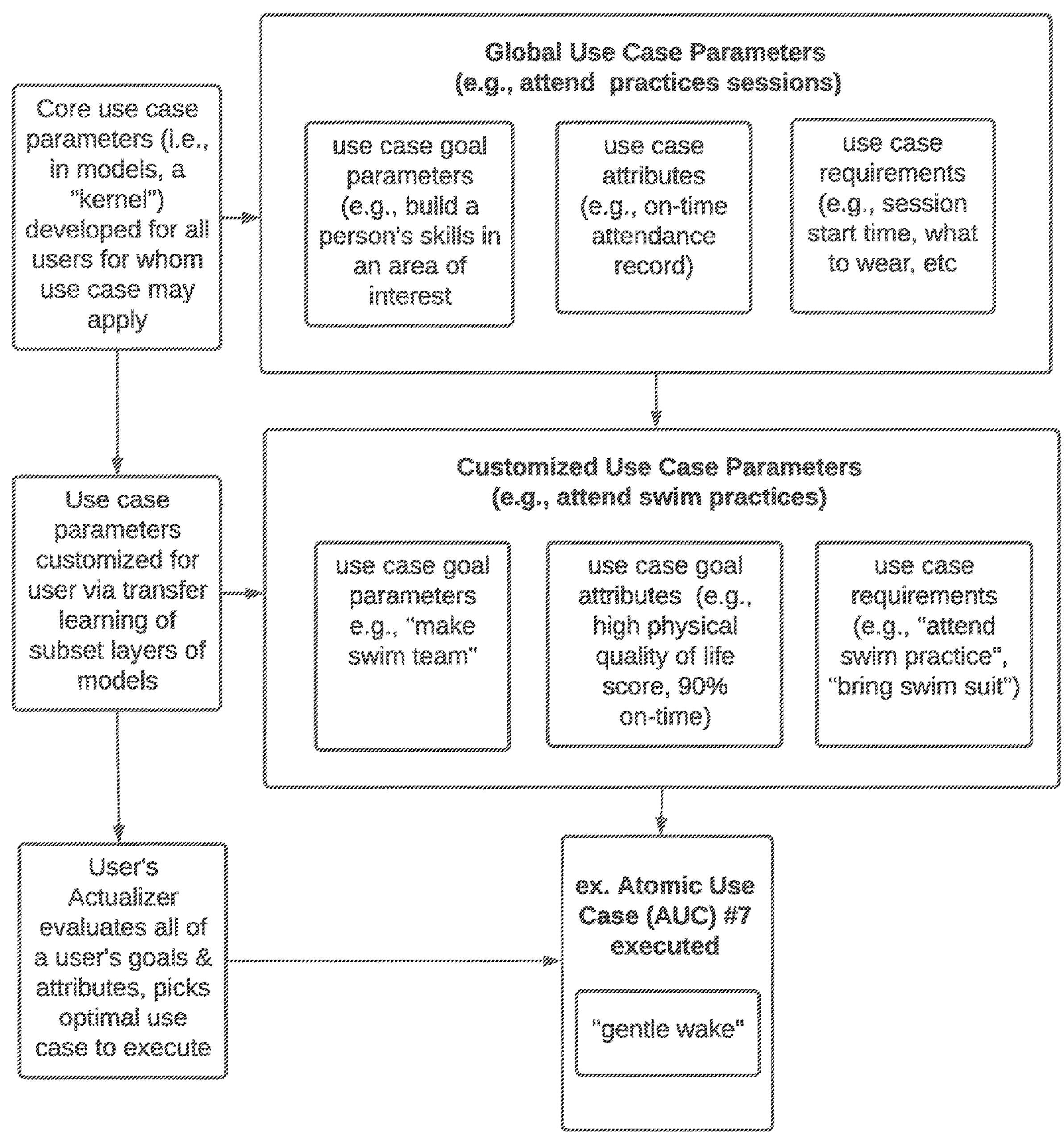
FIG. 55 illustrates Story Model—models, particularly use case specialization (e.g., attending swim team practices).

Meanwhile, to continue with the current example, if at any point in the ongoing evaluation of Story Model Inputs by the user's Story Model suggests an escalating risk of heart issues, the example embodiment may shift to a different communications "use case", through a method explained in FIG. 55, unless or until the constantly running classifier used for emergencies detects the onset of one, and immediately prioritizes an emergency use case.

Figure 48:
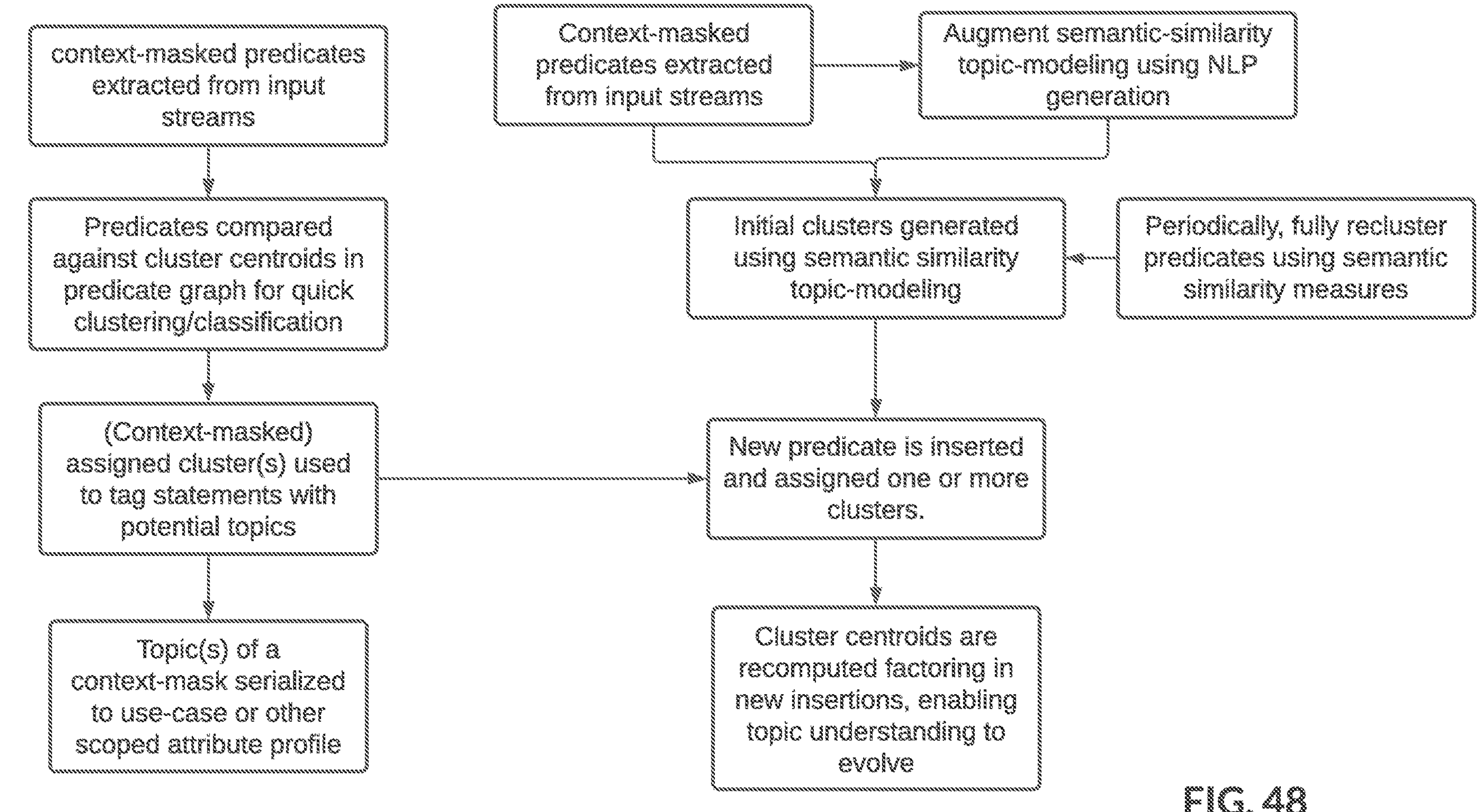
Figure 49A:
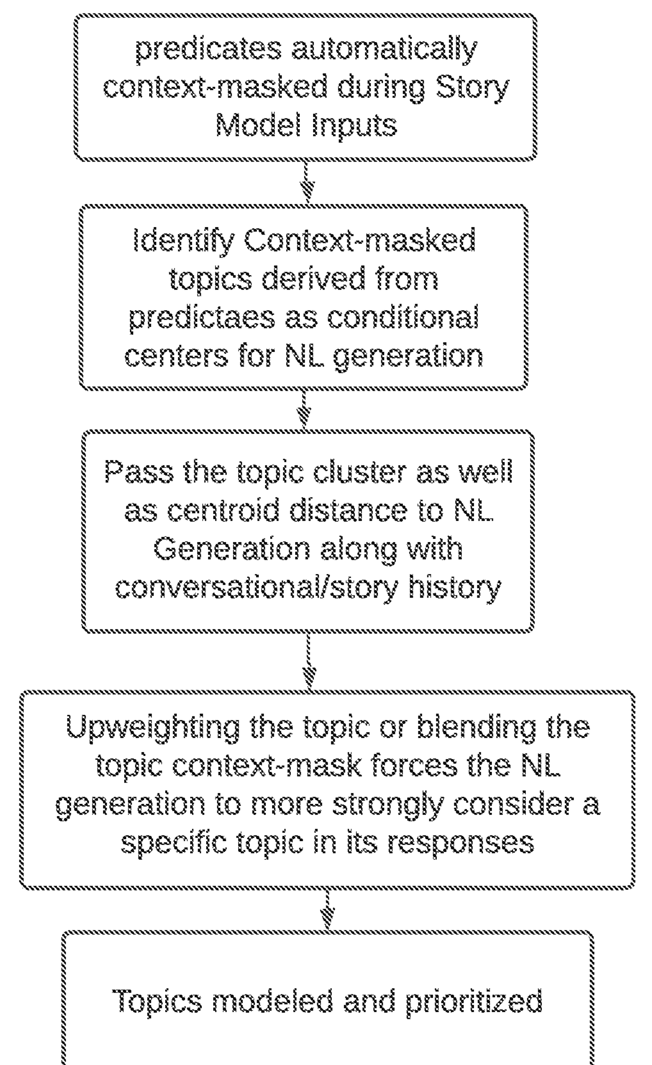
FIG. 49A illustrates a flow in the Story Model—models, particularly how predicate clusters may be viewed in terms of topics of interest using a change of basis in the embedding space.
Figure 49B:
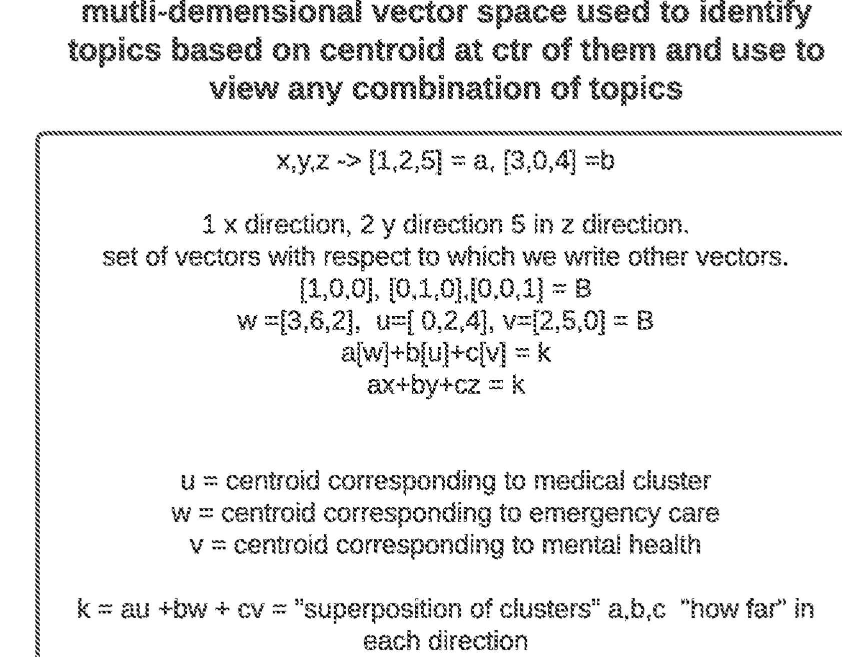
FIG. 49B illustrates using multi-dimensional vector space to identify topics based on centroid at center of them and use to view any combination of topics
Figure 50:
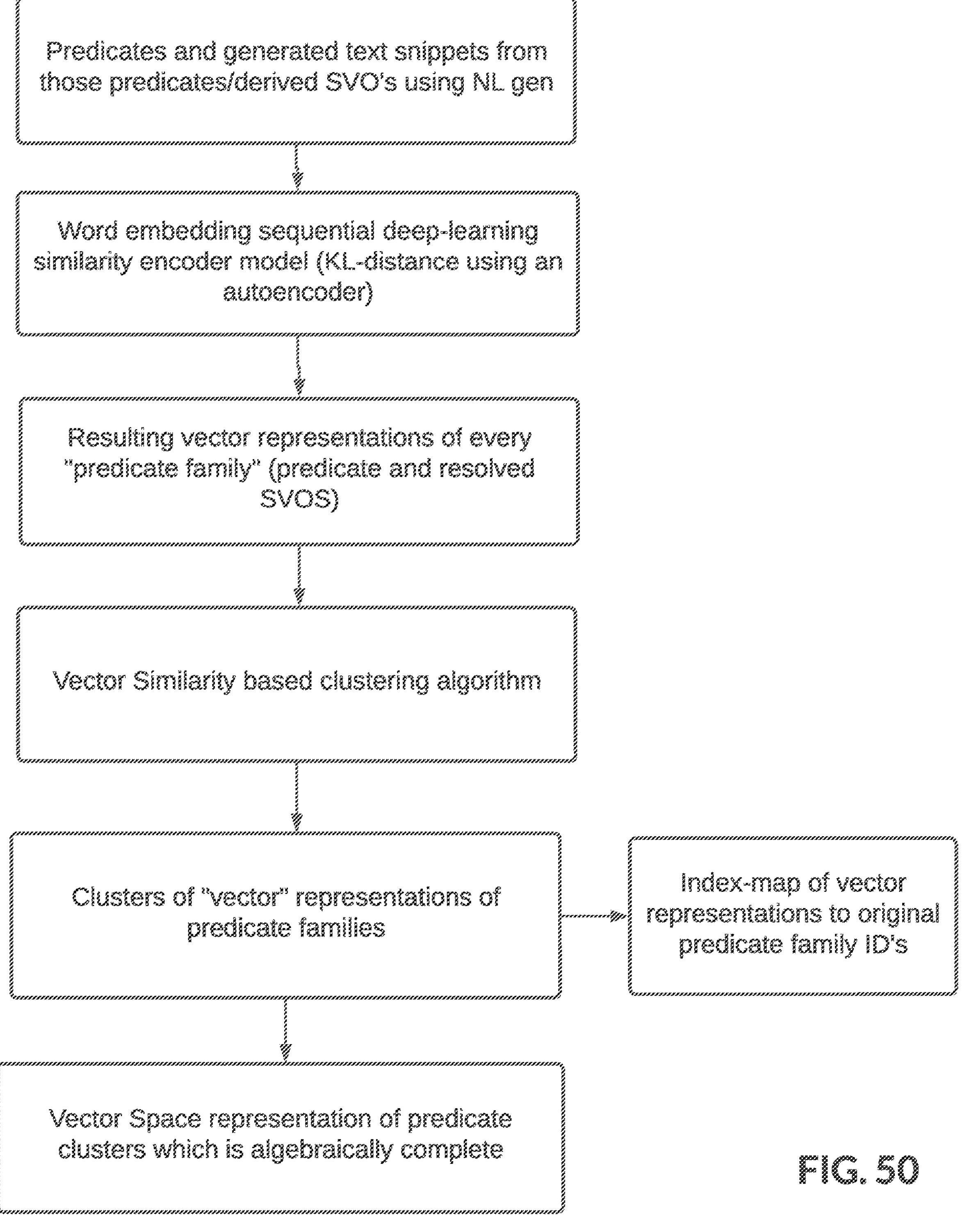

FIGS. 48-50 show how semantic similarity between text segments derived from predicates may be used by the example embodiment to calculate a topic embedding for predicates.

FIG. 48 illustrates Story Model—models, particularly Topics as Predicate clusters. See flow and descriptions in figure. It details the process of cluster discovery in the embedding space.

FIG. 49A illustrates a flow in the Story Model—models, particularly how predicate clusters may be viewed in terms of topics of interest using a change of basis in the embedding space. See figure for descriptions and flow.

FIG. 49B illustrates using multi-dimensional vector space to identify topics based on centroid at center of them and use to view any combination of topics. See figure for descriptions and flow.

FIG. 50 illustrates Story Model—models, particularly Autoencoder-based semantic similarity topic modeling. See flow and descriptions in figure. This provides additional detail on how this vector space may be constructed in the example embodiment.

Figure 51:
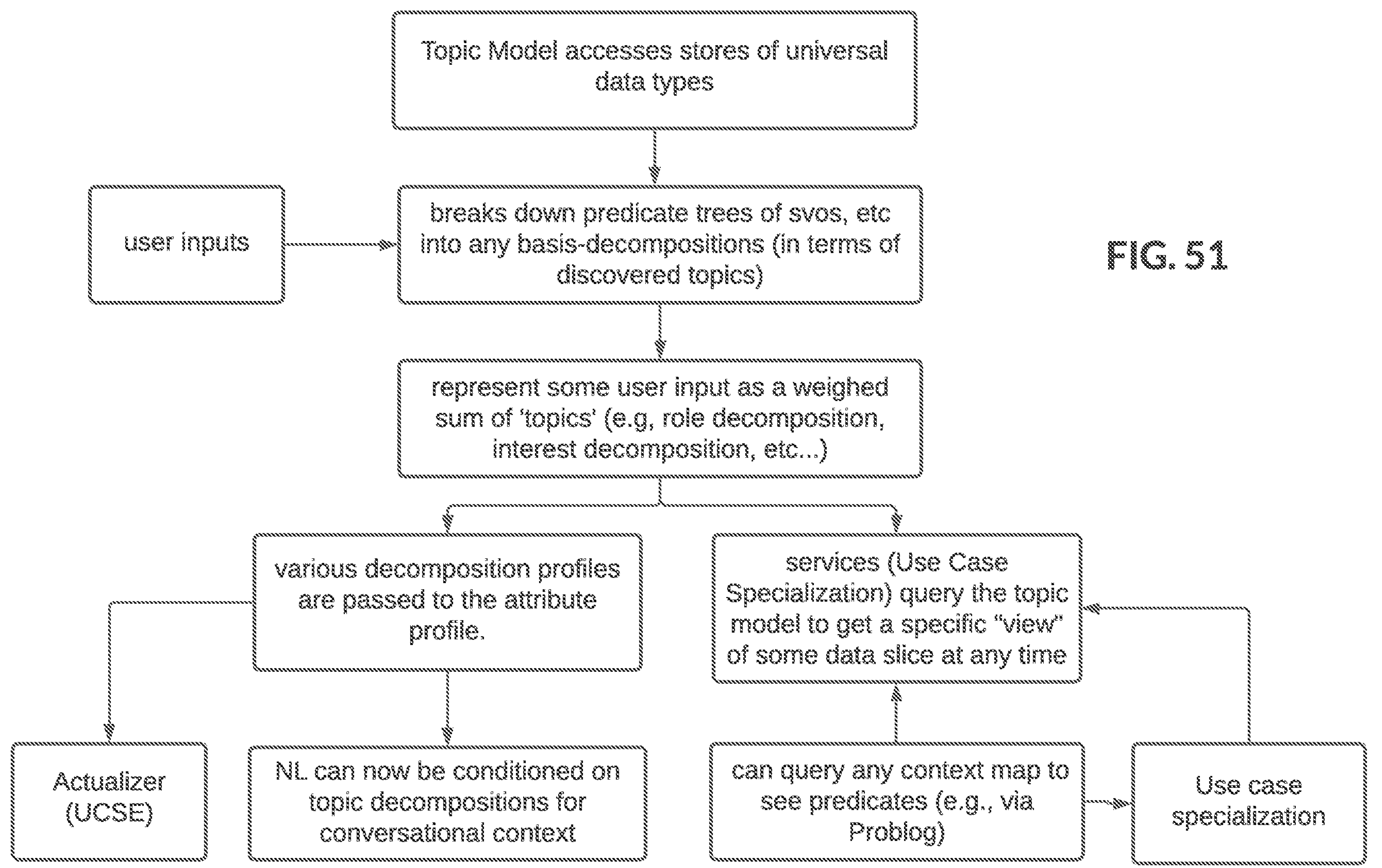
FIG. 51 illustrates a flow in the Story Model—models, particularly applications (among various uses in system) for topic modeling.

FIG. 51 illustrates Story Model—models, particularly applications (uses in system) for topic modeling. See flow and descriptions in figure.

Figure 52:
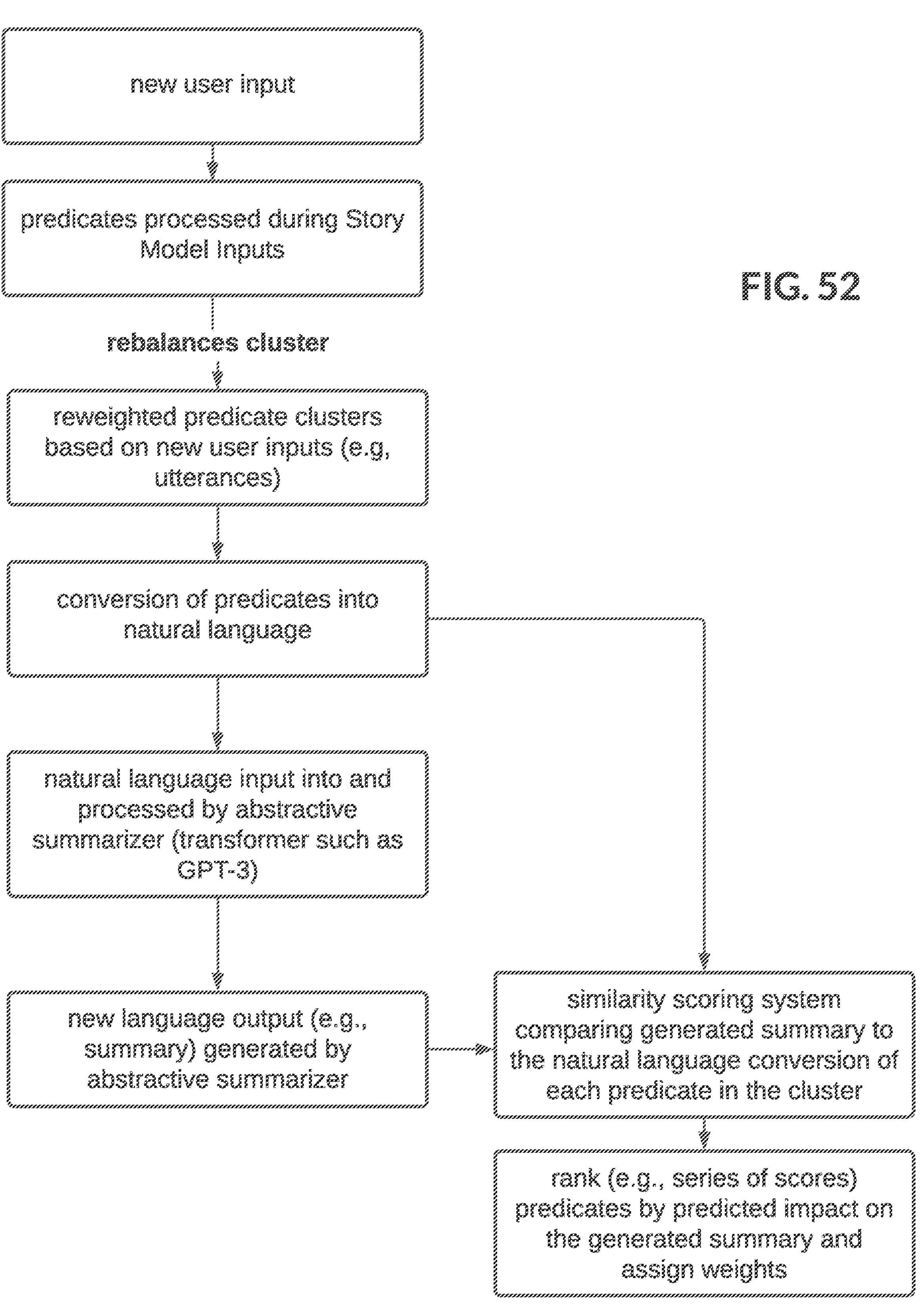
FIG. 52 illustrates a flow in the Story Model—models, particularly turning clusters into summaries.

FIG. 52 illustrates Story Model—models, particularly turning clusters into summaries. See flow and descriptions in figure.

The example embodiment may use probabilistic programming and AI computational tools to, among other things, create clusters of featurized information (e.g., machine readable data, language, predicates, objects, etc.) for a variety of purposes. For example, it may use clustering and other techniques to group and/or identify groups of similar steps in a use case, users with a particular set of skills, goals, conditions, etc., and other purposes.

Each predicate belonging to a cluster created by the example embodiment using user inputs or inputs about users and their respective use cases may be converted into natural language text by the example embodiment. This natural language representation of the predicate may be tagged to the predicate from which it is generated, to the cluster to which the predicate belongs, and to the user or users it applies to, including in instances where the example embodiment itself is a user (e.g., executing communications strategy use cases). The natural language conversion may act as both a label and the topic of the predicate. For example, the predicate 0.85::is_state("heart","racing") may be converted into "racing heart".

Mathematically, the closer a predicate is to the centroid of a given predicate cluster, the more likely it is to be similar (have a similar topic decomposition) to other predicates which are close to that same centroid. To continue with the above example, if "racing heart" is the natural language conversion of the predicate at the center of a cluster, the cluster may be about the topic "racing heart" and the corresponding predicate at the center would be 0.85::is_state ("heart","racing")

How strongly each predicate in a cluster correlates to other predicates in the cluster and to the predicate at the center of the cluster may be used to compute the coherence of the cluster. If the predicates in a cluster do not correlate above a threshold, the cluster may be unstable and topics generated from natural language conversions of them difficult to understand from the centroid of the predicate cluster(s) in the decomposition. On the other hand, even tightly correlated predicates in a cluster may involve topics that appear quite different without further inspection. To continue with the example of the "racing heart" natural language conversion of a predicate, if the next nearest predicate conversion into natural language may be "football game" it may be unlikely that the cluster is about heart issues. A reliable label for a predicate near a cluster centroid may not be a reliable topic for the cluster.

Since clusters may be learned embeddings of numerical representations of language, it may be difficult for people to accurately summarize what a cluster is about in natural language, or to work with clusters using natural language. In an embodiment, the example embodiment may convert predicates in a cluster into natural language which it then feeds into extractive and/or abstractive summarizers (See FIG. 87 description of summarizer). The natural language output of these summarizers provides a characterization of relationships between various data in a cluster that people now may see, while facilitating computations that use language data.

Natural language predicate conversions may be used by extractive summarizers and abstractive summarizers. Extractive summarizers retrieve information from data stores using search functions and concatenate extractions based on a method. Extractive summary output is inspectable, because it extracts actual text. It doesn't generate any new language, but pieces what the algorithm thinks are the most important sentences into a summary. Since data in a cluster is determined mathematically, strings of actual extracted text may not make sense when pieced together from a cluster. Abstractive summarizers, on the other hand, generate new language from natural language processing input. An abstractive summarizer may be a transformer, for example GPT3, that generates from multiple natural language inputs a real-time text summarization based on the transformer's prediction of the next word.

Predicates, scores and various summaries by various summarizers may be correlated by the example embodiment. For example, summaries of extractive summaries and abstractive summaries may be natural language conversions of the same underlying predicates. And, since predicates are associated with scores and extractions, computations that run on selected predicates also correlate to summaries based on these selections. The example embodiment may tag scores to the underlying predicates, underlying predicates to their natural language conversions, and natural language conversions to summaries, so weights between and among predicates, natural language conversions and summaries may be determined. Summaries also may be treated as inputs, featurized, scored and converted into predicates by the system, and then decomposed into cluster components. So, natural language summaries of predicate clusters may be compared to the clusters they summarize, and a vector similarity between the two may be computed as the distance between the resultant centroids in the predicate embedding space. The similarity between predicates derived from summaries to predicates in the cluster they summarize may be used to rank various summaries above a threshold.

Extractive and abstractive summarizers have different strengths which may be used in combination by the example embodiment to provide inspectability and coherence, respectively, to the natural language generated from clustered predicates. The example embodiment may use rankings above a threshold for similarities between predicates, scores, clusters, natural language conversions, summaries, and summaries of summaries to determine which summaries are reliably representative of the progressively developed characterizations of the data, which ones may fall below thresholds required for certain other system operations, and so forth.

Filtering criteria (e.g., thresholds, ranges, or curve restrictions on various quantitative statistical characteristics of predicate vector representations) may be set to determine which predicates from which clusters to convert into natural language and then to import into whichever or both types of summarizers. Filtering Criteria may be set by editors or by methods approved by editors of the use case, including by users who are authorized as editors. Filtering Criteria may synthesize a wide array of statistical descriptors of the population of predicates captured in the predicate embedding space, including vector similarity between predicates in a cluster, coherence of the cluster, etc., as well as the evolution of such descriptors over time. allow for intelligent scope restriction of predicates so that summarizers can provide more appropriate and human-interpretable descriptions of any system entity characterized by predicates, supporting both inspectability and flexibility in, for example, collaborative use-case creation. Thresholds and other rules for importing predicates into a summarizer may be established by use case editors, which may include users.

The natural language summary generated from the natural language conversion of predicates may be annotated by either users or by methods approved by use case/Narrative Segment editors, who may also be users. Users may use an interactive interface to highlight and annotate portions of the summary using either their speech or text, which may be tagged by the example embodiment to the highlighted language, underlying predicates and user, and processes. The annotations may be used by the example embodiment as new inputs, which it may featurize, score, and convert into new predicates. In turn, these annotations may be shared and thereby further annotated.

Predicates newly derived from annotations along with predicates already comprising the cluster being annotated may be clustered together to create a new cluster by the example embodiment. Impact analysis may be performed by the example embodiment on the newly created cluster using a variety of criteria. For example, analysis may involve, but may not be limited to, comparisons between newly created and previous cluster to determine if cluster recomputation improves performance on dependent tasks, what a certain annotation contributed to the improvement, and so forth.

Summaries of summaries may be generated by the example embodiment, and mapped back to input summaries, and thus to some degree to the original underlying predicates in a cluster used to generate the original natural language conversion. Abstractive summaries may be summarized by extractive summarizers, and extractive summaries may be summarized by abstractive summarizers. Summaries of summaries may be constructed from a variety of original text sources, which may be intelligently selected based on active user engagement context and natural language queries. The example embodiment may use selections of predicates and a combination of summaries per these queries to determine how a state of a cluster has changed over an interval.

For example, a user, perhaps a doctor, may wish to see quickly how the story of another user, perhaps a patient, has changed in the last several days. The example embodiment may generate snapshots of the clusters related to the user at various intervals of the requested period (e.g., start, middle and end), convert each set of clustered predicates in the snapshot to natural language, import each set of conversions into a summarizer, produce a different summarization for each snapshot, import all summarized snapshots into a summarizer, and then produce an overall summary of all summarized periods. Since summaries are tagged to predicates associated with scores, scores associated with each snapshot may be determined by averaging scores for the predicates underlying each natural language conversion used to produce each summary. In this manner, a progression of scores may correlate to a progression of summaries.

Analysis and natural language summarization may be used in a real-time way by the example embodiment, and its users, to curate and model clusters for a number of purposes, including use case development. Further, extractive and abstractive summarizers may be used in varying combinations to provide varying degrees of both inspectability and coherence. Meanwhile, filtering criteria may be used to rank reliability and usability of varying summaries.

Figure 83:
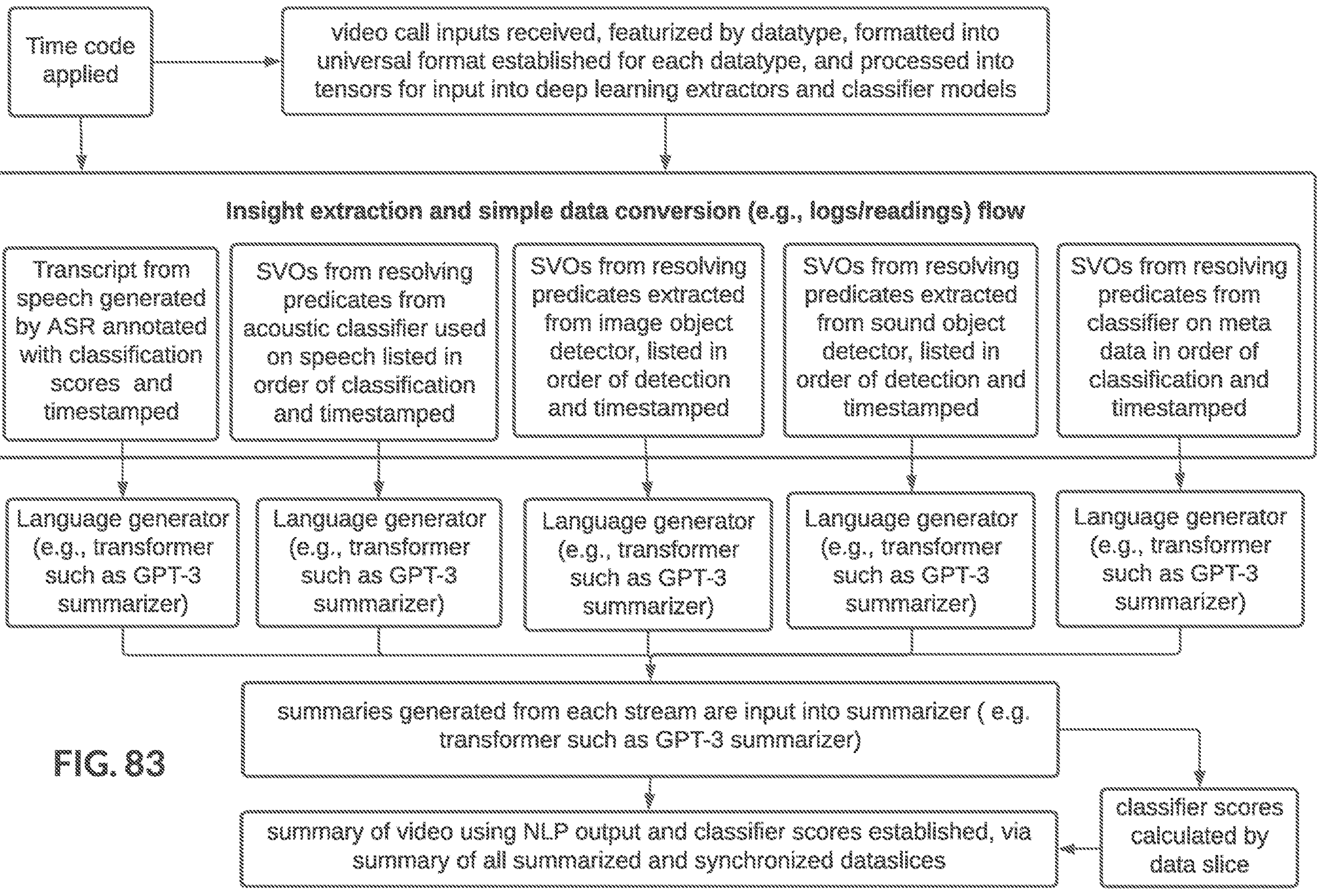
FIG. 83 illustrates how a flow of Story Model Inputs during a video session may be used to produce live, running, rich-media summaries of it.

The example embodiment may generate natural language summaries from streaming data (See also FIG. 83). The example embodiment may convert data it featurizes into predicates, and from predicates into natural language. This natural language conversion may be of featurized acoustical data, featurized text, featurized sensor data, featurized video, and so forth. For example, featurized video may be predicted by a computer vision method (e.g., image detection) to contain an image labeled during training of the video extractor and stored for look up when the trained extractor identifies it as an object. If the object indexed as a value in the output tensor of the image extractor is looked up in a datastore, it may find a label, such as "frown". A label may be converted into both a SVO and a predicate. As the video rolls, image featurization may generate many objects. To continue with the example, an audio extractor may be trained on sounds (e.g., "sigh", "heavy breathing", "siren", "thud", etc.). The audio streams may be used to detect labeled sounds that are time-coded with labeled images. Further, text generated from the audio streams by an automatic speech recognition service may already be in natural language and time-coded in the same sequence as the image and other audio streams. These may be used by the example embodiment to produce multiple natural language candidates for each sequence, which may in turn be streamed into an abstractive summarizer. The natural language output of the abstractive summarizer for each sequence in turn may be a summary that may be annotated. For example, the example embodiment may be used to produce from a video call between a patient user and a therapist user a real-time scored transcript (e.g., anxiety, quality of life scores), a summarization of portions of the transcript with associated scores for selected sections, video with key image frames associated with certain and/or certain sections of the transcript, and summaries of the video as well as summaries of portions of the video. These summaries may be annotated by the user through interactive displays and shared with other users, with permission, for further comment. As a result, dimensions of sound, image, text and readings (e.g., scores) may produce a richer analytical experience for clinicians trying to assess and treat a patient during and after a patient session. Since summaries may tie back to constituent parts of the video (e.g., text, sounds, image, score) as well as to the transcript itself, the summaries map to inspectable evidence, which may be useful in supporting an analysis by an expert, a bill authorized by a clinician for which there is documentation, and so forth To summarize streaming data, the example embodiment may segment streaming data into chunks using criteria for the chunks (e.g., number of frames) for conversion into predicates. The example embodiment may generate a natural language representation of each predicate. Natural language representations may then be streamed into groups and concatenated into long form text, until enough natural language has been assembled for the abstractive summarizer to summarize. The natural language output of the summarized streaming video, audio, etc. may be tagged by the example embodiment to underlying predicates, clusters, groupings of segments, and so forth. The summaries, having been produced, may be annotated and shared for further annotation. Thus, through the foregoing, multiple datastreams of varying data types may be converted into a natural language summarization, in chunks, each of which may be summarized, creating an opportunity to see summaries at varying apertures. The input predicates for these chunks are inspectable, and the natural language output from the summarizer may be mapped to them, by chunk. And, since the natural language conversions as inputs into the summarizer are tagged to predicates and scores, the summaries produced by the example embodiment may be weighted, ranked and deployed above thresholds based on similarity to the source of the summaries, scores, etc.

The example embodiment may use trained extraction models and summaries on text. During live or recorded speech, including a conversation involving a plurality of speakers, the example embodiment may use a plurality of classifiers to generate a plurality of scores (e.g., anxiety, quality of life, depression, etc.) for each input segment of each speaker for which a score is generated above a threshold. The speech input segment may be received as acoustic data only, or as text data from speech only, or as combination of acoustic and text-from-speech data.

The example embodiment may generate speech-to-text (i.e., transcriptions) from speech inputs in real time and may display the generated text and the Identity (or a proxy for the Identity) of who is speaking, the scores of each speaker in the order that the speaker speaks, and at any interval or intervals determined by users or use case editors (e.g., real time, tomorrow at 8 am, etc.). Similarly, the example embodiment may display whatever portion of the transcript the user may desire. The example embodiment may be used by a user to determine before a speech what sections of a transcript to generate and/or display.

For example, in a use case involving a therapist and a patient with anxiety, a therapist may wish to see only those portions of the transcript of the conversation where the patient is predicted to have the highest anxiety during the conversation, rather than to see the live, running score for the transcript as it is being generated.

In another example, the therapist may wish to see a plurality of sections of the transcript matching one or more criteria that the therapist wishes to use to assess the patient's situation. In said example, the therapist may want to see extractions related to both topics extracted from the conversation and scores associated with these extractions, as well as other information the example embodiment may compute and display related to the transcript.

The foregoing example may be accomplished through a combination of scores and extractions determined by the user, using tools that facilitate the operation on the transcript by the example embodiment. Extractors trained to extract predicates associated with various topics may be used to flag text that is about a topic and may be filtered by the score associated with the underlying predicates. In this manner, the example embodiment may display from the transcript only those topics that meet the criteria established by users.

Use case editors, who may also be users in certain embodiments, or methods approved by editors, may set the length of each speech input segment for which a classifier may generate a score and/or an extractor may extract a predicate, as well as the thresholds for scores and extractions. Thus, the length of each speech input segment used for scoring may vary based on use case and thresholds set for segment lengths for classifiers and extractors.

For example, it may be determined by editors of the use case that a score is to be determined for each user for each spoken utterance, or each sentence, or for as many sentences as a speaker speaks until the system detects another speaker speaking. The length of each speech input segment used for scoring may vary by use case and thresholds set for segment lengths for classifiers and extractors accordingly.

The example embodiment may tag the score to the input segment of each speaker based on the thresholds and segment lengths set by the use case editors. The foregoing may create and display a running, real-time transcript that is also scored in real-time in segments for each speaker in the order in which each speaker speaks for the duration of the conversation, or if just one person speaking, for the duration of the audio segment.

The example embodiment may display extractions from text and summaries based on them for annotation by the user. The example embodiment may import the user's annotation inputs into trained extractors, which it may then also summarize. The example embodiment may train extractors on a use case and be used to detect the presence of a use case during a conversation through operation not only on the transcript and on comments made to it but also through use of trained deep learning models running on inputs from individual and global predicate stores.

FIG. 53 illustrates Story Model—models, particularly composability of Narrative Segments, also referred to as use cases, and specialization logic and execution. See description and flow in figure. As shown in FIG. 53, the Actualizer in the example embodiment may choose a use case by type. The type of use cases available as candidates for selection by the Actualizer are illustrated in corresponding FIGS. 53A, 53B and 53C. With reference to use cases, a more detailed description of them, including their composability in the example embodiment, follows. The composability of Narrative Segments in the example embodiment may mean that Narrative Segments may be "built," or composed, of other Narrative Segments, as core building blocks, of sorts. The data type may be described also as a Story Data Type, as previously described in detail in FIG. 22. Meanwhile, in FIG. 53, additional explanation is provided, specifically in relation to what may be referred to as "child use cases". Further explained also is the concept of how certain actions (SVO—derived code logic) contained in the Narrative Segment data type may be executed by the example embodiment (e.g., via specialization logic).

In the example embodiment, and with specific reference to FIG. 53, "child use cases" may refer simply to the dependent Narrative Segments required to be executed in strict sequence along with the Narrative Segment on which they depend. Their hallmark is that, although they may be a group of strictly ordered segments, they may be handled by the Actualizer as a single unit of action. Recall that the Actualizer "chooses" a single optimal action from available actions, which in the example embodiment may be represented as a Narrative Segment, and that it synthetically builds a path for a user, one recommendation at a time.

As elsewhere explained but reinforced here in FIG. 53, a Narrative Segment may exist as a single action or as a unit of strictly ordered single actions. Likewise, recall that while these single actions may be referred to from time to time as atomic Narrative Segments or atomic use cases, these merely describe a Narrative Segment with no dependents; a Narrative Segment may be irreducible.

Illustrated next in FIG. 53 is an alternative way to organize Narrative Segments other than as single actions or as a unit of strictly ordered single actions. FIG. 53 illustrates, among other things, what may be referred to as a composite of Narrative Segments (composite use case). Composite Narrative Segments are described as well in FIG. 22, and in FIG. 53 provide an opportunity to show the power of composability in facilitating related actions for the Actualizer to evaluate in its optimization as well as to illustrate the flexibility that the example embodiment may have in executing prescribed actions at various levels of specification logic.

On the first point made about composites, recall a composite may have dependents and not be flagged as irreducible. Composites may be a real-time way to organize and group Narrative Segment clusters. The Narrative Segments in the composite may not have priority one over the other and may be executed in whichever order of Narrative Segment the Actualizer may choose. Thus, the Actualizer may recurse into composites and choose only a specific Narrative Segment within them to execute, since no strict order between them may be required, e.g., a composite use case might be "lose weight" and it might contain many different Narrative Segments, detailing various forms of exercise, techniques for improving eating habits (meal prep, etc.).

The composability of Narrative Segments may satisfy a number of requirements for the example embodiment to evaluate Story Model Inputs and deliver through the user's Story Model real-time as well as timely recommendations for users. In the example embodiment, composability of Narrative Segments may satisfy the function of an Actualizer to choose only one action as well as the concept of multiple related actions to be performed in strict sequence, when called for. It also may address what may be a failure of relevance by many systems, which may attempt to predetermine actions of significance without reference to a person's changing situation or new options that may present themselves. Meanwhile, the composability of Narrative Segments as single actions may relieve the burden on Narrative Segment developers to have to "figure it all out" ahead of time—as it relates to predetermining action sequences that may in life happen in any order. Instead, multiple single action Narrative Segments may be developed to characterize single or composite actions observed every day in the life of people (e.g., open door, call friend) requiring no predetermined order between them. In such a case, the example embodiment may "figure it out" and do so "live," in context of the user's immediate situation, through a combination of Actualizer selections for actions and specialization logic using encoded relationships in the knowledge base. Alternatively, if the Actualizer may not have available to it a Narrative Segment that meets activation thresholds, the example embodiment may "discover", or synthetically produce, a Narrative Segment through traversal of the knowledge base (see FIG. 59), which may be encoded. In other words, in many instances, the Actualizer may figure out the best next action without having to be provided a predetermined order.

To return briefly to those Narrative Segments which may comprise various predetermined and strictly followed steps, these may apply in the case of best practices for a profession. For an example of strictly followed actions in the real world that may be thought of as one unit, consider the Current Procedural Term (CPT) code. In medicine, the CPT code codifies steps in a medically necessary evaluation or management of a patient. CPT codes may be used by providers to take certain actions and to signal that they have completed the actions associated with the CPT code. When a provider assigns a CPT code to their activities, they are also attesting that they are performing the steps described in the CPT code. This attestation, or assignment of a code by the provider, in the exercise of their medical judgment, may be associated with billing or reimbursement rates. So, embedded in a CPT code are actions that relate to services, compliance and billing. In the example embodiment, a CPT code, which may have a fixed number of "steps," may be expressed as a Narrative Segment.

Note that during an execution of a Narrative Segment where multiple actions may be strictly ordered, as described above, other actions may still take place—just not as they relate to the strictly ordered actions. For example, let's say a phlebotomist is paged by a doctor just before her next action is to locate a patient's vein. Instead of continuing with the sequence of strictly ordered blood drawing actions, in the example, the phlebotomist may respond to the doctor's page, thus suspending actions associated with the Narrative Segment (use case) of the blood draw. It may even be that while the phlebotomist is responding to the doctor's page, the phlebotomist's new Story Model Inputs are evaluated by the Story Model and a new recommendation determined for the phlebotomist, say, to update a chart the paging doctor has asked to see, which may take the context into account. The point here is that when the phlebotomist does return to the patient whose blood is to be drawn, the blood draw actions continue where they left off, in strict sequence. In other words, the phlebotomist's next action may be to find the vein.

Figure 56:
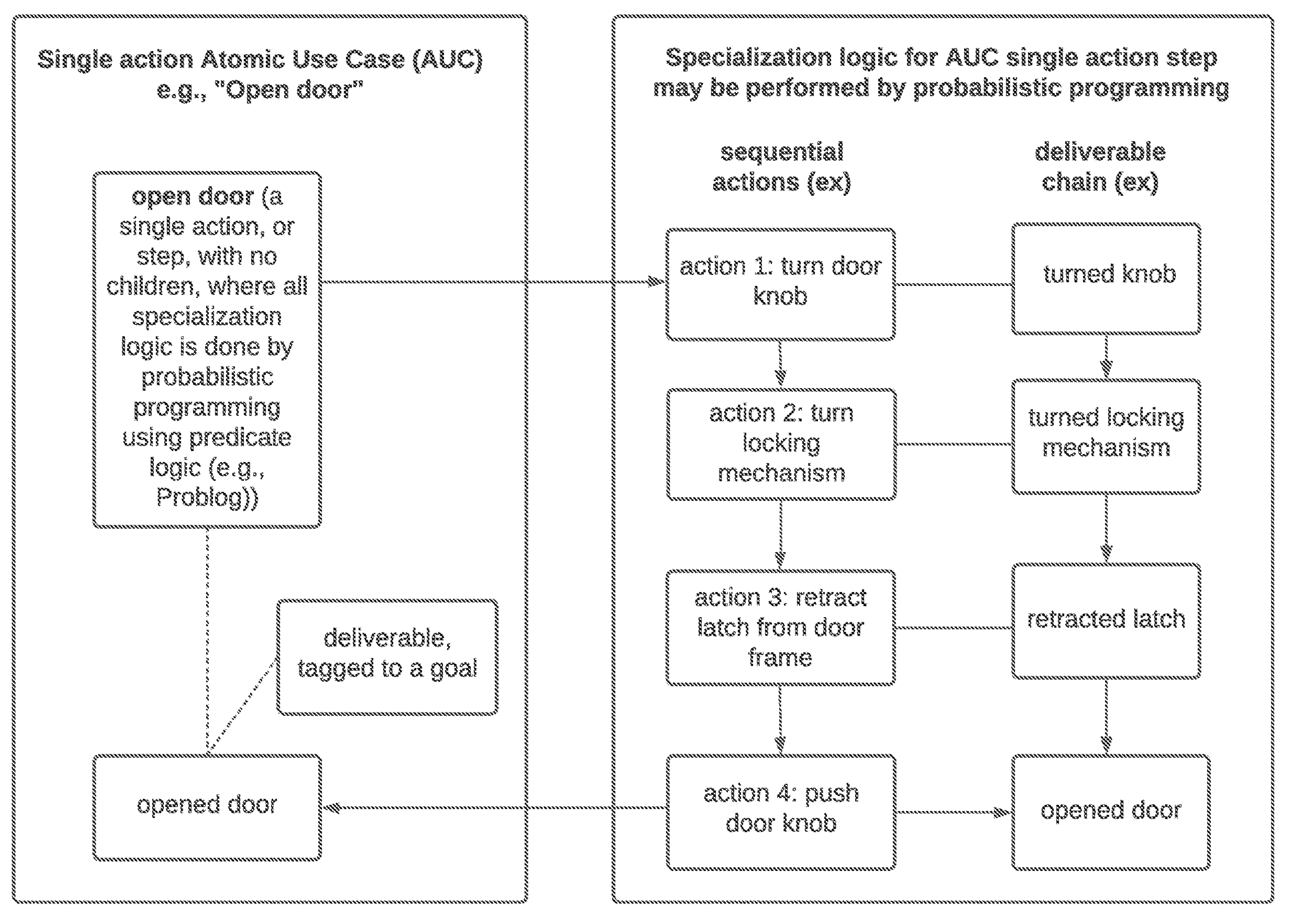
FIG. 56 illustrates a flow in the Story Model—models, particularly specialization logic example (e.g., imputed actions may be explicitly defined and executed by logical programming).

Returning now to the topic of specialization described in FIG. 53, various methods may be used by the example embodiment. For example, a Narrative Segment characterizing an action as "open door" may be interpreted by a user hearing the recommendation as a simple matter based on habituations/learned behaviors on how a door is opened. However, a computer may not know how a door is opened, without being taught, and if a door may need to be opened for a user to continue towards the user's envisioned goal (e.g., getting not just physically but also emotionally closer to a person who may be on the other side of the door), there may be instances when the computer may need to know this. For example, if a door has a knob that requires the ability of a person to turn the knob, this may present a conflict to a user with a broken hand. To continue with this example, in such case, another user may be needed as a resource to open the door. While a simple illustration, it may convey how the example embodiment may become entrained, or meshed, with other systems (e.g., door opens upon detection of a user) and the actions of other users to satisfy a best next action recommendation for still another user. Further, the specialization logic may be useful in identifying the sources of conflicts (e.g., knob is stuck and won't turn, so door remains shut). Illustrated in FIG. 54 through FIG. 56 is how actions specified by Narrative Segments may require specialization logic performed by models, or probabilistic programming.

FIG. 54 illustrates Story Model—models, particularly labeling use case containers (examples). See flow and descriptions in figure.

FIG. 54A illustrates Story Model—models, particularly containers for Atomic use cases (example). See flow and descriptions in figure.

FIG. 54B illustrates Story Model—models, particularly containers for Composite use cases (example). See flow and descriptions in figure.

FIG. 54C illustrates Story Model—models, particularly containers for Atomic use case and Composite use case (example). See flow and descriptions in figure.

FIG. 55 illustrates Story Model—models, particularly use case specialization (e.g., attending swim team practices). See flow and descriptions in figure.

FIG. 56 illustrates Story Model—models, particularly specialization logic example (e.g., imputed actions may be explicitly defined and executed by logical programming). Recall, every Narrative Segment may have attribute profile/goal metadata, and in some cases dependent Narrative Segments, each of which may contain attributes and characteristics. These attributes and related goals may be used to specialize the Narrative Segment for a given user. In some cases, expert knowledge may be required to properly specialize a Narrative Segment, as described also in FIG. 53.

With reference to modeling specialization itself, various methods may be used.

In one way of modeling specialization, the user's attribute profile may serve as an input into a constraint-resolution system using classical AI methods and entity-component resolution against the knowledge base. As an illustrative example, take the example of a Narrative Segment where the action is to "open a door". A door may have a handle, a lock, or many entities present needed to open it, and a user may have many traits that the system may resolve to one specific type of door from the general case. In other words, sets of conditions may be evaluated against entity components, for example: User want to open door?door has lock?no?→door has knob?yes→user has arms/dexterity?yes→open door by twisting knob?no?→call someone to open the door for them.

As for another way to model the specialization, a deep learning model may learn to choose specializations from conflicts in user attribute profiles and Narrative Segment attribute profiles, as well as learned efficacy of actions. Narrative Segments specialized in this way may be modeled as a composite, or non-atomic use case with many, slightly different, atomic children—the model may then learn conflicts from the data directly and choose optimized specializations.

Figure 57:
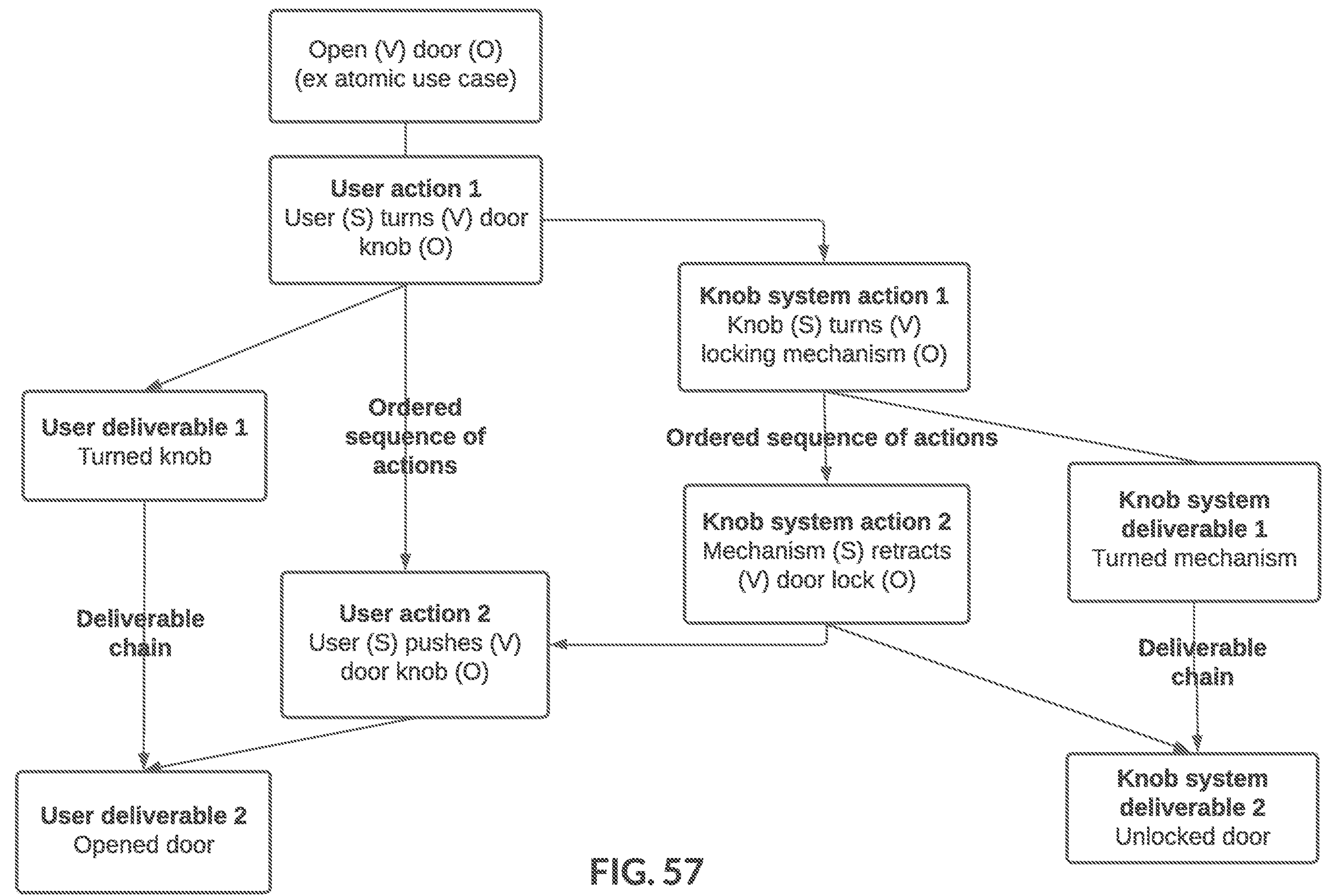
FIG. 57 illustrates a flow in the Story Model—models, particularly encoding use case in knowledgebase as SVOs specifying who/what (S) does (V) what (O).

FIG. 57 illustrates Story Model—models, particularly encoding use case in knowledgebase as SVOs specifying who/what (5) does (V) what (0). See flow and descriptions in figure.

FIG. 58 illustrates Story Model—models, particularly resolving encoded SVOs in knowledgebase. See flow and descriptions in figure. See flow and descriptions in figure.

Figure 59:
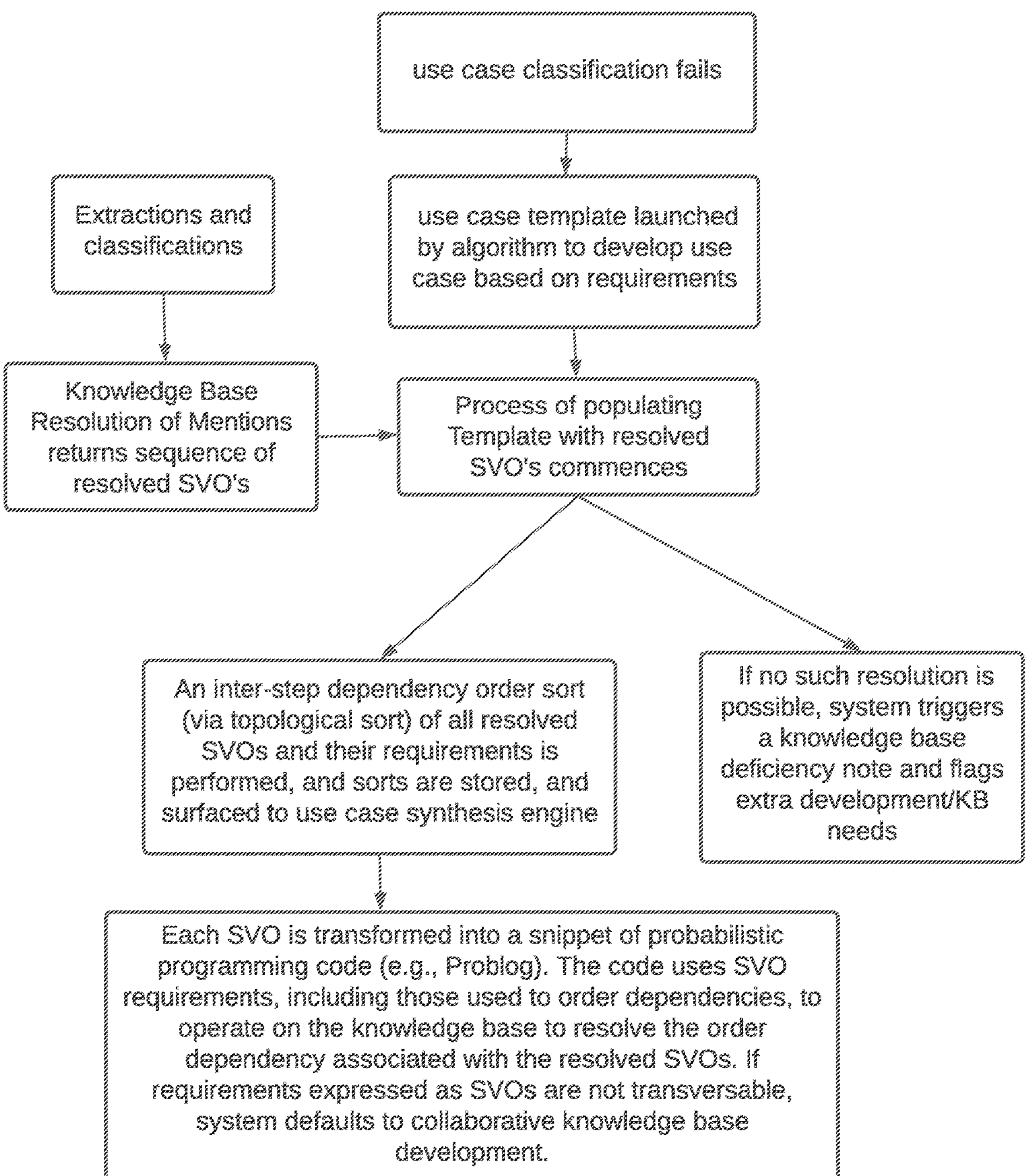
FIG. 59 illustrates a flow in the Story Model—models, particularly dynamic use case discovery.

FIG. 59 illustrates Story Model—models, particularly dynamic use case discovery. See flow and descriptions in figure.

Recall from Story Data Type descriptions (FIG. 22) that action components (e.g., SVOs) of a Narrative Segment may be extracted during Story Model Inputs, and they also may be selected as recommendations by the user's Actualizer during Story Model functions. While many Narrative Segments may be developed by experts, the example embodiment may also construct new Narrative Segments from Story Model Inputs. This construction of new Narrative Segments may happen when predicates from Story Model Inputs extractions may fail to have enough similarity to predicates associated with available Narrative Segments to be classified as a Narrative Segment. (Note, Narrative Segments that meet classification thresholds may simply be enqueued as messages to the user's Actualizer for use in its optimizations). Rather than simply flag inputs that fail classification for later resolution, for instance through knowledge base development, the example embodiment may use a method referred to as use case discovery, or Narrative Segment discovery, to dynamically create new Narrative Segments in real time. In FIG. 59, a template may be made available to the example embodiment to synthetically develop a Narrative Segment by resolving paths via graph traversals against the current knowledge base. This traversal process may involve steps identified in FIG. 58 for resolving SVOs in the knowledge base, steps regarding topic modeling (See FIG. 51), and requirements regarding the use case discovery template.

As illustrated in FIG. 59, when Narrative Segment classification fails, dynamic use case discovery may begin. When use case discovery begins, a template for a Narrative Segment may be populated with extracted VO's and related nouns from Story Model Inputs. For example, these extractions may contain the verb "fishing" and the nouns, "fish", "hooks", "license" etc. The extracted candidate V's and S's then may be resolved into structured sequences (directed paths) against the knowledge base, to in turn perform candidate actions, or SVO's (See FIG. 58). After knowledge base resolution, a list of potential SVO's parsed from the extracted nouns/entities may now exist the example embodiment.

Next, each SVO created by resolving extracted mentions and their relationships in the knowledge base may be used to generate a snippet of probabilistic programming code (e.g., Problog), which may resolve the action identified by the SVO.

To resolve the action of each SVO, recall that SVOs may be encoded in the knowledge base, which may already contain many nouns with entity properties and associated (via type of edges) "actions" which may be performed on them. Associated to fishing might be the nouns "hooks, bait, etc." with the relationship "requirement". Each of these nouns may contain various linguistic components (e.g., syntactical relationship—object or subject, position in independent or dependent clause, etc.), which snippets of code may use to determine if there are other verbs that may "act" on them or on which they may act. For example, certain "nouns" (hooks, pole, bait, etc.) may be "required" to perform the action "to fish" (V). In the example embodiment, probabilistic code snippets may follow a simple logic, based on what is not in Story Model Inputs (e.g., what is said in a conversation, emails, etc.) to complete the sense of what is. For example, in an interaction about going fishing, if words used in the interaction include "fish" and "bait," a word not mentioned but in the knowledge base may be "hook," and the code snippet may derive "hook has bait," and thus establish a requirement that a hook be included to perform the verb "fish". To continue with the example, it may also be determined from what is said that "water" is not mentioned. In this example, the probabilistic logic may use information in the knowledge base to determine that fish are animals, animals have habitats, water is a habitat for fish. So, to find fish means to find water. Therefore, to go fishing requires locations for water. In turn, these locations may be identified as candidate fulfillments for a location requirement associated with the action of "fishing".

As described, the requirements of each SVO may be figured out by the example embodiment, assuming a sufficiently robust knowledge base. Each SVO used in the construction of a Narrative Segment may have its set of requirements and dependencies, as per the Narrative Segment Story Data Type. And, for each SVO, a requirement may be that a subject has a role which may perform the associated action (e.g., fish eat bait).

The next step in creating a dynamic use case in the example embodiment may be resolving the sequence of actions between identified actions, which may be referred to as an inter-step dependency order sort. Here is a crude illustration of how requirements may be used to sort an order between SVOs: fishing requires equipment=>pack equipment (e.g., bait, hook, fishing wire, etc.); fish require water=>find water. If one may "find water" but may not "pack equipment" they may not fish, therefore packing equipment in this illustration may come first and establish "pack equipment" as a Narrative Segment on which "find water" depends. The interstep dependency order may be resolved by the example embodiment through a variety of methods, including a topological sort of SVO steps by requirements, an algorithm known to one of ordinary skill in the art. Once the interstep dependency order of resolved SVOs is sorted and their requirements fulfilled, sorted SVOs are stored, and may now be available as new Narrative Segments for the Actualizer to use in its optimization—in real time, as the interaction is taking place.

While dynamic use case discovery may occur in the background of live interactions, especially in instances when use case classification may fail, it also may be used in connection with prompts and NL communication to users in various instances. For example, to continue with the above illustration of the fishing trip, if the traversal of the knowledge base fails to develop new Narrative Segments, if use case classification may already have failed, the example embodiment may determine which query candidates that did not return a solution during discovery to surface to users to instead answer the query themselves. This method may be used by the example embodiment to facilitate live, contextually relevant development of Narrative Segments. For example, in the above scenario of planning a fishing trip, the example embodiment may determine from extractions of what is said (i.e., Story Model Inputs) that a body of water has not been revealed as a location for the fish, and then ask the users through NL communications generated in this case from the specialization logic requirements, as opposed to Actualizer NL communications, where they would like to fish. This same method of NL communications to dynamically create new Narrative Segments may be used by the example embodiment to construct Narrative Segments generally and to continue to populate the knowledge base with data encoded as Story Data Types.

Consider, for example, instances where a higher-than-normal anxiety score for a user may be determined from Story Model Inputs, but insufficient evidence may exist for the Actualizer to make a recommendation above a threshold for activation. In the example embodiment, specialization logic may use Story Model Inputs to populate a template for resolving SVOs related to anxiety scores, and through the above-described process, including prompts to users using NL communications, may obtain enough evidence to now generate a candidate Narrative Segment for new consideration by an Actualizer.

Another method to create candidate Narrative Segments during use case discovery may involve a collaboration between system users, consisting of negotiations between Actualizers as well as coordinated NL communication with the owners of each Actualizer, to establish a collaboration between users to create Narrative Segments. For example, a user may develop Narrative Segments for a course of therapy sessions by interacting directly with the example embodiment to create Story Model Inputs, where during a development process, the absence of enough similarity between extracted predicates and predicates associated with Narrative Segments may be expected. Through NL communication to users to supply missing information based on queries, including in instances for predicates themselves (i.e., predicates have heads and bodies, or arguments, which may be satisfied), and through queries or messages to other users' Actualizers, groups of Narrative Segments may be developed. In the example embodiment, in addition to queries between the example embodiment and users, queries may be posted by the example embodiment, or by users, on a query platform to which other users, and their Actualizers, may have access. Queries now being generated and answered by both people and the example embodiment may characterize a collaboration. This collaboration, involving both people and the example embodiment, among and between each other, may facilitate the rapid development of Narrative Segments.

In the example embodiment, use case discovery may be used for various everyday and/or professional purposes, and may include the use of query platforms and Actualizers available to users to train models and "fill out" Story Data Types (e.g., including via code in a respective Story Object) For instance, in the example embodiment, use case discovery may be used by a network of users and their Actualizers to define a project. In this instance, no Narrative Segment being identified within a library of Narrative Segments, may trigger a template for a "project". The ensuing use case discovery process may then be used by the example embodiment to complete the template, which may include, but may not be limited to, establishing definitions of the project, goal parameters attributes, requirements, including for resources (e.g., roles), and so forth.

Note, through interaction with other users and their Actualizers, the use case discovery process may establish which resource requirements may be needed to perform which actions. In this manner, the example embodiment may facilitate the development of "projects" from a community or network of users that the example embodiment then may enforce through Actualizers and their negotiations with other Actualizers and through NL communications, their respective users. Thus, new Narrative Segment or Narrative Segments may be created and resolved by a community of users during use case discovery from in-the-moment Story Model Inputs and Story Model functions.

In the example embodiment, the use case discovery process may be characterized as an on-the-fly method of creating, managing, and executing projects at work and in daily life through synthetically constructed Narrative Segments rather than from a library of pre-existing Narrative Segments. Note that once resolved as Narrative Segments, new Narrative Segments may be indexed along with other Narrative Segments for the Actualizer to choose between, when it may take into account all of the user's attributes and goals, not simply those related to one Narrative Segment. In this manner, the example embodiment may in the course of advancing a user towards goals also likely produce recommendations that strike a balance between goals. For example, the example embodiment may make recommendations for actions associated with social determinants of health and for actions associated more strictly with medical protocols, depending on the context and the total snapshot of a user's goals.

Figure 60:
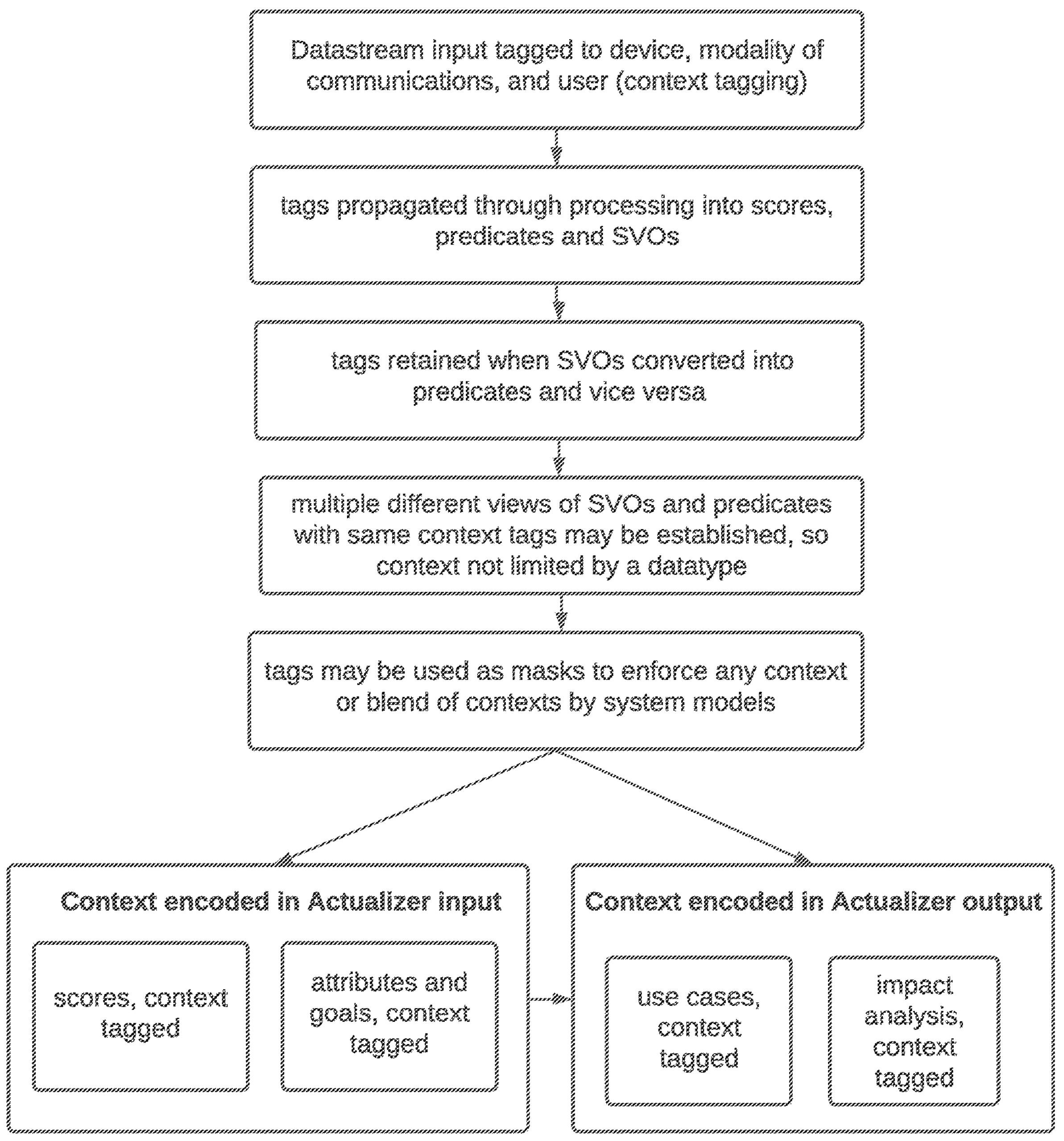
FIG. 60 illustrates a flow in the Story Model—models, particularly encoding Context for Optimization.

FIG. 60 illustrates Story Model—models, particularly encoding Context for Optimization. See flow and descriptions in figure.

In the example embodiment, encoding context may begin with Story Model Inputs. Recall that datastream input may be tagged to device, data type (e.g., audio, video, metadata such as location data, etc.), modality of communication (phone call, video call, email, etc.), and user at time of processing. As described elsewhere, this may be referred to in the example embodiment as context-tagging. As illustrated, context tags may be propagated throughout both Story Model Inputs and Story Model functions. With reference specifically to Story Model Inputs, the tagged inputs from datastream (i.e., context) may be propagated through universal data formatting and universal data type generation, establishing as outputs predicates, scores and SVOs tagged by context.

At this point, and still happening in Story Model Inputs, SVOs resolved against the knowledgebase may be converted from predicates and stored in a multiple view data store, with reference nodes for web graph derived from knowledge base edge types, for viewing by context. Support for multiple context views or "scopes" of same SVOs established, and SVO's with various similarity types (V-V, S-V, O-V, etc.) may be identified by tracing paths on different views.

Meanwhile, also happening during Story Model Inputs, support may be established for multiple, context views or "scopes" of same predicates existing now in predicate store (e.g., same predicate(s) may exist in a particular "conversation" scope as well as "user" scope and "global" scope)

To summarize the foregoing result of encoding context during Story Model Inputs, context-tagging may provide a method for modeling multiple different context views for both SVO's and predicates extracted with the same context tags established. Note also, SVOs may comprise use cases, so use cases may be context tagged.

This propagation of contexts continues from Story Model Inputs to Story Model functions. For example, attribute values (i.e., Current Story) constructed from the tagged predicates may be scoped per-field based on the evaluated predicates that generated them. Next, the context-tagged Attribute values established during attribute construction from context tagged predicates may be propagated to Envisioned Story to derive goal values. In turn, the establishment of context-masked attribute profiles and goals enforces context at the data input level to the Actualizer, which in turn propagates context tags through recommendations (i.e., Narrative Segment selection) as also context-masked. The cycle repeats with each new set of Story Model Inputs.

In the example embodiment, context-tagging may be used to generate increasingly timely and effective recommendations for users since they may pertain to a user's real-time situation and set of context-dependent options. For example, being out for dinner and wondering how to stay on a diet may involve different types of considerations than being out grocery shopping. The recommendations may be expected to be different based at least in part on context. Working context into optimizations may require that it flows through steps as described.

In the example embodiment, context tagging may facilitate what may be referred to as context masking, which may generally describe the use of context as a "mask" to focus in on a certain the state-subset (derived from Story Model Inputs), enabling analysis and optimization appropriate to a wide variety of situations where a universal approach may perform poorly. Since all input data may be context-tagged, all recommendations may be context-tagged. As a result, context-masking may facilitate richer data analysis from Story Model Inputs (e.g., "summarize what Chad said on the call yesterday") to more meaningful Story Model functions (e.g., "put dad's pills next to his coffee tomorrow if you want dad to take them"). Context-masking may be used in numerous ways to gather, evaluate, model, execute and effectively customize communications, recommendations, and so forth, to accelerate the system's development of hypotheses (i.e., goal discovery during Envisioned Story construction) as well as to evaluate (e.g., impact analysis, behavioral model) what actually does work. As just one of many examples, context-masking may be used to context-blend information across context masks as a way of encoding urgency (e.g., use 40% of context A and 60% of context B) or define composite or co-optimization contexts. This may happen at any layer of the data-flow (any box in FIG. 60 after input data tagged).

FIG. 61 illustrates Story Model—models, particularly an example of encoding context masks. See flow and descriptions in figure.

Figure 62:
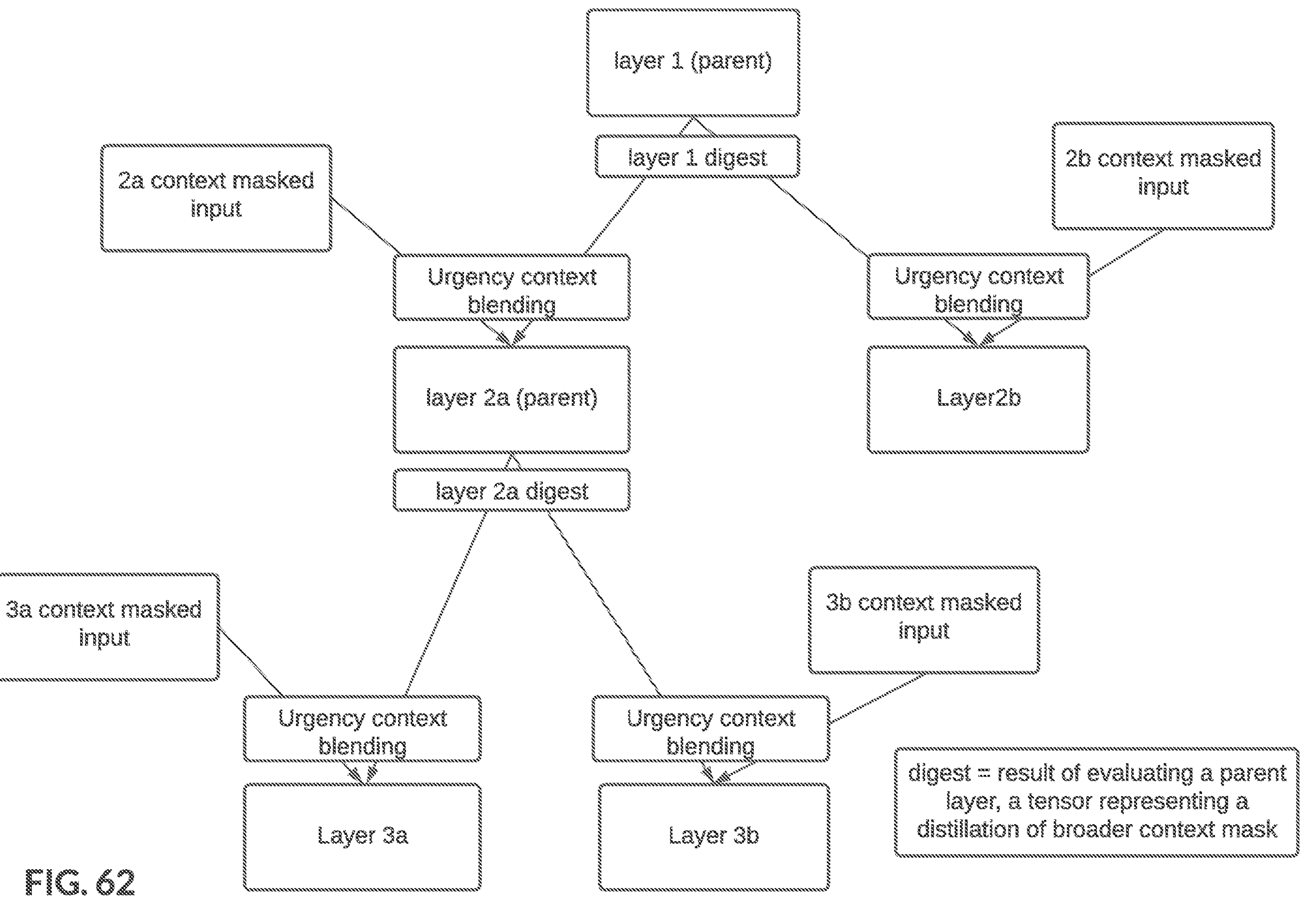
FIG. 62 illustrates Story Model—models, particularly a candidate architecture for the Actualizer deep learning model.

FIG. 62 illustrates Story Model—models, particularly a candidate architecture for the Actualizer deep learning model. The illustrated architecture shows how urgency, context and a compressed learned representation of a particular context-masked story state, known as digests, may establish a sprawling but traversable framework for evaluating the relationship between these elements during an Actualizer's optimization.

Specifically, during an optimization, unmasked attribute profiles and goals may feed into what may called the model's kernel (i.e., some deep learning model architectures make use of a kernel, which may refer to the part of the model that user models share), which may produce a reduced dimensionality representation of the kernel's learned representations/abstractions of that broad context. In the example embodiment, this reduced dimensionality representation of an input context may be referred to as a "digest".

At the same time that the above-described unmasked attributes and goals may feed into the Actualizer, before it produces a digest, a current context-mask of the attribute profile (a mask may include for example, only attributes derived within a single "conversation" or within a "collaboration" context) may also be constructed. Note, masking may be binary or weighted. I.e, out-of-context predicates may be ignored or reduce their contribution to final attributes.

As can be seen from the illustration, the output of the unmasked optimization context may become part of the input to each leaf node network and fanned out to all context-masked evaluation paths or strategies supported by the model (e.g., reinforcement learning model). In short, the Actualizer may learn to narrow its focus and return strategies optimized to a context a given context, while remaining aware of broader context(s). Because the Actualizer may have "leaves," which may take both digest input and context-masked input with a special focus (e.g., collaboration, conversation optimization, etc.) depending on the active context at query time.

Meanwhile, let's turn to the current context-mask of the attribute profile earlier described as being constructed (a mask may include for example, only attributes derived within a single "conversation" or within a "collaboration" context.) The masked attribute profile, now constructed, may become a context-specific state description which may serve as input to one leaf of each associated Actualizer.

Next, in the example embodiment, the Actualizer may concatenate the output of the unmasked context kernel and the masked attribute profile, and generate a context-weighted model input for "what works" in that context (e.g., a claimed policy in reinforcement learning).

The merger operation (context and urgency blending) may be characterized as encoding context-priority (and therefore urgency) natively in deep learning architecture (e.g., reinforcement learning architecture). In other words, balancing urgency across multiple hierarchical contexts may be achieved dynamically by the example embodiment.

Context-masking is recursive, i.e., a context may contain nested contexts; a collaboration context may contain role-specific nodes. If so, this process may repeat but with a new set of masked contexts and treating the previous context as a local kernel. And, eventually the system may reach a leaf context, may recurse no further, and may receive a context-masked Narrative Segment (use case) recommendation from an Actualizer leaf, heavily weighted towards the relevant context, but still aware of global context.

Note, referring now generally to urgency as mask-weight, at Actualizer inference time, at each recursion depth, prioritizing a "masked context" over the digest from the parent layer may determine the context's urgency.

FIG. 63 illustrates Story Model—models, particularly collaboration and the Actualizer: Collaboration through recursive message passing. See flow and descriptions in figure.

Figure 64:
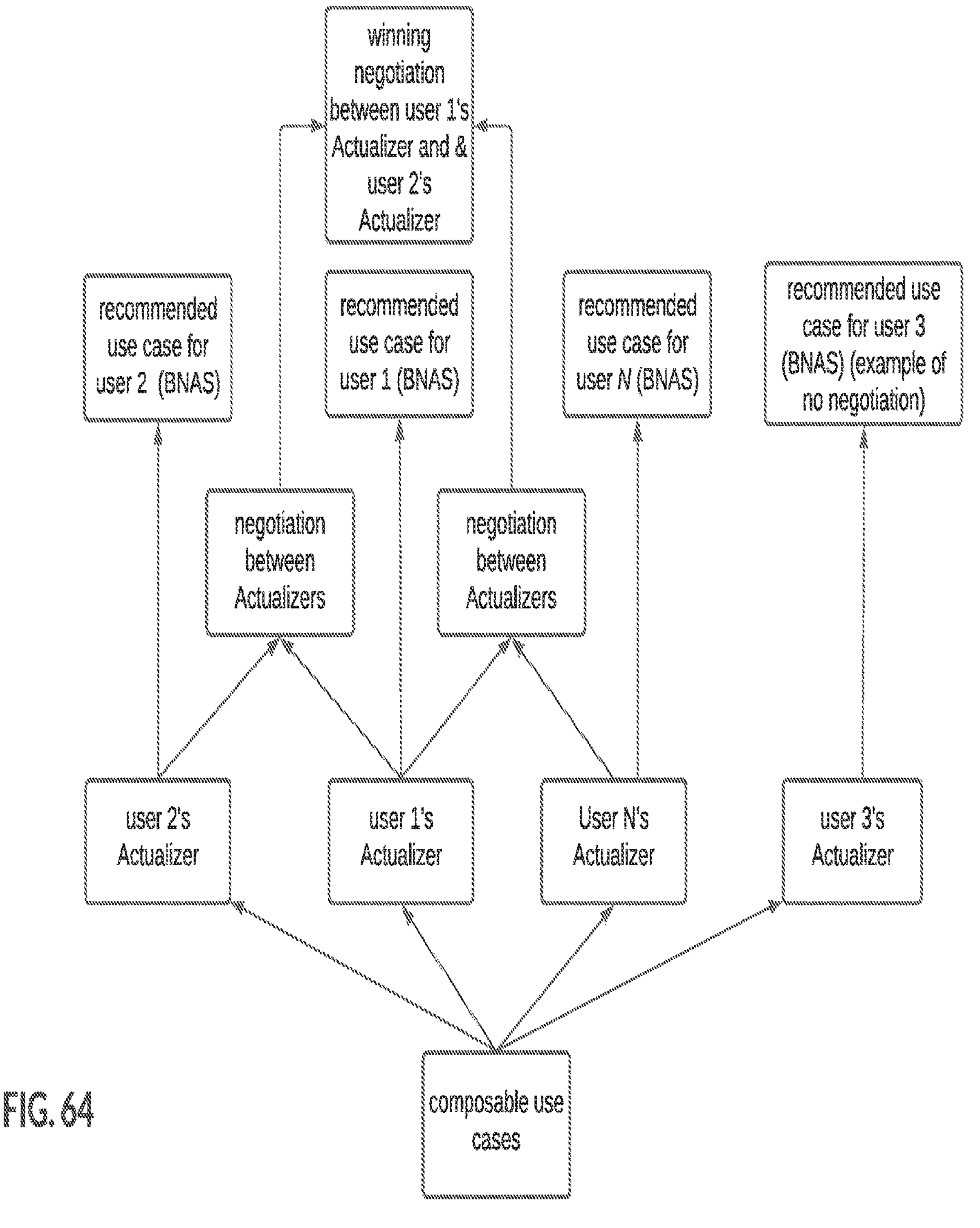
FIG. 64 illustrates a flow in the Story Model—models, particularly negotiation model to advance the goals of each user through collaboration with other users.

FIG. 64 illustrates Story Model—models, particularly negotiation model to advance the goals of each user through collaboration with other users. As an overview, each user's custom trained model (i.e., Actualizer) may identify the custom trained model (i.e., Actualizer) of each other user in the user's network with roles, skills and other attributes that meet requirements of the user's recommended best next action. Then, the user's Actualizer negotiates with all user Actualizers that meet requirements to determine which user's Actualizer goals are also advanced the most by meeting the requesting user's Actualizer recommended action. In the example embodiment, the negotiation model may initiate various ways, including when a user's Actualizer makes a user recommendation. Recall that the recommendation may be the optimal Narrative Segment (Targeted Narrative Segment or a use case) that the Actualizer selects after its evaluation of user goals, attributes, and all indexed Narrative Segments (use cases). The Actualizer's chosen Narrative Segment may have requirements (e.g., roles, deliverables, labor cost, etc.), which may be looked up for the user. For example, does the user have the skill to draw blood and produce a blood sample? In the example embodiment, other initiations of a User's Actualizer may commence upon receipt of a query, including from other user's Actualizers.

Meanwhile, the example embodiment may look up the Actualizers of other users in the user's network. Recall that the user's network of relationships may be established during user attribute construction, and that a user's social graph may be determined. The lookups conducted by the example embodiment may identify the Actualizers of other people, who also may be users. In the example embodiment, the lookup of Actualizers in a network of Actualizers may be conducted without having to surface the Identity of any user, only the Actualizer associated with them. For example, any personally identifiable information of users may be encoded as numbers or index values. Alternatively, or in addition, the similarity of Narrative Segments executed for other users to the currently recommended Narrative Segments for one user may be determined, with values normalized for certain requirements across users. Through such methods or other methods, including a grant of permission by users for other users to access certain personally identifiable information on their behalf, Actualizers in the example embodiment may use lookups for a pool of resources. For example, a user may permission financial professionals or health care professionals (or other professionals in other regulated industries) to access the same information about the user's finances or health, respectively, reducing repetitive submissions of similar information for similar professionals.

In the example embodiment, the identified Actualizers of other users associated with the user's social graph (connected to the user via edges expressing relationships in terms of validated instruments, role decompositions, and contract ledgers) may be queried by the user's Actualizer, based on permissions or other methods as described above, to determine above a threshold (e.g., similarity), if the other Actualizers represent users with the roles, skills and other attributes that meet requirements of the user's recommended best next action.

In the example embodiment, the user's Actualizer may negotiate with all connected user Actualizers that meet requirements to determine which other user's Actualizer's goals may also be advanced the most by meeting the requesting user's Actualizer's recommended action (Note: the Actualizer of the requesting user may be the winning Actualizer of a negotiation, i.e., no better resource found).

In the example embodiment, if no better resource may be found in the user's current network for the requirements of the action step, or if the user may not meet the requirements, the scope of the lookups by the example embodiment may be expanded to include other users Actualizers in the network outside the user's network, to negotiate with the user's Actualizer. Through this expansion, the user's Actualizer may begin negotiations with other Actualizers outside the user's own network (i.e., outside their social graph), and the above described process may be followed.

In the example embodiment, urgency as measured by a validated instrument as a function of incoming Story Data Types, may factor into the scoping of the lookups by a user's Actualizer. For example, if an elevated urgency score, which still falls below the threshold needed to trigger an emergency is calculated, the example embodiment may look up all Actualizers at once meeting requirements. As all requirements discovered through Story Inputs, these requirements may be context-tagged by the example embodiment, and the function of context may be used to help manage the urgency.

In the example embodiment, this lookup of other Actualizers to determine which ones may represent users that meet the requirements of a user's recommended Narrative Segment may expand to include organizations (i.e., other systems) that also may be users, or represent users. In the example embodiment, the actions and requirements of organizations may be normalized and represented to the user's Actualizers as an organization's Actualizer. In such an embodiment, the organization may be considered just another user.

For example, a hospital or physician practice may have an Identity, based on its many roles (e.g., radiologists, ER doctors, phlebotomists, surgeons, etc.), just as other users, as entities, may have Identities. In the example embodiment, the Identity may include, but may not be limited to, evaluations of the relative strengths of each role, which may also be context-tagged. For example, diagnosing a broken bone after 6 pm (radiologist) as opposed to a cancer consultation (oncologist). Just as roles may be valued in relation to each other to establish a user's Identity, so too may these roles in an organization be used to establish an organization's Identity.

Further, just like individuals, the attributes of organizations may be determined by the example embodiment, for instance, from ratings by ratings services, consumers, and so forth, in certain areas. For example, a hospital may be "known" for its excellence in "radiology" or be cited as being a "top rated" organization in knee replacement (orthopedic surgeons). The goals of an organization similarly may be set by the organization, through its leadership (board members, CEO, etc.) each of whom may play a role within the organization, which in the example embodiment may feed into the organization's Actualizer.

Meanwhile, through Narrative Segment development (use case development), the organization's Actualizer may have available to it Narrative Segments and requirements for them that may satisfy the requirements of certain Narrative Segments recommended to users.

Moreover, in the example embodiment, data aggregated for each professional role (e.g., a role for which a license may be required and standards may exist, including measures for them), may be used to train an aggregate role behavior model. In the example embodiment, such a model may model compliance with standards and produce a rating and/or index by which to measure each individual practitioner (See FIG. 96). This example embodiment may determine a professional user's fidelity to, say, CPT billing codes (i.e., Current Procedural Terms, used in medical practice for reimbursement), for example, or another standard. In the example embodiment, the aggregate role behavior model may be used to facilitate compliance with standards at both individual and organizational levels, as well as to inform the evaluation of an organization's Identity. In the example embodiment, the aggregate behavioral model may be used also to facilitate actions by professionals (e.g., via Narrative Segments based on aggregate behaviors/actions) that may be deemed medically necessary.

In the example embodiment, the aggregate role behavior model described above may be used to compare an individual practitioner's actions (received as Story Model Inputs) against the index for all practitioners of that role, as well as against the relative strength of other practitioner's role within an organization's Identity. In the example embodiment, the resulting comparisons may include, but may not be limited to, identifying disparities in quality of outcome (e.g., via Impact Analysis after an Actualizer's recommendation), pay/cost differentials by evaluated role, and so forth.

As a result of the foregoing, from time to time, Story Model Inputs from a user may pass through a sequence of Story Model functions (e.g., the negotiation of two or more Actualizers), to yield predictions of what organization (or other narrative entity) may satisfy a user's best next action. For example, a user may be determined from attributes constructed from Story Model Inputs to be likely in a predominantly patient role in a non-acute but evolving condition. The user's Actualizer may negotiate in this example with other narrative agent Actualizers (e.g., users, organizations) based on the user's Actualizer's recommendation. For example, it may determine from these negotiations whether or how to route a user who is predicted by the example embodiment to be in the early stages of developing an acute condition to the nearest hospital or to the best nearest hospital for the identified condition, or alternatively simply to a specialist for priority booking on the specialist's calendar. The above example may involve entraining outputs by the optimizer with multiple different GPS and emergency response systems, and electronic medical record systems to evaluate and choose which resource may be best for the user's optimal Narrative Segment.

In the example embodiment, the optimal user (resource) for each user's best next action may be determined by above described successful Actualizer negotiations between user/organization Actualizers. In the example embodiment, the best next action may be surfaced to determined optimal user via NL for approval/response, if not executed automatically by rule, including those pertaining to detected or stated emergencies. See description and flow in figure.

Figure 65:
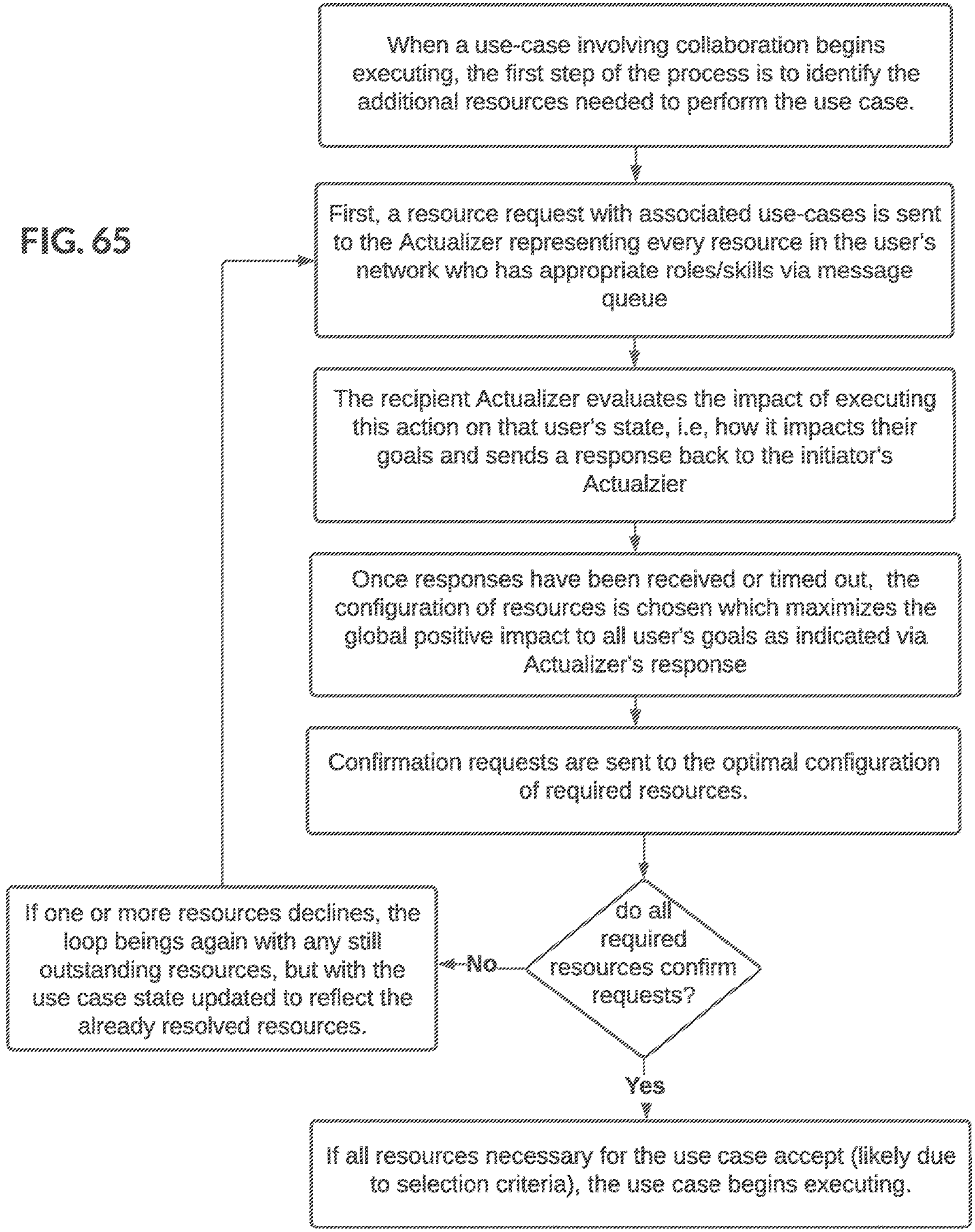
FIG. 65 illustrates a flow in the Story Model—models, particularly Resource Resolution.

FIG. 65 illustrates Story Model—models, particularly Resource Resolution. See flow and descriptions in figure.

FIG. 66 illustrates Story Model—models, particularly computing and executing winning negotiations between user models. See flow and descriptions in figure.

FIG. 67 illustrates Story Model—models, particularly escalation and non-responsiveness. While automated negations between N Actualizers may fully resolve many collaborative processes, some collaboration processes nay require user intervention for a resolution. If a user required for an intervention to resolve a collaborative process is non-responsive to a request for the user's intervention, the user's non-responsiveness may delay, impede or prevent a collaborative process resolution. For example, one user may be a patient who needs to schedule a doctor's appointment with another user, which may be a calendar system, involving a third user, such as a human scheduler, and an insurance company that may need to approve the appointment, as a fourth forth user, and so on. To determine non-responsiveness of a plurality of users, the example embodiment nay use various methods, including setting a maximum lag tine between responses between users based on Story Logs (a Story Data Type), analyzing a user's Contract (a Story Data Type), which on Contract ledgers of gives and gets may show missed Deliverables (a Story Data Type) between users, and other methods. These early detection methods may work in tandem with various other processes that may run constantly in the background of the example embodiment to reduce the likelihood of a user's non-responsiveness to inquiries generated by system users as well as human users, and to calibrate the escalation processes to address the user's unresponsiveness, when unresponsiveness is identified. As shown in FIG. 67, after the need for a user's intervention to resolve a collaborative process is identified, various processes are implemented to generate a communication, to the user whose intervention is needed. The communication generated by the example embodiment for each user identified as needed for an intervention to move the collaboration along may be conditioned by the example embodiment on a correlation between urgency scores and the relationship context involving each, user and other users with whom each user is communicating, before the communication is then distributed to the user by a communication channel determined to be preferred by that user.

Figure 68:
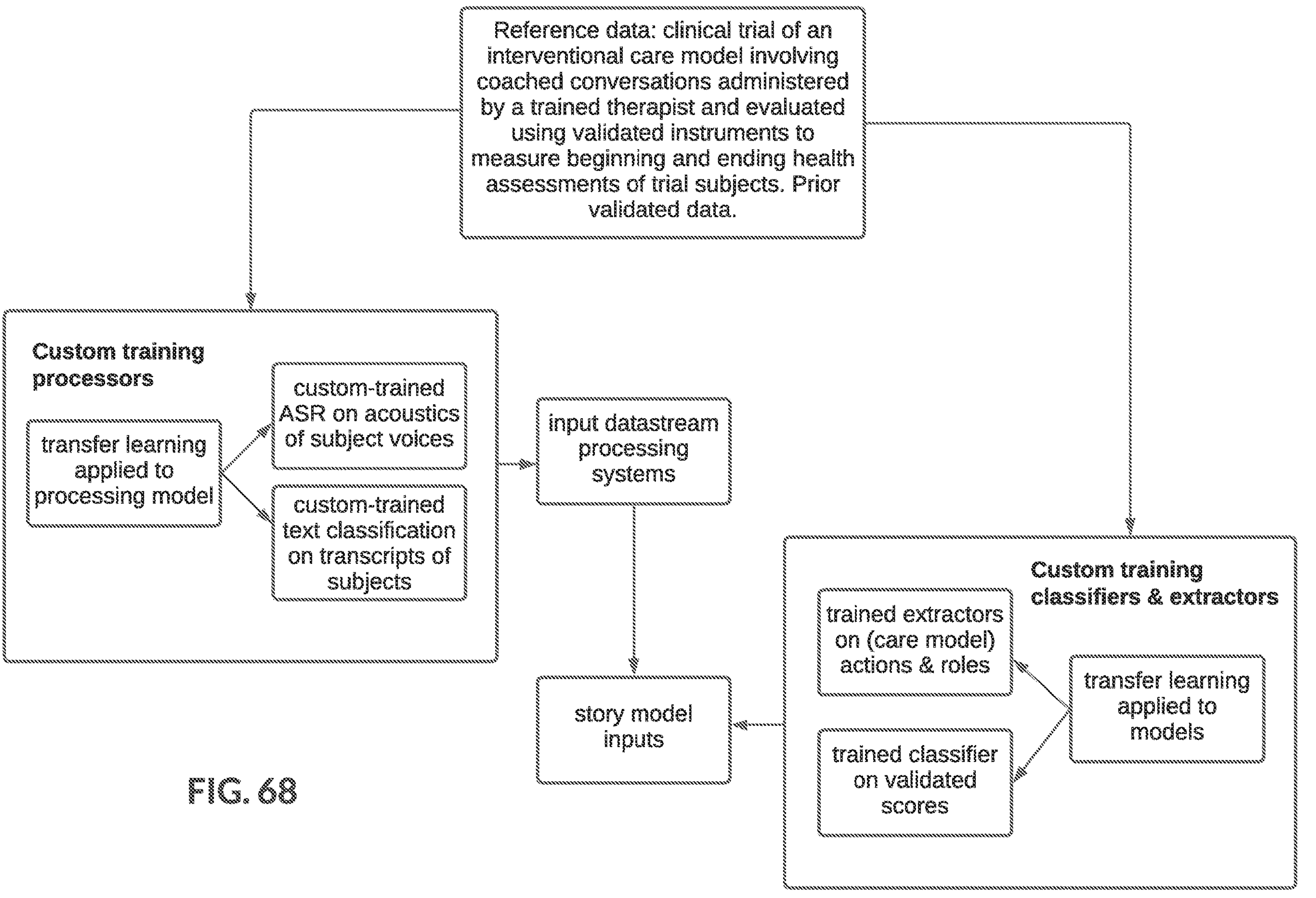
FIG. 68 illustrates a flow in the Story Model—training, particularly ASR, classifier and extractor reference data for training.

FIG. 68 illustrates Story Model—training, particularly ASR, classifier and extractor reference data for training. In the example embodiment, models or an ensemble of models to generate automatic speech recognition and text classification may be trained on training datasets. To train example embodiment models, various methods may be used. In the example embodiment, input speech may be processed by an ASR custom-trained on the acoustics of subject voices from the training data, and the processing of text may be performed by text classification custom-trained on subject transcripts, or other text, from the training data.

Datasets used to train models may be processed by the example embodiment as Story Model Inputs. This is to say that inputs from the training data may be featurized/formatted appropriate to the data type (e.g., video, audio, text, sequential), and an appropriate set of features or outputs generated, for inspection—during training. In turn, Story Model Inputs from training data may be used by the example embodiment as inputs to train classifiers and extractors.

To train classifiers, training data from Story Model Inputs may include starting and ending scores of the validated instruments used in randomized controlled studies. These starting and ending scores may be used to measure progress during a studied intervention and evaluate the effectiveness of the intervention. The evaluation of the data may be based on regression and deep learning models alike for the training. In the example embodiment, scores used as inputs from the training data to train classifiers may be based on validated instruments, such as for Quality of life, anxiety, and so forth. In turn, classifiers may be trained for what features evidence what scores, and extractor trained for what features evidence what predicates.

With reference to extractor training, sections in transcripts of recorded conversations may be matched to steps in a care model as well as to roles of professionals (e.g., cognitive behavioral therapist) executing or describing the care model. Training materials may include other text, as may be found in the literature used to describe a care model. Additionally, training inputs for extractors may include video and other data used in communications modalities.

Extractors may also be trained on constructs for SVOs (e.g., roles, skills, deliverables, etc.) which may be encoded into the knowledge base to facilitate knowledge base resolution.

The above-described steps may be used for other models involving a professional practice, such as law, finance, accounting and so forth where there may be a license, codes for conduct, best practices and measures for assessing the quality of the product, which may include ratings.

The above describe a few of the steps to custom-training classifiers and extractors on care models (or other types of professional models), roles, actions and scores, using pre-trained classifiers and extractors to determine anxiety and other states from the voice and text, as well as roles and other Story Data Types already encoded in the knowledge base.

Figure 69:
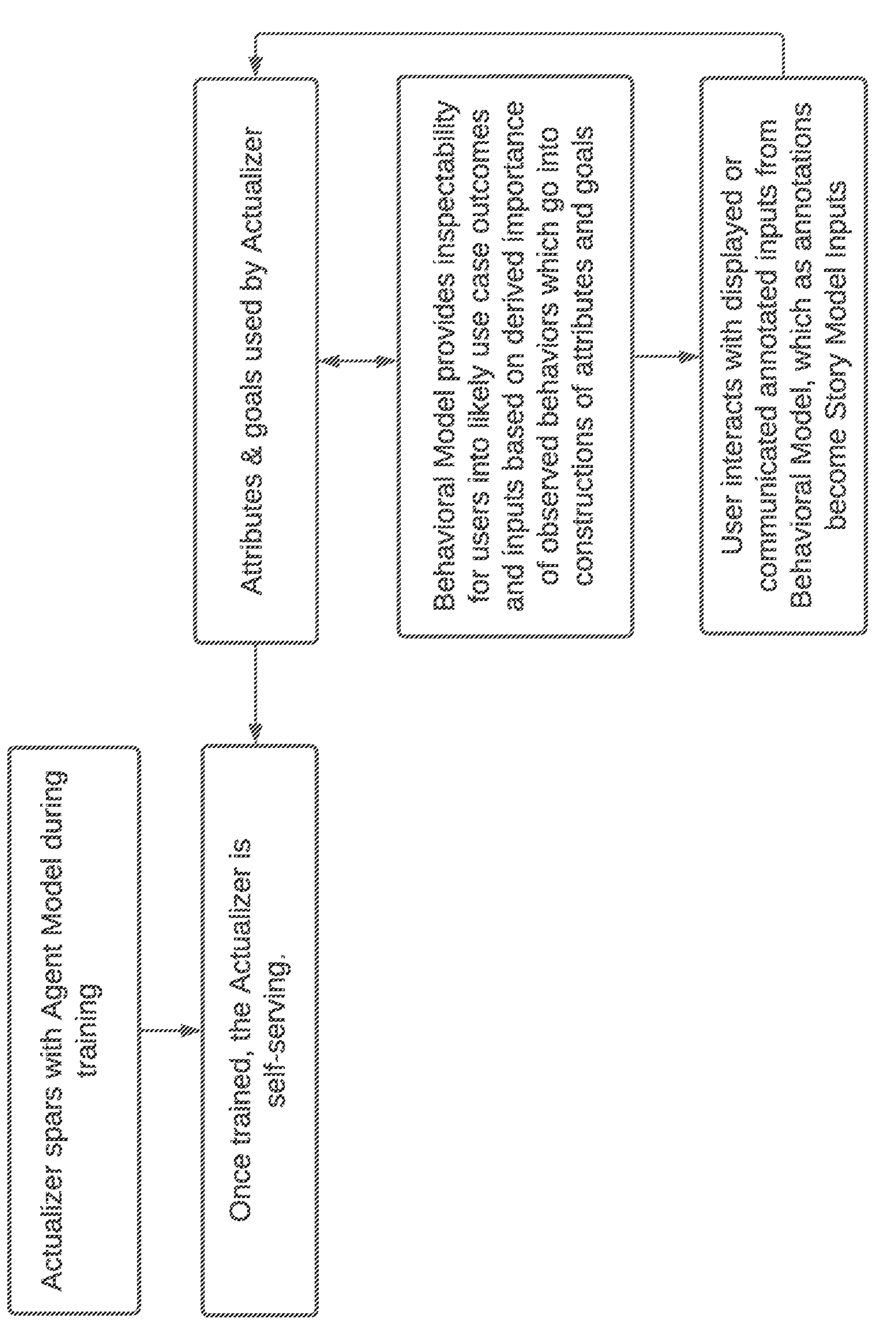
FIG. 69 illustrates a flow in the Story Model—overview of relationships between various deep learning models during runtime, particularly Actualizer, Agent, and Behavioral models.

FIG. 69 illustrates Story Model—overview of relationships between various deep learning models during runtime, particularly Actualizer, Agent, and Behavioral models. In the example embodiment, the Behavioral Model may use inputs from user attributes and goals (see FIG. 70) to provide inspectability into likely use case outcomes. Besides outputting a likelihood that the currently recommended Narrative Segment (use case) may be "completed" by the user, the behavioral model may also be used to derive or interpret the importance of various attributes to the user from the user's "observed" behavior (via Story Model Inputs analyzed as evidence of actions during Impact Analysis). Recall that another data source that feeds into the Behavioral Model may be Impact Analysis (See FIG. 37); Impact Analysis may include actions "observed" from evidence (Story Model Inputs) to advance the user towards goals. Consequently, the example embodiment may use inputs based on derived importance of observed behaviors to construct or update attribute and goal values. In other words, the behavioral model may use attribute and goal values not only to predict the likelihood of the recommended use case being acted on but also to generate new inputs into the process of attribute and goal value construction. Through the foregoing, the likelihood of a user acting on what is important to them may be "baked into" recommendations made by the Actualizer based on attribute and goal values derived, at least in part, by what may be shown to be important to users by the behavioral model. This may aid in the inspectability of the behavioral model. Users may see from inspections of the behavioral model how their actions impact what may be important to them, and as such, the example embodiment may represent a real-time use of AI to assist users in discovering "meaningfulness" of actions in personally relevant narrative contexts. Conversely, the attributes which interact with the behavioral model—such as importance of this role to the user and satisfaction and dissatisfaction (separately, since they are not always anticorrelated) of a particular Contract to the user—are metrics that may be used to understand the users' motivations and decision-making processes. In this regard, the interaction between the observed behavior and current attributes mediated by the behavioral model may focus on actual behavior as opposed to the user's stated (but unjustified) attributes and even goals. This may allow the example embodiment to interpret whether behaviors are due to poor reasoning (e.g., in the case of cognitive decline), unrealistic goals, insufficient willpower, or even rebelliousness against the system itself.

While user behavior may not be optimized directly (i.e., people simply may not act on a machine's recommendation), the example embodiment's methods to optimize recommendations based on what is known to be important to users, as described, may increase the likelihood that the user will act on them. In the recurrent process of training a behavioral model, the example embodiment may be used to compare the observed and/or predicted actions to the actions under a null hypothesis where the example embodiment was not/is not used. As a result, the example embodiment itself may estimate the gain that it may provide to each individual user and may even quantify the specifics of that gain, e.g., it provides moderate support in helping the user manage their blood sugar by noticing a pattern of forgetting to take pills or it provides major support in helping someone reach a long-term goal by gently reminding them to be diligent. For example, the user's behavioral model may be used to predict that, say, Chad is now spending X % of his day on actions important to Chad which is an increase of Y % based on the null hypothesis (of no interaction with our system). See flow and descriptions in FIG. 69 for further details.

Figure 70:
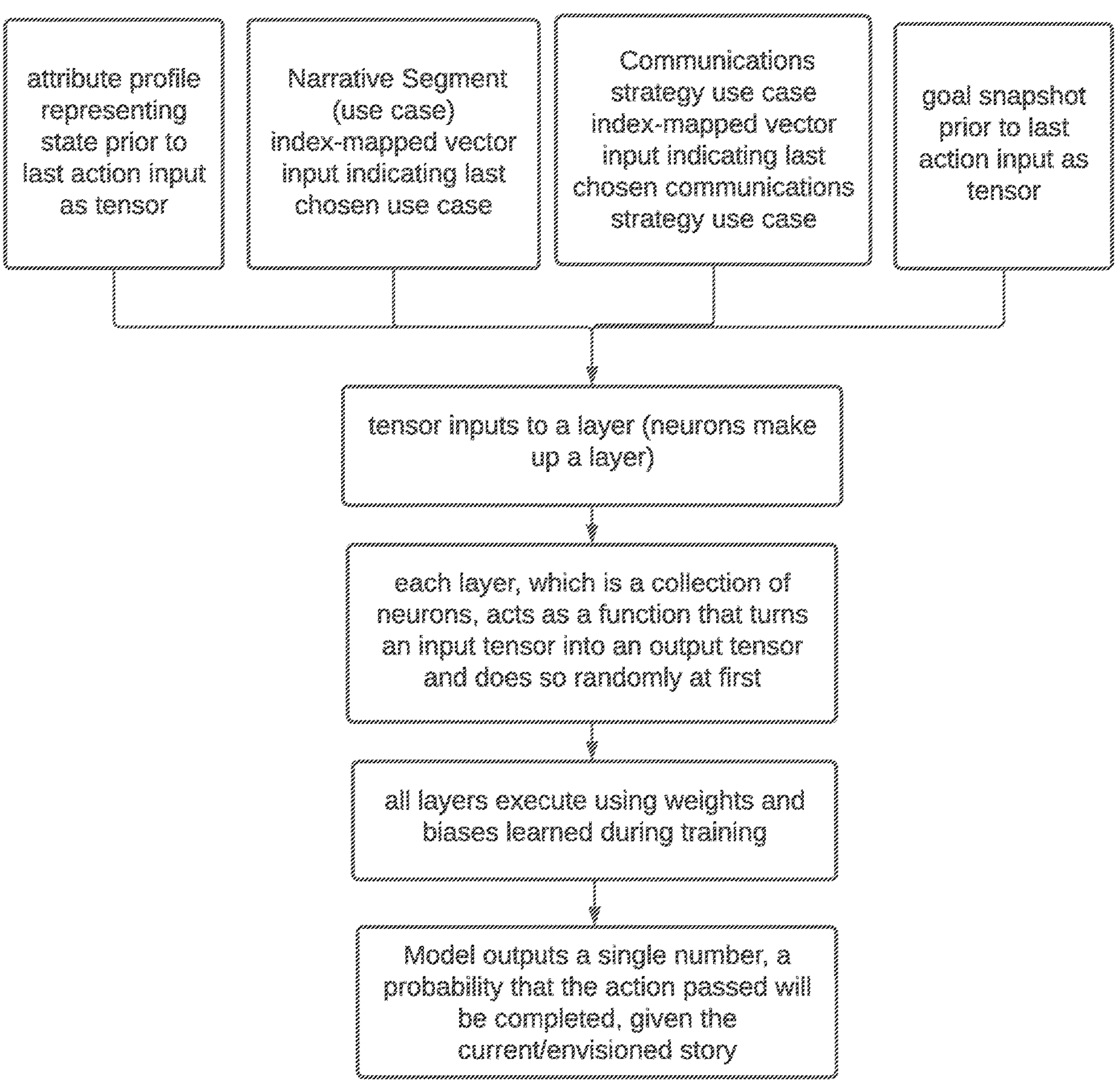
FIG. 70 illustrates a flow in the Story Model—training, particularly behavior model runtime.

FIG. 70 illustrates Story Model—training, particularly behavior model runtime. See flow and descriptions in figure.

Figure 71:
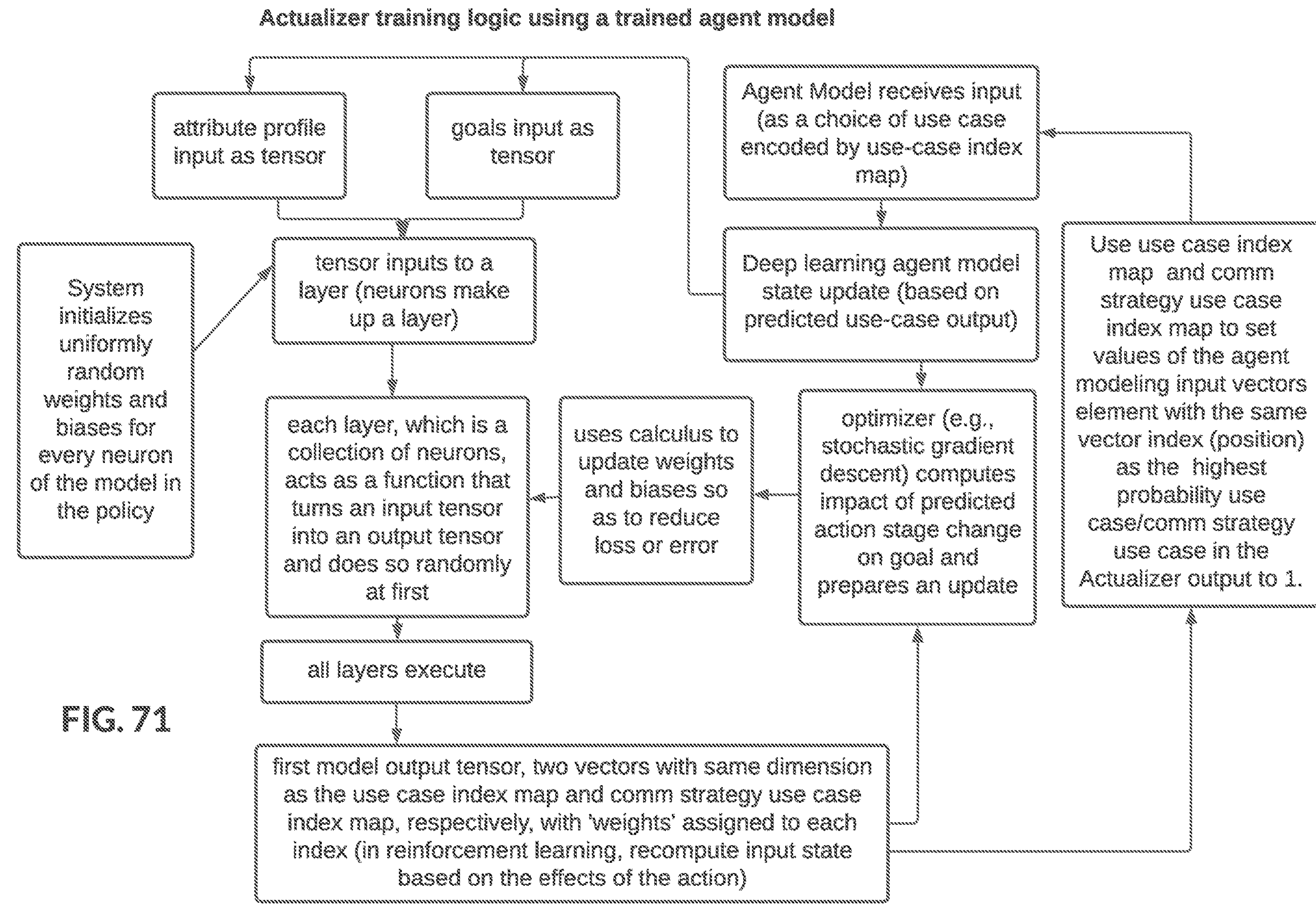
FIG. 71 illustrates a flow in the Story Model—training, particularly RL training logic using a trained agent model.

FIG. 71 illustrates Story Model—training, particularly RL training logic using a trained agent model. See flow and descriptions in figure.

Figure 72:
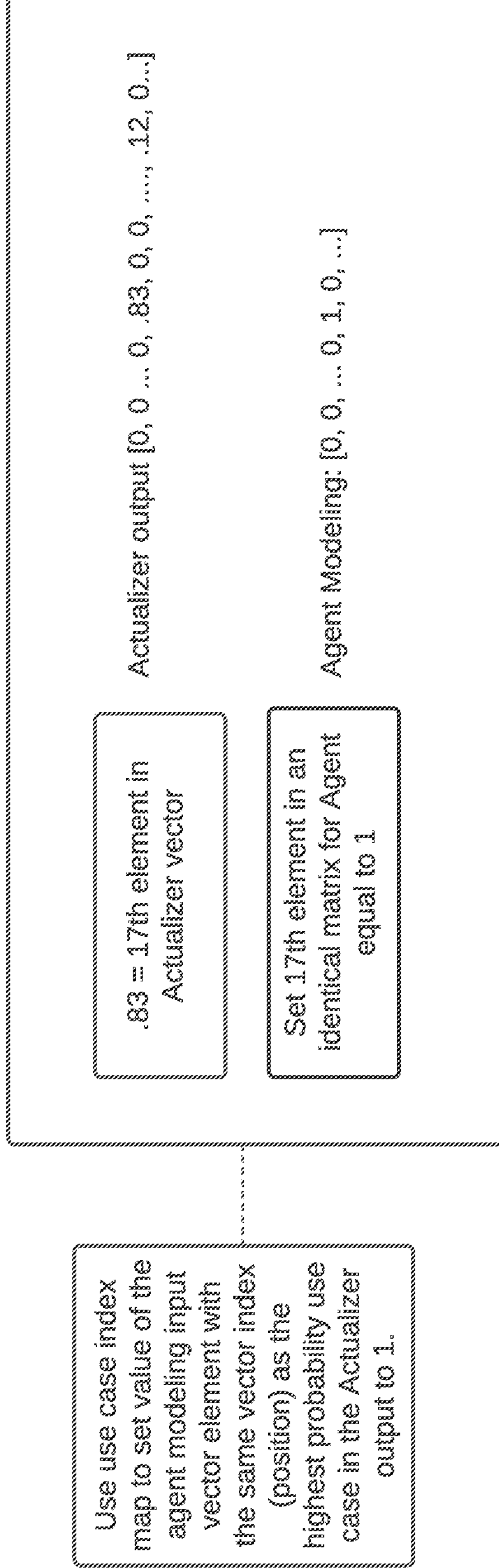
FIG. 72 illustrates Story Model—training, particularly RL training logic using agent model.

FIG. 72 illustrates Story Model—training, particularly RL training logic using agent model. See flow and descriptions in figure.

Figure 73:
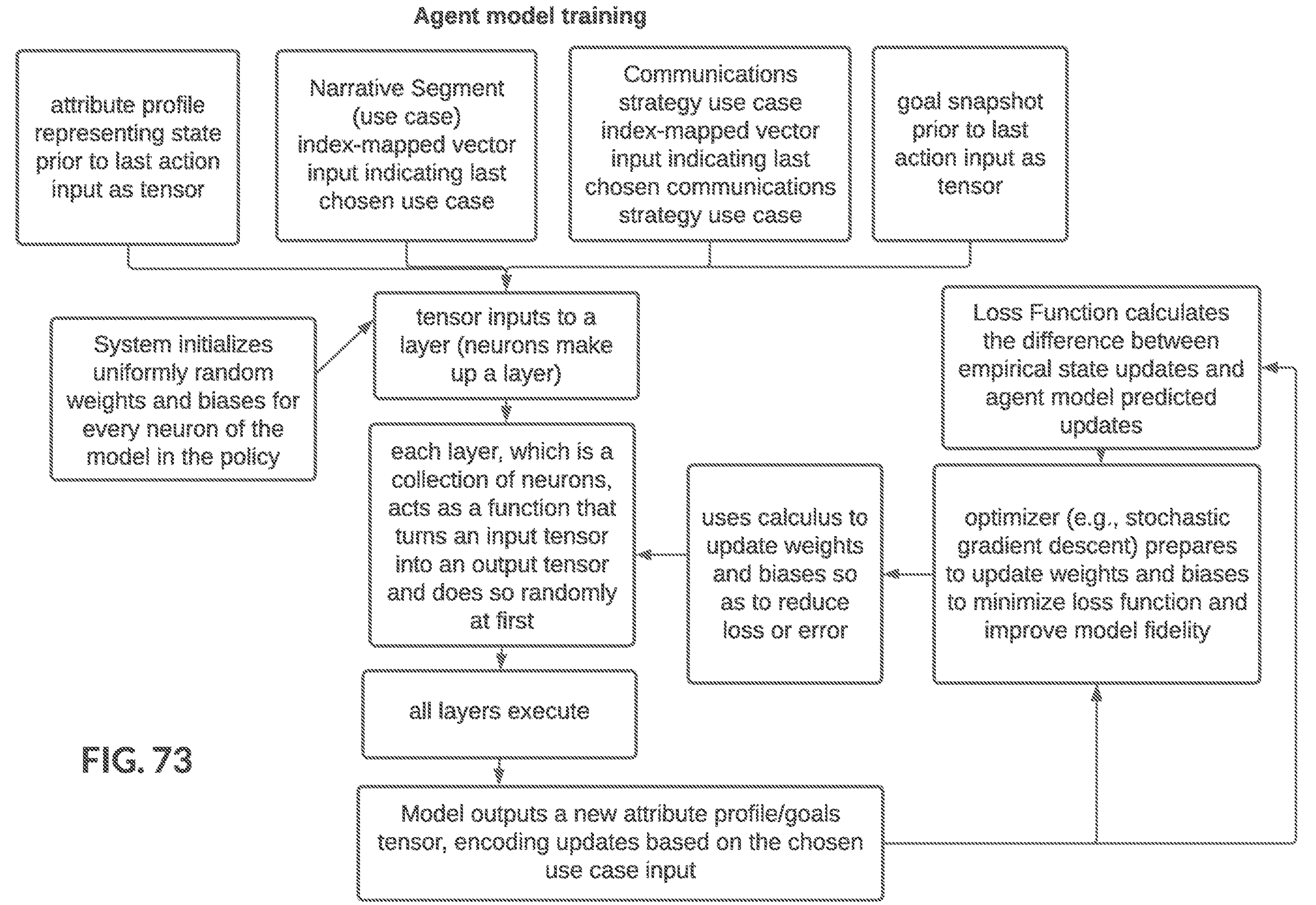
FIG. 73 illustrates a flow in the Story Model—training, particularly agent model training.

FIG. 73 illustrates Story Model—training, particularly agent model training. See flow and descriptions in figure.

Figure 74:
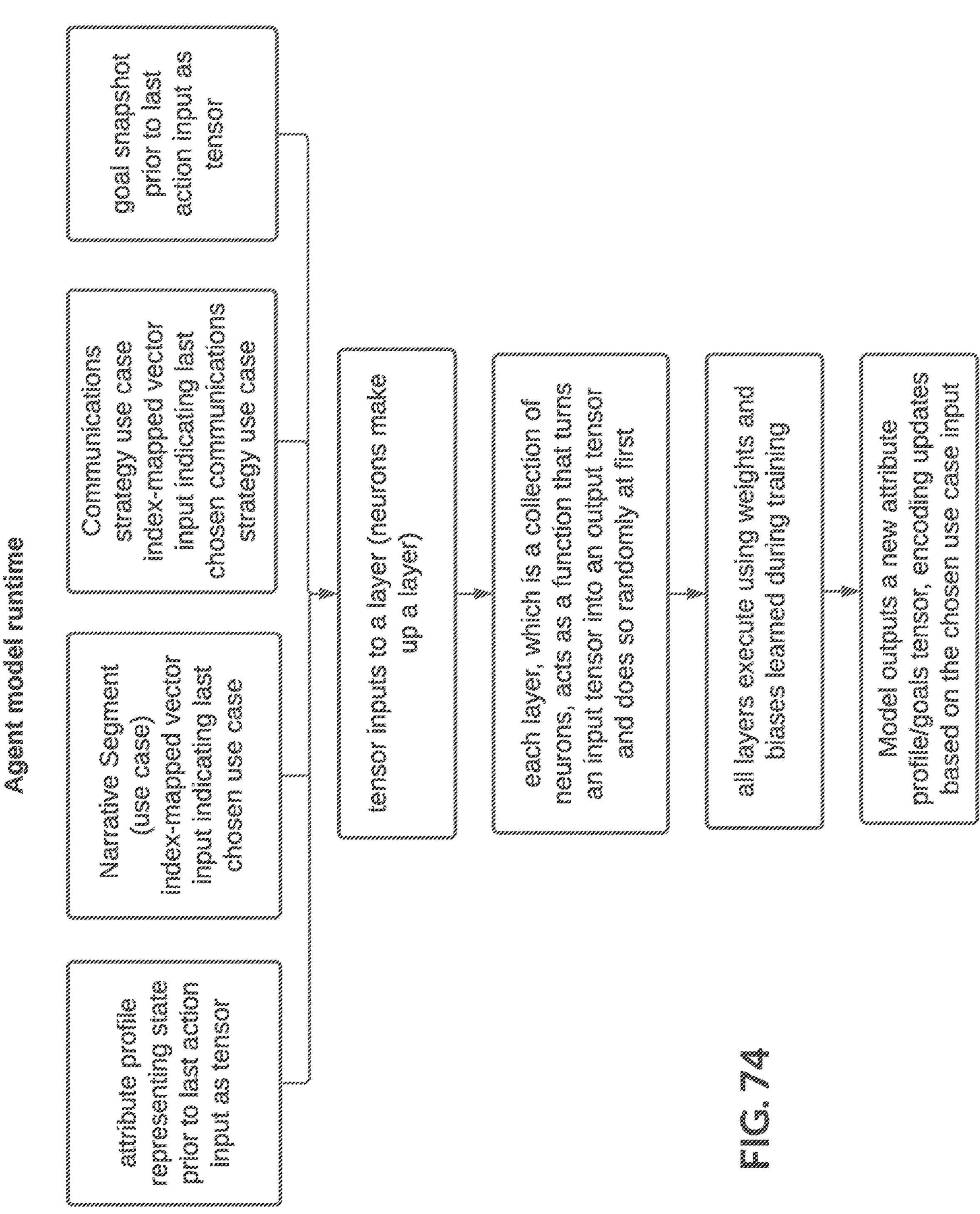
FIG. 74 illustrates a flow in the Story Model—training, particularly agent model runtime.

FIG. 74 illustrates Story Model—training, particularly agent model runtime. See flow and descriptions in figure.

Figure 75:
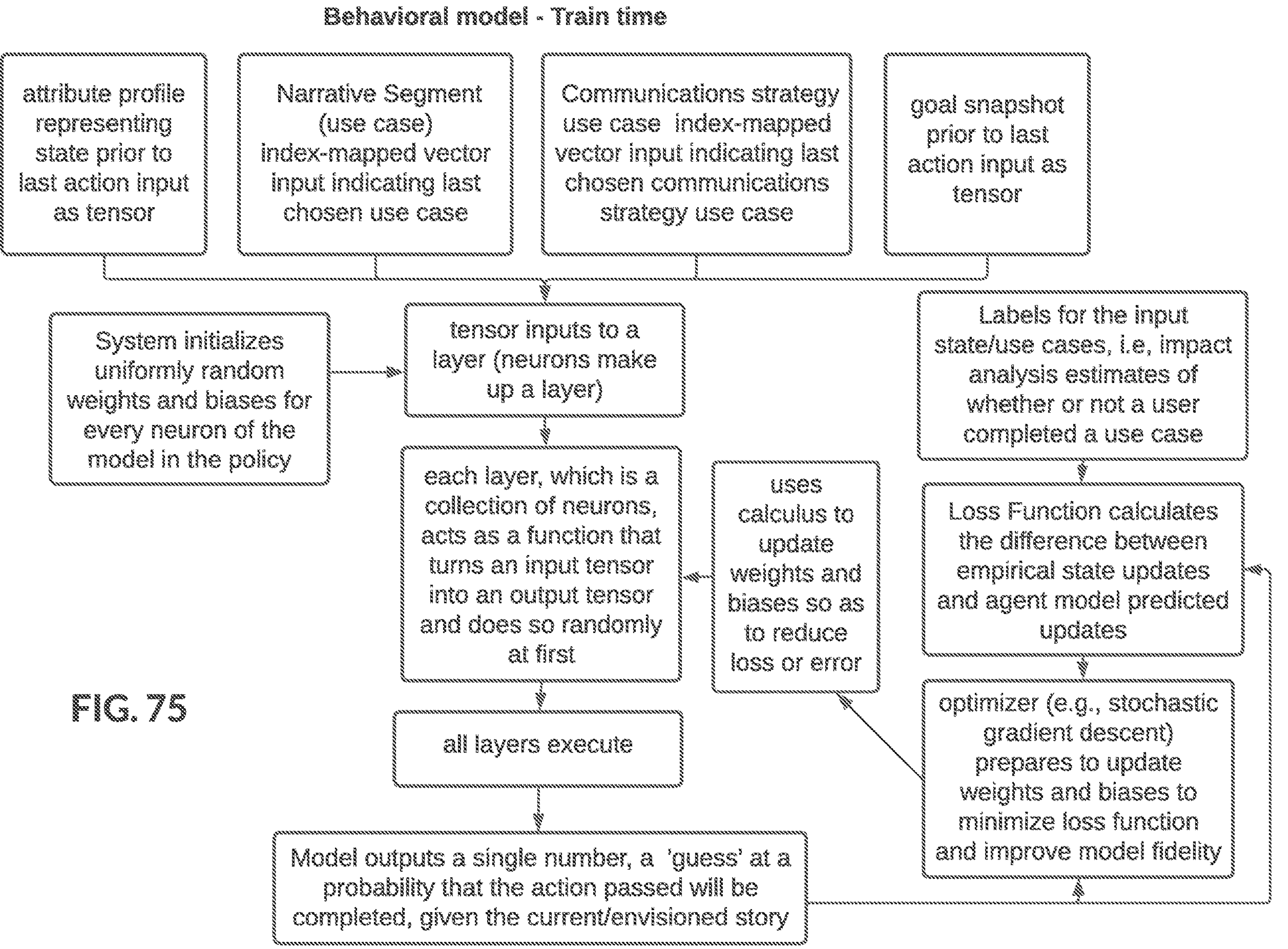
FIG. 75 illustrates a flow in the Story Model—training, particularly behavioral model—Train time.

FIG. 75 illustrates Story Model—training, particularly behavioral model—Train time. See flow and descriptions in figure.

Figure 76:
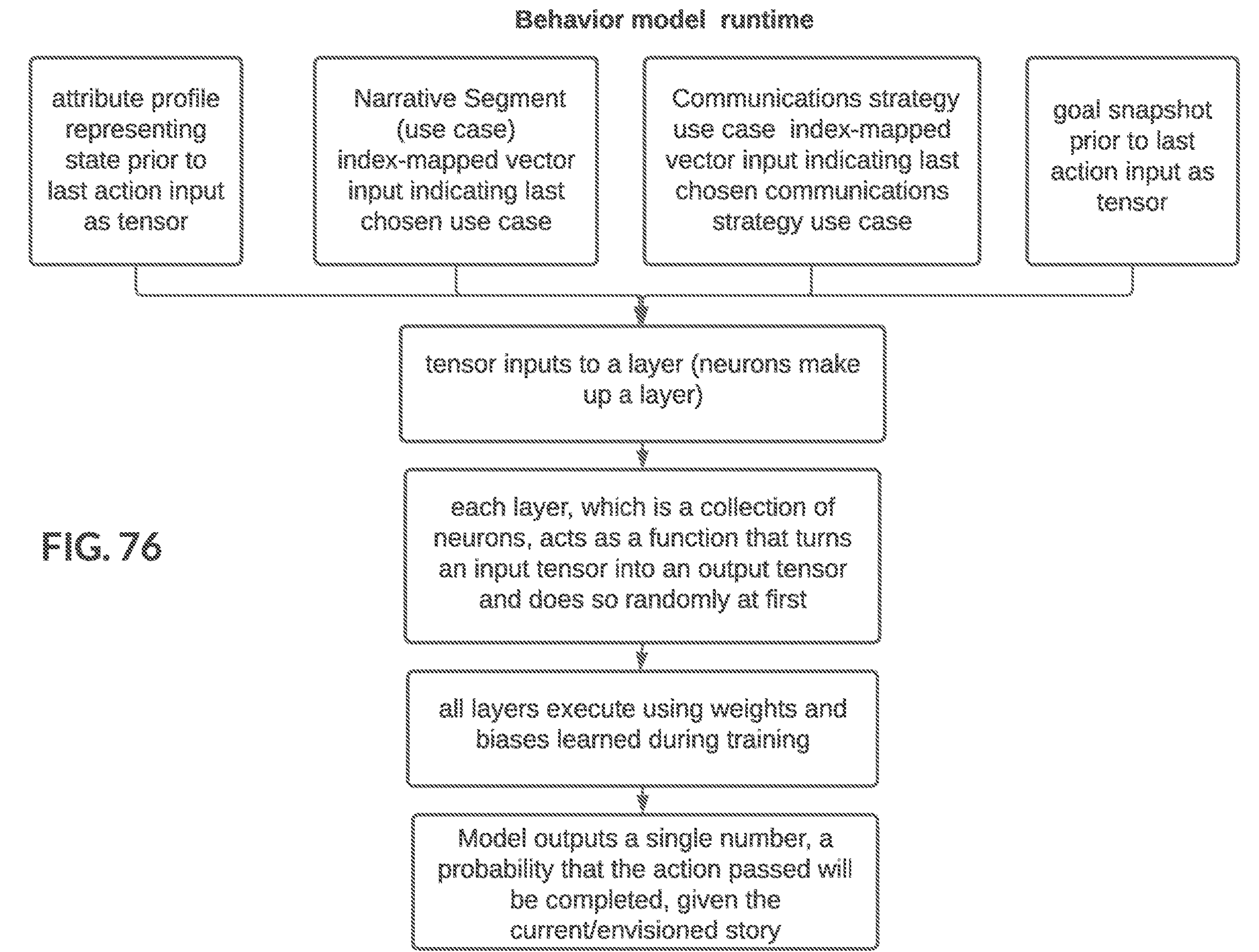
FIG. 76 illustrates a flow in the Story Model—training, particularly behavioral model—run time.

FIG. 76 illustrates Story Model—training, particularly behavioral model—run time. See flow and descriptions in figure.

Figure 77:
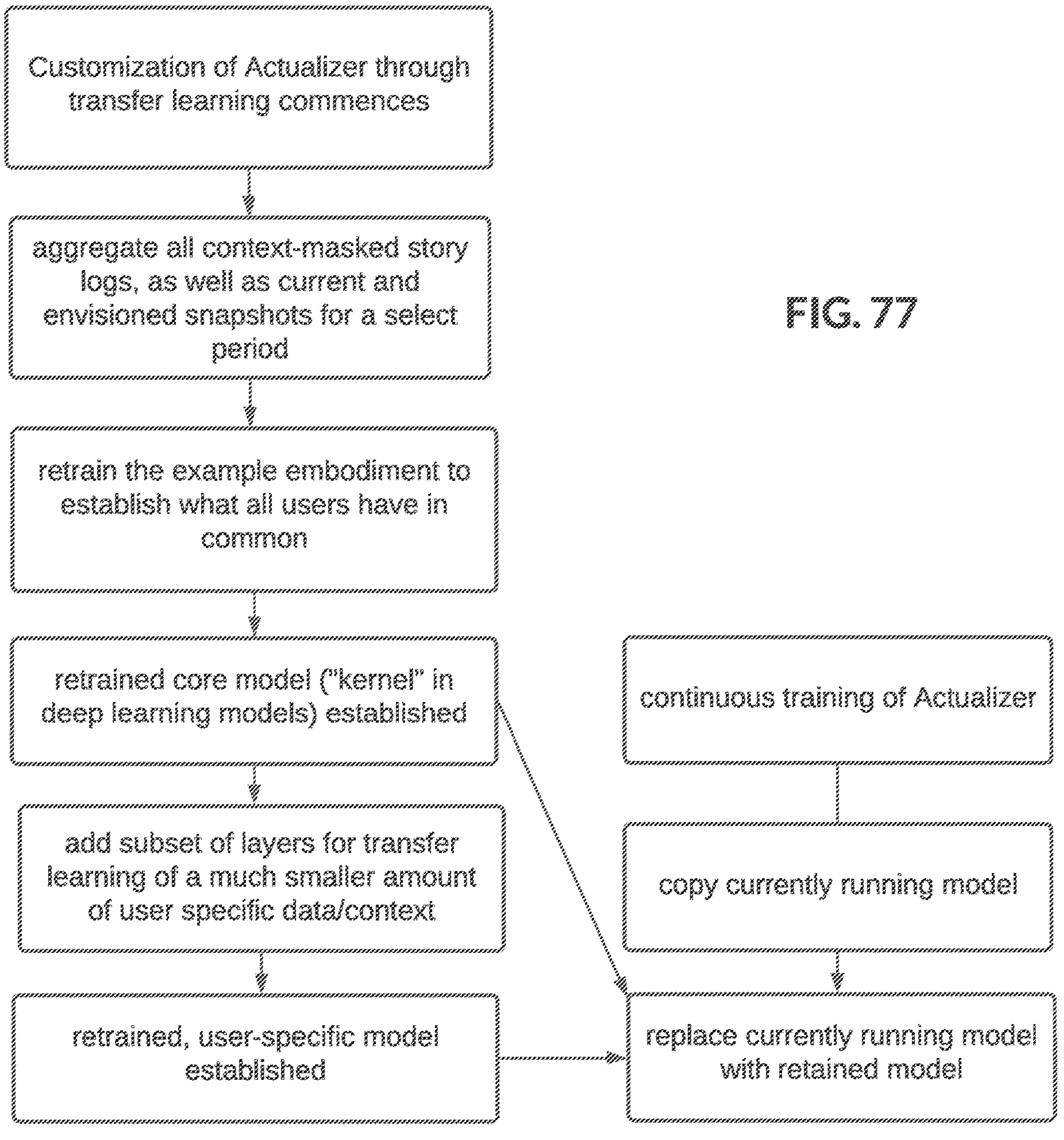
FIG. 77 illustrates a flow in the Story Model—training, particularly customizing the Actualizer by using transfer learning and continuous training.

FIG. 77 illustrates Story Model—training, particularly customizing the Actualizer by using transfer learning and continuous training. See flow and descriptions in figure. Additionally, note that in deep learning models, there tends to be a "kernel" or core set of layers that may act globally to perform similar tasks for all agents, or users, of that particular deep learning model. Because each user's agent may "share" this same core, agents that use the model may interact with each other. However, since agents represent users who differ from each other, it may be necessary to train the system (e.g., agents, deep learning models) on the uniqueness of each user. Methods accounting for the uniqueness of each user may advance the likelihood the user find's the system's recommendations relevant and lead to more use of the system.

As described previously, the user's Current Story and Envisioned Story may be user-specific, from the outset. To also customize the model's strategy for choosing actions, a method may be used to combine customization techniques: Transfer Learning and Continuous Training.

Continuous Training as illustrated in FIG. 77 may refer to limited, low volatility updates of a model while it is in active production. By fixing a kernel and applying transfer learning only to a few layers, frequent updates may be made to the model performantly, so it may factor in User-level behaviors in quasi-real time. These updates may be updates to user-specific strategy (i.e., Actualizer), after enough data is collected from specific users (i.e., enough actions are performed, scored and converted into predicates, for treatment as evidence).

Transfer Learning may refer to how example embodiment may take advantage of general observations, while still specializing them to a target application or user. The example embodiment may aggregate data from ALL users to retrain the "core" (e.g., a kernel in a reinforcement learning model) periodically. This "kernel" may have significant general knowledge about what works/doesn't from having observed numerous actions and their effects against different attribute profiles. All user models may use the kernel, but all user models also may be "specialized," using what may likely be a smaller amount of user specific data/context on a subset of the model layers.

The combination of these two techniques, Continuous Training and transfer learning, may achieve user-specific strategies for users to accomplish objectives (Goal values set during Envisioned Story Generation).

Figure 78:
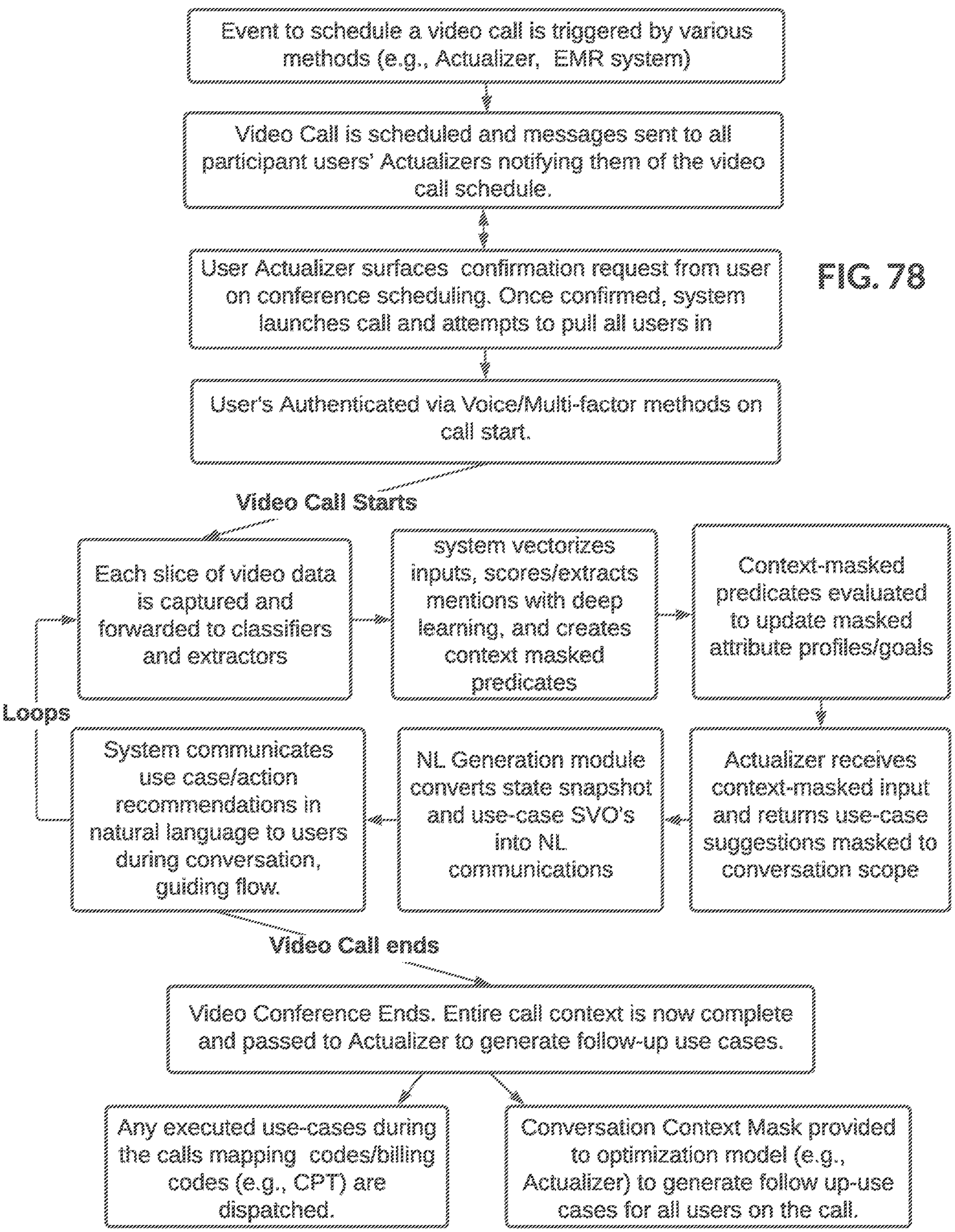
FIG. 78 is a flow diagram for an instance of the example embodiment described in FIG. 6 as remote consultations and workflow, especially involving video calls.

FIG. 78 is a flow diagram for an instance of the example embodiment described in FIG. 6 as remote consultations and workflow, especially involving video calls. During a video call, multiple datastreams comprising multiple different data types from multiple different devices used by multiple simultaneous users may be received, tagged and processed by the example embodiment as Story Model Inputs (See FIG. 7 and following).

The example embodiment may perform various functions regarding video calls. These video call functions may include, but may not be limited to, recommending, organizing, arranging, scheduling, logging, hosting, operating, populating (e.g., via negotiation between users' Actualizers), launching, conducting, managing, documenting, recording, concluding, summarizing, scoring, rating, annotating, analyzing and archiving Video calls. The example embodiment may perform these functions via leveraging Story Model Inputs and Story Model functions where appropriate.

As it relates to the term, "Video call," the term may be used interchangeably with "video session", "video conference", "conference call", "remote consultation", "telemedicine session," "video interview," "work session", "recorded meeting", "remote visit", "online session", "online meeting", and multiple other words, including simply "meeting" or "session," to refer generally to interactions supported by the example embodiment that may take place between users in one or more locations at the same time (pre-arranged or not), involving various modalities of communication, various devices, and various data types, such as audio and/or video/images, and/or text and combinations thereof. In the example embodiment, text may be included in connection with a video call. For example, during a "video call" operated by the example embodiment, a user may "participate" in the meeting by text/chatting with, or even emailing, other participants, and/or by seeing and commenting on a live transcript generated from live conversations between users.

The example embodiment may use device IDs, communications modalities, session IDs, logs (including locations) and other methods to identify and tag various data streams of different data types associated with the video call and the users on the video call. As described elsewhere, these "context tags" may propagate throughout Story Model Inputs and Story Model functions to support masking of various functions, including optimizations, by context.

Interactions between users before, during and after a video call operated by the example embodiment may be through their devices, which may be connected to the system. Other interactions may include those between the example embodiment and other systems or devices that may also be connected to it (e.g., electronic medical record systems, clouds). Interactions may be context-tagged and processed as Story Model Inputs. In turn, Story Model Inputs may feed into each user's respective Story Model, which may construct from Story Model Inputs a user's Current Story and Envisioned Story. Next, the user's Story Model may produce real-time recommendations (best next actions) for each participant optimally styled for communicating it, generate a NL communications to convey the stylized recommendation, receive new Story Model Inputs regarding users' actions after receiving the stylized recommendation, analyze the impact on user goals of the user's action, and then make a new recommendation. In the example embodiment, the input-output cycle between Story Model Inputs and Story Model outputs may repeat continuously before, during and after a video call, providing real-time, contextually appropriate, dynamically generated and individualized recommendations stylized specifically for each user. In the example embodiment, the Story Model Inputs (e.g., scored transcripts) and the Story Model (e.g., Impact Analysis, behavioral model outputs) may be inspectable by the user at various points. So, a video call conducted through the example embodiment may also be a collaboration or set of interactions guided by it. As well, the example embodiment may provide a certain level of inspectability into these interactions for live or follow-up analysis and comment, which in turn may be treated as new Story Model Inputs.

Additionally, note that the collection of figures inclusive of FIG. 78 through FIG. 101 may illustrate how the example embodiment, which may include the flows and descriptions illustrated by these figures, may support, facilitate, execute and resolve case management cases (CMC) in a professional service. While FIG. 78 may describe a telemedicine session conducted by video specifically, which may be used in the medical evaluation and management of a patient case, the example embodiment may support and be used to execute in whole or in part various other professional services that may also utilize video calls.

In the profession of law, video calls may be used by the example embodiment to take depositions, record trials, and serve other relevant workflow and documentary purposes in the evaluation and management of a legal case. In finance, video calls may be used by the example embodiment to facilitate financial planning sessions, build rapport with clients during interactions about their investment portfolios, and so forth. In insurance, video calls may be used by the example embodiment to take in claimant information in the establishment of a case and to manage interactions with the claimant until the case closes. In virtually any professional service, where a case may be developed and managed, the example embodiment may be implemented. These professions may include, but may not be limited to, the many specialized fields and sub-fields within health care, law and law enforcement, finance, accounting, animal health, insurance (e.g., health, worker's compensation), teaching, engineering, and across professions for training and instructional purposes.

Further, while various terms described in FIG. 78, such as EMR (electronic medical records) may apply with specific regard to one profession (e.g., health care), in many cases the functions represented by these terms may be performed by somewhat similar functions in other professions, which the example embodiment may perform in whole or in part. For instance, the example embodiment may create, manage, update, and provide only permissioned access to confidential electronic records developed through interactions with users and other systems in categories that may require client confidentiality (e.g., attorney-client privilege, HIPAA). As another example, while billing codes may vary across professions, the example embodiment may map billing to a sequence of actions (e.g., a procedure, such as a legal procedure, dental procedure, etc.) of a professional, and may document these professional actions to facilitate review and approval of invoices based on them before invoices may be rendered. Naturally, implementations of the example embodiment may be customized to each industry's standard for procedures and to each organization's interpretation of that standard. As described later (See FIGS. 95-96), the example embodiment may facilitate the establishment and promulgation of standards by professional role (e.g., orthopedic surgeon) and/or by professional accreditation (e.g., a college of orthopedic surgeons, the American Medical Association, etc.), and create an index against which evaluations may be made, for example, to determine compliance with the standard.

Functions across professional service categories that the example embodiment may execute may include case management functions. Case management functions that the example embodiment may execute in whole or in part, depending on the level of professional supervision required (or not), may include, but may not be limited to, authorizations of users (including both "client" users and "professional" users), authentication of users, scheduling, recording interactions (via modalities of communication, such as calls, videos, emails, chats/texts), notes/comments on interactions, peer-to-peer collaboration on matters involved in the case, case descriptions as well as plans and objectives for clients based on professional standards, progress reports/charts, work product (e.g., deliverable), evaluations of work product (e.g., deliverable measures), codes for use in tracking time on a case or to correlate one's professional's decisions to case progress (e.g., higher portfolio values in financial services; better patient outcomes in medicine), billing according to accepted industry practices, and audits based on comparing case actions to standards (e.g., standards of care), to name a few. In other words, the example embodiment may support and execute various functions related to various procedures and terminologies of various professions. For example, in medicine, these procedures may be codified and referred to as current procedural terminology (CPT).

In the example embodiment, procedures specific to an industry may be associated with Narrative Segments developed for the specific industry. Narrative Segments may be recommended by the user's Story Model (e.g., via user's Actualizer) as actions to meet various functional requirements of a professional, expressed in NL communications (e.g., note the plaintiff's demeanor), based on the context (e.g., video deposition of plaintiff), sequenced by protocol (e.g., question-answer-question), and audited for compliance. Story Model Inputs may include data used as evidence by the user's Story Model to make a recommendation, analyze actions, and create new recommendations. This continual sequencing of actions (actions may be surfaced to users as recommendations or executed automatically, depending on various factors, protocols, etc.) conducted by the example embodiment may advance users continually from one interaction to the next.

The example embodiment may provide a platform for the integrations of actions across professions through an analysis of similarities that may exist between certain actions and functions across professions. In the example embodiment, in some instances, Narrative Segments may be customized for one industry to accommodate specified procedures, or actions, from a core set of actions common to other industries. In the example embodiment, customization methods may involve Narrative Segments (with or without dependents) and/or specialization logic (See FIG. 53)

For example, the example embodiment may be used to support a structured interview conducted by a behavioral therapist and a legal deposition conducted by an attorney, both of which may be structured interactions during which the user (client) inputs may be obtained relevant to each respective professional's case management case. In both types of cases, evidence may be gathered directly from user inputs in somewhat similar ways, and may involve user's attestations that their statements are true. For example: what does the user say?What does the user confirm upon cross-examination?Narrative Segments may be developed to support and/or execute similar types of interactions across professions using various methods. An example method may follow a machine learning approach known to one of ordinary skill in the art of first developing a "core," or kernel, then specializing or customizing it via transfer learning into a more restricted domain with limited, but more specialized data. Analogously, the core attributes, goal parameters and requirements of a Narrative Segment may be developed and validated in a general sense, then, specialization logic specific to an industry or a number of new Narrative Segments may be added as dependents to the "core" Narrative Segment to complete a composite of Narrative Segments. In addition to developing a core Narrative Segment during development, the example embodiment may be used to determine core or common Narrative Segments from Story Model Inputs. Predicate clusters derived from Story Model Inputs from interactions may be evaluated by the example embodiment to determine which may be the most similar predicates across industries, and which may follow a somewhat similar logic, even though the subject matter may be different. Methods for determining similarities between predicates may include topic modeling (see FIG. 51), cluster summarization (FIG. 52) as well as other techniques, such as training extractors to extract certain logical relationships typical of an abstracted set of common actions. In the example embodiment, clusters of SVOs associated with certain "core" actions across industries (e.g., job interviews, legal depositions, discovering a patient's chief complaint, structured interviews in behavioral health), may be used to train extractors. Further, knowledge base development may also take place to encode stores with the specialization logic that the system's probabilistic may use, for instance, to customize recommendations to meet professional requirements for certain interactions.

What may be obtained through interviews supported and/or conducted by the example embodiment may be cited as evidence as well as be used to test the evidence provided by the user and by others. Recall that in the example embodiment, Story Model Inputs may be evaluated as evidence, and, using that evidence, the user's Story Model may produce a recommendation.

In the case of evidence-based medicine, the example embodiment may facilitate and/or perform the gathering and evaluation of evidence from users and to compare user evidence with evidence associated with standards of care to make recommendations. Recall that the example embodiment may acquire evidence (e.g., health scores from voice data), encode it (e.g., Story Data Types), construct evidence into attributes (e.g., Current Story), determine goals from the evidence (Envisioned Story, such as better overall quality of social life), use evidence to make recommendations (Actualizer), analyze progress towards goals (e.g., impact analysis), and then make the next recommendations based on the evidence of what works. Through continuous real-time Story Model Inputs and highly individualized, real-time Story Model outputs that may optimize actions based on such evidence, the example embodiment may discover and implement a new standard of care which may be a standard of care that is unique for each user.

To explain further, the similarity of functions that the example embodiment may perform across different professions, including those already described, may facilitate coordination and integration of these functions by the example embodiment, and at a user-specific level. This may be illustrated with a function as simple as scheduling, which may be handled in various ways by the example embodiment. Adding value to the scheduling process, the example embodiment may integrate not only calendars of different users but also the goals of various users in different professions. For instance, let's say that a user may be a doctor who may be determined from Story Model Inputs to have an interest in starting a new practice. In such a case, the user's Actualizer may generate from inputs from the user Current Story (e.g., attribute values) and Envisioned Story a recommendation involving, say, a composite of Narrative Segments on "Starting a new practice." Now let's say that within the composite, the Actualizer's chosen action may be a work session and a dependent action may be to schedule one. In such a case, the example embodiment may identify skills and deliverables required to perform a next recommended action, for instance to hammer out deal terms, and to continue with the illustration, to determine that requirements may be met by, say, a tax attorney and a financier. At this juncture, the user's Actualizer may reach out to the Actualizers of, say, tax attorneys and financiers, and if identifying ones with the appropriate skills and availabilities from the user's network, secure permission to schedule a meeting. This meeting may be scheduled upon user's approval, or as a result of an agreement between the users' respective Actualizers, if these Actualizers may be pre-approved to schedule meetings, as may happen within user groups accustomed to working together. And so, in various real-time ways, meetings may be established that are also predicted to be more productive, since they may result from an alignment of goals of different users and may be associated with deliverables to advance users towards them.

The example embodiment may also simplify navigation for users within and across various professions, which may tend to operate as silos of specialized knowledge. For example, a user, who may be a client (i.e., client role) of multiple different professionals (e.g., vendor role, particular professional role, organizational role, etc.), may receive recommendations from a user's Actualizer based on an index of all available Narrative Segments, including Narrative Segments characterized as case management cases (e.g., vendor role, particular professional role, organizational role, etc.). In the example embodiment, the user Actualizer's recommendations may factor in a multitude of different potential actions (Narrative Segments) based on different areas of expertise required to advance the user towards the user's Envisioned Story. As to these recommendations, recall that assignments of best next actions may happen after a negotiation between the Actualizers of various users to determine which user who by taking the recommended action also may advance towards their own goals. In the example embodiment, user goals may include career or professional goals, especially when context-masking and urgency may apply (e.g., a lawyer is taking a deposition), although recall that the example embodiment may consider all of a user's goals. If the example embodiment may determine that requirements for an action may be satisfied optimally by a professional, then, to continue with the illustration, the professional may receive the assignment, agree to it, and perform the action, which may be captured and processed as Story Model Inputs. To continue further with the illustration, the Actualizer of the user who may not be the professional may be assigned the action of attending a remote session with a user who is. However, note that certain actions that the non-expert may take may be expert actions that the example embodiment may determine the non-expert has the skills to complete and optimally may be recommended to take. As a very simple example, a family caregiver need not be trained as a nurse to take a loved one's temperature. A record of actions, such as a temperature reading from a device or spoken words from a caregiver, may be context-tagged and used as evidence, including for professional monitoring purposes. In this manner, the example embodiment may guide non-professional users—one recommendation (best next action) at a time, without the user having to be an expert on what's next, know how to identify or interact with the right expert, or manage the interactions between experts. As a result, the example embodiment may provide significant relief to users, such as family caregivers, who otherwise may have to learn through trial and error how to navigate between different professional fields, and how to coordinate the services of different experts who may not talk to each other.

Recall further that the Actualizer in making a recommendation may factor in all of a user's goals and attributes (e.g., via Story Logs) as well as all context histories, including the current context, through context tags and context masks. Because the example embodiment may use context-tagging and masking, as described elsewhere, recommendations based on "in the moment" Story Model Inputs may also result in context-appropriate, "in the moment" recommendations from the Story Model. In effect, a steady stream of Actualizer recommendations/actions resulting from a steady stream of Story Model Inputs, may create a record of sequenced recommendations and/or actions, a path in a sense, that from one moment to the next may guide or be shown to have guided the user from one set of choices to another, each one optimized for the user's goals based on an immediate context. In the example embodiment, the synthetically produced path, comprising streaming recommended best next actions, may order the actions related to various case management cases, including multiple simultaneous case management use cases.

For example, an older user with disabled legs living on a fixed income but with financial assets (e.g., multiple roles, including patient, client, home-owner) may receive recommendations from his Actualizer regarding best practices from a chronic care CMC, a financial planning CMC, and architecture CMC (e.g., building a ramp that's up to code). Since the example embodiment looks for users to perform the best next action that may include the most suitable user, not only the user whose Actualizer generated the recommended action, family caregivers and professionals, who also may be users, may receive recommended actions (See again FIG. 1, FIG. 64, and throughout for descriptions of how in the example embodiment the Actualizers of different users may negotiate with each other to resolve actions and resources.)

In the example embodiment, Narrative Segments may be developed for a CMC using the composability of Narrative Segments to create combinations of composite and single actions, appropriate for types of users who may be clients in their profession. For example, in health care, a group of CPT codes may have some similarities (e.g., analysis after a therapy session, analysis involving another a consultation with therapist, etc.), each of which may be developed as a Narrative Segment and together which may comprise a composite that may define aspects of a case management case. To continue with the health care example, aspects of a case management case that the example embodiment may support may include, but may not be limited, any information gleaned from the client user Story Logs, Impact Analysis, or Story Model Inputs to which the professional may be granted access by the client and which may be context masked. This access may provide, for example, evidence of changes in client scores (e.g., lower anxiety over time), deliverable histories (e.g., prescriptions written), client's adherence record (propensity of patient to follow doctor's orders based on behavior model), and other details that may be required by case managers for use in evaluating and managing a case management case. Even though requirements for a case management case may vary between organizations and professionals, the composability of Narrative Segments may facilitate as general or as highly specialized a set of attributes, goal parameters and requirements for the case management case as may necessary or desired.

To illustrate the flexibility of the example embodiment for use in developing and implementing Narrative Segments for case management cases: Narrative Segments may be developed that model a care model as a strict sequence of actions or as a composite of different sets of strictly ordered actions, which, when executed in the example embodiment, may follow a care model, including NL that may communicate actions in a way that may also be modeled to persuade the user to take the recommended actions, or to let the example embodiment take the action instead, provided it is an action the example embodiment itself may be "authorized" to take, or which may be taken through the agency of users, including through other systems connected to the example embodiment. The action that the example embodiment may identify as the best next action for a user may be surfaced to users recommended to take the action for approval via NL The example embodiment may deliver supportive information to users for them during an interaction for comments, which when commented on may become Story Model Inputs used to update Current Story and Envisioned Story.

In an example illustration, a Narrative Segment may be developed for a behavioral health therapy session or a sequence of behavioral therapy sessions to lower a user's anxiety. For the example illustration, let's say goal parameters may include reducing the frequency, intensity, and duration of anxiety, and let's say success measures may include evidence of lower anxiety scores from the example embodiment's classifiers and evidence of user's progress towards target attributes. Meanwhile, as an example, actions of the Narrative Segment (recommendation) for the patient-user may include sharing past experiences, and actions of the Narrative Segment for the therapist-user may include specific questions about the patient's experiences from a structured interview.

As to users who may be case managers (e.g., professionals), their own area of expertise may extend only so far and from time to time they themselves likely may require expertise of others within their own profession and by dint of numerous other roles they may have as individuals, professionals in other professions. As a simple example, a person who may be a doctor (e.g., case manager) may need another doctor to consult with about a patient, but also may himself need a doctor for his own health reasons, have dealings with a financial planner, get his taxes prepared by a certified public accountant, take lessons from a golf pro—all other professionals with whom he may interact—and meanwhile, have children for whom he aspires to be a great dad. In the example embodiment, the Identity of the person is unlikely to be only one role (see FIG. 21).

To continue with the illustration of the doctor, who also may be a case manager, the user's Story Model may create user-specific Story Model outputs from Story Model Inputs, which may include interactions with or about the user, as it may for any user. However, as a case manager, if permissioned by their client, the case manager may have certain access to their client's Story Model Inputs as well. In the example embodiment, access may be restricted to masked contexts, as agreed between client and case manager, which in turn may involve a "contract". Recall that a "contract" may exist between users in the example embodiment (See FIG. 26) involving "gives and gets" between them. And so, in the example, the client (e.g., patient's) may agree in exchange for the expert's service (e.g., treatment) to provide evidence of the client's progress to the expert through certain connected devices. For example, a client user, here a patient of the case manager, may give the case manager permission to access the client user's simple data from devices (e.g., pulse rates, sleep times) and other data the client user agrees to be shared, which may include data about client behavior (via behavioral model) as well as data related to the impact analysis of the client's progress. In the example embodiment, this data may be communicated between users (client and case manager) by their Actualizers through negotiation when an action is recommended, and also through other methods, for instance involving Story Model Inputs.

Further, a combination of methods, such as context-masking and strictly ordered actions of a particular Narrative Segment appropriate to certain professional contexts and roles, may facilitate the likelihood that no recommendation will be made that may harm the client interest. In the example embodiment, Actualizer recommendations, including for professional actions specific to the CMC as well as for other actions specific to the user's other goals, may be context-masked. To illustrate the importance of this, take a user who is an orthopedic surgeon (e.g., roles=>doctor, orthopedist, surgeon). In the example embodiment, the context-mask and strict sequence of actions to prepare for and conduct surgery likely may prevent a recommendation from being made to the surgeon, during surgery, to practice a golf swing, even if in an off-color moment the surgeon is heard to say loudly enough during the operation, "I'd rather be playing golf."

Referring directly now to the flow diagram, FIG. 78 begins with generating a schedule to meet. Recall that a case management case (Narrative Segment) may be generated by Actualizers for a user based on Story Model Inputs and that a best next action may be to schedule a session. In the example embodiment, scheduling a session may be a dependent Narrative Segment required by another Narrative Segment for the session itself. In the example, the session may involve, say, a therapy treatment. If the treatment needs to follow a strictly ordered sequence, as per CPT code requirements, a Narrative Segment may exist for the code (See FIG. 99), and this code may be used to determine the actions of the session and its requirements (e.g., resource requirements, deliverables, etc.).

To continue with the scheduling event depicted in FIG. 78, Story Model Inputs from an EMR system or from some other source (e.g., sensor-detected utterance scored as abnormally low quality of life) may result in the Story Model output of a recommendation to meet. Or, perhaps the user may be in the midst of a scheduled sequence of sessions as for instance may be requirements of a Narrative Segment. Alternatively, the session may be scheduled by a simple phone call that creates Story Model Inputs. In any case, the example embodiment may be integrated or connected through appropriate end points with other systems, such as scheduling systems, to which certain users and their Actualizers may have authorized access.

When the example embodiment may recommend a session, the date, time, place and attendees for the session may in many cases be negotiated by the respective Actualizers of each user's Story Model. In the example embodiment, a recommendation for date, time, place and attendees may be generated using requirements for data, time, place and attendees, which likely may make the schedule about more than availability. These requirements, which may include, for example, the optimal place to meet as well as whether the users, even if they satisfy other requirements for the Narrative Segment, may be authorized to meet.

First, to address how the example embodiment may be used to determine the meeting place: As with other recommendations made by Actualizers, context masks may be used to determine the optimal context for action of the Narrative Segment. In the current example, the recommended context may be a video call. However, note that the example embodiment may recommend whichever context may be determined by the Actualizer to represent the greatest likelihood of advancing the users towards their respective Envisioned Story. In the example embodiment, a session may be scheduled and characterized as a visit that may take place between users in various locations. Visits may take place in any location or any combination of locations, for example involving some people in one place and others in another through remote connections (e.g., video calls) to each other through the example embodiment. The recommended location, which may be part of the output of the Actualizer's negotiation, may be determined by dependent Narrative Segments for each user related to transportation, proximity of potential locations, and so forth. For example, visits may be in-office, at home, at a hospital or another facility, or remote, involving some combinations of locations. Being context-aware, and likely knowing from Story Logs, location and other data, as well as Narrative Segment requirements adjusted to meet new needs (e.g., contagiousness of a virus), a video call in some instances may be the optimal choice of communications modality made by Actualizers, yet not in other instances.

Next, in the flow diagram, once the date, time, and place for users to meet for the session may be confirmed, which may be through their respective Actualizers, the example embodiment at the confirmed time may attempt to gather the users whose attendance may be required.

There may be prerequisites for users to meet, which the example embodiment may determine from the recommended action. In various fields, users in many instances may need authorization to engage in, to deliver, or to receive certain services from other certain users. In the example embodiment, when a user may be authorized by an organization to deliver services and when a user may be authorized to receive these services may depend on standards in the given industry, standards of the given organization, and so forth, which may be characterized by appropriate care management cases, or Narrative Segments.

The just described authorization of users may be required in some instances before certain users may attend certain sessions or meetings. In the example embodiment, authorization of users may be a prerequisite for a particular meeting between authorized users as well as a prerequisite for organizations operating under governmental and/or local authority. For example, in healthcare, health care professionals may explain to users what to expect when they become patients of the healthcare professional, to which the user then may consent, as part of the process of their being authorized to receive services. Other authorizations may involve a user to furnish proof of health care insurance coverage for services offered by the health care professional. In turn, health care professionals may be required to be authorized by users to obtain their information and not share it with others except with certain permissions from the user (e.g., HIPAA). In the example embodiment, Narrative Segments may be developed and used to facilitate the authorization of users (e.g., professional and patient users) to engage in or to receive certain services from other users, including from other systems, as well as to authenticate users who may be so authorized.

To authenticate users, recall that a Narrative Segment may or may not have dependent Narrative Segments, each with requirements, which may include, among other requirements for a session, sufficient evidence not only that the session is an authorized session (e.g., an Informed Consent session, a session involving a medical intervention such as therapy treatment, etc.) but also that attending users may first be authorized to attend it. Establishing the Identity of the entity as an authorized entity may be referred to as authentication.

Figure 79:
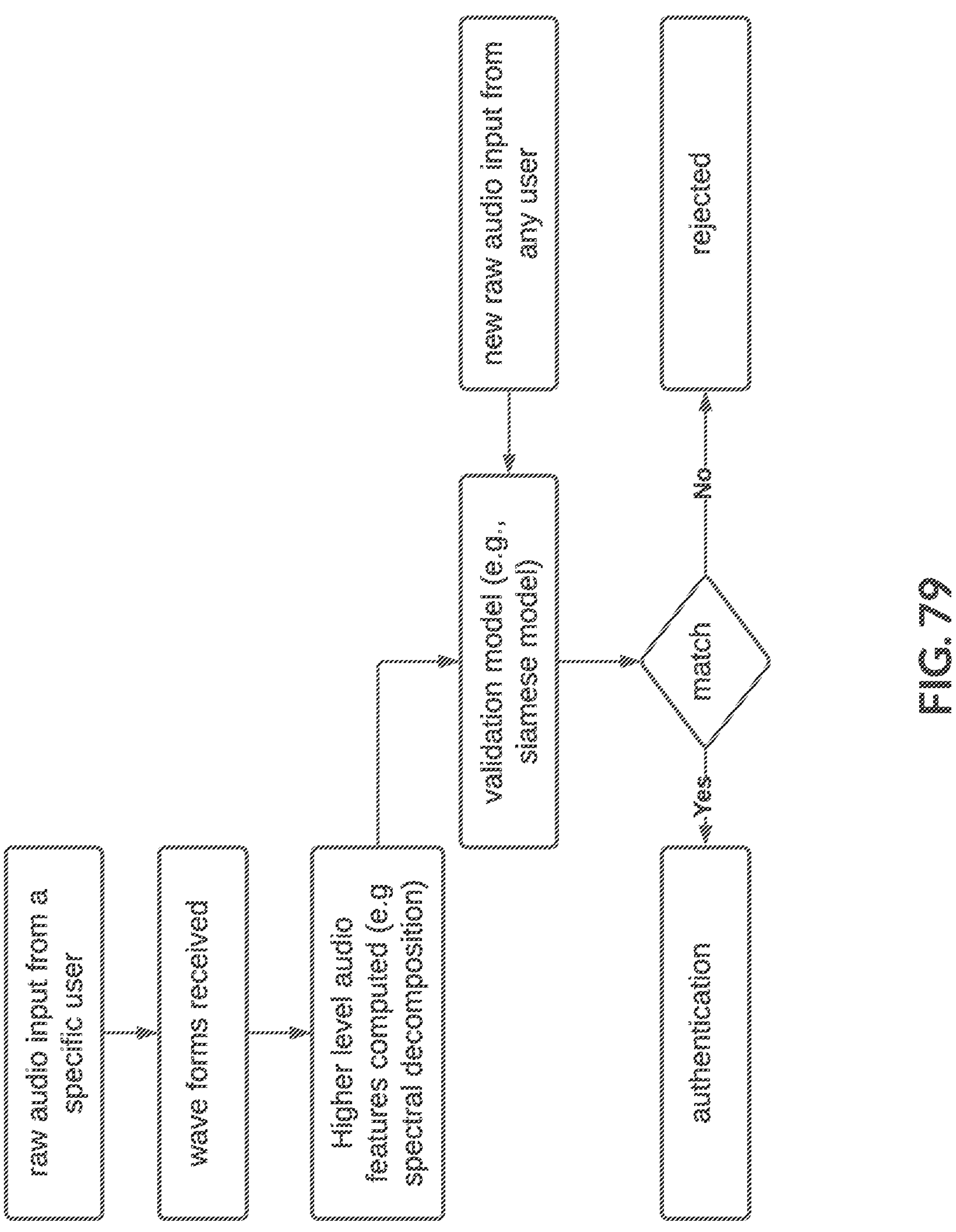
FIG. 79 illustrates a flow in the Story Model instance—Video conference—remote care, particularly voice authentication.

In FIG. 78, a method of authentication is described as "Voice/Multi factor authentication." See FIG. 79 for flow and details). In the process of pulling together an authorized meeting between users authorized to meet, the example embodiment may analyze a user's voice, as well as execute any number of other security measures (e.g., "hashing", facial recognition, etc.), to determine that the user may be an authorized user, as described above. In addition to satisfying authentication requirements, note incoming data used for authentication may be Story Model Inputs. The voice data, for example, besides being used to authenticate the user, may be scored and constructed into new values for the user's Current and Envisioned Story. If drift (see FIGS. 39-45) may be detected from what a user may say during authentication, or if health scores derived by classifiers from the user's voice are worrisome, this may impact how the example embodiment routes the user call and perhaps which Narrative Segment then executes for this and other users in the planned session. Consider for instance when a user calling in to attend a remote therapy session (e.g., telecare session) conducted by another user (e.g., therapist) who also may be calling in, may be characterized as being much higher than normal for that user. This differential (e.g., via Impact Analysis) may be relayed to the provider by the example embodiment before the call between users commences, to assist the provider in prioritizing actions. Meanwhile, to continue with this example, it may be that the new Story Model Inputs from the distressed user result in an override of the currently executing Narrative Segment for that user. In this instance, the currently executing Narrative Segment, generated after analysis of the impact of prior recommendations on user attributes and target values, may stop executing. In such instance, a Narrative Segment used for emergencies may execute instead, or if Story Model Inputs are still determined to fall within thresholds of other available Narrative Segments, a new recommendation more appropriate to the emergent context may be generated.

Next, in FIG. 78, after authorized users may be authenticated (e.g., via Story Model Inputs) for the video session, they may join the session. How the session is conducted may depend as earlier described on which context-masks may apply during optimization for the session (e.g., is the user a professional?), and as a result which Narrative Segments (actions) may be selected as recommendations. For example, to what degree may a professional, if any, preside over the session, whether the example embodiment conducts it in whole or in part, and so on. During the session, remote users may interact with each other through the example embodiment (e.g., via Story Model Inputs), or if non-remote, directly with each other where the example embodiment may "watch" and "hear" users in the same place interact.

Interactions may be processed as Story Model Inputs and feed into each user's Story Model in the example embodiment. Recall, inputs received as data slices from data streams by data type may be received and processed/transformed into scores, predicates and SVOs during Story Model Inputs. In turn, during Story Model functions, the user's Actualizer may recommend a Narrative Segment. And so, during a session, multiple users may receive multiple recommendations while the example embodiment may also either support or conduct the session as a participant itself.

During a session, one or more Narrative Segments composed for a variety of purposes during Narrative Segment development may be executed by the example embodiment. Among Narrative Segments that may be executed during a session may be those developed to meet standards in an industry to perform certain functions during a session. Narrative Segments may be used to design sessions where certain functions of a professional may be performed during a session by the example embodiment. In some cases, the example embodiment may launch a pre-packaged communications pre-approved by the professional during a session, if the Actualizer recommendation calls for it. In this example, Narrative Segments may be developed in advance as a series of self-paced, interactive exercises pre-approved by professionals (e.g., therapists, financial planners) for their clients (e.g., patients, heads of households) to go through to achieve a goal (e.g., self-manage one's anxiety, self-manage a budget). The example embodiment may trigger these interactive exercises as a recommendation, obtain new Story Model Inputs (scores and user responses), and in turn make the next recommendation for a different exercise or communications module. Meanwhile, for the professional user, if the professional user may be "running" the video call, the recommendations made by the example embodiment in a support capacity during the live session may help the professional steer an interaction, or to recommend one. For example, a therapist presiding over a group session may be recommended by the example embodiment to engage a user on a topic to arrest the drift detected in that user's response during an exercise tailored to that user by the example embodiment. The example embodiment may be used to calibrate which exercises may be optimal for which users, including which exercises may be group exercises and which may be individual exercises, which interactions may be shared, which may be private, and so on, based on professional standards, context, and session design. In this manner, multiple different exercises may be administered to multiple different users during the same session presided over by the same professional.

Further, in some instances, the example embodiment, with prior approval, may execute certain professional actions without the professional having to be present during the session, but to which the professional may have access afterwards, via recordings, transcripts and other evidence from Story Model Inputs, about which the example embodiment may render and display analytics and annotations (e.g., transcripts scored for evidence of low quality of life), which the professional may comment on, and over which the professional may exert control, override recommendations made by the example embodiment, and contribute his own recommendation. For instance, during a video session, the example embodiment may be used with a professional's prior approval to execute in whole or in part, for example, a structured interview per standards in the professional's field. In behavioral health, where words and other communications themselves may be the intervention (e.g., the actual care), a structured interview, such as a problem-solving therapy involving words and other communications may be supported and/or executed by the example embodiment. In such a case, where words are the therapy, Narrative Segments may be used to define appropriate groupings of words as actions. In this manner, the example embodiment may make more available to more people therapies where words and communications may constitute the intervention. Note, however, a Narrative Segment developed for use in the evaluation or management of a professional action may require pre-approval and proper validation. For example, care to be delivered by the example embodiment may require approval by the doctor or therapist, who also may control the degree to which the example embodiment may be used to administer any part of the care, or to develop patient and care model assessments. The example embodiment may be used in various ways and to various degrees, including for diagnostics and care delivery, when validated and approved for such use.

The requirements of Narrative Segments, which may include duration for actions, may be used by the example embodiment to determine when the session may be concluded, and the looping between Story Model Inputs and Story Model functions may continue until then for each and all users during the video call. This determination of a session's completeness may be reached by the example embodiment, in part, by comparing predicates associated with the Narrative Segments and predicates from Story Model Inputs.

Referring still to FIG. 78, upon conclusion of the video call, the context mask (e.g., video call) may be provided to the Actualizer to generate follow up-use cases (Narrative Segments) for all users on the call. Meanwhile, any executed Narrative Segments (use cases) during the calls mapping to billing codes (e.g., CPT codes) may be surfaced, for review/audit, comment, revision and/or approval by an authorized professional, when required.

FIG. 79 illustrates Story Model instance—Video conference—remote care, particularly voice authentication. See flow and descriptions in figure.

FIG. 80 is a flow diagram of Story Model Inputs during a Video conference, with particular regard to creating universal formats by data type and associating extractions with classifier scores, as inputs into Story Models. See flow and descriptions in figure. Not explicitly diagrammed in FIG. 80, but which may be included in a video conference, may be other modalities of communication supported by the example embodiment as well as user actions that may be contemporaneous Story Model Inputs. For example, user comments on real-time transcriptions and inspectable system-generated annotations (e.g., as per FIGS. 87-89), or emails exchanged between participants, may be mapped to a conference.

Figure 81:
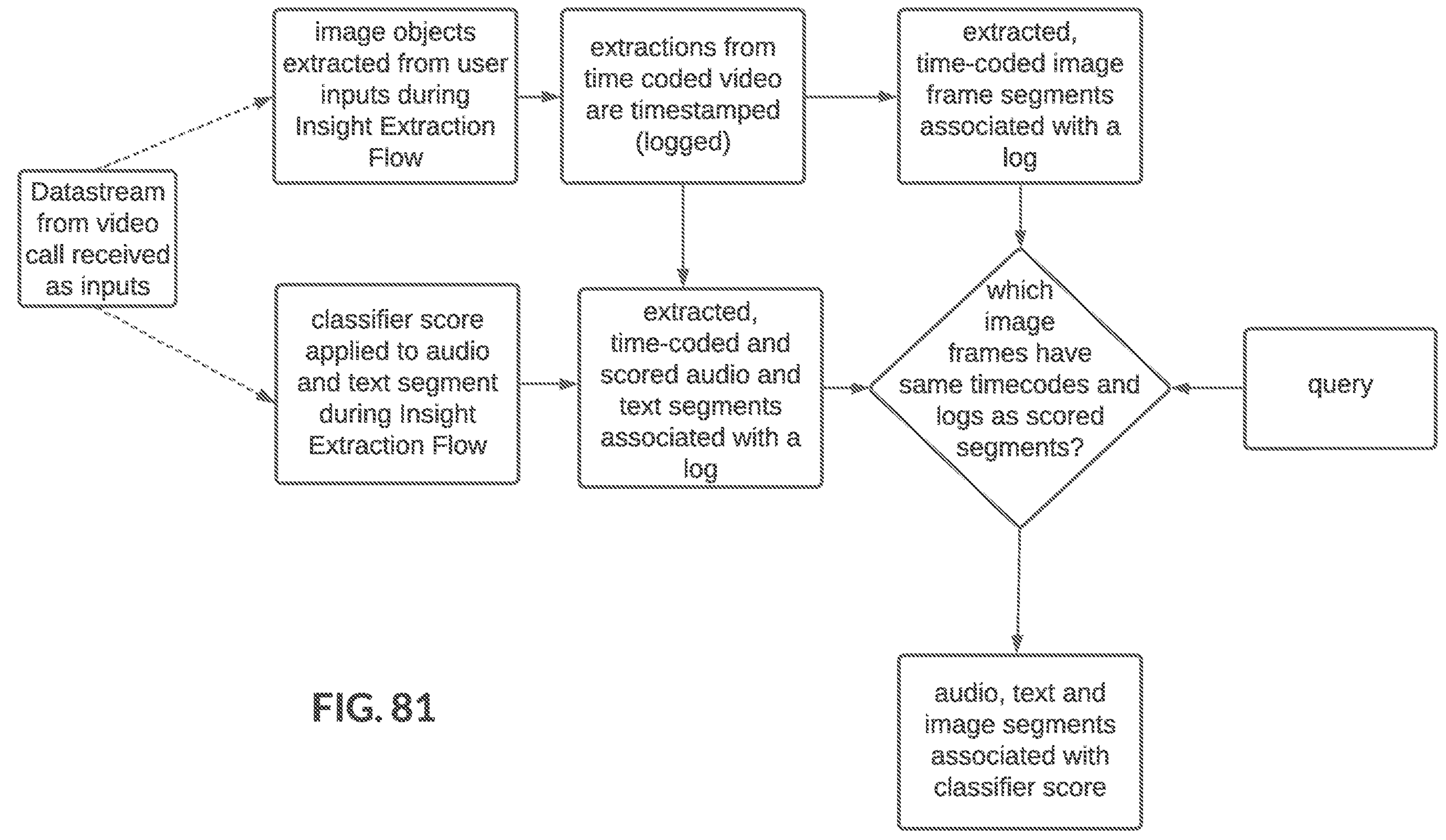
FIG. 81 illustrates a flow in the Story Model Inputs during a Video conference—with particular regard to using time codes and time stamps (logs) to associate non-voice inputs from video conference with a classifier score.

FIG. 81 illustrates Story Model Inputs during a Video conference—with particular regard to using time codes and time stamps (logs) to associate non-voice inputs from video conference with a classifier score. Associating various classifier scores with various extractions may facilitate and help validate certain attribute constructions during Story Model functions. See flow and descriptions in figure.

Figure 82:
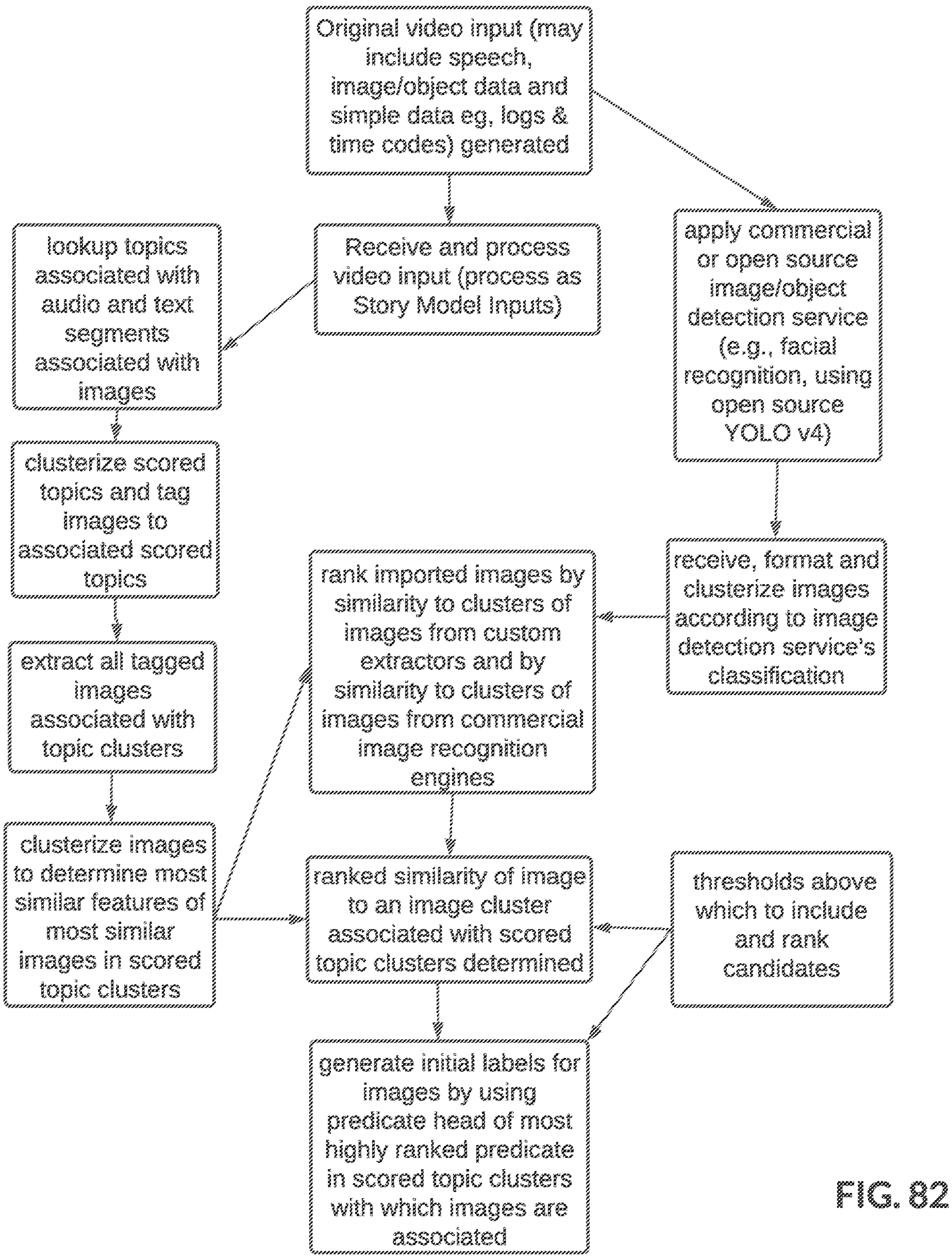
FIG. 82 is a flow diagram of Story Model Inputs for a Video conference, particularly associating classifier scores and topics with images/frames.

FIG. 82 is a flow diagram of Story Model Inputs for a Video conference, particularly associating classifier scores and topics with images/frames and selecting a best performing option between object detection systems. By associating topics with image clusters in real-time, the example embodiment may facilitate NL communications about the image clusters. See flow and descriptions in figure.

FIG. 83 illustrates how a flow of Story Model Inputs during a video session may be used to produce live, running, rich-media summaries of it. See flow and descriptions in figure for more information on the steps. In addition to summarizing videos, the example embodiment may index summaries for use in managing a "library" of videos, including summarized parts of videos. Summaries may map to inspectable, original recordings, transcripts, text and various metadata from devices (e.g., location data) at the time of the original meeting. And so, what is summarized may be indexed to the summary. As a result, a library of indexable, context-tagged original content (use inputs) may be made available for inspection and for various types of re-use. For example, a summary of multiple video sessions may be produced by the example embodiment to create an evidence-based analysis of user progress. Since various Current and Envisioned Story Snapshot data may also be mapped to various modalities of communication, including video calls, the example embodiment may facilitate multiple data views for analytical purposes. For instance, an analysis of Story Model Inputs may determine how representative the data gathered during video calls may be of other data gathered by the example embodiment not involving multi-user interactions. As with other abstractive summaries produced by the example embodiment, summaries of videos may be annotated (e.g., scored for anxiety), searched, and commented on by users, and in turn treated as new Story Model Inputs. For instance, a professional user (e.g., therapist) may interact with the example embodiment (e.g. via voice-activated tools) to request a summary of all case management cases (e.g., with patients), showing improvements in anxiety outcomes after a certain number of video sessions. In turn, a user may be directed to indexed content by the example embodiment to determine common features of the summarized sessions.

Figure 84:
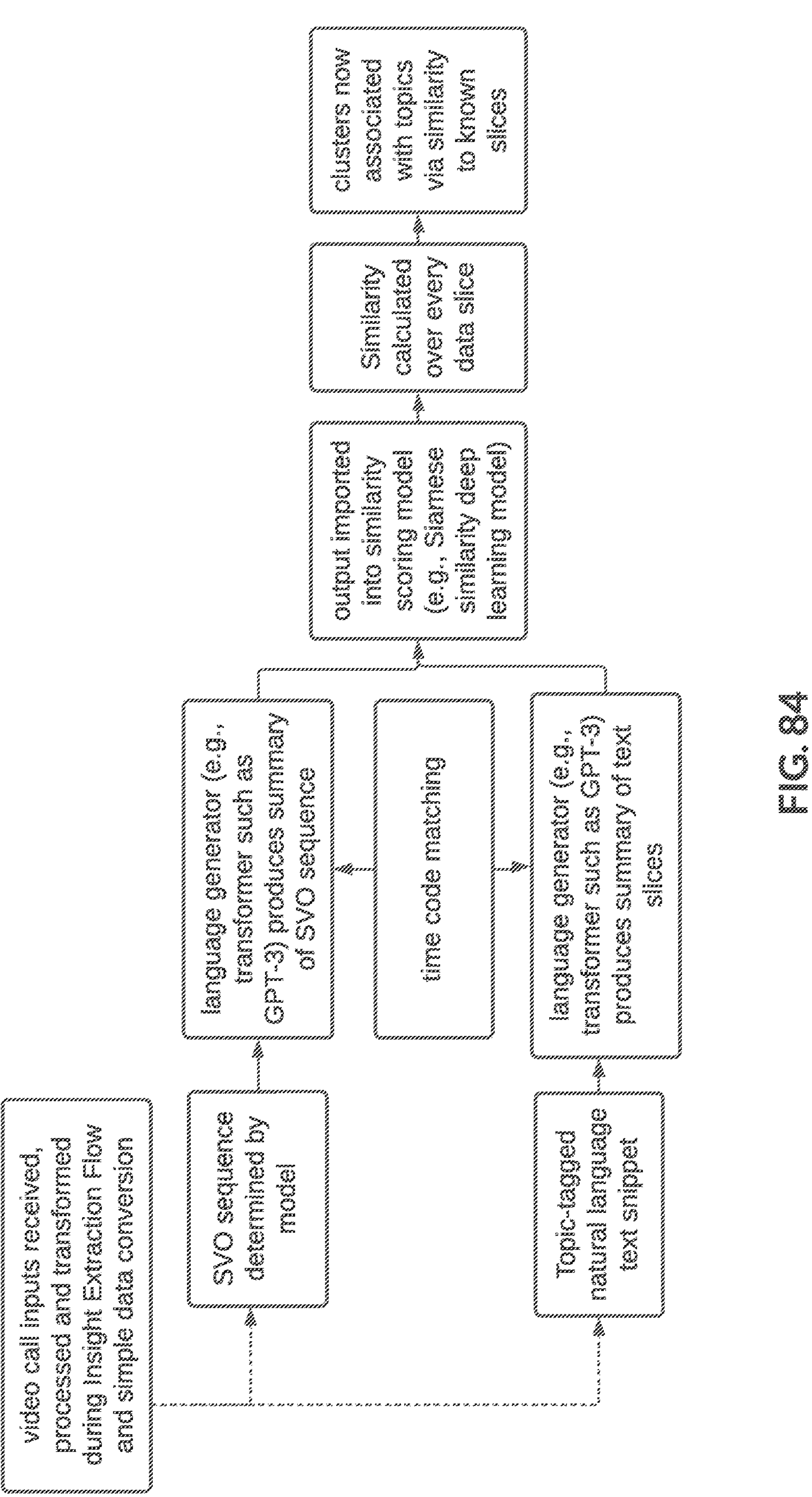
FIG. 84 illustrates a flow in the Story Model instance—Video conference—remote care, particularly cluster topic identification via summarization.

FIG. 84 illustrates Story Model instance—Video conference—remote care, particularly cluster topic identification via summarization. See flow and descriptions in figure.

Any summaries as elsewhere described may be Story Model Inputs and therefore be represented in terms of topics, based on predicates derived from the summary. FIG. 84 represents an alternative method to determine predicate-derived topics which is described in FIGS. 48-50. See these for a description of how predicates may be embedded in a Topic Model vector space. In the example embodiment, the topic model may create a computable representation of topic clusters so that predicate clusters or video slices or anything else represented as predicates may be described in terms of topics. Since the information extracted from video slices may be predicate-derived (from predicate clusters and the resolved SVOs associated with them), they may also be embedded into a topic vector space. Consequently, topic decompositions or views of those video slices may be surfaced; this may be done for any input data, since all input data may be processed into predicates.

FIG. 85 illustrates Story Model instance—Video conference—remote care, particularly transcription during a video call. See flow and descriptions in figure.

Figure 86:
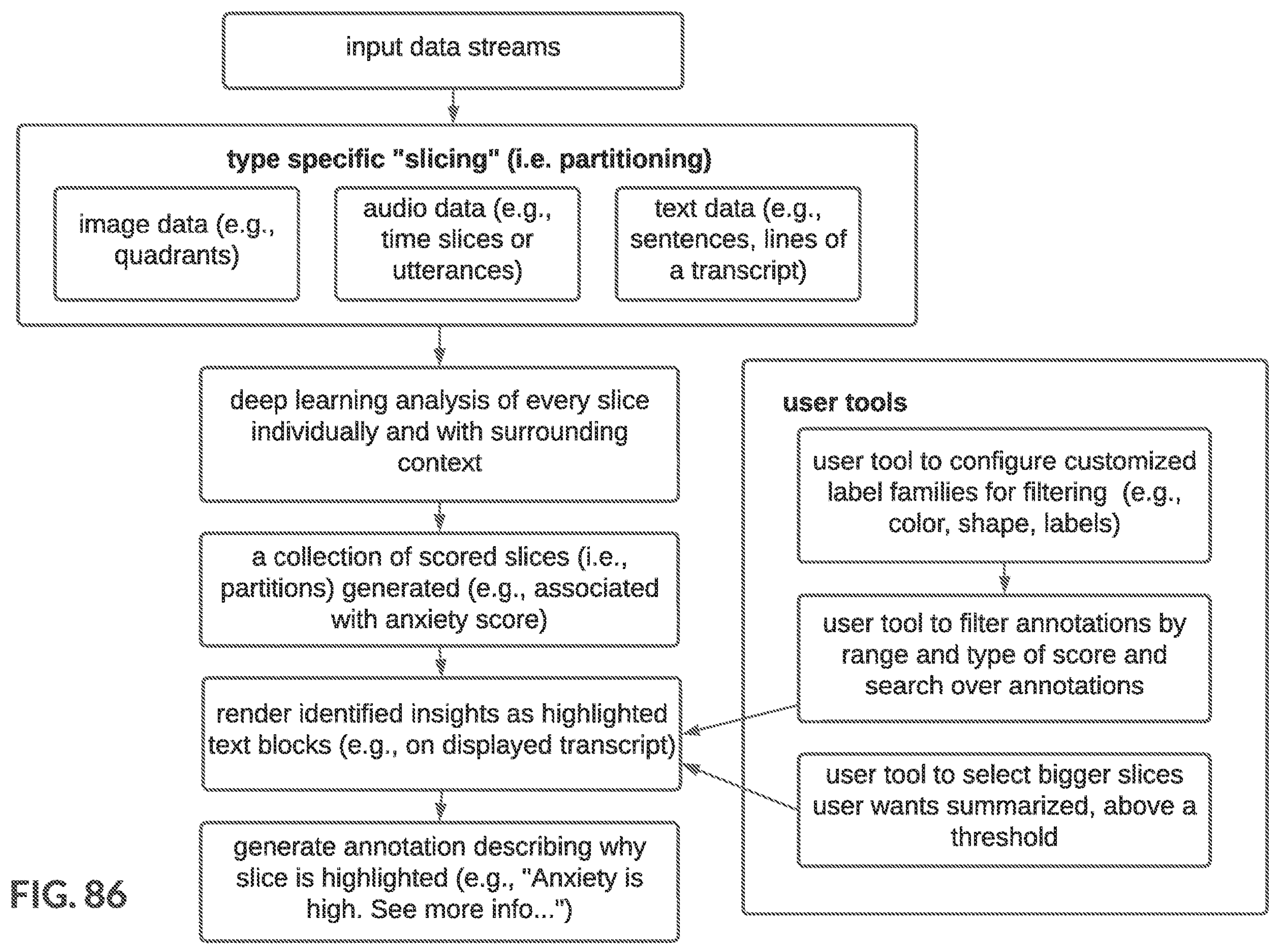
FIG. 86 illustrates a flow in the Story Model instance—Video conference—remote care, particularly highlighting and annotating slices, or partitions, of a datastream by type of datastream, and user tools for filtering criteria for display.

FIG. 86 illustrates Story Model instance—Video conference—remote care, particularly highlighting and annotating slices, or partitions, of a datastream by type of datastream. See flow and descriptions in figure. See also descriptions of Narrative Templates, which may include use of various filtering and display methods described in FIG. 86, among other methods as may be specified by one or more Narrative Segments (e.g., commentable transcripts and summaries).

Figure 87:
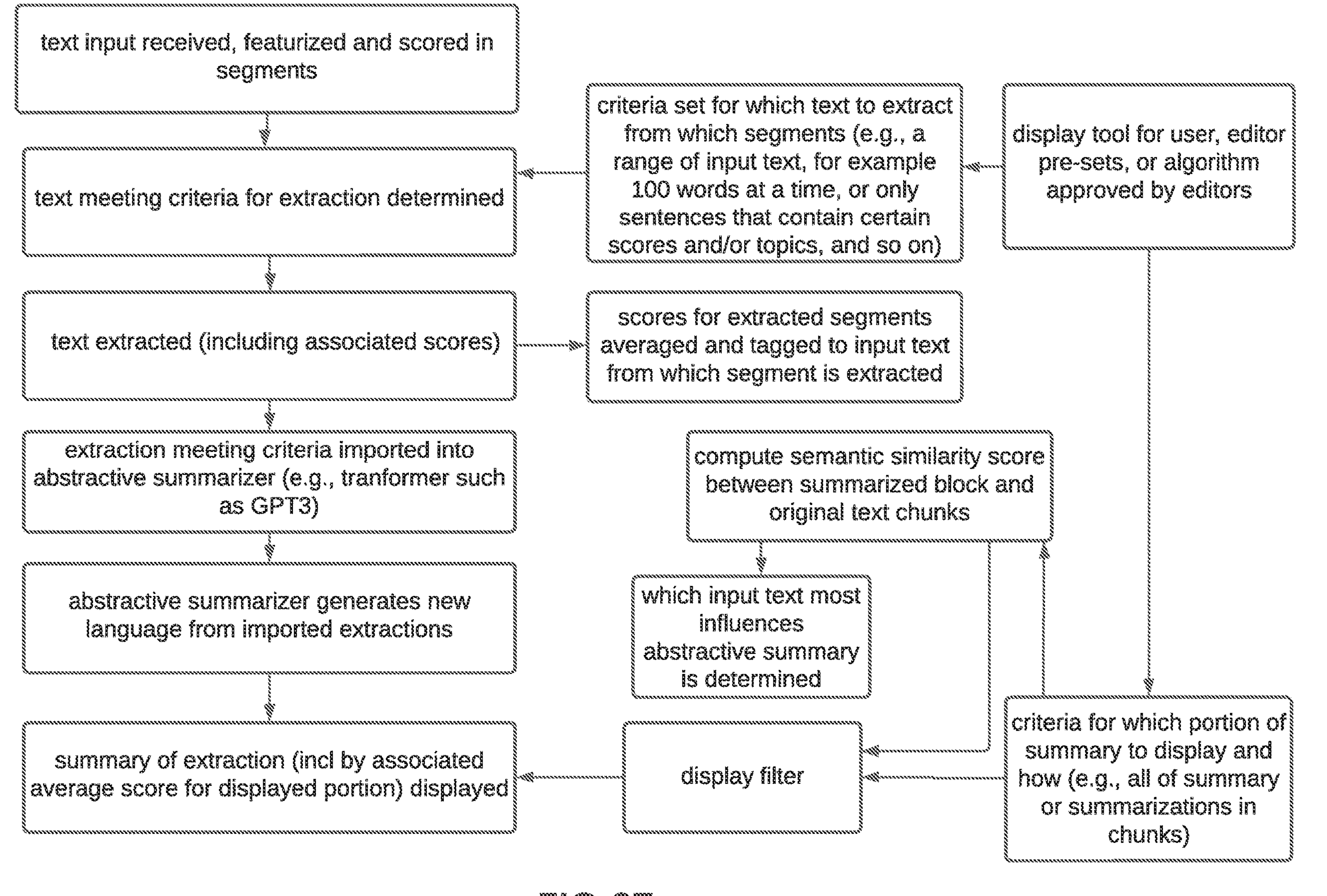
FIG. 87 illustrates a flow in the Story Model instance—Video conference—remote care, particularly an abstractive summarizer (e.g., seeing a summary of transcript in whole or in part during or after a video call with scores associated with selection).

FIG. 87 illustrates Story Model instance—Video conference—remote care, particularly an abstractive summarizer (e.g., seeing a summary of transcript in whole or in part during or after a video call with scores associated with selection). See flow and descriptions in figure.

As to the abstractive summarizer used in the example embodiment, it may be transfer-learned from a language model (e.g., OpenAI's GPT-3 language model). The abstractive summarizer may use an encoder-decoder (sequence to sequence) architecture where both the encoder/decoder are multi-head attention based transformer modules. It may receive input text, then that input text is 'encoded' by the encoder into a vector space that is commonly known as the 'latent' space, and then the same set of vectors may be decoded by the 'decoder' into a summary. The decoder can be conditioned on an aperture parameter which tells it "how much" to summarize. Smaller aperture corresponds to a summary which is higher level and omits more detail.

In the example embodiment, the chunks of data ingested may be referred to as the aperture of the summarizer. As the example embodiment generates and scores live text (e.g., transcript produced live by ASR), it batches the scores and text corresponding to the scores into chunks using an aperture to control the size of the chunks ingested by the summarizer. A chunk may be any number of segments above a threshold, for instance, 25 sentences. An aperture may be used to set the number of segments per chunk. The time and length of these segments may be set by the example embodiment to match the time and length of audio, etc. and may marry scores and extractions from segments to summaries. At the widest level, the chunk may be the entire transcript. At the narrowest, it's the smallest chunk. If the smallest chunk is 25 sentences, and all chunks are set as being the same size upon generation, then a transcript with 75 sentences has 3 chunks. Chunks correlate to scores because scores may be predicted for each segment and can be aggregated and averaged by the score of all segments divided by the number of segments in a chunk. Since extractors may also be conducted in chunks, and mapped to segments in a speech input, extractions may be summarized in addition to the running text, and associated with a score. For example, a user may see a summary of what a user says that is determined by the example embodiment to be associated with the user's lowest quality of life score. Text rendered from voice inputs via speech-to-text methods or featurized as text by modality (e.g., email, chats, etc.) may be scored and chunked into an abstractive summarizer.

FIG. 88 illustrates Story Model instance—Video conference—remote care, particularly annotating displays. In the example embodiment, analysis of type specific "slicing" or partitioning of data may be conducted on various processed Story Model Inputs (e.g., scored transcripts, comments from other users, etc.) as well as certain Story Model outputs (e.g., Story Log analysis, inspections of Current Story Snapshots, goal setting during Envisioned Story Generation, behavioral model, impact analysis, audits of completed Narrative Segments/use cases, etc.). These may be commentable through interactive interfaces, or as elsewhere described, Narrative Templates, which may surface for review and annotation by the user various processed data slices. Users may highlight a displayed area and comment on it and/or use filters to determine what is displayed, and to comment on that. Further, users may make general notes that may be tagged to the context (e.g., call/transcript).

As illustrated in FIG. 88, the example embodiment may provide tools for the user to create custom filters and labels for various views of partitioned data. For example, a clinician may wish to filter a transcript for all extractions and/or topics (Story Model Inputs) related to, say, lowest quality of social life. In turn, the example embodiment may apply the filter options chosen by the user (e.g., colors, underlines, bolding, etc.) to sections of the annotated transcript that met the filter criteria. The user may comment on the filtered selection, which may now become Story Model Inputs tagged to the user, to the section, and to the context (e.g., the live call from which the transcript is being generated). During a live call, a user may view the call transcript as it is generated and annotated as Story Model Inputs and add their own comments. To surface the comments, the example embodiment may fetch comments associated with both this user and this call, and then return those comments (e.g., as JSON data). Meanwhile, if other users are authorized to access comments or add their own, these may also be surfaced. (See Comment thread, FIG. 90). That data can then be "drawn" on the frontend (in the browser) however someone likes. See flow and descriptions in figure for more detail.

Figure 89:
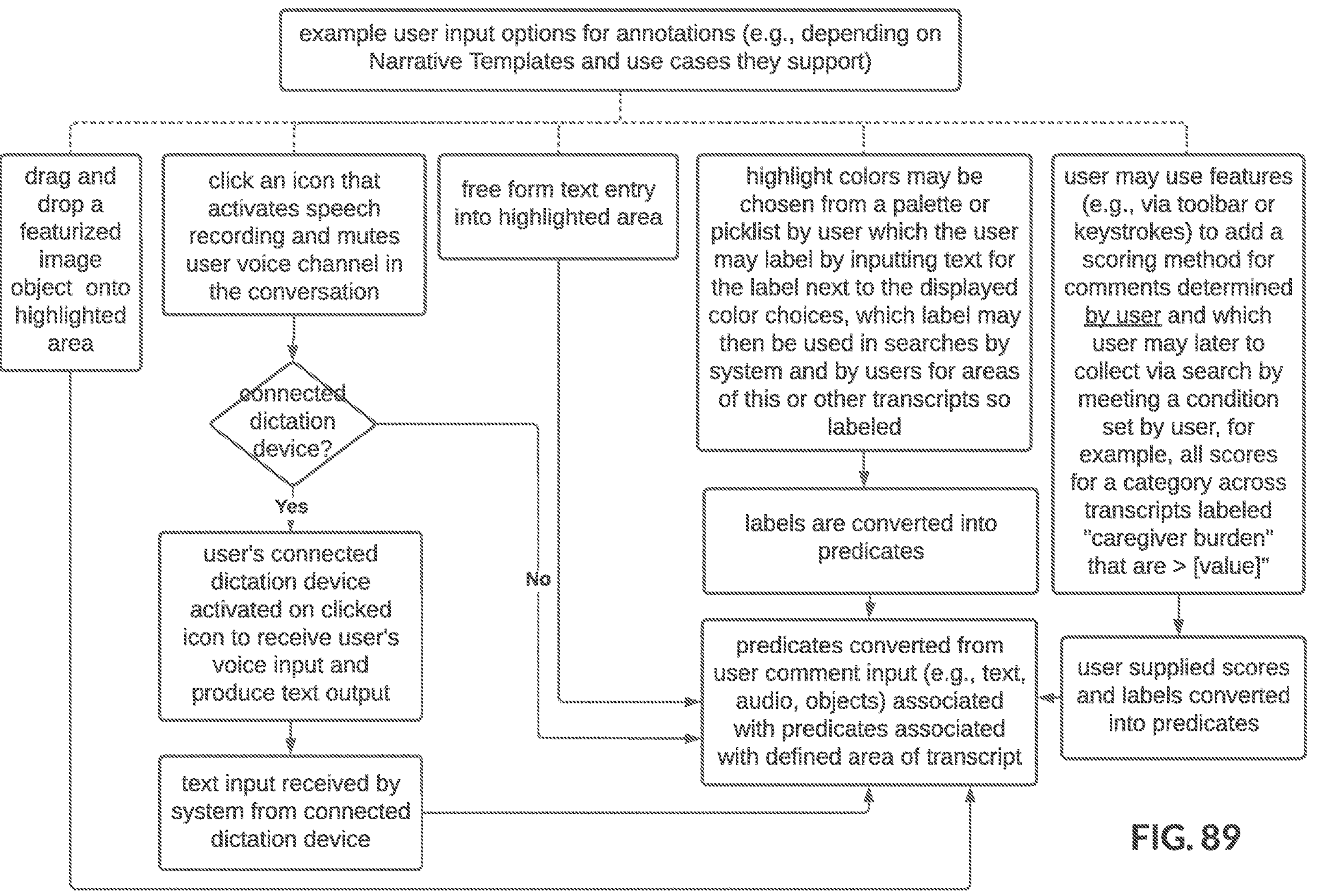
FIG. 89 illustrates a flow in the Story Model instance—Video conference—remote care, particularly example user annotations.

FIG. 89 illustrates Story Model instance—Video conference—remote care, particularly example user annotations. See flow and descriptions in figure.

Figure 90:
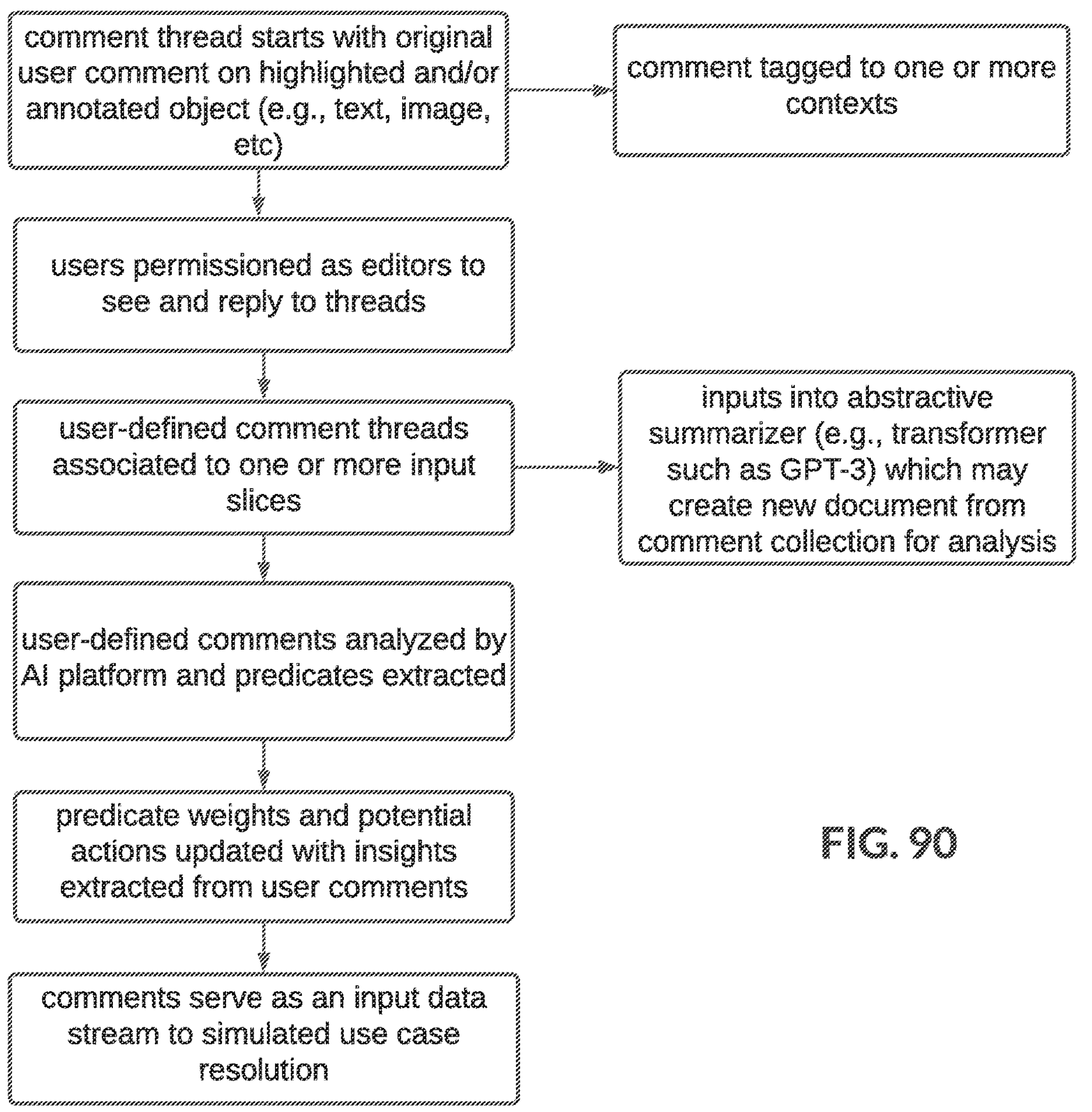
FIG. 90 illustrates a flow in the Story Model instance—Video conference—remote care, particularly comment threads.

FIG. 90 illustrates Story Model instance—Video conference—remote care, particularly comment threads. See flow and descriptions in figure.

FIG. 91 illustrates Story Model instance—Video conference—remote care, particularly how a user revises notes/comments (example embodiment). See flow and descriptions in figure.

Figure 92:
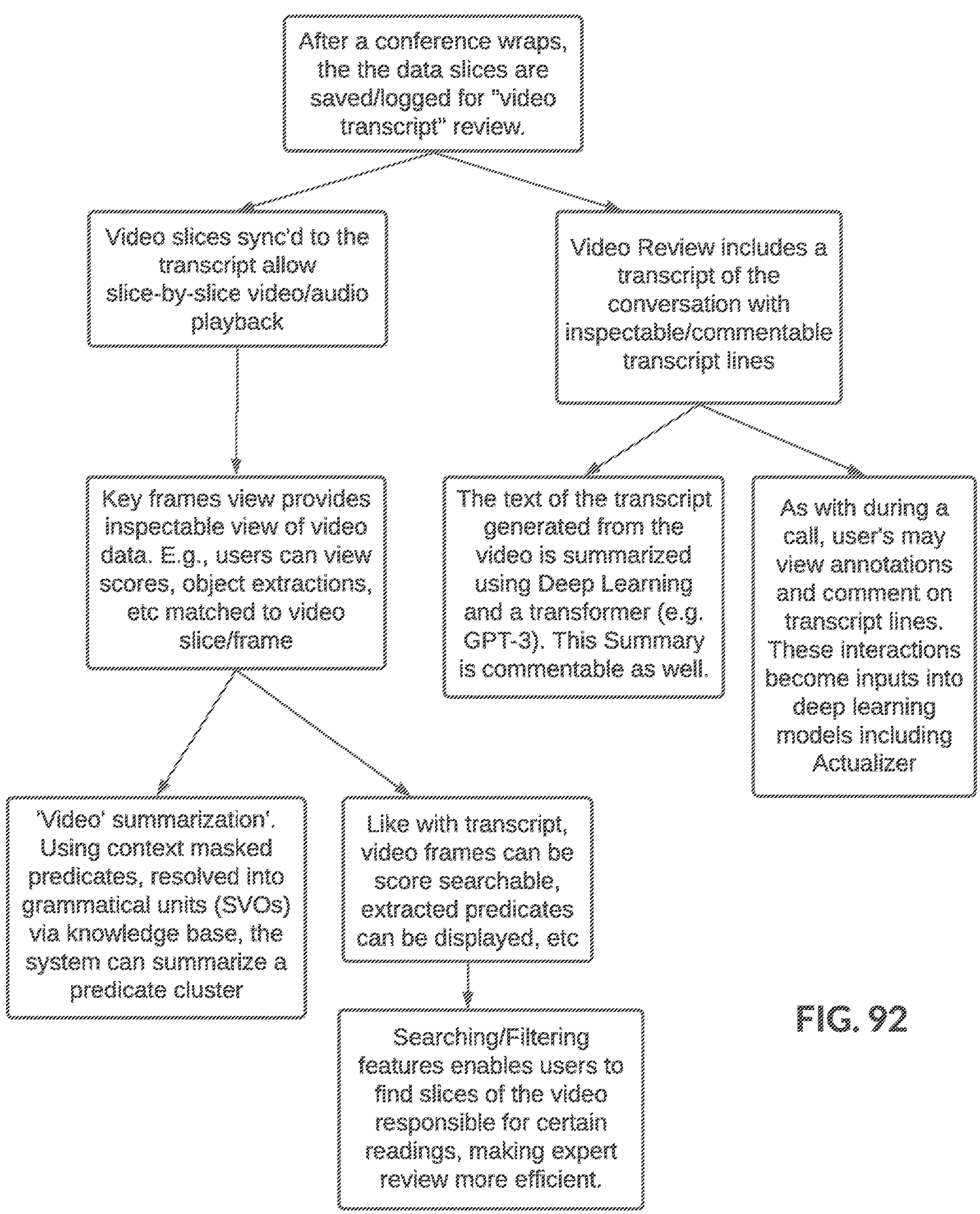
FIG. 92 illustrates a flow in the Story Model instance—Video conference—remote care, particularly conference Analysis/Insights.

FIG. 92 illustrates Story Model instance—Video conference—remote care, particularly conference Analysis/Insights. See flow and descriptions in figure.

Figure 93:
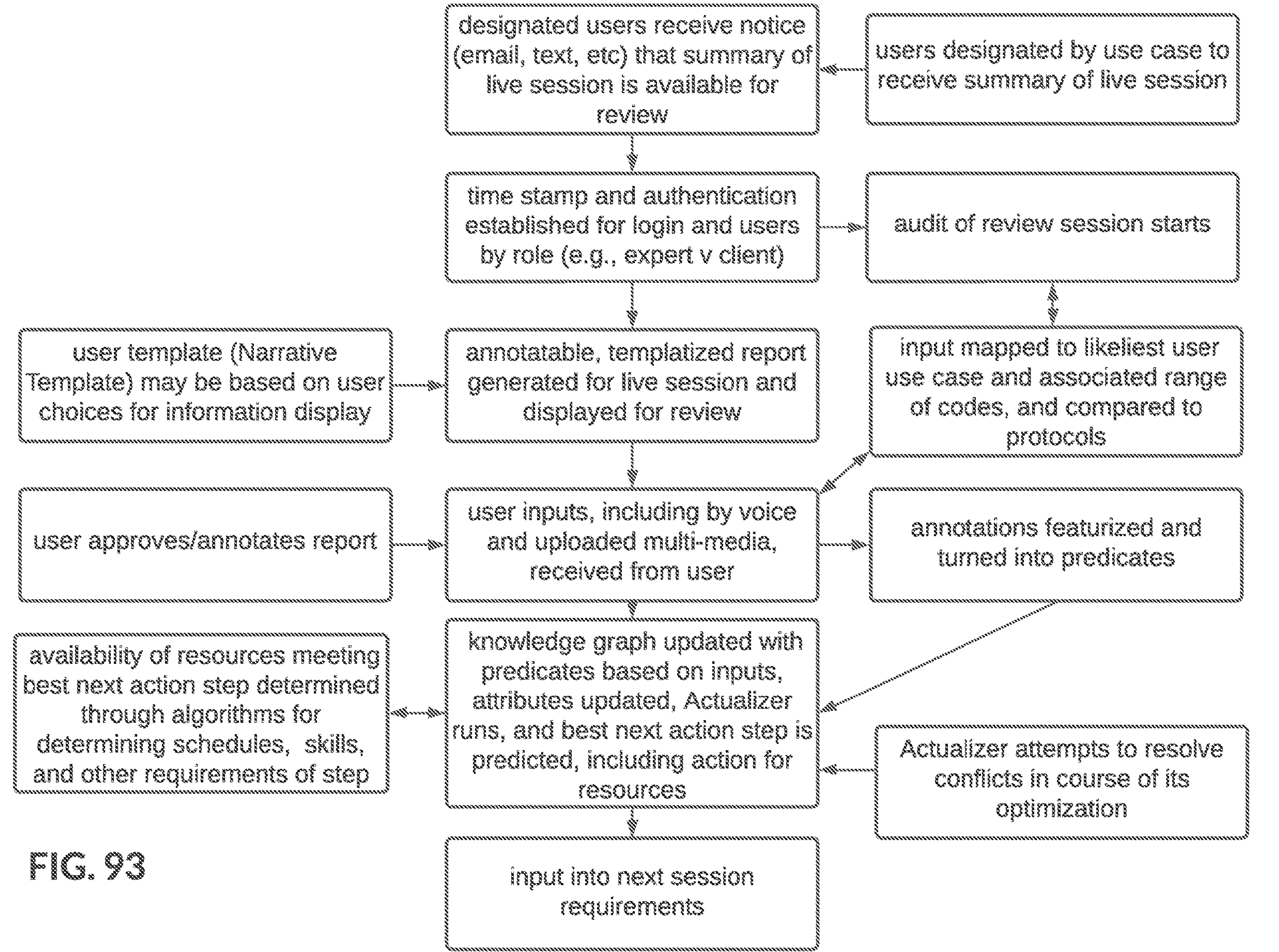
FIG. 93 illustrates a flow in the Story Model instance—Video conference—remote care, particularly reviewing session.

FIG. 93 illustrates Story Model instance—Video conference—remote care, particularly reviewing session. See flow and descriptions in figure.

FIG. 94 illustrates Story Model instance—particularly case management, and professional engagement. See flow and descriptions in figure.

FIG. 94 illustrates Story Model collaboration instance—particularly case management, and professional engagement. See flow and descriptions in figure.

Turning now to an overview of steps described in FIG. 94, recall that a Story Model instance (see FIG. 6) may be a case management case (CMC). A CMC may refer to a specific profession or industry use case involving a collaboration between various expert and client users to resolve certain matters following standards established for resolution of these matters by the profession or industry. A CMC may be modeled in the example embodiment as certain long-term goals to be optimized by the Actualizers of users in the CMC, and a sequence of past actions/interactions, together with a collection of resources with specialized roles.

As described in FIG. 94, a Narrative Template may be designed to facilitate inputs of requirements from experts for Narrative Segments during the development of Narrative Segments for a CMC. Expert inputs received during CMC development may be passed from a Narrative Template to guide expert inputs into the Story Model Inputs Processor, which may transform user inputs into Story Model Inputs. From Story Model Inputs, the example embodiment may generate an emergent Story Object Hierarchy for the specified CMC, which may transform requirements for the CMC into specific Story Data Type dependencies that execute in accordance with professional standards for the CMC.

In the example embodiment, a Narrative Template may be designed for expert users during CMC development to simply describe (e.g., via voice, text or other user inputs) the CMC. To continue with this illustration, the example embodiment may then determine from expert inputs processed as Story Model Inputs which inputs transformed into predicates may be missing predicate heads or predicate arguments (i.e. a predicate comprising a predicate head, or topic, and a predicate argument). Recall, predicates in the example embodiment may be a universal interim representation of user inputs used by user Story Models that may be further transformed into Story Data Types. Detection of missing predicate heads or missing predicate arguments from processed inputs by the example embodiment may trigger upon discovery of an incomplete predicate prompts for users to complete the incomplete predicate, until a complete set of predicates may be characterized and displayed in natural language (e.g., via a Narrative Template) for approval by users during development of the CMC. Since predicates may be transformed by the example embodiment into Story Data Types, a complete set of predicates for a CMC may be used to establish the CMC as a specific instance of a Story Object Hierarchy.

As shown in FIG. 94, during CMC development, requirements for a CMC may require that when a certain Narrative Segment executes, a specified Narrative Template may also execute. To illustrate, let's say that among various requirements for a care plan CMC is a specific course of treatment (e.g., an action or series of strictly ordered actions characterized by a Narrative Segment) to resolve a specific, diagnosed condition (e.g., a conflict created by a failure of a patient's various body parts to play their normal roles). To continue with the illustration, when a doctor (i.e., a specialized role) meets with the patient at certain intervals to evaluate the patient's heart, the actualizer of the patient user in the care plan CMC may choose a Narrative Segment (e.g. checking vitals, including blood pressure). When this "checking vitals" Narrative Segment is executed, a Narrative Template may execute automatically to show the doctor an analysis (Impact analysis) of the patient's heart, which may include for example, vitals and changes in vitals (e.g., via Story logs). Note, in this illustration, the doctor may have privileged access to the patient user's Story Model.

Narrative Templates may be specialized to facilitate various interactions between users and their Story Models throughout a case management case, from its initiation through its resolution. For example, a Narrative Template may display case logs (attribute profile snapshots in the context of professional-client collaboration) to assist a physician in remotely monitoring a patient, as may be required by a Narrative Segment chosen by the expert user's Actualizer.

To assist the professional in performing at a professional standard, the example embodiment may facilitate and document an expert override of a specific Actualizer recommendation (wherein Actualizer may continue gathering evidence to update state and prepare the next update, so case stays on track)

As another example to facilitate better care outcomes, an interactive front-end may facilitate a collaboration between professional and client users to configure and confirm client goals, which in a professional case a client Actualizer may consider; similarly, an expert user authorized to make adjustments in care plan or treatment prerogatives may state certain goals and freceive via Narrative Templates appropriate opportunity to confirm (e.g., text for doctor to confirm spoken instruction "to reduce patient's anxiety to normal levels"; or "let's bring down her heart rate from 110 bpm to 90 bpm." The example embodiment may use a Narrative Template to confirm the instruction, wherein received confirmation launches Actualizer to optimize client's envisioned story for that goal)

As another example, a Narrative Template may display a specific set of screens for an exercise generated by a Narrative Segment within a session (video call) that begins executing and defines a new context for inputs.

In the example embodiment, the optimal resource for taking the best next action step chosen by a user's actualizer maybe be identified using various methods, including through a negotiation between actualizers of users in the CMC. For example, to continue with a simple illustration of the care plan CMC, a best next action recommendation to consider increasing the dosage of a medicine for a patient may be taken, as required by an executing Narrative Segment, a nurse practitioner or doctor, but not by a less skilled nurse, patient, or family caregiver. The assigned action to evaluate an increased dosage may be determined to advance the assigned resource towards the resource's goals as well as the patient's. For example, a nurse practitioner may have a professional goal of building stronger relationship with a doctor's patients, wherein the recommendation may facilitate a stronger Contract (a Story Data Type) between the nurse role and the patient role.

As described in FIG. 94, negotiated assignments may require approval of the negotiated resource, which may be presented via a Narrative Template.

Recall, however, that not every action handled by the example embodiment may be characterized as a best next action step, which may characterize the Actualizer's choice after consideration of all of a user's current story and envisioned story snapshots. For example, taking a patient's vitals, while key to managing patient outcomes, may at one time be the best next action but at others a routine one. As described earlier, specialization logic may simply determine that a device is to be queried by the example embodiment for a fresh reading, rather than initiate a negotiation for taking vitals between actualizers of authorized users.

Figure 95:
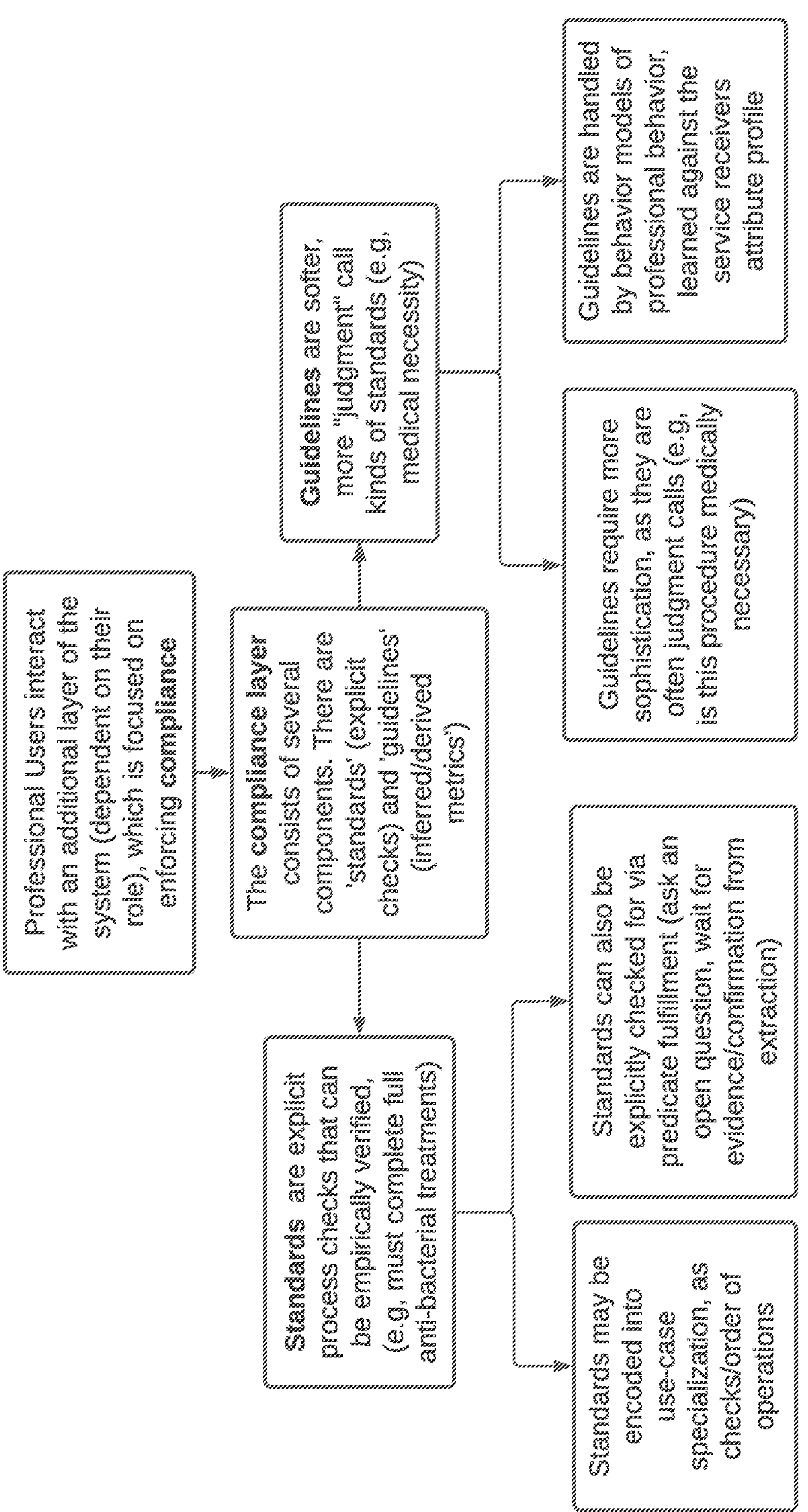
FIG. 95 illustrates a flow in the Story Model instance—Video conference—remote care, particularly case management—compliance, standards & guidelines.

FIG. 95 illustrates Story Model instance—Video conference—remote care, particularly case management—compliance, standards & guidelines. See flow and descriptions in figure.

Figure 96:
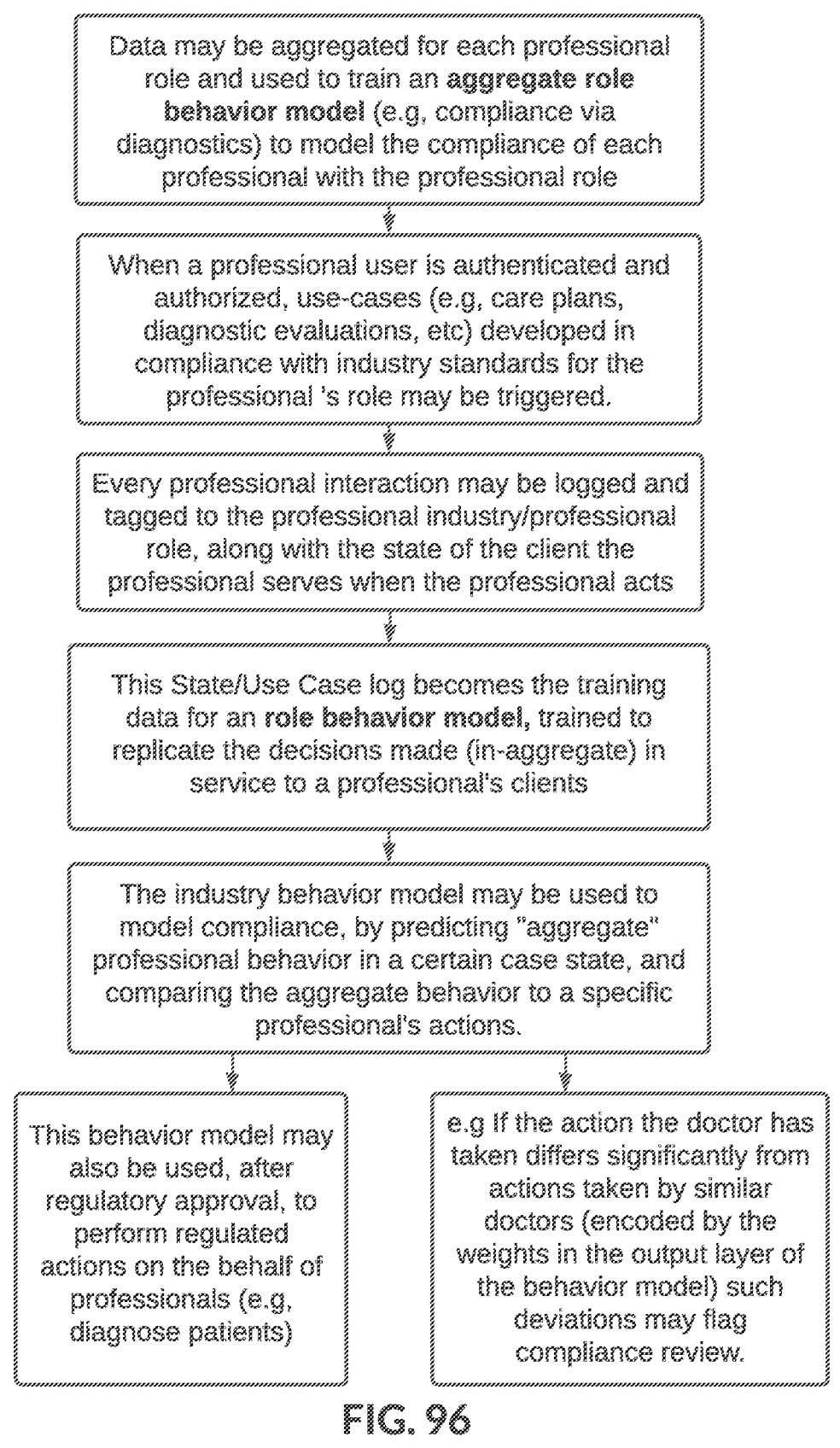

FIG. 96 illustrates Story Model instance—Video conference—remote care, particularly case management—compliance—industry behavior model (by role). See flow and descriptions in figure.

Figure 97:
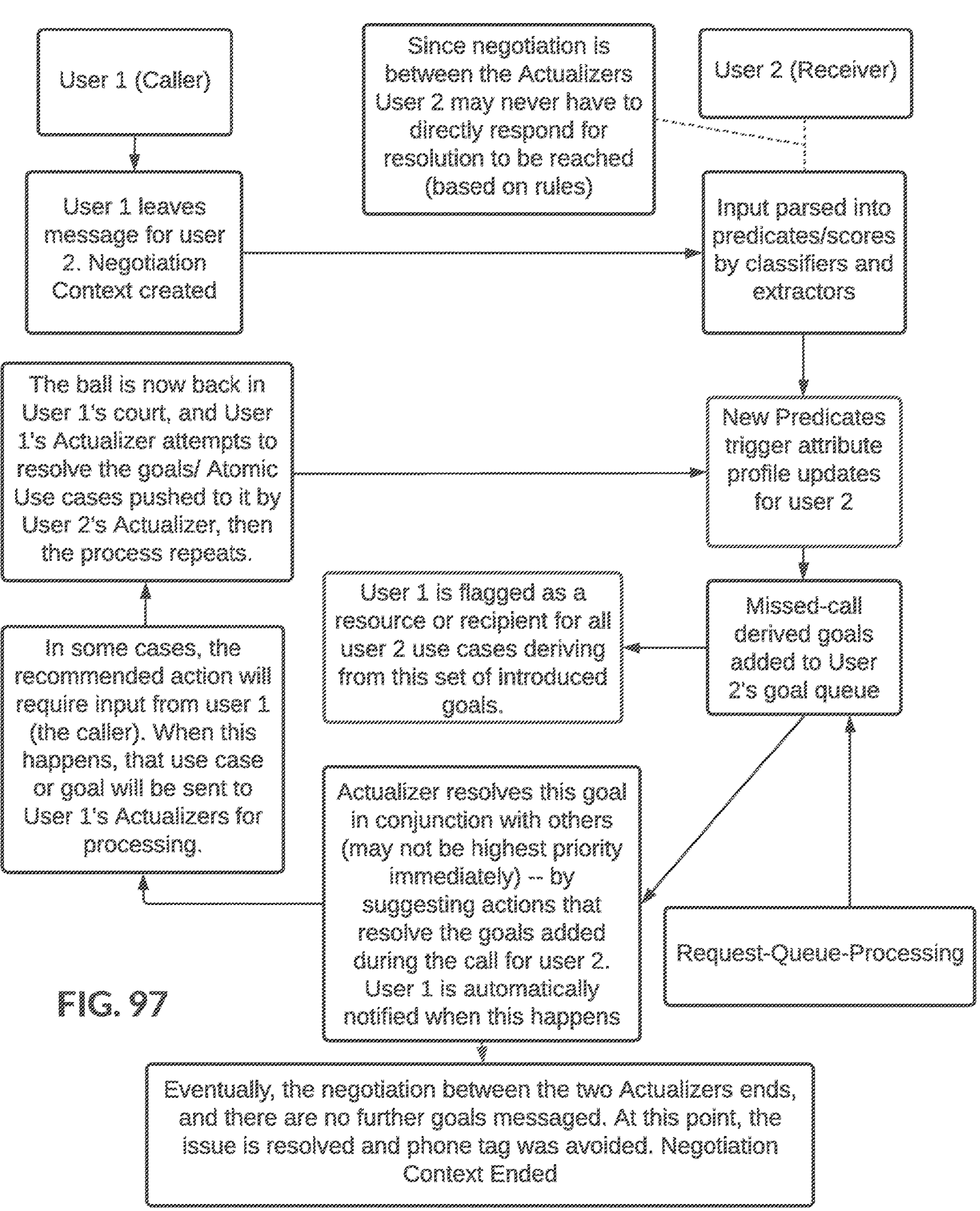
FIG. 97 illustrates a flow in the Story Model instance—Video conference—remote care, particularly ending phone tag, negotiation model (pairwise example).

FIG. 97 illustrates Story Model instance—Video conference—remote care, particularly ending phone tag, negotiation model (pairwise example). See flow and descriptions in figure.

As further described below, the example embodiment may use a real-time method of negotiation between the Actualizers of different users to reduce or eliminate cycles of unsuccessful attempts by two people to reach each other, as well as to improve responsiveness to attempted outreaches, especially when such responsiveness may correlate to an important goal for either or both users, and thus have some urgency. (See also FIG. 4A.)

In FIG. 97, the flow diagram begins with one user leaving a message for another user. However, note that the modality of attempted communications may be any modality of communications supported by the example embodiment (e.g., text, email, video call, chat, etc.). See also FIG. 67 on optimizing communications modalities between users.

To continue with an illustration in the example embodiment of the negotiation model, the message left by user 1 as spoken words (or as written words, images—e.g., "emojis"—links, etc., if a text or email) may be received as Story Model Inputs from user 1. User 1's message for user 2 also may be received as Story Model Inputs for user 2 (i.e., recipient of message in the illustration). Each user's Actualizer then may receive current and envisioned story updates from user 1's left message.

It should be pointed out now that some messages left by one user for another user may contain a request for action (e.g., "Sorry I missed you, Chad. Please pick up something for us to have for dinner on your way home."). When a message left by one user for a receiving user is determined to be a request for a receiving user's action, the actualizer of the receiving user may consider the requested action in the example embodiment through a process referred to as Request Queue Processing.

Meanwhile, in the example embodiment, the message left by the caller for an action to be taken by the recipient of call may be processed as Story Model Inputs for the caller, and used by the caller's actualizer. For example, regarding the missed call illustrated in FIG. 97, user 1's Actualizer may send user 2's Actualizer a request for an action determined by user 1's Actualizer from the Story Model Inputs derived from user 1's message. As to user 2, who "misses" user 1's call, user 2's attribute and goal updates as a result of user 1's message may be enqueued for "consideration" by user 2's Actualizer.

During request-queue processing (See also descriptions and flow for Request-Queue Processing in FIG. 98), user 2's Actualizer may suggest solutions masked to the current context (e.g., call between user 1 & 2) and blended with the Actualizer's digest by urgency of similar context Narrative Segments/use cases for user. See also FIG. 62). How user 2's Actualizer may score the urgency of user 1's Actualizer request may determine how user 2's Story Model may route the request of user 1's Actualizer and which model used by user 2's Story model, if any, may be used to act on user 1's request.

If the context is determined to be an emergency or is scored with urgency equal to or greater than other user 2 "goals" (See also FIG. 47), user 2's Actualizer may prioritize goals derived from user 1's message, and executes actions accordingly. Meanwhile, user 2's Actualizer may notify user 1's Actualizer of these actions, which in turn may choose a communications strategy use case to stylize NL communications for communication of the notification to user 1. (See FIG. 4A)

If the context is determined not to be an emergency or is scored as having lower urgency than other user goals, the Actualizer may still identify one or more appropriate Narrative Segments. In this case, execution of the "non-urgent" Narrative Segment may be performed by the Actualizer after it completes higher priority actions, or, alternatively, the execution may be handled by other models, such as probabilistic programming.

The example embodiment may process both urgent and non-urgent requests using a method by which the user's Story Model may continue to optimize most urgent or priority goals, while still responding in a timely manner to less urgent goals. For example, a doctor's Actualizer may continue to book appointments with patients while prioritizing which one to see on a more urgent basis on any given day.

To continue with the flow in FIG. 97, just as user 1's message for user 2 triggered updates to user 2's current and envisioned story, user 2's Actualizer's "response" may trigger updates to user 1's current and envisioned story, and thus perpetuate the process. In the illustrated example, and subject to limits to loops, user 2 may never have to respond directly for resolution to be reached between the two Actualizers.

As also illustrated, user 1 may be tagged as a resource for user 2 Narrative Segments/use cases deriving from the negotiation context of the voice mail left by user 1 for user 2.

The negotiation process from unsuccessful attempts by one user to reach another may be described generally as one between requesting and receiving Actualizers. As illustrated, the user's communication may be used by the example embodiment as Story Model Inputs to update each user's current and envisioned stories, which in turn may be enqueued and scored for urgency, and then executed by each user's Story Model based on the best available model for the determined priority (e.g., Actualizer or other model)

This above-described process may end phone tag, characterized as one or more unsuccessful attempts by users to reach each other, because while users may not reach each other, their Actualizers may reach each other and then act on behalf of their users. Additionally, messages left by one user for another may be transcribed, summarized, annotated by the example embodiment, and made available for user comments, which in turn may generate new Story Model Inputs, and thus further inform Story Model optimizations.

The negotiation model used by the example embodiment may help improve the situation of one user who may attempt to contact another user who may not be reachable at the moment, but whose assistance may be desired or required by the person attempting to make contact.

For example, a patient calling a doctor after hours to seek help to relieve pain or address a concern may instead be connected to an answering service. In turn, a doctor designated to return calls received by the answering service may attempt unsuccessfully to call the patent back. The patient in this scenario may opt to reach another doctor, go to the emergency room of a local hospital, wait until office hours, or keep trying to make contact with the off-hours staff covering for his doctor. These scenarios may have actual costs as well as hidden costs to both doctor and patient. For example, the doctor may lose the patient as a "customer" to another doctor or service reached by the patient in the interim; the patient may incur a potentially unnecessary expense at the emergency room, or alternatively, the patient may defer seeking immediate attention with the result that the condition becomes acute, perhaps requiring hospitalization. In this example, costs may stem from a failure to connect patient and doctor faster, earlier, with no clear and immediate next steps as to the right care decisions.

In the example embodiment, many of the above-described situations may be addressed in real time through interactions between the Story Models of different users. In the instant example, Story Models may predict if the communications left by one user (e.g., patient) for another (e.g., doctor) may impact the goals (e.g., improving a patient's health outcomes) of either (e.g., patient, doctor) more than other actions in an optimization of best next steps performed by the Actualizer for each user. Recall, however, this is notwithstanding an emergency, where an emergency action may override other priorities as the priority for an Actualizer to execute.

For example, a doctor or a relative may receive a voice mail for help from a user who has fallen to the ground at home and suffered an injury. The voice mail from the fallen user may contain multiple data types used by the example embodiment to determine the user's likeliest current situation, or put another way, likeliest current use case. The user may be predicted to be seeking help by the example embodiment by processing multiple data types, including acoustic classification of the fallen user's voice signals, extractions of predicates from speech-to-text featurizations indicating a fall, and attribute configurations suggesting potential injury.

In the example embodiment, an attribute profile may contain an exhaustive list of attributes, provided each is expressed as a number, or probability, such as may be derived by Problog from extracted predicates. These attributes may include, but may not be limited to, for illustrative purposes: quality of life scores by subcategory (e.g., emotional, social, physical, financial well-being), likelihood of certain health conditions (e.g., early stage dementia, diabetes), weighting for dependency (e.g., potentially high for a cared-for), likelihood of current role from extractions (e.g., highly likely user in a patient role), likely contracts involving likely current roles (e.g., high likelihood patient has public health insurance), likely mobility (e.g., low on ambulation), urgency of the communications (e.g., high) and so forth.

Let's say for simplicity of the illustration that the fallen user's attribute profile may include a low quality of life score for physical well-being, a high anxiety score, and a probability, or value, from predicate extractions for risk of injury. Once the attributes are constructed, the user's envisioned story generation may construct new goals as top priority. These in turn may map to a current use case characterizing an emergency use case, here, for illustration purposes, a fallen elderly man over 75 years old with no prior injury but having osteoporosis, living alone, and prone to calling his daughter only when physical dependencies are acute.

To continue with the example, the user's Actualizer then may generate a use case to contact the nearest emergency medical service (EMS) with the highest rating that is also covered by the fallen user's insurance. In an embodiment, a rule may be established that a recommended best next action step may be executed automatically, without human supervision (e.g., approval), by the example embodiment if it involves an urgent situation meeting criteria set by editors and or permissioned users.

Meanwhile, the example embodiment may loop in the other user or users who "missed the call". For example, the current and envisioned story of the relative who may receive the voicemail from the fallen user may be updated, then enqueued to determine the relative's priority goals. It may be that the relative receives a text (the phone call not having been answered) from the relative's Actualizer to meet the caller at the same location as the EMS destination (e.g., a local hospital). It may also be that if it was the doctor's voice mail that received the fallen user's message, the doctor may receive a NL communications from his Actualizer about a new updated case management case (Narrative Segment). For instance, the doctor may receive an annotated transcript of the message with recommended actions pertaining to the doctor's next protocols. Meanwhile, the EMR system used by the doctor may also be updated with records pertaining to attributes from the fallen user's current story.

To dig deeper still into the example, it should be remembered that the example embodiment may receive as inputs any data type, including from sensors, and that in an alternative scenario, if the fallen user is unable to make a call, the fall may be "heard" by a sensor, or a lack of evidence of movement in the house may be identified (e.g., a refrigerator door that usually is detected to move by 1 pm doesn't), and may be processed as Story Model Inputs by the example embodiment. The example embodiment may determine a best next step from sensors alone, in cases, and communicate as appropriate to other users based on relationships mapped contextually to the situation (e.g., notifications to a relative and/or doctor).

In the example of the fallen user, swift authentication may be required to meet the user's needs before further predicted harm. In situations of some urgency, where password entry is not feasible, the example embodiment may use acoustic authentications of the caller whose voice is recorded in voice mail, for example, in addition to other sounds present in the background of the voice mail or alternatively provisioned to the example embodiment characteristic of events, via sensors. Sensors may detect sounds (e.g., thuds) such as those produced by sudden falls.

Not every call to a doctor may be an emergency or even one necessarily handled by a user's Actualizer. In the example embodiment, user goals identified as important but not so important as to drive best next action steps for the user, may still be satisfied by models other than the optimizer including, for example, models powered by Problog, which may generate new predicates from inferences. Examples of actions handled by models in addition to or other than the Actualizer, may include but may not be limited to, summarizing messages, notifying staff of a new summary to review, generating a link for staff to click to see these summaries, receiving staff comments on summaries, summarizing staff comments, prompting a courtesy return call from staff based on the situation determined by the message leaver's scores and extractions, and so forth. These may be dispatched by methods used by the to determine from extractions and scores which specialization logic to use for a relevant use case (e.g., a staff routine)

As further description, each user's Story Model may process Story Model Inputs to determine which messages between users themselves may have greater urgency and thus priority of response. To determine priority for a response to a "missed call" or to a non-responsive user, the example embodiment may use various methods in addition to those described above. The example embodiment may maintain a log comprising a variety of information about attempted and successful attempts by one or more people to connect to each other through one or more devices connected to the system. This log may include, but may not be limited to, metadata such as timestamps, modalities used by users to attempt to reach one another, duration of a connection, data type (e.g., video, audio, etc.) and so forth, for use by the example embodiment to determine the urgency, responsiveness, and other characterizations of the attempts and successes computable from the information. This data may be referenced in Story Logs used by the Actualizer to determine the best next action and how best to communicate that. For example, calls of nominal duration made by one phone number to another in a few minutes' time may characterize the urgency of one party to reach another, and this may be used with other data by the example embodiment to determine the urgency of a situation that may affect one or both of the users.

Through analysis, it may be determined by the example embodiment that the urgency of the outreach and the urgency of a response to the outreach is asymmetrical. One person may wish to make contact more than the other. This asymmetry may be quantified by the example embodiment by deriving a value for an overall set of goals each person may desire to achieve and predicting the impact of the current user actions on progress towards these goals. Predicted changes in goal weights above a threshold may be prioritized for response by the example embodiment.

Sometimes, people may not reach each other when they try to because they're using different communication modalities. For example, one user may prefer a call, another a text or an email. The example embodiment may address this issue in several ways, including through communications strategy use cases, as already described, which, among other things, may specify an optimal modality of communications. As also described earlier, the example embodiment may support a variety of communications modalities and featurize incoming datastreams from them into a universal format. The same universal format may be generated by the example embodiment as output for a variety of communications modalities. So users may not to have to use the same modalities to communicate with each other through the example embodiment.

Referring still to communications strategy use cases, story log data may be used by the example embodiment to determine patterns of outreach and response between users (e.g., see reciprocity), which in turn may factor into the Actualizer's choice for a particular modality (e.g., text) as the likeliest choice for connecting. In this manner, the example embodiment may predict the optimal modalities of interaction between users, and assign greater importance to the modalities used by users to reach each other successfully. For example, a user who prefers to communicate by text and a user who prefers to communicate by call may communicate with each other through the example embodiment without changing their preferences.

In addition to log data, the information contained within a communications that one user generates for another may be processed by the example embodiment to predict not only how urgent each user feels it is to connect with the other user but also how urgent the likeliest current situation of each user may be. For instance, it may be learned that one user tends to call frequently in urgent situations while another user may not call at all; that in urgent situations only certain relatives are called, and so forth. This may be discovered by the example embodiment during impact analysis, which in turn may be used to update constructions of communication strategy use cases.

The example embodiment may characterize the urgency of the user situation using a rating system using multiple factors determined to be highly correlated and predictive of a user's current use case. These factors may include, but not be limited to, user log values, classified health scores, current attribute values in user's attribute profile reflecting cumulative attribute values, the highest numeric value of a user goal derived from attributes constructed from newly extracted predicates, values for user use cases closest to these values based on probability values of extracted predicates associated with use cases, and so forth.

Worth also mentioning as it relates to left messages, or to other communications that a user may not respond to, are privacy and various regulatory requirements that may be enforced by the example embodiment. For instance, the above-described example situation may be subject to regulation in certain fields (e.g., healthcare) that may impede swift resolutions and/or bake in consequences if swift resolution takes a course that violates regulations. The example embodiment may only process communications from users if permissioned. Permissioned communications in a regulated field may be an information containing text, video, image, audio, simple data (e.g., pulse data, medical graph) or any combination thereof authored by a communicator or permissioned by authors for communicator to send and permissioned by receivers to receive.

In the example embodiment, one user may provide a permissioned communications to a receiving user, where both users have granted permission for their communications be shared, and where at least one device used by either communicator may be connected to the example embodiment. The permissioned communications may be via any permitted communications modality (e.g., videoconference, voice message, chat, email, bulletin board, post on social media, etc.) that is permitted for the permissioned communications.

In the example embodiment, one or more users may send permitted communications to one or more receivers, provided at least one device used by either communicator is connected to the example embodiment.

Communicators may not all have to be users of the example embodiment to experience its benefits, notwithstanding limitations imposed by contract, law or regulation of access or means by which communicators may share permitted communications. As long as at least one user has a device connected to the example embodiment, at least that user's input, whether sent by the user or received by the user, will be tagged to the user and processed by the example embodiment as user input data.

Permitted communications may contain information that the example embodiment may use to advance the goals of either or both communicators. In an embodiment, to the extent that an authenticated and authorized communicator communicates a permitted communication, the example embodiment may perform a variety of automated tasks on this information. These tasks may include any task the example embodiment otherwise performs on streaming inputs of any data type.

FIG. 98 illustrates Story Model instance—Video conference—remote care, particularly request-queue processing. See flow and descriptions in figure.

In addition to enqueuing steps described in FIG. 97 and FIG. 98, request-queue processing may involve the screening of inputs for blacklisted information (i.e., excluded from further processing), if the associated information is contextually inappropriate based on scores (e.g., an angry message left in a voice mail to "jump off a bridge"), and so on.

A screening method used by the example embodiment may reduce the likelihood that the importance of one user's goals unduly impacts another user's goals, based on only a sent or received communications, even one that is permitted. Alternatively, a screening method for blacklisted information as described may be useful for forensic and/or diagnostic purposes, since blacklisted or contextually inappropriate information may be predictive of a state of mind associated with potentially treatable conditions or alternatively a planned or completed action worthy of further investigation, depending on the context.

Figure 99:
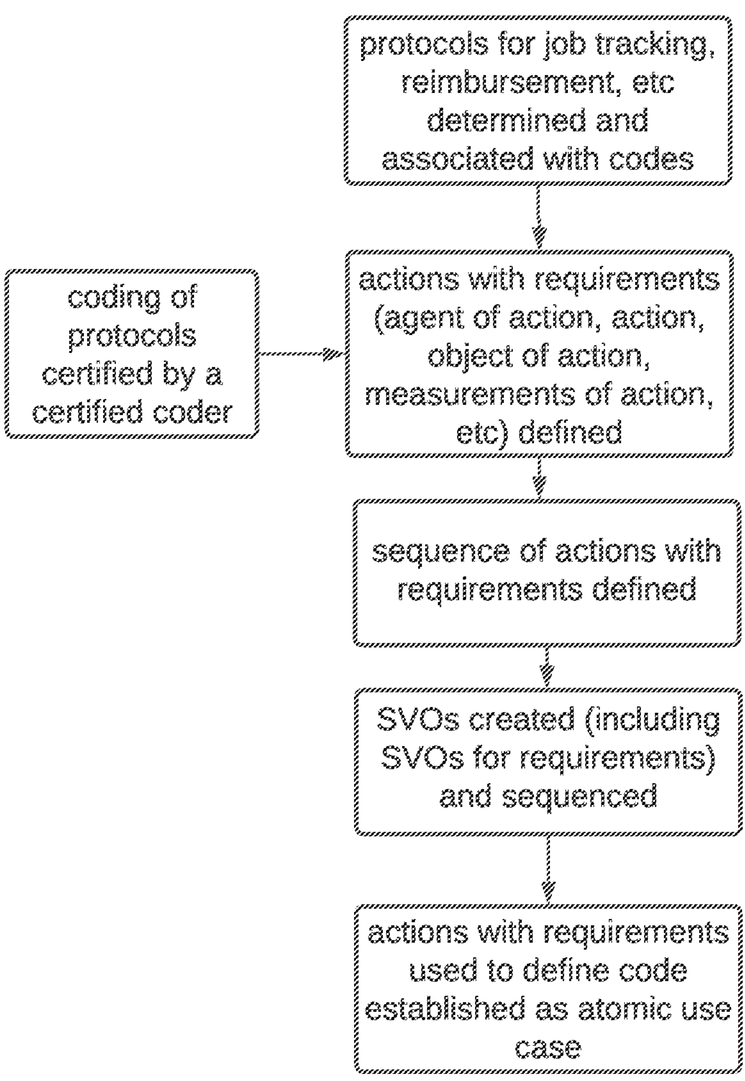
FIG. 99 illustrates a flow in the Story Model instance—Video conference—remote care, particularly use case development for protocols (e.g., procedural codes such as CPT codes).

FIG. 99 illustrates Story Model instance—Video conference—remote care, particularly use case development for protocols (e.g., procedural codes such as CPT codes). See flow and descriptions in figure.

Figure 100:
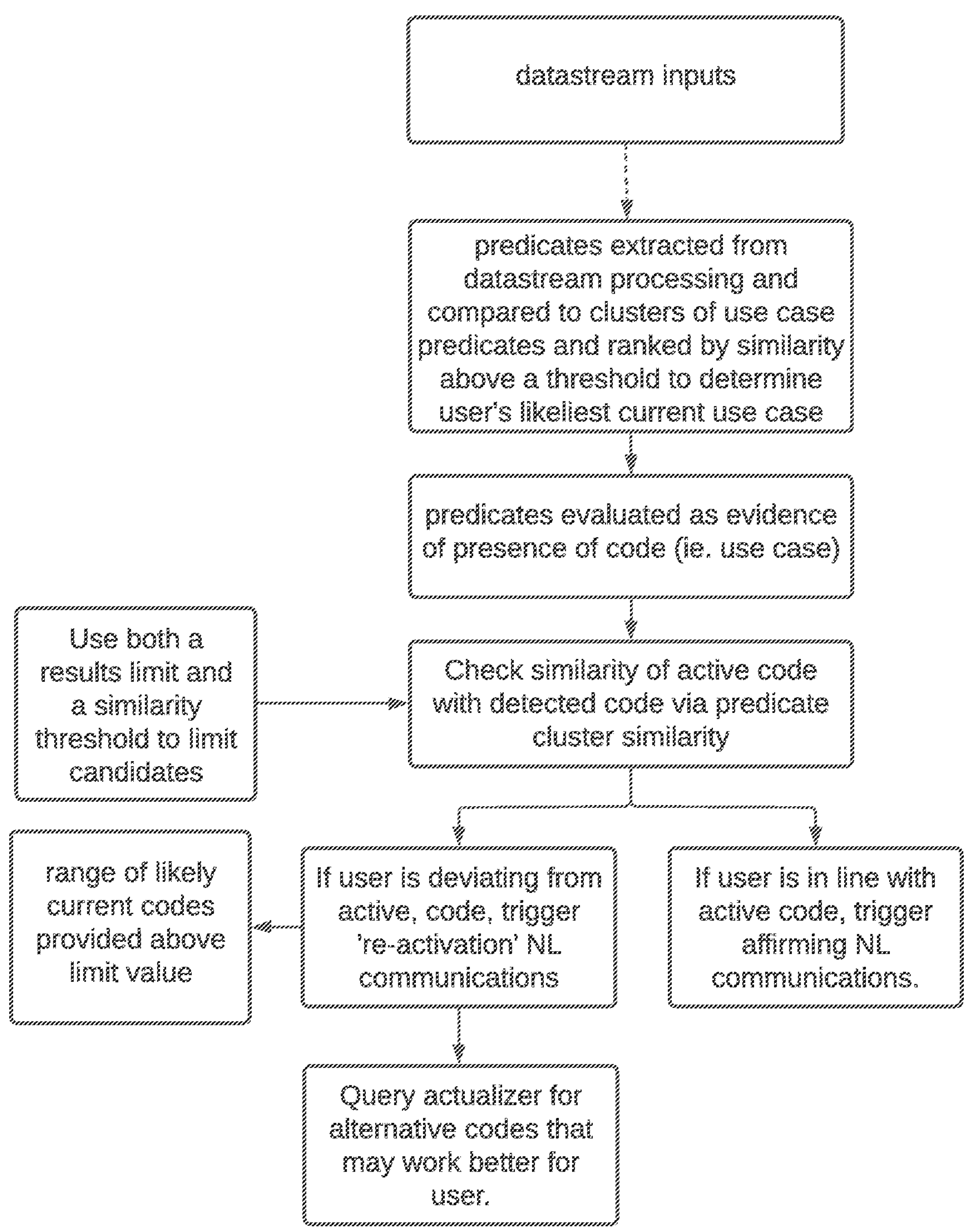
FIG. 100 illustrates a flow in a Story Model instance—Video conference—remote care, particularly Codes at Runtime (e.g., CPT codes).

FIG. 100 illustrates a Story Model instance—Video conference—remote care, particularly Codes at Run-time (e.g., CPT codes). See flow and descriptions in figure.

Recall that in the example embodiment, a procedural code (e.g., Current Procedural Terminology, or CPT) specifying a strict order of steps for a medically necessary situation may be detected by the example embodiment using extractors trained on the procedural code and on evidence of medical necessity, such as a worrisome health score. Extractors may be trained on procedural codes using deep learning methods and deployed with an ensemble of trained models to customize use cases for individuals and individual situations involving medical necessity. Predicates derived from a user interaction with the example embodiment may be determined to be sufficiently similar to predicates associated with a procedural code (via centroid similarity in the topic embedding space) in order to predict the interaction involving a procedural code use case. However, such similarity need not be because a specific procedural use case is being currently executed by the example embodiment. The example embodiment may discover the likely presence of this procedural code itself, through interactions in a situational context. The example embodiment may analyze variances between extractions from interactions using models trained on a procedural code and the actions recommended in a prescribed use case to determine fidelity of users to a procedural code. Variance between assigned and executed use cases may be computed by the example embodiment, mapped by the example embodiment to places in the transcript evidencing deviations, aggregated and displayed and summarized for annotation by users. The example embodiment may be used to specify an order of steps or to establish best practices based on precedent and on other forms of evidence. These fields may include medicine, law, finance, or other fields where a user may be considered an expert by professional standards, licensed to practice, and subject to audits. Specific use cases may be determined by the example embodiment to be present during user interactions based on extractors trained on use cases. The prediction of similarity between predicates in strict order use cases and fidelity to these through analysis of user actions may be used by the example embodiment to support or trigger billing, audit and other actions. The summaries and inspectable sources of these summaries (e.g., transcript, annotations) may be used to validate decisions made by users and to assist users in making decisions based on evidence used to train the example embodiment.

FIG. 101 illustrates a Story Model instance—others, particularly auditing activity codes for session (with annotation during and/or after session). See flow and descriptions in figure.

Figure 102:
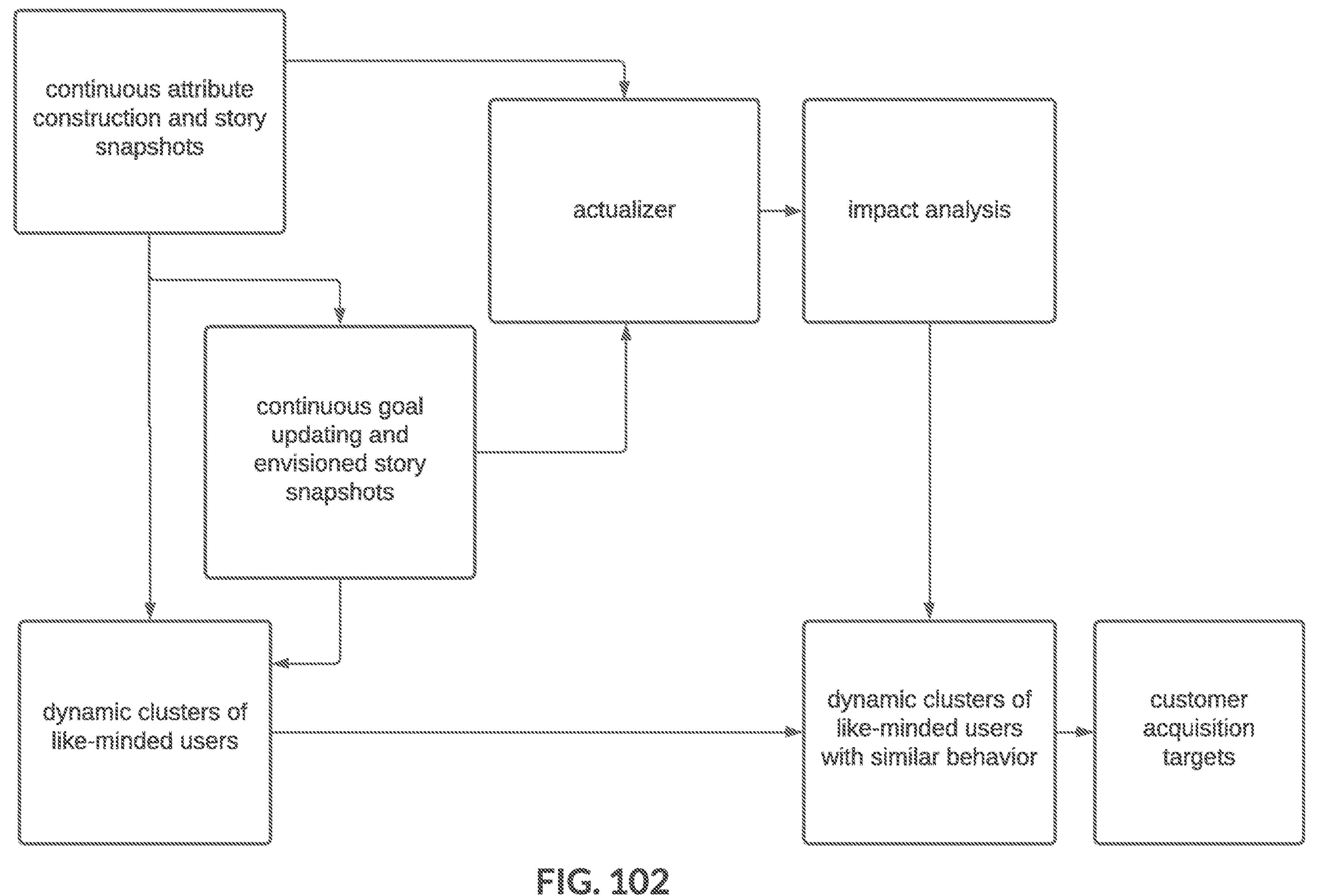
FIG. 102 illustrates a flow in a Story Model instance—others, particularly monetization of user data (with permission).

FIG. 102 illustrates a Story Model instance—others, particularly monetization of user data (with permission). See flow and descriptions in figure.

Figure 103:
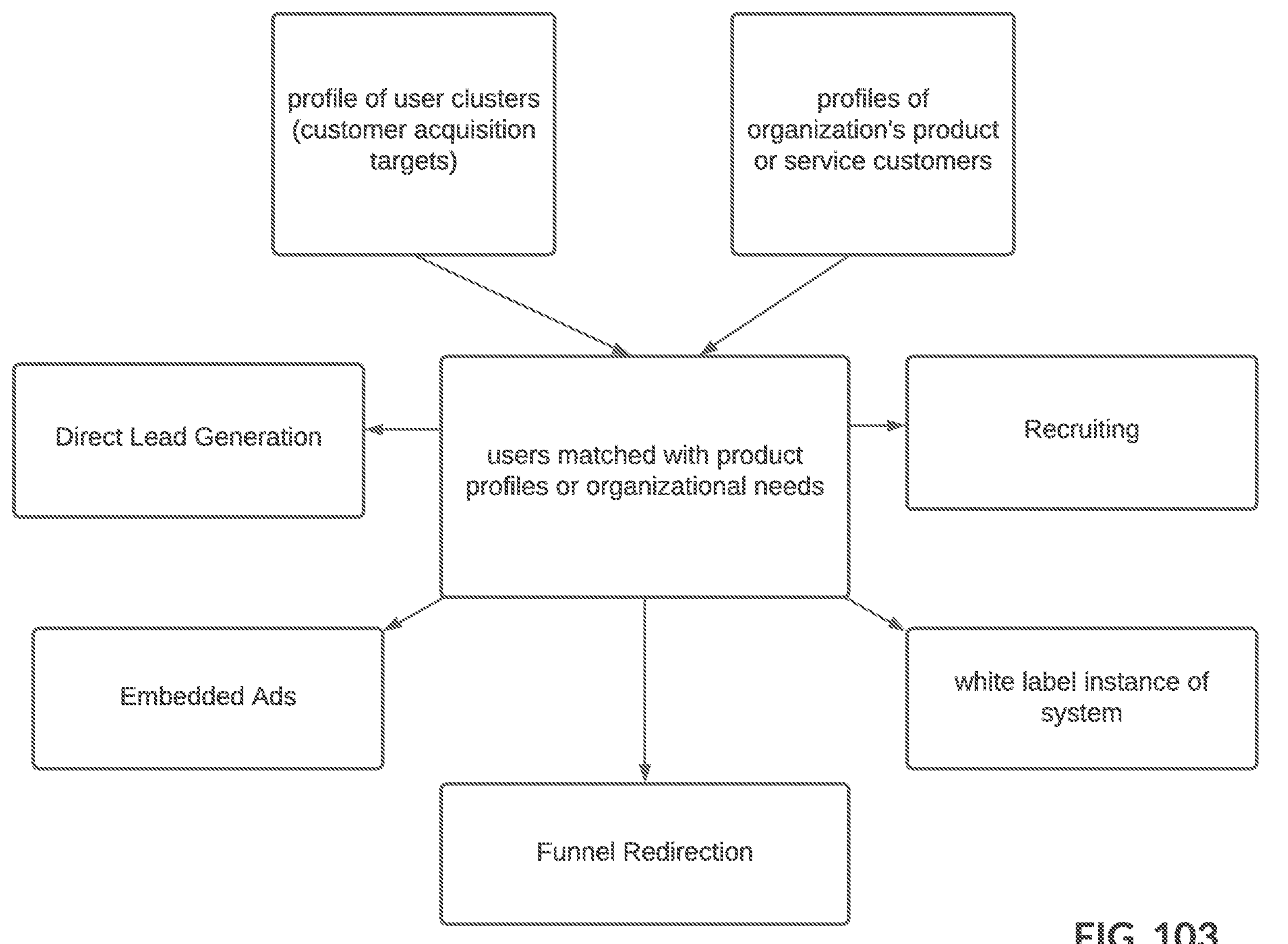
FIG. 103 illustrates a flow in a Story Model instance—others, particularly example types of monetization.

FIG. 103 illustrates a Story Model instance—others, particularly example types of monetization. See flow and descriptions in figure.

Figure 104:
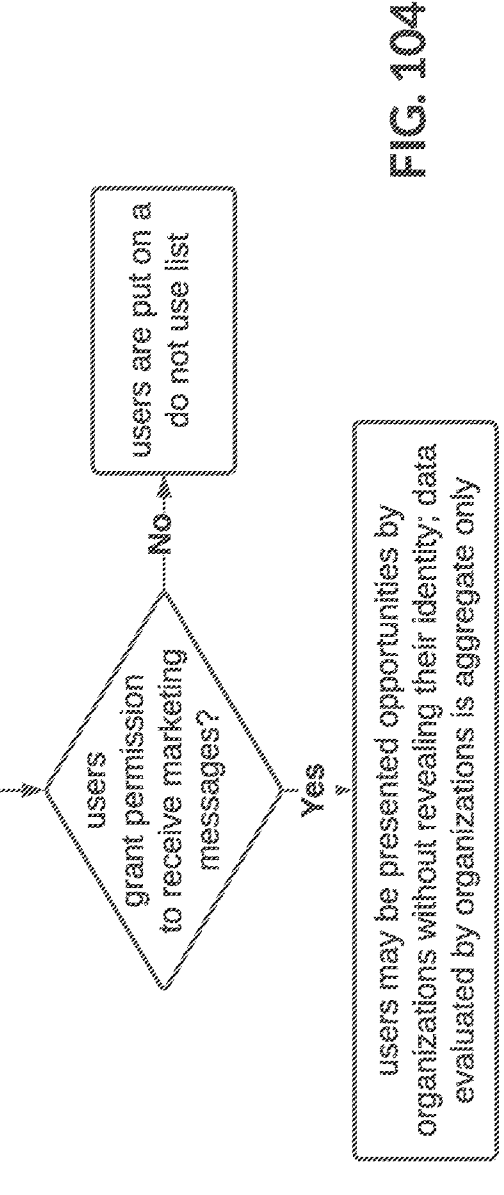
FIG. 104 illustrates a flow in a Story Model instance—others, particularly matching an organization's target user profile with system users.

FIG. 104 illustrates a Story Model instance—others, particularly matching an organization's target user profile with system users. See flow and descriptions in figure.

Figure 105:
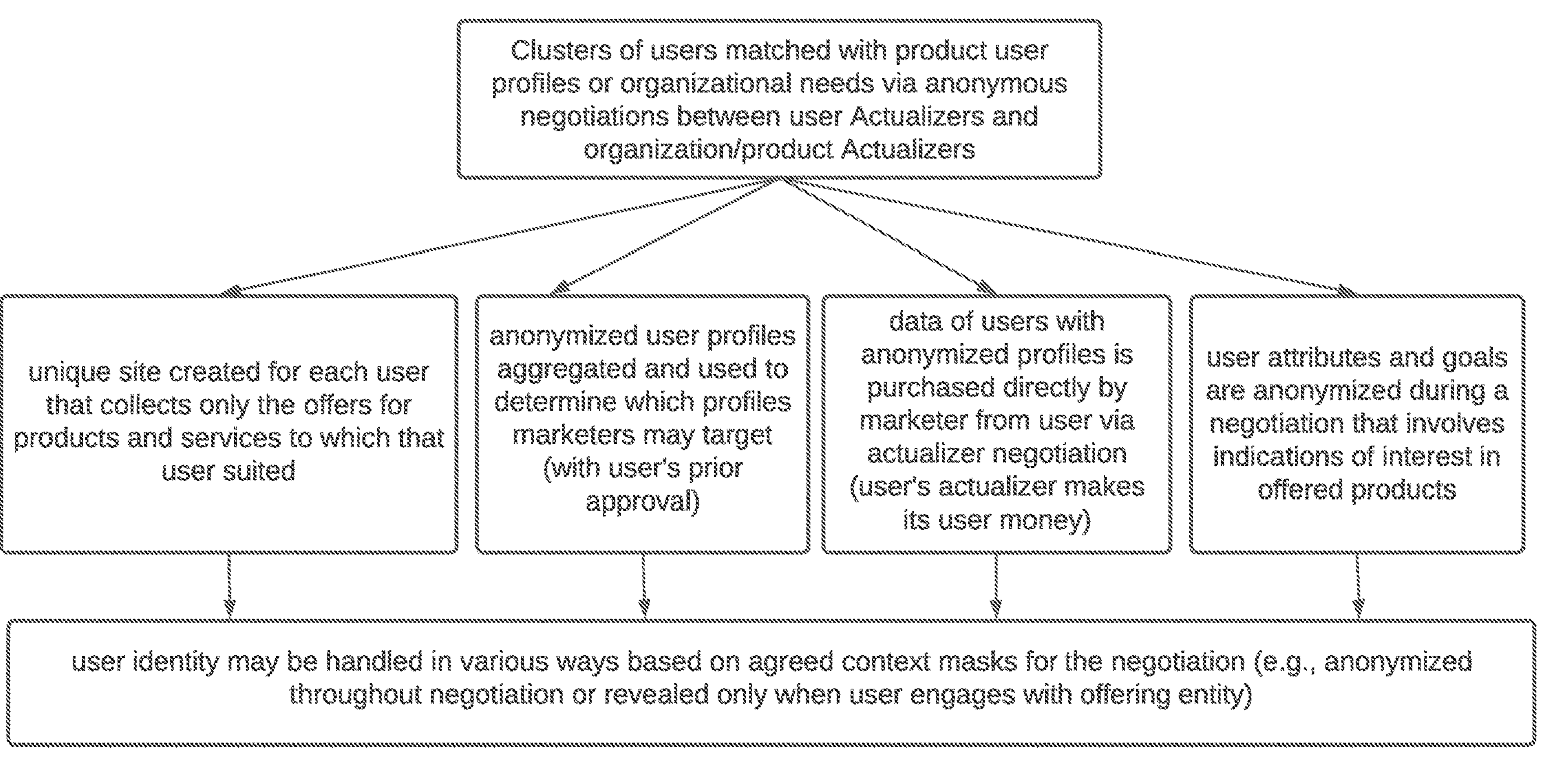
FIG. 105 illustrates a flow in a Story Model instance—others, particularly direct lead generation.

FIG. 105 illustrates a Story Model instance—others, particularly direct lead generation. In the example embodiment, user profiles may be compared to product user profiles to identify most similar clusters of users to product users. Users with similarities determined to be close enough to targeted profiles may be identified by the example embodiment. In the example embodiment, these users may not themselves be identified to the business user without their permission. There may be various ways that access to these users may be provided. These ways may be managed in combinations or as single ways by the example embodiment.

Among ways that users of the example embodiment and organizations interested in reaching them may connect is through the creation of a unique site for each user that runs on the example embodiment. Each user of a uniquely created site may be identified by the example embodiment as belonging to a cluster that may interest an organization. Multiple organizations may be interested in the aggregate cluster data views to which the user belongs. Such a site may collect only the offers for products and services from organizations, or from members of an organization, to which that user may be suited. Suitability may be based on the evaluation of the user's Current and Envisioned story. These offers may be for employment (e.g., recruitment), entertainment, durable medical equipment, financial planning assistance, virtually any offer that may be processed as Story Model Inputs, which then may be used by the User's Story Model to determine when an offer may align with the recommendation of the user's Actualizer.

If processed as Story Model Inputs, an organization's offer may be tagged by the example embodiment to the organization's profile of the product user, and treated as a Narrative Segment, or use case, with attributes and goal parameters either derived from the offer by the example embodiment or developed by the organization for the offer. This may include along with the offer what the organization knows about targets. Provided safeguards, including for validation of product claims, the example embodiment may make a commercial Narrative Segment available to the user's Actualizer in its optimizations for the user, if users wish to receive offers. A method to make offers available to users by organizations may include creating for organizations an Actualizer that may negotiate with suitable users' Actualizers. In such a case, a negotiated "agreement" between Actualizers in the example embodiment may surface a rating for the negotiated product or service. In the example embodiment, a list of ranked services and products from successful negotiations may be used to create a link to them from the user's site or in an alternative example a display in rank order. Other modalities of communicating a product or service recommendation may be used to inform users of the offers who may be interested in receiving them.

If not processed as Story Model Inputs, offers from organizations may still be posted for review by users on their uniquely created site, but such posting may not be the result of negotiation between Actualizers, but rather the result of the user's belonging to a cluster of attributes and goals constructed by Story Model that may be of interest to the organization.

In the example embodiment, organizations may be charged per posting of an offer or link to one on the user's site, and/or commission on a sale, and/or by an organization's use of an Actualizer. Regardless, the organization may not know any user's names or personal details unless users themselves provide it. Actualizers may not be used to identify users, which may be enforced by various security techniques (e.g., hashing) that may mask the user's Identity. In the example embodiment users may control what they share about themselves.

To further describe options involving a private site for each user that collects offers suitable for that user, products may be listed that may perform actions that may satisfy the actions required for a user to advance towards goals. A product's performance capability may be determined by validated representations of the product attributes (e.g., ratings by users, studies to support claims, etc.). As other recommendations, these may be commented, and comments about products may factor back into predicates, which may create new evidence for use by the example embodiment. In the example embodiment, users may request a product or service using the site, a site masked email, and so on, so as to remain de-identified until a user may decide otherwise.

A more conventional use of the example embodiment by organizations for marketing purposes may be explained simply here: users meeting the evaluation criteria of organizations, and who also may give permission, may be put on a list to be emailed or texted or otherwise reached through their devices by a third-party service, to receive coupons, ads, emails, etc., and opt-in and self-identify before business users may discover their identity. Business users may be charged by list size and frequency, or by opt-ins or another method. Additionally, it may be determined from Story Logs, among other user data, which communications strategy use cases may be most effective in moving the user population towards common goals. This may be of interest to an advertiser, and may be used as input to create better ads or other communication (e.g., emails, videos, brochures, musical jingles, etc.) and/or to determine from an inventory of ads or other communications (e.g., emails, videos, brochures, musical jingles, etc.) which may have a communications style closest to what may be shown to have moved the population of users. Further, communications strategy use cases may be used in conjunction with Narrative Segments to populate Narrative Templates, as will be described later. For example, this combination may be used by the example embodiment to generate ads (e.g., text and images in a layout).), to extract, compile and display video segments on products or services from a library based on topical similarities to user goals (e.g., stock footage of travel destinations for various vacation use cases), and so forth.

In another example, organizations may use the example embodiment to advance their missions, including marketing or other organizational objectives. These may involve their paying users directly for their data, based on the organization's evaluations of the cluster that users may be associated with and the agreement of users to provide their data.

For example, an organization may use the example embodiment to recruit users as subjects in a clinical trial study of the efficacy of a new drug, device, or care model. Recruitment may occur through various methods, which may include, but may not be limited to, screening of users from Story Model Inputs (e.g., via by classifiers trained on certain health conditions and extractors trained on certain topics and Story Data Types) to determine which candidate enrollees meet filter criteria; influencing development of offers of compensation and/or of other benefits based on user's current and envisioned story; managing interactions between recruiter and users as explained below (e.g., via Actualizers and methods that may include generic descriptions and indications of interest by a user without having to reveal identities, depending on the style of negotiation); authorizing users via Narrative Segments developed for Informed Consent (e.g., interactive informed consent); managing and/or conducting specific care model protocols developed as Narrative Segments for subjects, principal investigators, and providers; scheduling and managing care sessions, as appropriate to the care model (e.g., structured interviews); ending or significantly reducing phone tag between participants during enrollment or as part of running a clinical trial (See FIG. 97); recommending Narrative Segments developed for specific exercises (e.g., maintaining a diary); monitoring compliance (e.g., of providers) and adherence (e.g., of subjects) through evaluation of Story Model Inputs, including Impact Analysis; monitoring subject progress towards trial goals; comparison of progress towards user and study goals; amassing of new training data based on annotated transcripts, impact analysis, story logs and audits, scores, and other contextually relevant datasets from the trial; summarizing and annotating daily and longitudinal reports; and so on. Meeting enrollment and completion targets for a clinical trial study may present various challenges that the example embodiment may help address economically, and in the context of the candidate's current life and goals.

Successful aspects of clinical trials conducted using the example embodiment may then be promulgated by the example embodiment to users not involved in the clinical trial immediately upon training updates. Recall, impact analysis is used to constantly update current and envisioned user stories, and training updates from behavioral and agent models may happen in near-real time, if desired. (See FIG. 77)

Further, a business may prefer to pay a user to use its products (paid sampling), if such payment may be predicted by the example embodiment to represent a lower acquisition cost than possible through advertising, promotions (e.g., coupons), and so on.

In the example embodiment, a lifetime value analysis may be conducted by each user's Story Model (e.g., using what may be known about a user's current and envisioned stories, and a behavioral analysis based on their actions) for a range of generically described services or products For example, it may be estimated that a user diagnosed with a condition (known via Story Model Inputs) may have greater need for certain recurring items (e.g., projected from Story Logs), such as a meal with certain nutritional requirements. In the example embodiment, this information may be masked to context (e.g., mealtimes and places) and an estimate produced for how much may be consumed (e.g., predicted by a behavioral model) and thus spent over a period of time on the needed, recurring item. Consumption and frequency of consumption and generic or product specific pricing may be used to forecast a lifetime value for the recurring item, which in turn may be averaged across a population of users with similar recurring needs, to determine an average lifetime value of the user and also an index for each user and each group of different users against that index. High-indexing users may be priced more highly, for example, and reached as described above through a variety of ways. Additionally, the forecasted lifetime value of the users, represented initially as a cluster, may be used as a basis to negotiate a direct payment to users, or in-kind offer, within a cluster to sample a service or product. For example, if a user may be forecasted to need 15 cases of baby formula within two years, the organization providing the baby formula may use the example embodiment to arrange a free initial supply to forge loyalty or simply make an offer based on expected consumption.

Meanwhile, as a service to the user, services and products that a user may need, or be expected to need, may be described generically to the user by the example embodiment. A generic description (e.g., an attribute profile describing characteristics and role specifications, topic view decompositions of the product or service) may be construed by treating services and products as narrative entities (e.g., any system object with an attribute profile, Users, Narrative Segments, products, services) and processing information related to those products as Story Model Inputs, for example, from promotional or educational literature (including videos, images, captions, etc.). These descriptions may be compared to the user's Narrative Segments to determine the strength of association between these descriptions and the user's Narrative Segments. In the example embodiment, comparisons may be made using various data-views to determine the likeliest connection between a product description and the user's narrative history. For example, the user's Story Logs may support a longitudinal analysis of the user's behavior. The results of this comparison may be one of several methods that the example embodiment may use to identify the types of services and products in which a user may have an interest.

In the example embodiment, a generic description of a product or service and what it does may be created using Narrative Segments, roles (e.g., cleaner, cleans bathroom toilet), which may be assigned to "things", and encoded in the knowledge base, then processed as Story Model Inputs by extractors (e.g., toilet cleaner", [brand]"), and so forth. This genericization of a service or product, or for that matter a scenario involving them (e.g., via Narrative Segments), may facilitate what may be referred to as an indication of interest in the example embodiment.

In the example embodiment, an indication of interest may involve the identification of a possible agreement between users based on what each user may know about the other user at a given point in time—without also having to know the identity of the other user. In the example embodiment, a successful negotiation between Actualizers, as earlier described, may be characterized as an indication of interest, at least up until the point the user of an Actualizer may be provided a recommendation naming an entity, or resource, associated with the recommendation.

There may be many ways in which an indication of interest may be used in the example embodiment. In some instances, indications of interest may be how certain recommendations are surfaced in NL communications to users. For example, if a recommendation may have as requirements (recall, a recommendation may be a Narrative Segment, which has requirements) to "eat tasty low-carb food", a method of communicating this recommendation may include generic aspects of a product offering. For example, "Chad, would you consider an award-winning quick serve dinner?" This illustrates just one of various ways the example embodiment may assist a user who may be "open" to receive offers (i.e., with permissions), and an analysis by the system (e.g., Actualizer, rules) of the appropriateness of such offers to advance the user towards the user's goals.

Referring still to indications of interest, various methods may be used by the example embodiment to withhold the identity of each user in a negotiation, up to and including a consummation of a transaction between users who may remain anonymous throughout, depending on the chosen style of negotiation by participating users.

In the example embodiment, users may "choose" how to stage negotiations between them. For example, a negotiation may be arranged through the example embodiment as a binary negotiation, where users may choose upfront to agree that no user identity in the binary negotiation may be shared until user identities of all involved in the particular negotiation may be shared. In such an arrangement, only when a user agrees to share their identity may they advance to the next stage in negotiation. In this context, if no other user agrees to share their identity, the negotiation may fail. Only those users that do share their identity in such a case may move ahead, and all those who have not shared their identity may be terminated from the negotiation.

Meanwhile, in another style of negotiation, a negotiation may be conducted without any user ever knowing the other's identity. In an example instance, a user may interact with their own Actualizer, which in this particular negotiation context may represent to the user through NL the genericized responses from other users' Actualizers to satisfy the optimal "agreement" between users who may be interacting with each other through only their only respective Actualizers. In this case, all NL may be parsed as Story Model Inputs via NLP pipelines, and user actions or responses similarly processed as Story Model Inputs. Just as in other uses of the Actualizer, Story Logs and conversational contexts may be used to audit progress, and in this example record points of agreement for use in a "contract" between the "winning" negociants. This "contract" may be generated as an inspectable and actionable version of the Contract Story Data Type for "agreeing" parties to "sign".

While various uses of indications of interest may involve an Actualizer, an Actualizer may not be required in all instances. For example, Story Model Inputs may be used to develop and compare predicate clusters for masked responses using the genericized descriptions of services generated from "abstracted" Narrative Segments. The NL output of the example embodiment, which as described elsewhere may typically be via an Actualizer, here to some extent may also be generated based on evidence of constructions between the respective users' Current and Envisioned Stories, using for example the method described in FIG. 34. Values generated by current and envisioned stories may run through a NL generation architecture and collect each user's response through an interface designed for the purpose. The interface, which may be a web site or managed series of email exchanges, may be used to update predicate clusters determined from Story Model Inputs, which in turn may be evaluated. Evaluations may include the degree of reciprocity between users and the similarity of their interests, including "points of agreement."

In the example embodiment, a Narrative Segment (including its dependencies on other Story Data Types, such as Roles, Deliverables, and Contract) may specify what constitutes an agreement between users and how such an agreement may be instantiated. Likewise, a Narrative Template dependent on these requirements may be generated and also instantiated as users interact with each other through the Narrative Template. As described, reciprocity measures may be among various methods used to identify similarity of user inputs. For example, points of agreement may be based on how semantically similar descriptions of services offered and services being searched for may be, on how many topics surfaced between the negociants may there be semantic similarity above a threshold agreed by the negociants, on how a ranked order of the similarity between topics derived from the interactions may be agreed via interactive tools for arranging orders from evaluated interactions, on how ratings and buttons via a Narrative Template may be used to rate interest in discussion points and to indicate agreement, and so forth.

Furthermore, in the example embodiment, where users may participate in an anonymous negotiation for goods and services, indications of interest may be mapped over the course of their negotiation. The indications of interest during negotiations may in some instances be used by the example embodiment to instantiate a contract between anonymous parties based on points of agreement, determined for example, from similarity between positions. In the example embodiment, each anonymous negociant's input may be plotted in relation to another negociant's input, using various methods. For example, topic modeling may be conducted during each user's turn in a negotiation, then used by the example embodiment to compare similarities using each "pair" or dyad of exchanges, and to show as a result increasing or decreasing distance between each anonymous user's position, which may be represented at any point in time as a dot. So a sequence of turns between anonymous negociants may be used to show progress towards each other's "position" and displayed via a Narrative Template to show the "spread" between the "positions" of the anonymous users. In this manner, users may see in a two-party negotiation the distance between their positions, and in multiparty negotiations, users may see where concentrations of interest may be relative to each anonymous user's position. This may provide a "picture" of the "market", and be used to guide various user's decisions.

Additionally, the distance between positions of negociants may be evaluable by a unit of measure established between the negociants, which measure may also be a unit of value established by the negociants as the basis for commerce between them. This unit of measure may be a currency or some other agreed standard of exchange between the negociants (e.g., as in a barter). For example, services being offered by a negociant may be valued as a quantity of currency, or other standard, which may be set by the user offering the services, or by an index used to set pricing for similar services, or by other various methods as may be agreed between the negociants and as may be established for purposes of commerce by Narrative Segments (e.g., including equivalencies between actions, as in a barter). In the example embodiment, a price proposed or set for the services being offered by the user offering them may be referred to as the ask, and the price set or proposed by the user negotiating for them may be referred to as the bid. The spread between positions, which may have a value, or difference between prices, may be expressed as a value. For example, a nurse anonymously offering a specified service (e.g., weekly home care visits to check vitals and file a report) may set a price of $X for these specified services, or let the market set the price, based on an index of similarly specified services, as described above. Meanwhile, to continue the example, the anonymous bidder for nursing services may bid a % of the asking $X. In this regard, a bid for offered services may evidence an indication of interest, and the distance or difference (or both) between the bid and the ask may be used to quantify the strength of the indication of interest. Thus, indications of interest may be expressed in various and related ways related to similarity—between bid and ask prices, between similarity of positions, between similarity of topics used to form positions, etc. In the example embodiment, similarities observed in a negotiation may be valued on the basis of a value agreed as a method of exchange between negociants. For example, if a dollar ($1) is the agreed unit of value, a product of similarities may be expressed in dollars. By valuing similarities using an agreed standard, similarities themselves may be used as a method of negotiation in the example embodiment. For example, values based on similarities may facilitate bartering of services, one in exchange for the other. Further, since similarities in the example embodiment may be derived from comparisons between user snapshots, which may include validated measures across user populations, an inventory of similarities may be developed, which may map back to users, and for which values may be established. The example embodiment may use methods as described to value similarities to help users meet goals that may not be the priority goals optimized or executed by the user's Actualizer, but which may be executed by probabilistic programming.

Furthermore, similarities between user stories may be evaluated (e.g., via Story Logs, Current Story Snapshots, Envisioned Story Snapshots) by the example embodiment and used to equate values of "gives" and "gets" in contracts between user roles. For example, consider: "If you go to the store, I'll get the fire going". While this example may involve little semantic similarity, "if" may conjoin dissimilar actions, conjoined only by location in the same sentence, but nonetheless may create a narrative connection between them as well as a logical condition that may be executed by probabilistic programming. To continue with the establishment of value, “Going to the store” may be said to be equivalent in value to “getting the fire going”. If “going to the store” may be a cost “worth” incurring in order to receive the benefit of the “fire”, and the reverse may also true, that the cost of building the fire may be “worth” incurring in order to receive the benefit of whatever is acquired at the “store” the actions may be expressed as an exchange of values. In this manner, narrative abstractions themselves may have value, even when semantic similarity may not. As a result, actions may be used by the example embodiment to “square” accounts or ledgers tracking exchanges between roles.

Unlocking the transactional value of narrative may be facilitated by the example embodiment, and help establish monetary equivalencies for the potential of one user to satisfy the needs of another, while advancing each other's own “story”. For example, in the exchange between “shopper” and “firestarter” described above, the equivalencies of perceived costs and benefits of different users may satisfy the function of currency to otherwise establish them. In this example, each action may be valued monetarily and in various ways, even if monetary compensation is not used to reward the deliverable of a service. To continue with the example, “going to the store” and “building a fire” may have importances associated with expected deliverables “in return”. These importances may map to somewhat similar costs (e.g., material, time), even if the deliverables are themselves different, and thus be quantified as monetary values. In the example embodiment, the various ways to “price” services may facilitate equivalencies between expressions of value that nonetheless tie back to the underlying narrative relationships. In other words, many different methods of pricing a value may be used to determine the value of actions, especially in the sequential order of them when associated with an expected or observed exchange of deliverables. In the example embodiment, value may be expressed interchangeably as monetary or narrative equivalencies, depending on an agreed basis for the value, which as described may be negotiated.

To return to the example of the anonymous nurse's offer, a 50% similarity between topics used to define a position of the nurse and the position of a user seeking a nurse services may mean simplistically that the % of $X to make as a bid may be 50% of the ask. In other words, the anonymous negociants may “agree” on half of what they share with each other, and that the half they agree on may be known, through the similarity measures establishing their positions. However, to continue with the example, the “unknown half” may represent opposite possibilities—that the “ask” may represent only half of what the bidder may need or that conversely only half of the services offered may be needed. To reduce ambiguity while maintaining anonymity between negociants, the example embodiment may context mask user inputs to the anonymous negotiation as Story Model Inputs, and construct from them user attribute and goal values, which as a snapshot may be used to compare the offered services to a user's current and envisioned story. To add further insights, snapshots inclusive of value constructions of the negociant's services descriptions may feed into a user's Actualizer. The output recommendation then may be compared to the services being offered. As a result, the example embodiment may generate evaluations of offered services that go beyond evaluations of the similarity of negotiating positions, to predict a relative value for them based on how they may advance the user towards goals. Furthermore, the example embodiment may act as the negociant for the user seeking services, to not only identify the best resource for the best next action, but also to identify the best price for these services, based on the user's goals.

In the example, the staging of a negotiation between anonymous users may continue until a user agrees to reveal their identity, and neither identity may be revealed until both agree to share their identity, as may be managed by the interface through a button that each user hits to signal that that user is ready for the reveal.

Another way to preserve anonymity during negotiation may involve enqueuing Actualizer requests as described in FIG. 98, where the execution of the request may not be determined to be the Actualizer's priority and instead may be executed using probabilistic programming (e.g., via Problog). The above examples illustrate various ways—with and/or without the Actualizer—that the example embodiment may facilitate anonymous and/or de-identified transactions between users.

Figure 106:
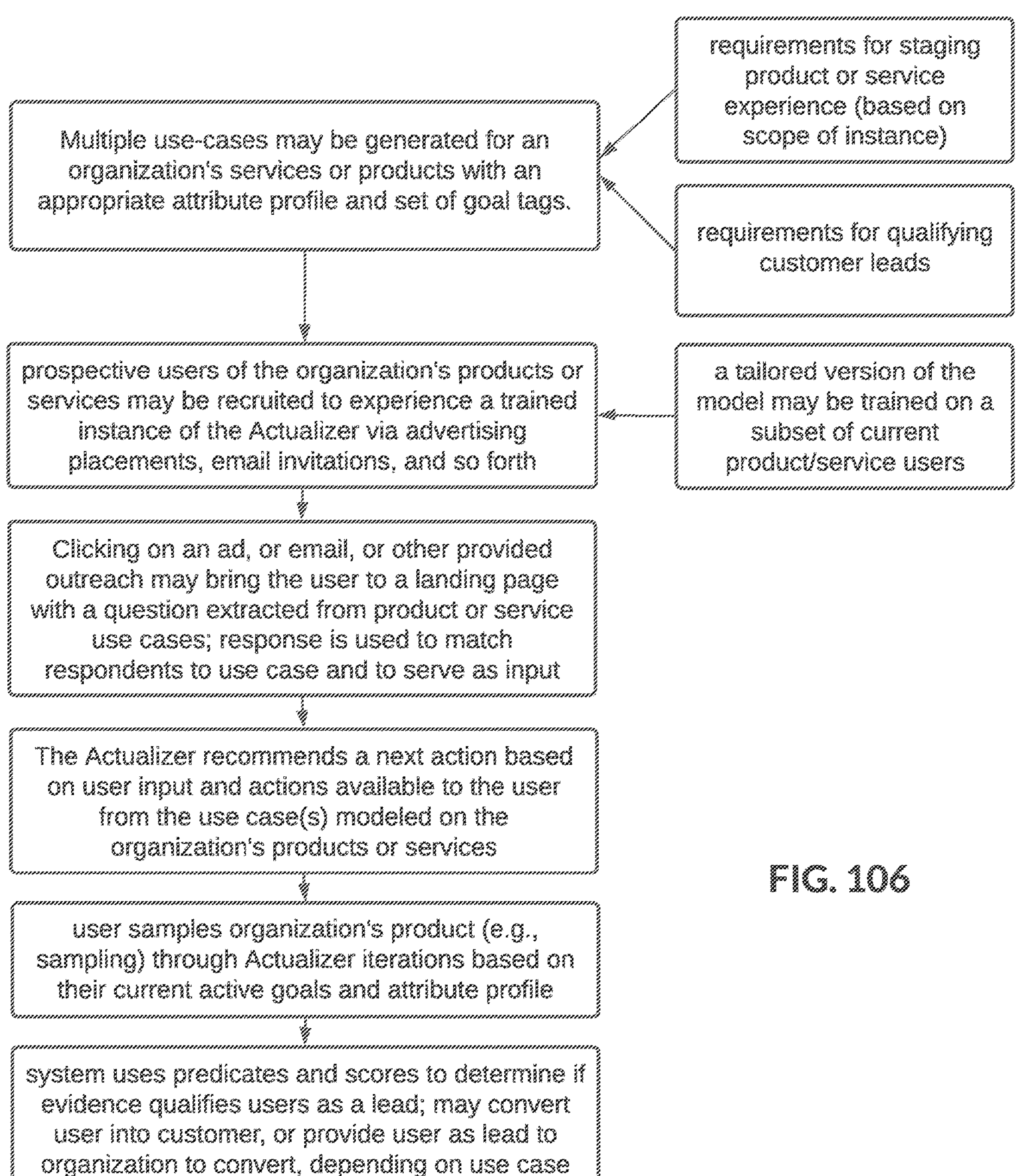
FIG. 106 illustrates a flow in a Story Model instance—others, particularly funnel redirection.

FIG. 106 illustrates a Story Model instance—others, particularly funnel redirection. See flow and descriptions in figure.

Figure 107:
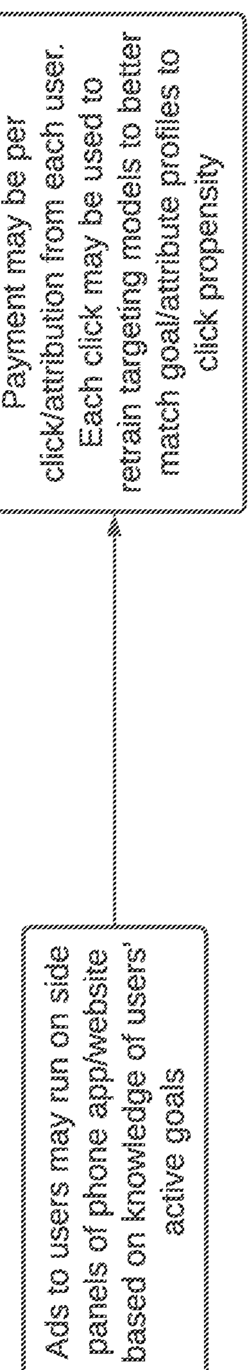
FIG. 107 illustrates a flow in a Story Model instance—others, particularly embedded ads.

FIG. 107 illustrates a Story Model instance—others, particularly embedded. See flow and descriptions in figure.

FIG. 108 illustrates a Story Model instance—others, particularly generating various recommendations (Narrative Segments/use cases for the best next action) and NL communications (based on communications strategy use cases) for various users in a collaborative setting (e.g., hospital) from various datastreams, including data from various devices whose output may be formatted as a data type used by the example embodiment and processed as Story Model Inputs. These devices may include, but may not be limited to sensors, wearables (e.g., pulsometers, pedometers, sleep analyzers, blood glucose monitors, etc.), lab and genetic tests, MRIs, electroencephalogram machines, electrocardiographs, X-ray machines, blood pressure gauges, electronic medical records including prescription and other data, and other devices that output data that may be transformed into a format used by the example embodiment for that data type. See flow and descriptions in figure.

In FIG. 108, examples are provided of Story Model Input from extractors trained on sounds, such as rustling sheets, or sensors to detect movement, which may include video extractors trained on movements, or both. Additionally, in FIG. 108, an example of a recommended use case is triggered from sounds or object detection involving movements. In the example, pain management is triggered by an increase in a pulse rate detected by a wearable device, which may be determined from inference used by the example embodiment on the knowledge base to be associated with a fever and also with pain.

The example embodiment may generate a user's Current Story from Story Model Inputs processed from sensors and other sources of simple data (see FIG. 12) as well as from extractors trained on object detection (via Insight extraction Flow, FIG. 7). Recall that Story Model Inputs may include datastreams of different data types and process them into predicates, regardless of input data type. So, Story Model Inputs may generate (via predicates) a “picture” of a user's current situation, even in the absence of spoken or written words. This may facilitate monitoring, for example, of a cared-for user's ability to perform activities of daily living, such as going to the bathroom, as indicated by the sound of a flushed toilet, or preparing a meal, as indicated by a sensor when the refrigerator door is opened. This adds remote functionality to acquiring evidence for construction by the user's Story Model into user attributes and goals. For instance, converting sound and sensor data into language elements, such as "flushed toilet" or "opened refrigerator," may provide communicable "facts" useful to remotely monitoring the wellbeing and state of independence of the cared-for when clinicians and family members cannot be physically present. Similarly, the conversion of non-language data (e.g., images and videos) into predicates may be performed as described elsewhere. This may facilitate the use of the AI computational tools in collecting visual evidence of a user's situation, behavior, condition, goals, and other matters, for a wide range of purposes, including in support of assessments and therapies.

Since the example embodiment may produce predicates for all Story Model Inputs, all inputs may be compared as evidence with varying degrees of precision. Datastream types involving vital supplied health status measurements, such as blood pressure readings or pulse rates or blood test results, may provide a higher degree of probability of being true as well as precision than language only representations. Compare "my heart is racing," expressed as a predicate, "0.85::is_state("heart","racing"), and a pulse rate of 140, expressed as predicate from the machine input, 1.0::is_measurement("pulse",140). Likewise, data from genetic testing used to identify a person's potential mental, behavioral or physical health risk factors and predispositions, may be transformed into predicates. For instance, potential predispositions to heightened stress, inattentiveness, moodiness, substance abuse, and other ways of reacting or behaving are associated with certain genotypes, which, when identified through genetic testing, may be important datapoints in the assessment of a person's current or potential future condition, and thus inform clinical recommendations based on those assessments. These genetic and other biological data may be transformed into predicates, stored in the knowledge base, and like other predicates, used to construct attributes and goals, as well as to be available for use by AI probabilistic programming tools. In this manner, data and language elements may both be managed as predicates in the same system.

Further, the collection of synchronous non-language data and language data, for example, during a video call, may be used by the AI computational tools to infer relationships between converted predicates from different types of data. For example, the image of a face in a "frown", and the statement, "I can't do anything right," while different "facts," from different types of data (i.e., non-language data and language data), may express the same sentiment at the same time, and may be useful to clinicians seeking evidence to support their evaluation of patients on a video call.

Further in support of evaluations and recommendations are predicates converted from data that may not be received as inputs at the same time, yet which may facilitate the clinical use of the AI computational tools during such a video call, or at any other time. To continue with the example of the person frowning in the video who says "I can't do anything right", the person's genotype test results before or after the video call may identify the likelihood of the person's predisposition towards anxiety. The person's likelihood of having this predisposition may be assigned a numeric probability by the testing service or by a clinician reviewing the genomic results, which, in turn, may be received by the example embodiment as the initial value that it then may use to convert the testing service data into probabilistic predicates. While received and converted by the example embodiment into predicates at a different time than the video call is conducted, the testing service data (e.g., genomic/genetic data) may be managed as other predicates in the person's knowledge base may be managed by the user's Story Model. This adds considerably to the store of predicates converted from the video call data for use by the AI computational tools to improve the precision of the system's predictions about the user's current state, context and potential health condition. As will be explained below, the system also scores spoken and/or written words using health assessment classifiers trained on validated health instruments, anxiety for instance. These classifiers run on the same modalities of interaction, add clinical rigor and context, and may be used to add further probability to language analysis.

For example, the AI probabilistic programming tools may use health assessment scores and other data to predict congruity with a sentiment derived from statements and images, to predict no statistical or clinically significant congruity or incongruity, or alternatively, to predict incongruity, and assign a probability that the user's statement and images, are less likely to express what is true. To continue with the given example, if the user's genomic test does not identify a genotype known for its association with anxiety, and health assessment classifiers trained on validated health instruments, such as anxiety, do not identify from the user's voice (audio data) a level of anxiety suggested by only the user's words (text data), then it may be that the user in this example is not anxious, clinically speaking, but perhaps only trying to appear so. Through the operation of Story Model functions on predicates transformed from the language data and non-language data, the example embodiment may create logical relationships between the "facts" made available to the user's Story Model, assign new probabilities to these facts, and store the new relationships between these facts, and their new probabilities, in the knowledgebase. To expand the system's reach of clinical medicine and/or the deployment of expert services by using remote monitoring, the example embodiment may be given users' permission to "listen" to and/or to "watch" users throughout the day or under certain circumstance, by way of, for example, internet connected devices in the home or hospital, work, and/or mobile phones, among other means of access.

The example embodiment may develop a fuller picture of the "whole person" (e.g., a richer set of narrative abstractions), by using what it learns from any one type of data input to leverage all that it may know about the user from multiple different types of data inputs as well as from the transformations of these inputs into Story Data Types, from which more generalized determinations may be reached as to optimal next steps for the user. Thus, information from, say, just a sensor, may be used to build a "narrative" for the user about whom other information may be known by the example embodiment. Alternatively, if no other information about the user is known other than from a single input data type, the Story Object Hierarchy may still establish Story Data Types from the sole user inputs and tag them to the user, which may then be used as a basis for comparing the user's narrative abstractions with the narrative abstractions of other users, without having to reveal the user Identity, since the user may now be abstracted into a series of weighted roles, for instance, to determine candidates for similarity between abstractions of different users (e.g., similar roles, similar conflict-resolution sets, etc.). These narrative abstractions may then be compared, and even simulated as described below, to produce narrative abstractions that may serve as the basis upon which to make recommendation for a user based on only one type of initial data input. The resulting recommendation may be expressed through a Narrative Template. In this manner, the example embodiment may leverage the information of one type of data to return narrative output that may significantly increase the usefulness of the single data input.

To continue with the discussion of simulations, the example embodiment may use various methods to account for the fact that users may simply not complete every task in perfect order because of random events, including conflicts caused by a missed deliverable by another party or object in a contract. Everyday life situations are often cast this way, "An employee was late to the meeting because they were in a car accident." In these situations, drift detection, use case resolution and use case discovery, among various other methods, as previously described, may be used to handle real-time adjustments after impact analysis of recommended actions. And, in terms of anticipating such scenarios, the example embodiment may attempt to approximate (using a variety of methods) the probability of missed deliverables using real world information (e.g., "no parking" is usually more likely than "car accident" which itself is less likely than "sleeping in") customized when possible to the user. But it may be impossible to extensively explore the exponential number of all possible scenarios representable with narrative abstractions. And so, the example embodiment may use a probabilistic version of story propagation to simulate a still vast range of possible scenarios, by using sequential forecasting/simulation (e.g., Monte Carlo techniques), where events either happen or don't based on the estimated probabilities. Limited only by computational resources, enormous numbers of possible futures, even many steps ahead, may be simulated by the example embodiment. The ensemble of these future stories may then be studied such as looking for commonalities or anomalies/outlier detection. For example, if each scenario may be established as equally likely, by construction, probabilities may be assigned to future outcomes, e.g., the odds that you reach a particular goal value of role importance is 83.4%, although in practice systematic uncertainties (those not represented with the model) may be significant, particularly for complex situations and longer-term futures. The most important variables may be identified in reaching any particular outcome. For example, the main reason why a user does not complete her homework on time may be that her boyfriend will call (like he does every day around 5 p.m.). In other words, identities, which as narrative abstractions may comprise weighted roles and associated contracts (e.g., gives and gets between the example "boyfriend" and "girlfriend" vs gives and gets between "student" and teacher") deliverables, etc., may be simulated by the example embodiment. Results may then be used to construct attribute and goal inputs to the user's Actualizer. Methods such as this may facilitate an indexing of values for story elements across populations, which in turn may establish a basis for use by tensors in deep learning optimization models and a basis for many dataviews of embedded vector spaces. In this manner, the example embodiment may conduct a "backward" chaining from simulated narrative abstractions (e.g., roles, contracts, etc.) to specific people about which less may be known initially, but about whom enough may be known from Story Data Types to generate a recommendation on the basis of modest initial user inputs. Based on its validation of each user, the example embodiment may include the probability that a user performs the next best action and/or next suggested action in the probabilistic story generation.

In an abstract sense, the example embodiment may therefore turn inputs and the time evolution of attributes from implementations of Story Logic reflective of the Story object Hierarchy, into a narrative, a list of natural language statements generated from evaluations of Story Data Types. For example, "the task of taking pills was probably not completed" and "mental clarity went from 70% to 30%." With the generation of thousands or even millions of such simple statements, each tagged with a measurable value and a probability, the example embodiment may provide an extensive narrative. Various methods (e.g., via Story Logs) may be used to identify the key elements in this narrative and create a story of roles, contracts, conflicts, and reversals. The use of story elements as quantifiable inputs into optimization models may facilitate setting goals as tasks that produce outputs expressed as story elements. Because the Story Logic may be based on story structure and meaningful personal and social relationships, the example embodiment may provide significant meaning-making abilities in the form of intuitively understandable stories.

The automated conversion of raw input data by the example embodiment into interpretable stories may have transformative implications in a variety of areas. Narrative abstractions may be used by the example embodiment to identify from inputs a user's immediate narrative context, and through emulation and inspectable interactions help users address tradeoffs, foresee consequences, and resolve conflicts in the moment that may stand in the way of their goals. Their goals may be numerous, and from time to time they may exist in binary relationship to each other (e.g., "caregiver" role to take mom to see doctor vs "tennis player" role to take a tennis lesson) while at other times in non-binary relationship to each other (e.g., one may desire to be a good "worker" and also a good "father"). The example embodiment may analyze the user's immediate narrative context in terms of the user's full narrative context, which may include past narrative contexts and also potential future narrative contexts, the latter deriving in part from goals important to the user to achieve (and, in part from evidence of user attributes, including competencies as to which roles may be played). The example embodiment may factor into its recommendations its robust insights into each user's unique narrative contexts, goals and user attributes.

The example embodiment may use narrative abstractions, among other methods, to not only create unique, robust insight models for each person, as described earlier, but also to mediate between individual and group prerogatives. For example, the example embodiment may learn new insights from multi-directional interactions with employees that may be applied differently for different employees based on each one's own unique insight model. This may have the effect of reducing training period on how to use support technologies and instead shift the focus to helping employees work with the knowledge. Additionally, the example embodiment may be used to render organizational imperatives into emulative recommendations for each employee based on their role as an employee, which as mentioned above, may be one of many different roles a user may have.

And so, in this manner, the example embodiment may help manage the interplay between roles unique to each user. This may produce, for example, numerous ways for different individuals to find a balance between work life and home life that works uniquely for them.

The example embodiment also may help organizations transition from managing outcomes at a group level that may mask the diversity of subgroups to effectively managing outcomes at an individual level. For instance, in healthcare, the dominant practice of population health management concerns large populations of patients that may have in the aggregate various characteristics into which an individual may be type cast, and is a currently dominant way to manage care. The example embodiment may support population health management, through the kernels of its deep learning models, which may be used to satisfy these normative approaches to care management, and thus may meet various current organizational objectives. However, in a departure from the norm in healthcare, by applying techniques known in the art to specialize models, such as transfer learning, a small portion of the model's architecture may be trained to focus on a particular task associated with a particular user, i.e., it is capable of providing personalized care recommendations. Transfer learning may be used by the example embodiment to learn optimal strategies (sequences of recommended actions and communication use cases) for each user, while leveraging the population-wide knowledge contained in the model kernel. The recommended actions themselves may also be specialized by the example embodiment to the specifics of a given application of that use case, including to a particular user, via specialization logic specified in probabilistic programming routines associated with constituent subject-verb-object sets (SVOs).

Furthermore, the example embodiment may execute specializations associated with actions when the optimizer doesn't select them for execution, demonstrating a combination of models working in tandem to produce a better solution than perhaps either may alone. While this may represent an interweaving of deep learning and reasoning models, the routines associated with particular SVOs or actions may execute differently depending on the observed facts available in a given context, for each user. Customizing each user action recommendation in a manner that retains what the user may have in common with other users while also specializing the model to what is unique about each user may meet multiple objectives.

In health care, the example embodiment may help solve scalability challenges associated with personalized medicine, for example. The example embodiment may generate through each user's Story Model a unique representation of each user's current and envisioned story, which factor in user attributes and goals (via each user's Story Model Actualizer), to determine the best next action for that unique user. At the same time, the example embodiment may harness siloed knowledge and expertise in ways that may help organizations to find new life for their data (e.g., via leveraging it into actionable insights) and more efficient ways of deploying their expertise (e.g., via resource optimization, more efficient compliance, automated workflows, etc.—See FIG. 78 descriptions). In the example embodiment, organizations may be represented in various ways, including, as earlier described, as an Identity (Story Data Type). In the example of an organization, the Identity may comprise the roles of its experts, which roles may contract with roles of other users. Additionally, the organization may be represented as a cluster of individuals under one shared optimization context.

In contrast to other systems, the example embodiment may operate as a unified narrative model to enable interoperability and collaboration by propagating across a network of users a common set of abstractions that emulate how people may already express themselves and their thinking. Across networks of users, all User Story Models may use the same Story Object Hierarchy, same Story Data Types, and same inventory of methods for instantiating them. As an example of persistent methods, each user's Story Model may use semantically meaningful vectors to characterize insights, actions and communications for all data, while propagating context views of any data through each user's Story Model to provide persistence of personally relevant narrative contexts. This propagation may result in a deep and complex view of a user identity or role or other story object for purposes particular to each user.

Meanwhile, Story Data Types such as Contract may facilitate collaboration between a user's Story Model and another user's Story Model. Recall, contracts in the example embodiment may explicitly create ledgers to account for exchanges between various roles that comprise identities. The example embodiment may use contracts in various ways to derive insights into relationships between roles, and to compute conflicts (Story Data Type), which may stand in the way of goals important to a user, and to their Identity. The example embodiment may also use contracts in various ways to upweight or balance roles to overcome conflicts. In the example embodiment, conflict may be "internal" to a person and reflect an imbalance of roles. And so, some contracts facilitated by the example embodiment may be between different roles the same user may be trying to manage as part of their Identity (e.g., contract between "foodie" and "health nut" roles, representing conscious effort or plan to, say, lower body fat but still enjoy a highly caloric meal, although perhaps less often). In the example embodiment, some contracts may spawn other contracts. For example, resolving an "internal" conflict (e.g., "foodie" vs "health nut") may require one or more "external" contracts between roles of different users within their respective identities (e.g., the "foodie" role may result in a contract with other "foodies" to eat out regularly together; the "health nut" role may result in a contract with a "trainer" or an organization such as a gym.) In the example embodiment, certain roles may be upweighted to achieve the desired weighted relationship in a user's Identity (e.g., a new contract to upweight the "health nut" role may be created between the user and "work-out partners", thus adding to the user's number of existing contracts, which may already include a contract with a "trainer"). In other words, in the example embodiment, the Contract Story Data Type may be used to define, quantify and resolve "internal" as well as "external" conflicts to advance users towards desired goals, expressed as their envisioned story.

Recall also that when a user's Actualizer may recommend an action, this may spawn negotiations between the user Story Model and other users' Story Models, which may result in harnessing the agency of one user to simultaneously advance a desired role of another user. (To continue with the example of the "health nut" role, the other "health nuts" who join the user for workouts, which may advance the user's "health nut" role, may also be advancing their own "health nut" role.) This in turn may generate or execute a contract between roles played by different users, whose relationship with each other may be characterized in terms of the interplay between their respective roles, and how one may advance or deter another. In the example embodiment, this notion of advancing one role through agency of another may be fundamental to collaborations.

The example embodiment may use contracts to facilitate, create, document, monitor, audit, evaluate, formalize, manage, conduct, describe, conclude, narrate, summarize and annotate (e.g., from classifiers and extractors) collaborations, among various other functions (e.g., identifying conflicts, quantifying Identity, tracking deliverables, propagating a "story").

To return to the "health nut" example, collaborating with other "health nuts" during a workout may involve "turn taking" and "spotting" each other while lifting weights together. The "turn taking" may be between "lifter" and "spotter" as perhaps specified by a weightlifting Narrative Segment (use case) that to execute may require a Contract between "lifter" and "spotter", which in turn may require Role instantiations for "lifter" and "spotter", each with its own requirements, such as the deliverables, which also may be a constituent of the contract, which, as has been described, may be an exchange of deliverables between roles. In this example, a deliverable for "lifting" may be "150 pounds bench-pressed," which in turn may have requirements, including, say, a "bench" and measures, say, for the weights (e.g., 150 pounds) and degree of arm extension. Additionally, "health nut" and "lifter" and "spotter" may now be all "abstract" roles as well as associated and instantiated ones (e.g., one of Chad's health nut roles is a weightlifter), using Story Model Inputs. To continue the example, these Story Model Inputs may include processed image objects (picture of Chad hitting the 150 pound bench pressing mark), log data, classification scores of what Chad says evidencing high quality of social and physical well-being (Quality of life), schedules, extractions from lifting session, conversations leading up to it, and so forth.

The example embodiment may inspect the number of roles instantiated (e.g., "lifter") within and across contracts (e.g., instances where a user role may be as a "lifter" with a "spotter") to determine and analyze roles a user is observed to play, or may be "assigned" to play, for example as a recommended action (Narrative Segment) by the user's Actualizer. The example embodiment may measure role distributions to evaluate and measure Identity constituents contextually and to create "sub-Identities" for users. Recall, Identity may be a combination of roles and associated contracts. If, as a "health nut", a user is more of a "lifter" or a "spotter", for example, a "sub-Identity" for "health nut", for the user, may be a "lifter". Identity, which comprises roles and contracts, may have its own requirements as Story Data Type. For example, Identity may have a requirement related to contracts to context-mask a characterization of a user Identity by type of contracts and role, which in turn may require a Narrative Template. These requirements may be implemented to maintain the Story Object Hierarchy across Story Data Types. As a result, natural language output may be something like "[Identity: Chad] is a health nut who lifts weights with friends, and does more lifting than spotting."

In the example embodiment, "agency" may be evaluated through observation of contracts and promoted or fostered by them. Agency, how one person may help another, is inherent in stories and may be facilitated in the example embodiment via Story Data Types having complex interdependencies reflective of the Story Object Hierarchy and managed by methods as described (e.g., negotiations between users' Actualizers, contract propagation and monitoring, conflict identification, etc.). This notion of agency is inherent in many of life's situations, where another's expertise may be needed to overcome a conflict to advance towards a goal.

The example embodiment may generate a unique insight model (i.e., Story Model) for each user that may collaborate with the insight models of other users to advance each user optimally toward their respective goals.

Consider the case of many who suffer from chronic health conditions, who may rely heavily on others for support to perform activities of daily living. The example embodiment may help relieve some of the burden of identifying unique needs, recommending next actions, and resourcing solutions—through Story Model collaborations. To continue with the healthcare example, Story Model collaborations may involve those with chronic conditions, their family caregivers, providers, and others in a user's network. Through its own recommendations, based on the training of its extractors and classifiers on validated health instruments and care models, the example embodiment may help assess needs of each user and parse the work of care among users, and in some cases handle aspects of it (e.g., via case management cases it may be authorized to conduct). This may help address the growing gap between needs and the availability of trained resources, as well as the needs of the "whole person".

Regarding the whole person, recall that the Identity Story Data Type may comprise numerous weighted roles a person may have. In the example embodiment, desired roles may be valued as part of the user's envisioned story. In other words, desired roles may be goals. Through interactions with each user, each user's Story Model may help articulate all the goals important to each user and advance them towards their own envisioned story. Moreover, the example embodiment may facilitate an understanding of that story in a way other systems may be able to process, too. Recall that the Story Object Hierarchy may be used by the compiler in the example embodiment to render "story" into machine-readable data. This "rendering" may facilitate the promulgation of what is found to work best across networks, including those connected to the example embodiment—assuming enough "evidence" may be amassed by the example embodiment to satisfy standards for a new solution, service or product set by relevant authorities in relevant industries (e.g., Food and Drug Administration approvals, based on rigorously examined evidence of success).

By creating a scalable model for individual goal attainment that factors in the agency of others, the example embodiment may represent new possibilities for entirely new social and organizational models for how people may work with each other. FIG. 109 illustrates training steps for a Topic Model. The example embodiment may facilitate the training of a deep learning topic model on specific topics. In the example embodiment, a Topic Model may break down Story Model Inputs into trees of context-tagged and scored predicates and associated SVOs (see FIG. 51). During training of the topic model, datastream inputs to be processed as Story Model Inputs may be received as various data types from a plurality of expert sources. Expert sources may include, but may not be limited to, reference data based on prior validated evidence (e.g., via randomized controlled trial datasets), information from peer-reviewed standards and guidelines (e.g., FDA), and expert sources such as published papers, experts recognized in the field pertaining to the topic, industry thought leaders and trained practitioners credentialed by accredited organization(s) and licensed to practice. Once trained, the topic model may facilitate various operations of the example embodiment, as described in FIG. 51 and previously in FIGS. 39-42 and FIGS. 48-50.

FIG. 109 illustrates a flow in the training steps for a Topic Model. See FIG. 109 for description of steps.

FIG. 110 illustrates a use of a trained topic model to derive topics from multiple datastreams, including from users and various produced communications on various topics (e.g., videos, papers, speeches, reports, studies, etc.). The topic model in conjunction with tools for managing clusters of predicates (e.g., cluster summarization) may facilitate, among other functions, the development of Narrative Segments and communications strategy use cases, across all input datastreams supported by the example embodiment. Sees flow and description in figure.

The example embodiment may use various methods to determine similarity between various inputs, for example, as described in FIG. 111. FIG. 111 illustrates another method that the example embodiment may use to determine similarity between inputs. A process for determining reciprocity, a measure of how similar inputs may be between different users, or between any two sets of inputs, may begin with Story Model Inputs from processed datastreams, including vectorizations of inputs. To determine the degree of similarity, the cosine distance between respective vector distances may be averaged, and a reciprocity score calculated, as described in FIG. 111. Reciprocity may be used by the example embodiment in various ways to facilitate improved interactions between users. Reciprocity may be associated with user attributes, and be established as goals for users to reach during their interactions. For example, a professional (e.g., nurse speaking with a patient or an insurance representative speaking with a claimant) may receive a score for reciprocity during their conversation, which may be compared against a target score for reciprocity. In the example embodiment, a reciprocity score may be mapped to what is said and then analyzed, including for impact analysis. For example, the Actualizer of a nurse receiving a low reciprocity score may generate a communications strategy use case to lift the tone of the nurse's response and for the nurse to confirm more of what the patient says in the course of responding to the patient. Reciprocity may be used in evaluations of professional performance and in conjunction with the example embodiment to facilitate ongoing professional training and performance evaluations.

A combination of methods and models as described may continuously improve how the example embodiment derives evidence from Story Model Inputs and uses it to advance users towards their envisioned story. For example, topic models and reciprocity may be used to not only identify and address user drift from recommended actions but also to develop and customize Narrative Segments and communication strategy use cases for each user.

User interactions with the example embodiment may be facilitated via a Story Data Type referred to as a Narrative Template. Among other things, a Narrative Template may be used by the example embodiment to express natural language narratives for users to hear or see how a case management case may be progressing.

As a fuller description, a Narrative Template may specify the structure and nature of the user's digital view of and interactions with the example embodiment about one or more use cases that may include special requirements to produce an interactive report, document, page view, etc. A Narrative Template may use "markdown language" (e.g., Hyper Text Markup Language (HTML), Move-to-front (MTF) data transformation language) and various technologies to describe the digital view's appearance/presentation (e.g., CSS) or functionality/behavior to define how which content in which context from Story Model Inputs and from various user's Story Model functions may be produced as "documents", "page views", and so forth. Generated from requirements for use cases, or by the example embodiment to support various other communications needs, Narrative Templates may contain the logical skeleton for the particular template (e.g., e-mail summary, report on a patient's mental health, a targeted ad for a product, a legal brief, etc.). Narrative Templates may be developed for various personal and/or professional purposes, which may include, but may not be limited to, diaries, chief complaints (e.g., how a doctor may capture a patient's description of what hurts where), testimony, office visit recaps, synopsis, biographical sketches, progress reports, project management documents (e.g., where goals, responsibilities, and next steps may be discussed), call reports (which may be included in project management documents), research studies, patient monitoring and evaluation, meeting summaries and analysis, performance reviews, call center insights, survey results, case management cases (as per standards for information gathering and reporting in a given profession), communications summaries and insights, incident reports, review and summary of structured interviews, "patient journey", hospitalization stay summaries from admissions intake to discharge, clinical observations, story-telling (i.e., a story involving a key conflict that a person uses words and/or pictures to describe), story-projection (i.e., a story involving wishes that a person uses words and/or pictures to describe), recounting of events (e.g., accident reports, news "stories"), memoirs, obituaries, histories, and other sequences of actions that may be recounted, including for purposes of establishing chronology, conflicts, causation and consequences, and may be constructed from a probabilistic skeleton specialized in a generation use case, fulfilled by analysis of Story Model Inputs.

The example embodiment may populate a Narrative Template using a combination of Story Model functions based on Story Model Inputs. These combinations may include annotations of Story Model Inputs based on trained extractors and classifiers, Story Logs (including current and envisioned story values), impact analysis, health assessment scores, drift detection, topic modeling, abstractive summarization, context-masking, and other functions of the example embodiment as may be used to complete a Narrative Template. A Narrative Template may be responsible for assembling all Story Model information necessary to present the Story Model's current activities and insights to the end user, as well as to respond to requests for specific information and insights from the end user. This data may either be assembled from read-only data storage locations which may log Story Model activities, or generated by a request to the backend to compute a certain insight or perform a certain task needed to respond to a user interaction. A graphical widget may be used to generate and stylize graphical representations of data in support of the generated narrative and to conform the representation to requirements of an appropriate output or display device. Further, recall that outputs may in some instances be annotated/commented by users, which in turn may be handled as new Story Model Inputs. In such instances, Narrative Templates may be characterized as searchable and inspectable "living documents" that may be updated and available in real-time to users, depending on the scope of a given Narrative Template and access authorizations. One or more use cases per template may be tasked with transforming continuously arriving Story Model Inputs into updated structured document sections and posting them to the user facing Narrative Template. For example, let's say users may be developing a legal contract together. In this example, the Story Data Type Deliverable may be a "document" expressed as a Narrative Template which may itself have various dependencies on various other Story Data Types (e.g., Role, Contract, Narrative Segment, etc.)

The following may describe an example Narrative Template for a doctor's office visit. Recall that the Narrative Template may be an interface through which the user may interact with the example embodiment, and vice versa. As a template, it may be populated with information received from the user (e.g., comments, speech) as well as information from activity logs from active Story Models and bespoke requests for insights and computations from the example embodiment. In this application of the example embodiment, a narrative template may assemble these data sources to "document" a doctor's office visit. During an office visit, a patient's voice and a provider's voice may be represented by the Narrative Template as a transcript annotated with various scores and topics by each user's Story Model. For example, Narrative Segments (use cases) may use topic models to identify topics discussed during user interactions (e.g., Chad's high blood pressure, diet, stress at work, exercise) and to convert these into NL communications via the NL Generation module, such as topic headings. These may be displayed/communicated in a form and format useful to the doctor and to the patient, including as text or speech (NL). Each user may have a different interactive experience, depending on requirements and the Narrative Template customized for each user. Meanwhile, the example embodiment may import into an abstractive summarizer the transcripts produced by ASR during the interaction, which may be mapped to the topics discovered by the topic model (recall transcripts and topics both may be associated with underlying predicates). In turn, this summary may be displayed, and in a form commentable by each user. The example embodiment may score the new text generated by the summarizer about the topics discussed during the interaction, which also may be displayed via the Narrative Template. Furthermore, the example embodiment may construct from Story Logs when in the interaction a user (e.g., patient) may be shown to be moving towards or away from goals, and use the Narrative Template to highlight text in the original transcript for inspection associated with that advance/drift (e.g., "I'm exercising more"). The example embodiment may also conduct the following actions, as per a Narrative Segment for the office visit, and display results via the Narrative Template: analyze Story Logs to determine adherence to certain attributes for "patient" role in use case (e.g., drift on topic of dieting, but solid on topic of exercising) and to evaluate the evidence from device readings (e.g., slightly lower blood pressure since last visit, with accompanying graph showing longitudinality); analyze conflicts by comparing contracts involving roles (e.g., work role favored over family role?) and associating these with certain wellness or health scores (e.g., higher anxiety and lower quality of emotional well-being when discussing "work"); suggesting CPT codes or range of CPT codes based on Narrative Segments observed from the doctor and patient interaction; creating through a summarizer a summary of the visit of a specified length (e.g., 50-75 words) and a summary of the best next action for doctor (e.g., case management case action such as a medical prescription) and for patient (e.g., mindfulness exercises to lower anxiety), which in turn may be executed remotely through the example embodiment as Narrative Segments. Annotations made by the doctor on a Narrative Template for an office visit may be used by the example embodiment to now continue to shape interactions with the patient remotely. To continue with the example, these remote interactions with the example embodiment after the office visit may be handled as Story Model Inputs and used to "update" on a rolling basis a Narrative Template for remote monitoring, which the doctor may review and annotate before the patient's next office visit. If in between visits the patient-user's Story Model may determine that the user needs to see a doctor sooner, it may initiate as a best next action for the patient a scheduling event, say, as described in FIG. 78.

The foregoing illustration of a doctor and patient encounter is an example of how various "living documents" may be managed by and through the example embodiment to continuously guide users towards their envisioned story. In the example embodiment, such a living document may be the result of a Narrative Segment or Collection of Narrative Segments responsible for the definition and real-time augmentation (filling out) of the core template to which they are specialized. This augmentation may be accomplished via the satisfaction of requirements and the association of incoming Story Model inputs extracted to fulfill the requirements and logical action flow outlined in the Narrative Segment. Since the underlying input data may be expressed as predicates, and since predicates may also may be expressed as SVOs and topics, stored and encoded in the knowledge base as Story Data Types, and feed various models used by the example embodiment (e.g., Current and envisioned story generation, specialization logic models, drift detection, etc.), Narrative Templates that rely on predicates may change without affecting the underlying predicate data. This may facilitate real-time data views useful in developing new Narrative Templates and how various Narrative Templates may be used together for purposes of virtual case management.

Additionally, Narrative Templates may be used to facilitate social interactions between users based on interests and evidence of their own lives. For example, a Narrative Template, as stipulated by one or more specialized Narrative Segments may be populated from user interactions with the example embodiment, or with other users through the example embodiment involving one or more events that the user wishes to share with other users. The user may upload one or more images, or videos, to populate a Narrative Template that the user may then describe (e.g., a concert photo on which the user then comments). The user's interactions may be context-tagged and processed as Story Model Inputs, then used to generate recommendations, for instance, for planning for the event, inviting others to the event, purchasing tickets for the event, recording the event, and so forth. To continue with the illustration, the user's Actualizer may seek out the Actualizers of other users with similar interest in the event, and determine compatibility with them through a negotiation of their Actualizers. Then, interested users who respond to their Actualizers via NL may join the group initiated by the user posting the initial image or video, share their stories, and interact with the user, if they desire, as also may be established between Actualizers communicating with their respective users. To continue with the illustration, stories from users (e.g., reminiscences of past concerts, what to expect for future concerts, etc.), which may be gathered and summarized by topic by the example embodiment, may populate the Narrative Template. Additionally, the example embodiment may analyze group compositions, for instance by roles, and display this information using graphic widgets used by the Narrative Template (e.g., 37% of concert fans are moms, 27% are retired military, etc.). A Narrative Template may be used to help organize various activities of interest to users, whether of personal or professional interest (e.g., concert, celebration, business conference, etc.).

User tools providing inspectability and annotation of certain Story Model Inputs and Story Model functions (e.g., impact analysis) may facilitate the development, deployment, and curation of Narrative Templates for any legal purpose. These tools/features may also help extend the usefulness of Narrative Templates as "living documents." Tools and features to develop and curate Narrative Templates as "living documents" may include filtering, annotating, commenting and other features described herein, including FIGS. 87-92 and the descriptions included in these figures.

Narrative Templates may facilitate user inspection, annotation and/or response to certain Story Model Inputs and Story Model outputs in the example embodiment. In other words, they may provide a human-interpretable view of certain context-masked data. Further, various Narrative Templates may be created for various interactive purposes to assist users in advancing towards their respective goals, including in collaboration with others.

Narrative Templates may be used in conjunction with direct communication between users and their Story Models.

Recall, for example, users may interact with their Story Models directly as named entities (See again FIG. 4A specifications), as in the manner of a virtual assistant, virtual coach, virtual nurse, virtual doctor, virtual lawyer, virtual case manager, etc., related to any area of expertise or combinations of expertise, as may be expressed in roles, and therefore, identities, including for the user's Story Model. Recall further that Story Model Inputs may include inputs from the user—as well as inputs about the user, including from other users (e.g., via other users' Actualizers during a negotiation or collaboration).

While these user interactions may not necessarily require a Narrative Template, these interactions may be guided by Narrative Templates in certain contexts that the user may find productive. When a Narrative Segment is active or significant drift is detected, the skeleton of the active template may shift to a new template generated by one or more Narrative Segments to which the user interaction may be drifting, thereby adapting some Narrative Templates in content and form to user communications within the constraints of the available underlying Narrative Segments. For example, a case manager may "ask" her virtual assistant or virtual expert (the name she gives to her Story Model), "Elsa," to show her a client's progress since last visit—or to tell the progress to her. Returning the above described example of a doctor visit, the example embodiment may determine that the request may not be high urgency and so may perform this request using other Story Model functions (e.g., use case specialization logic). User queries may be processed as Story Model Inputs and machine responses (Story Model outputs) may be generated via NL as speech and/or as text and/or other modalities (e.g., texted link to current Narrative Template for the case management case), depending on user preference.

Thus, the disclosure and diagrams provided herein describe various example embodiments of an automated story model collaboration system. The example embodiments disclosed herein may facilitate deep meaning making as data are interpreted via a person's identity as a combination of weighted roles and associated contracts, tasks, skills and deliverables. Contracts may be used to represent relationships between roles explicitly. Contracts may be identified, managed, negotiated, traded, evaluated and assigned values. Values derive from evidence of actions, or non-action. Measures of value may include completeness, importance, satisfaction and dissatisfaction.

Some portions of this description describe the example embodiments in terms of algorithms or processes. These operations, while described functionally, computationally, or logically, are understood to be implemented by computer programs or equivalent electrical circuits, microcode, or the like. The described operations may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Example embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to herein may include a single processor or may be implemented with architectures employing multiple processor designs for increased computing capability.

Example embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially available operating systems and other known applications for purposes such as database management. These devices can also include other electronic devices, such as dummy terminals, virtual terminals, thin-clients, and other devices capable of communicating via a network.

Embodiments can utilize at least one network that would be familiar to those of ordinary skill in the art for supporting communications using any of a variety of commercially available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, or any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C #or C++ or any scripting language, such as Perl, Python, or TCL, as well as combinations thereof. The server(s) may also include database servers, including without limitation those commercially available from Oracle®, Microsoft®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those of ordinary skill in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element, or keypad) and at least one output device (e.g., a display screen, a display device, printer, or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed, and/or removable storage devices as well as storage media for temporarily and/or more permanently containing, storing, transmitting, and retrieving computer-readable information. The system and various devices also can include a number of software applications, modules, services, or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets, APIs, scripts, and the like), or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments and that many modifications and variations are possible.

The foregoing description of the example embodiments has been presented for the purpose of illustration; it is not intended to be exhaustive or to limit the invention to the precise forms disclosed. The description and drawings are, accordingly, to be regarded in an illustrative rather than a restrictive sense. The language used in the specification has been principally selected for readability and instructional purposes. It is therefore intended that the scope of the invention be limited not by this detailed description and drawings, but rather by any claims that issue based on this application. It will, however, be evident that various modifications and changes may be made thereunto without departing from the broader spirit and scope of the invention as set forth in the claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method comprising: processing a set of datastreams associated with a user, wherein the set of datastreams is continuously received in real-time, and wherein the set of datastreams corresponds to inputs associated with the user, other users, and different user devices; transforming the set of datastreams into story model inputs with at least one intermediate representation having at least one universal data type, wherein the story model inputs include a set of context-tagged scores generated using a classifier trained on validated reference data, and a set of context-tagged mentions generated using an extractor trained on validated models; translating the story model inputs into a set of story model objects, wherein the set of story model objects defines data structure dependencies and relationships on different story data types; processing the set of story model objects through a user story model to generate a user current story, wherein the user current story includes a profile of user attributes expressed in terms of different values corresponding to the different story data types, and wherein the user current story provides a representation of the user at a particular moment in time; processing the user current story through an envisioned story generation model to generate a user envisioned story, wherein the user envisioned story includes a set of target values corresponding to the different story data types; processing the user current story and the user envisioned story through an actualizer to identify one or more story model objects from the set of story model objects and that correspond to a narrative segment executable to cause a transition from the user current story to the user envisioned story; executing the narrative segment, wherein when the narrative segment is executed, new datastreams associated with the user are logged to determine an effectiveness of the narrative segment in achieving the user envisioned story; updating the user story model and the actualizer according to the effectiveness of the narrative segment in achieving the user envisioned story; and processing the new datastreams through the updated user story model and the updated actualizer to generate new user envisioned stories and new narrative segments corresponding to the new user envisioned stories.

2. The method of claim 1, wherein the set of datastreams is of a type from a group consisting of: video data, image data, audio data, text data, and simple data.

3. The method of claim 1, wherein processing the set of datastreams further comprises: performing automated feature extraction and datastream type specific processing on the set of datastreams.

4. The method of claim 1, wherein translating the story model inputs into the set of story model objects further comprises: transforming the story model inputs into tensor representations corresponding to a datatype of the set of datastreams.

5. The method of claim 1, further comprising: transforming the at least one intermediate representation of the story model inputs into predicates, subject-verb-objects (SVOs), and scores.

6. The method of claim 1, wherein each story model object from the set of story model objects includes an executable code portion and a story data type portion.

7. The method of claim 1, further comprising: determining a predicted impact that the one or more story model objects will have on a story object hierarchy associated with the other users; and updating the actualizer according to the predicted impact.

8. The method of claim 1, further comprising: determining a predicted impact that the one or more story model objects will have in transitioning the user current story to the user envisioned story; and updating the user story model and the actualizer according to a difference between the predicted impact and the effectiveness of the narrative segment.

9. The method of claim 1, wherein the actualizer identifies the one or more story model objects based on a predicted impact that the one or more story model objects will have in achieving the user envisioned story.

10. The method of claim 1, wherein executing the narrative segment further comprises: communicating a request for input required to continue execution of the narrative segment, wherein the request for input is routed to the user via a narrative template; and routing a response to the request for input through the narrative template.

11. The method of claim 1, further comprising: communicating a natural language output of the narrative segment to the user.

12. The method of claim 1, further comprising: performing a user story model collaboration between the user and different users through a networked data communication between the actualizer and different actualizers associated with the different users across a story model collaboration network.

13. The method of claim 1, further comprising: transmitting, through the actualizer, a request for resource resolution as a networked data communication to a different actualizer associated with a different user across a story model collaboration network.

14. The method of claim 1, further comprising: receiving a networked data communication from a different actualizer associated with a different user across a story model collaboration network, wherein the networked data communication includes a request for resource resolution corresponding to an executable action; and processing the request through the actualizer to generate a response, wherein the response is generated according to an impact of the resource resolution on the user envisioned story.

15. The method of claim 1, further comprising: determining a level of drift corresponding to a deviation between the user current story and the user envisioned story; and adjusting the narrative segment to reduce the level of drift.

16. The method of claim 1, further comprising: determining a level of drift corresponding to a deviation between the user current story and the user envisioned story; exchanging information between the user story model and a different user story model associated with a different user, wherein the information is exchanged in a user story model collaboration across a story model collaboration network; and using the user story model collaboration to adjust the narrative segment to reduce the level of drift.

17. The method of claim 1, wherein the narrative segment includes a contract, wherein the contract defines a sequence of deliverable exchanges amongst a user role corresponding to the user and other user roles corresponding to the other users; and wherein the narrative segment identifies and resolves conflicts that impact the contract and role performance associated with the user role and the other user roles as the new datastreams are logged.

18. The method of claim 1, wherein: generating the user envisioned story further comprises defining a set of goals based on a user role corresponding to the user, other user roles corresponding to the other users, and a set of contracts; and determining the effectiveness of the narrative segment further comprises determining an importance of the user role, the other user roles, and the set of contracts according to actions performed during execution of the narrative segment.

19. The method of claim 1, wherein the different values and the set of target values further correspond to user roles, contracts, and deliverables according to completeness, importance, satisfaction, and dissatisfaction measures.

20. The method of claim 1, further comprising: performing a negotiation corresponding to different contracts required by the user and the other users to fulfill different goal roles, wherein the negotiation is performed through a networked data communication between the actualizer and different actualizers associated with the other users across a story model collaboration network.

21. The method of claim 1, wherein the different values and the set of target values include at least one value corresponding to contracts and contract constituents.

22. The method of claim 1, wherein the narrative segment is executed to propagate new contracts to advance roles through planned deliverables within pairwise role contexts.

* * * * *